US012516058B2

(12) United States Patent
Choi et al.

(10) Patent No.: US 12,516,058 B2
(45) Date of Patent: Jan. 6, 2026

(54) SMALL-MOLECULE COMPOUNDS FOR CONTROLLING ENDOSOMAL TOLL-LIKE RECEPTORS AND THERAPEUTIC AGENT FOR AUTOIMMUNE DISEASES USING SAME

(71) Applicant: S&K THERAPEUTICS, Suwon-si (KR)

(72) Inventors: Sangdun Choi, Suwon-si (KR); Chang Hee Suh, Seoul (KR); Uisuk Jeong, Suwon-si (KR); Yangseon Choi, Suwon-si (KR); Wook-Young Baek, Hwaseong-si (KR); Kevin Jaesuk Choi, Suwon-si (KR); Chun Young Im, Daegu (KR); Doohyun Lee, Daegu (KR); Nam Hui Kim, Daegu (KR); Seungyeon Lee, Daegu (KR); Hyo-Ji Kim, Daegu (KR); Sang Kyoon Kim, Daegu (KR); Yoojin Oh, Daegu (KR); So Young Kim, Daegu (KR); Ye Ri Han, Daegu (KR)

(73) Assignee: S&K THERAPEUTICS, Suwon-si (KR)

( * ) Notice: Subject to any disclaimer, the term of this patent is extended or adjusted under 35 U.S.C. 154(b) by 434 days.

(21) Appl. No.: 18/035,190

(22) PCT Filed: Nov. 25, 2021

(86) PCT No.: PCT/KR2021/017501
§ 371 (c)(1),
(2) Date: May 3, 2023

(87) PCT Pub. No.: WO2022/114808
PCT Pub. Date: Jun. 2, 2022

(65) Prior Publication Data
US 2024/0018139 A1    Jan. 18, 2024

(30) Foreign Application Priority Data
Nov. 26, 2020 (KR) .................. 10-2020-0160977

(51) Int. Cl.
*C07D 471/04* (2006.01)
*A61P 37/02* (2006.01)

(52) U.S. Cl.
CPC ............ *C07D 471/04* (2013.01); *A61P 37/02* (2018.01)

(58) Field of Classification Search
CPC .................. C07D 471/04; A61P 37/02
See application file for complete search history.

(56) References Cited

U.S. PATENT DOCUMENTS

| 2010/0028299 A1 | 2/2010 | Einav et al. |
| 2011/0081365 A1 | 4/2011 | Cortez et al. |
| 2014/0155375 A1* | 6/2014 | Chen .................. A61P 43/00 514/211.09 |

FOREIGN PATENT DOCUMENTS

| CN | 103864780 A | 6/2014 |
| CN | 105992766 A | 10/2016 |
| JP | 2019-531280 A | 10/2019 |
| KR | 10-2020-0101393 A | 8/2020 |
| KR | 10-2020-0121823 A | 10/2020 |
| WO | 2010/046013 A1 | 4/2010 |
| WO | 2011/075613 A1 | 6/2011 |
| WO | 2017/106607 A1 | 6/2017 |
| WO | 2019/225920 A1 | 11/2019 |
| WO | 2020/086503 A1 | 4/2020 |

OTHER PUBLICATIONS

Kaczmarek, et al., "Synthesis of 6-Substituted 6H-Indolo[2,3-b]Quinolines as Novel Cytotoxic Agents and Topoisomerase II Inhibitors", Acta Poloniae Pharmaceutica—Drug Research, 2002, vol. 59, No. 3, pp. 199-207.

Chemical Abstract Compounds Registry (STN), retrieved on Jun. 24, 2024: (2) RN: 1010898-17-5 (Mar. 30, 2008) (3) RN:1246042-73-8 (Oct. 12, 2010) (4) RN:1010914-84-7 (Mar. 30, 2008) (5) RN:1010894-74-2 (Mar. 30, 2008) (6) RN:1010892-46-2 (Mar. 30, 2008) (7) RN:1010873-39-8 (Mar. 30, 2008) (8) RN:1219543-52-8 (Apr. 19, 2010) (9) RN:1010933-63-7 (Mar. 30, 2008) (10) RN:1010935-70-2 (Mar. 30, 2008) (11) RN:1010934-66-3 (Mar. 30, 2008) (12) RN:1010930-19-4 (Mar. 30, 2008) (13) RN:1010923-08-6 (Mar. 30, 2008) (14) RN:1010916-07-0 (Mar. 30, 2008) (15) RN:1010892-16-6 (Mar. 30, 2008) (16) RN:1010883-33-6 (Mar. 30, 2008) (17) RN:1010879-15-8 (Mar. 30, 2008) (18) RN:1010878-71-3 (Mar. 30, 2008) (19) RN: 1010877-56-1 (Mar. 30, 2008) (20) RN:1010912-23-8 (Mar. 30, 2008), 6 pages.

Martins, et al., "Synthesis and biological assessment of diversely substituted furo[2,3-b]quinolin-4-amine and pyrrolo [2,3-b]quinolin-4-amine derivatives, as novel tacrine analogues", European Journal of Medicinal Chemistry, 2011, vol. 46, pp. 6119-6130.

Office Action issued Jul. 2, 2024 in Japanese Application No. 2023-531626.

(Continued)

Primary Examiner — Timothy R Rozof
(74) Attorney, Agent, or Firm — Sughrue Mion, PLLC

(57) ABSTRACT

Antagonistic small-molecule compounds having a function of inhibiting endosomal Toll-like receptors (TLRs), more specifically, a small-molecule compound for inhibiting TLR3/7/8/9 signaling pathways, a composition for inhibiting Toll-like receptors, containing the compound; and a composition for preventing or treating autoimmune diseases, inflammatory diseases, or viral diseases are disclosed. The novel compound shows very significant results in a systemic lupus erythematosus animal model by not only preventing TNF-α secretion induced by poly I:C (TLR3 agonist), imiquimod (TLR7 agonist), TL8-506 (TLR8 agonist), or ODN2395 (TLR9 agonist), but also inhibiting the production of inflammatory cytokines. This suggests that the compound is also useful for the prevention or treatment of TLR3, TLR7, TLR8 or TLR9-associated autoimmune diseases, inflammatory diseases and viral diseases.

7 Claims, 41 Drawing Sheets

(56) References Cited

OTHER PUBLICATIONS

Olivier Demaria et al., "TLR8 deficiency leads to autoimmunity in mice", The Journal of Clinical Investigation, Oct. 2010, vol. 120, No. 10, pp. 3651-3662 (12 total pages).
Sandra S. Diebold et al., "Innate Antiviral Responses by Means of TLR7-Mediated Recognition of Single-Stranded RNA", Science, Mar. 5, 2004, vol. 303, pp. 1529-1531 (4 total pages).
Florian Heil et al., "Species-Specific Recognition of Single-Stranded RNA via Toll-like Receptor 7 and 8", Science, Mar. 5, 2004, vol. 303, pp. 1526-1529 (4 total pages).
Hiroaki Hemmi et al., "A Toll-like receptor recognizes bacterial DNA", Nature, Dec. 7, 2000, vol. 408, pp. 740-745 (6 total pages).
Hiroaki Hemmi et al., "Small anti-viral compounds activate immune cells via the TLR7 MyD88-dependent signaling pathway", Nature Immunology, Feb. 2002, vol. 3, No. 2, pp. 196-200 (5 total pages).
Arthur M. Krieg et al., "Toll-like receptors 7, 8, and 9: linking innate immunity to autoimmunity" Immunological Reviews, 2007, vol. 220, pp. 251-269 (19 total pages).
Ann Marshak-Rothstein, "Toll-like receptors in systemic autoimmune disease", Nature Reviews, Immunology, Nov. 2006, vol. 6, pp. 823-835 (13 total pages).
Alexander Poltorak et al., "Defective LPS Signaling in C3H/HeJ and C57BL/10ScCr Mice: Mutations in Tlr4 Gene", Science, Dec. 11, 1998, vol. 282, pp. 2085-2088 (5 total pages).
Todd W. Rice et al., "A randomized, double-blind, placebo-controlled trial of TAK-242 for the treatment of severe sepsis", Crit Care Med, 2010, vol. 38, No. 8, pp. 1685-1694 (10 total pages).
R.I. Rynes, "Antimalarial Drugs in the Treatment of Rheumatological Diseases", British Journal of Rheumatology, 1997, vol. 36, No. 7, pp. 799-805 (7 total pages).
Osamu Takeuchi et al., "Discrimination of bacterial lipoproteins by Toll-like receptor 6", International Immunology, 2001, vol. 13, No. 7, pp. 933-940 (8 total pages).
Osamu Takeuchi et al., "Cutting Edge: Role of Toll-Like Receptor 1 in Mediating Immune Response to Microbial Lipoproteins", The Journal of Immunology, 2002, vol. 169, pp. 10-14 (6 total pages).
Dorothea Terhorst et al., "Dynamics and Transcriptomics of Skin Dendritic Cells and Macrophages in an Imiquimod-Induced, Biphasic Mouse Model of Psoriasis", The Journal of Immunology, Oct. 14, 2015, pp. 1-9 (10 total pages).
Fabien B. Vincent et al., "The BAFF/April system in SLE pathogenesis", Nature Reviews, Rheumatology, Jun. 2014, vol. 10, pp. 365-373 (9 total pages).
Zhikuan Zhang et al., "Structural Analysis Reveals that Toll-like Receptor 7 is a Dual Receptor for Guanosine and Single-Stranded RNA", Immunity, Oct. 18, 2016, vol. 45, pp. 1-12 (13 total pages).
Extended European Search Report dated Sep. 24, 2024 in Application No. 21898634.7.
Guo, et al., "Preparation of Novel Pyrrolo[2,3-b]pyridine Derivatives via a New Concise Synthetic Approach", Bulletin of the Korean Chemical Society, 2015, vol. 36, pp. 1143-1147 (5 pages).
Blackburn, et al., "Isoteric Replacement of The Indole Nucleus By Benzothiopene in a Series of Pyrido[2,3-*b*]Indoles With Potential Anxiolytic Activity", Bioorganic & Medicinal Chemistry Letters, 1995, vol. 5, No. 22, pp. 2589-2592 (4 pages).
Iaroshenko, et al., "Synthesis of Fluorinated Pyrrolo[2,3-*b*]pyridine and Pyrrolo[2,3-*d*]pyrimidine Nucleosides", Synthesis 2009, No. 11, pp. 1851-1857 (7 pages).
Chemical Abstract Compound, STNext RN 1010920-57-6, Mar. 30, 2008.
Ondrej Benek et al., "Design, Synthesis and in vitro Evaluation of Indolotacrine Analogues as Multitarget-Directed Ligands for the Treatment of Alzheimer's Disease", ChemMedChem, 2016, pp. 1264-1269, vol. 11, No. 12.
Request for the Submission of an Opinion issued in KR 10-2020-0160977, dated Sep. 20, 2022.
Khalid Mohammed et al., "Synthesis of new pyrrolo [2, 3-b] pyridines as a potent inhibitor of tumour necrosis factor alpha", Arc. Pharm. Pharm. Med. Chem., 2004, pp. 15-19, vol. 337, No. 1.
Yutaka Nakajima et al., "Synthesis and evaluation of 1H-pyrrolo [2, 3-b] pyridine derivatives as novel immunomodulators targeting Janus kinase 3", Chem. Pharm. Bull., 2015, pp. 341-353, vol. 63, No. 5.
International Search Report of PCT/KR2021/017501 dated Mar. 2, 2022 [PCT/ISA/210].
Gao Diaoqing, et al., "Effect of TLR2 Signaling Pathway in Inflammatory Response in RAW264.7 Cells of Kawasaki Disease Model and Its Mechanism", Chinese Remedies & Clinics, Jan. 2019, vol. 19, No. 2, pp. 1-6 (11 pages total).
Office Action issued Feb. 25, 2025 in Chinese Patent Application No. 202180079593.3.
Search Report dated Feb. 24, 2025 issued by the China National Intellectual Property Administration in application No. 202180079593.3.

\* cited by examiner

FIG. 3D

| Name | SMILES | IUPAC Name | MW (g/mol) |
|---|---|---|---|
| SK09 | CCc1nc2n(CCN(C)C)c(C)c(C)c2c(N)c1C | 1-(2-(dimethylamino)ethyl)-6-ethyl-2,3,5-trimethyl-1H-pyrrolo[2,3-b]pyridin-4-amine | 274.41 |
| SK11 | Cc1c(C)c2c(N)c3CCCCCc3nc2n1CCCN1CCOCC1 | 5,6-dimethyl-4-(3-(morpholin-4-yl)propyl)-1,2,4-diazatricyclo[7.5.0.0²,⁷]tetradeca-1(9),2,5,7-tetraen-8-amine | 356.51 |
| SK13 | CN(C)CCn1c(C)c(C)c2c(N)c3CCCCc3nc12 | 1-(2-(dimethylamino)ethyl)-2,3-dimethyl-1H,5H,6H,7H,8H-pyrrolo[2,3-b]quinolin-4-amine | 286.42 |
| SK14 | CN(C)CCCn1c(C)c(C)c2c(N)c3CCCCCc3nc12 | 4-(3-(dimethylamino)propyl)-5,6-dimethyl-2,4-diazatricyclo[7.6.0.0²,⁷]pentadeca-1(9),2,5,7-tetraen-8-amine | 314.48 |
| SK16 | CN(C)CCCn1c(C)c(C)c2c(N)c3CCCCCc3nc12 | 4-(3-(dimethylamino)propyl)-5,6-dimethyl-2,4-diazatricyclo[7.5.0.0²,⁷]tetradeca-1(9),2,5,7-tetraen-8-amine | 314.48 |
| SK19 | CCCc1nc2n(CCN(C)C)c(C)c(C)c2c(N)c1CC | 1-(2-(dimethylamino)ethyl)-5-ethyl-2,3-dimethyl-6-propyl-1H-pyrrolo[2,3-b]pyridin-4-amine | 302.47 |

FIG. 4E

Therapeutic Index (TI)

| Target TLR | Ligand Name | LC₅₀ (µM) | IC₅₀ (µM) | TI (LC₅₀ / IC₅₀) |
|---|---|---|---|---|
| TLR3 | SK01 | 89.91 | 5.99 | 15.01 |
| | SK16 | 35.22 | 1.69 | 20.84 |
| | HCQ | 52.22 | 6.6 | 7.91 |
| TLR7 | SK01 | 89.91 | 5.47 | 16.45 |
| | SK16 | 35.22 | 3.44 | 10.23 |
| | HCQ | 52.22 | 3.21 | 16.27 |
| TLR9 | SK01 | 89.91 | 0.76 | 118.04 |
| | SK16 | 35.22 | 0.24 | 145.42 |
| | HCQ | 52.22 | 1.71 | 30.47 |

FIG. 10

| ID | LC50 | Raw264.7 cell line (unit : µM) | | | |
|---|---|---|---|---|---|
| | | TLR7 | | TLR9 | |
| | | IC50 (mTNFα) | TI value | IC50 (mTNFα) | TI value |
| HCQ | 52.20 | 3.20 | 16.31 | 1.71 | 30.53 |
| SK16 | 48.30 | 2.70 | 17.89 | 0.20 | 241.50 |
| SK24 | 58.10 | 2.31 | 25.15 | 0.41 | 142.05 |
| SK29 | 91.80 | 2.07 | 44.35 | 0.50 | 185.45 |
| SK36 | 29.90 | 1.38 | 21.67 | 0.18 | 170.86 |
| SK39 | 55.56 | 1.02 | 54.26 | 0.43 | 128.34 |
| SK40 | 121.50 | 2.86 | 42.53 | 0.37 | 325.48 |
| SK41 | 67.18 | 0.63 | 106.63 | 0.16 | 419.88 |
| SK50 | 34.06 | 0.35 | 97.82 | 0.06 | 562.60 |
| SK52 | 37.70 | 0.83 | 45.44 | 0.14 | 261.81 |
| SK54 | 18.62 | 0.94 | 19.83 | 0.13 | 144.23 |
| SK55 | 30.20 | 1.38 | 21.95 | 0.24 | 123.67 |
| SK58 | 51.19 | 0.68 | 75.65 | 0.12 | 422.71 |
| SK64 | 54.23 | 0.40 | 135.91 | 0.04 | 1227.20 |
| SK75 | 23.91 | 1.05 | 22.79 | 0.16 | 148.33 |

SMALL-MOLECULE COMPOUNDS FOR CONTROLLING ENDOSOMAL TOLL-LIKE RECEPTORS AND THERAPEUTIC AGENT FOR AUTOIMMUNE DISEASES USING SAME

CROSS REFERENCE TO RELATED APPLICATIONS

This application is a National Stage of International Application No. PCT/KR2021/017501, filed Nov. 25, 2021, claiming priority to Korean Patent Application No. 10-2020-0160977, filed Nov. 26, 2020.

TECHNICAL FIELD

The present invention relates to antagonistic small molecule compounds having inhibitory activity against endosome Toll-like receptors (TLRs), and more particularly, to small-molecule compounds inhibiting the signaling pathways of Toll-like receptors 3/7/8/9, a composition for inhibiting Toll-like receptors comprising the same, and a composition for preventing or treating an autoimmune disease, an inflammatory disease or a viral disease comprising the same.

BACKGROUND ART

Innate (or congenital) immunity is the first defense line against bacterial infection in the mammalian immune system and is activated when pattern recognition receptors such as Toll-like receptors (TLRs) recognize pathogen-associated molecular patterns (PAMPs) or damage-associated molecular patterns (DAMPs). Examples include triacyl lipoprotein (e.g., Pam$_3$CSK4) recognized by TLR1/2 (Takeuchi, O. et al., *J. Immunol.* 169: 10-14 (2002)), diacyl lipoprotein (e.g., Pam$_2$CSK$_4$) recognized by TLR2/6 (Takeuchi, O. et al., *Int. Immunol.* 13: 933-940 (2001)), lipopolysaccharide (LPS) recognized by TLR4 (Poltorak, A. et al., *Science* 282: 2085-2088 (1998)), bacterial flagellin recognized by TLR5 (Poltorak, A. et al. *Science* 282: 2085-2088 (1998), viral double-stranded RNA (dsRNA) recognized by TLR3 (Poltorak, A. et al. al., *Science* 282: 2085-2088 (1998)), viral single-stranded RNA (ssRNA) recognized by TLR7 and TLR8 (Diebold, S. S. et al., *Science* 303: 1529-1531 (2004); Heil, F. et al., *Science* 303: 1526-1529 (2004)), unmethylated CpG-containing oligodeoxynucleotides (ODN) recognized by TLR9 (Hemmi, H. et al. *Nature* 408: 740-745 (2000)) and the like.

TLRs play a key role in the innate immune response, and are classified into extracellular TLRs acting on the plasma membrane, including TLR1, TLR2, TLR4, TLR5, TLR6 and TLR11, and intracellular TLRs acting in cells such as endosomes, including TLR3, TLR7, TLR8, and TLR9. Structurally, TLRs have a leucine-rich repeat (LRR) site recognized by a ligand or accessory molecule at the N-terminus of the extracellular domain, and have a Toll/interleukin 1 receptor (TIR) domain that delivers a signal to the C-terminus of the intracellular part.

In particular, TLR3, TLR7, TLR8, and TLR9 detect exogenous single-stranded RNA (ssRNA), double-stranded RNA (dsRNA) and CpG DNA, which are exposed to endosomes from extracellular invading pathogens, or recognize, as ligands, endogenous ssRNA or DNA fragments exposed from tissue damaged by necrosis or apoptosis in tissue due to an abnormal response, thereby amplifying inflammatory cytokines through signaling processes. In general, TLR7 and TLR8 recognize ssRNA from influenza or damaged cells, while TLR9 detects CpG DNA fragments generated from the genome of bacteria and viruses or damaged tissue, and TLR3 recognizes dsRNA, which is an intermediate product of viral proliferation, thereby activating the innate immune response. Research on the use of TLR as a target for treatment of the immune-associated diseases is being actively conducted worldwide due to the known roles of TLR.

In MyD88 (myeloid differentiation primary response 88)-dependent signaling of TLR7/8/9, a dimer is formed with the corresponding ligand, and the TIR domain of TLR binds to the TIR domain of MyD88 to form a complex, so the signaling pathway is activated (Hemmi, H. et al., *Nat. Immunol.* 3, 196-200, (2002)). The activated TLR signal induces activation of NF-κB, migration thereof to the nucleus, and activation of MAPK, and expresses interferon α (IFNα) and IFN-inducible genes. The activation of NF-κB and MAPK causes secretion of inflammatory cytokines such as TNFα, IL-1β (interleukin 1β) and IL-6. The MyD88-independent signaling process of TLR3 is initiated by binding between the TIR domain of TLR3 and the TIR domain of TRIF (TIR domain-containing adapter-inducing interferon-β), and type 1 interferon is secreted due to the activation of the interferon regulatory factor (IRF). In addition, TLR activity produces oxidative stressors such as NO and ROS in macrophages.

The TLRs (TLRs 3, 7, 8, and 9) in the endosome membrane play an important role in protecting hosts from various viral and bacterial infections. In particular, the expression of TLRs 7, 8, and 9 is essential for sustained defense against pathogenic components or self-antigens released from damaged or stressed tissue/cells (Demaria, O. et al., *J. Clin. Invest.* 120: 3651-3662 (2010)). Malfunctions of these nucleic-acid-detecting TLRs have been associated with several autoimmune pathologies such as psoriasis and systemic lupus erythematosus (SLE) (Vincent, F B et al., *Nat. Rev. Rheumatol.* 10: 365-373 (2014)). However, the etiology of these diseases remains unclear (Krieg, A. M. & Vollmer, J., *Immunol. Rev.* 220: 251-269 (2007); Terhorst, D. et al., *J. Immunol.* 195: 4953-4961 (2015)). Thus, there is increasing need for the development of novel antagonists that inhibit the progression of endosomal TLR-mediated diseases.

As described above, TLR may serve as a target for treatment of various diseases such as autoimmune diseases, inflammatory diseases, viral diseases, and cancer, and thus research has been actively conducted on substances targeting TLRs and medical compositions for treating TLR-associated diseases.

Accordingly, as a result of intensive efforts to develop TLR-targeting substances and medical compositions for treating TLR-related diseases, the present inventors found that novel compounds comprising compounds defined as "SK" inhibit the secretion of cytokines by inhibiting the TLR-signaling pathways induced by TLR3, TLR7, TLR8 or TLR9 activation, and completed the present invention based on this finding.

The information described in the Background Art is only for improving understanding of the background of the present invention, and it is not to be construed as including information forming the related art already known to those of ordinary skill in the art to which the present invention belongs.

SUMMARY OF THE INVENTION

It is one object of the present invention to provide a small-molecule compound having a function of inhibiting TLRs (Toll-like receptors), and a composition for inhibiting TLRs (Toll-like receptors) comprising the same.

It is another object of the present invention to provide a composition for preventing or treating an autoimmune disease, an inflammatory disease or a viral disease comprising the small-molecule compound or the composition for inhibiting TLRs.

It is still another object of the present invention to provide a method for preventing or treating an autoimmune disease, an inflammatory disease or a viral disease comprising administering the small-molecule compound or the composition for inhibiting TLRs.

It is yet another object of the present invention to provide the use of the small-molecule compound or the composition for inhibiting TLRs for the prevention or treatment of an autoimmune disease, an inflammatory disease or a viral disease.

It is a further another object of the present invention to provide the use of the small-molecule compound or the composition for inhibiting TLRs for the manufacture of a medicament for the prevention or treatment of an autoimmune disease, an inflammatory disease or a viral disease.

In order to accomplish the above objects, the present invention provides a compound represented by the following Formula 1, an isomer thereof, or a pharmaceutically acceptable salt thereof:

[Formula 1]

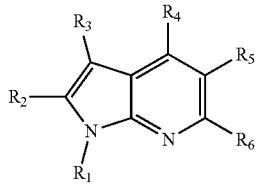

wherein $R_1$ to $R_6$ are identical to or different from each other, and are each independently a hydrogen atom, a halogen atom, straight- or branched-chain alkyl, amino, alkylamine, heterocyclic amine, a nitrile group, a nitro group, a nitroso group, hydroxy, cycloalkyl, benzyl, haloalkyl, allyl, alkoxy, alkoxyalkyl, alkylcarbonyl, cycloalkylcarbonyl, arylcarbonyl, alkylarylcarbonyl, alkoxycarbonyl, cycloalkoxy, aryl, heteroaryl, heterocycloalkyl, aryloxy, alkoxyheteroaryl, heteroaryloxyalkyl, alkylheteroaryl, alkylaryl, arylalkyl, alkylheteroaryl, alkylester, alkylether, alkylamide or acryl, or $R_2$ and $R_3$ are linked to each other to form a substituted or unsubstituted cyclic hydrocarbon or aromatic hydrocarbon, or $R_5$ and $R_6$ are linked to each other to form a substituted or unsubstituted cyclic hydrocarbon or aromatic hydrocarbon, wherein the alkyl, the alkylamine, the heterocyclic amine, the alkoxy, the alkoxyalkyl, the alkylester, the alkylether or the alkylamide is $C_{1-30}$, the cycloalkyl is $C_{3-30}$, the allyl is $C_{2-30}$, the aryl is $C_{6-30}$, and the heteroaryl and the heterocycloalkyl contain a heteroatom selected from fluorine, oxygen, sulfur, and nitrogen.

In addition, the present invention provides a composition for inhibiting Toll-like receptors (TLRs) comprising the compound represented by Formula 1, isomer thereof, or pharmaceutically acceptable salt thereof.

In addition, the present invention provides a composition for preventing or treating an autoimmune disease, an inflammatory disease or a viral disease comprising the compound or the composition for inhibiting TLRs.

In addition, the present invention provides a method for preventing or treating an autoimmune disease, an inflammatory disease or a viral disease comprising administering the compound or the composition for inhibiting TLRs.

In addition, the present invention provides the use of the compound or the composition for inhibiting TLRs for the prevention or treatment of an autoimmune disease, an inflammatory disease or a viral disease.

In addition, the present invention provides the use of the compound or the composition for inhibiting TLRs for the manufacture of a medicament for the prevention or treatment of an autoimmune disease, an inflammatory disease or a viral disease.

BRIEF DESCRIPTION OF DRAWINGS

FIG. 1 FIGS. 1A to 1E illustrate an overall computational screening workflow and evaluation of initial activity for TLR7 and TLR9 of product SK01.

FIG. 1A illustrates quantitative structure-activity relationship modeling and steps of the ligand screening process according to the present invention, wherein the first step is divided into several sub-steps described in orange boxes, FIG. 1B illustrates the inhibition of TNF-α induced by the TLR7 agonist imiquimod (IMQ), FIG. 1C is a graph showing the inhibition of TNF-α secretion induced by the TLR9 agonist ODN2395, wherein cells were treated with SK01 for 1 hour, followed by treatment with IMQ (3.61 μM) or ODN2395 (0.5 μM) for 4 hours, and secretion of TNF-α was detected by ELISA, FIG. 1D is a graph showing the evaluation of cytotoxicity of SK01 in mouse macrophage cell line RAW 264.7, wherein cells were treated with 20 or 50 μM SK01 for 24 hours, and cell viability was tested by MTT assay, FIG. 1E is a graph showing evaluation of agonistic activity of SK01, wherein cells were treated with the ligand for 24 hours, secretion of TNF-α was monitored by ELISA, cytokine induction by ODN2395 (0.5 μM) was shown for comparison, experiments were performed in triplicate and differences in means±SEM were evaluated by two-tailed Student's t-test (*p<0.05, **p<0.01).

FIG. 3 FIGS. 3A to 3D show the evaluation of activities for TLR7 and TLR9 of six derivatives of SK01 showing primary activity in FIG. 2.

FIG. 3A is a graph showing the inhibitory activities of SK01 derivatives against TLR7 activation, wherein RAW 264.7 cells were treated with 2 or 5 μM inhibitors for 1 hour and then treated with the TLR7 agonist IMQ for 4 hours, FIG. 3B is a graph showing the inhibitory activities of SK01 derivatives against TLR9 activation, wherein RAW 264.7 cells were treated with 0.5 or 2 μM inhibitors for 1 hour and then treated with the TLR9 agonist ODN2395 for 4 hours, and TNF-α secretion in all experiments was monitored by ELISA, FIG. 3C shows the two-dimensional structure of a ligand exhibiting TLR7/9 inhibitory activity in a cell-based assay, wherein SK01 was identified as an initial lead, and its derivative, SK16, was found to be a potent inhibitor for both TLR7 and TLR9, and FIG. 3D shows SMILES strings, IUPAC names and molecular weights of active ligands.

FIGS. 4A to 4E are diagrams showing the in vitro efficacy of SK01, SK16 and HCQ.

FIG. 4A is a graph showing the comparative evaluation of the cytotoxicity induced by SK01, SK16 and HCQ, wherein RAW 264.7 cells were exposed to increasing concentrations (12.5, 25, 50, 100 and 200 µM) of the ligand for 24 hours, and cell viability was monitored by MTT assay, and the graph shows $LC_{50}$ obtained from the % toxicity induced by the ligand at these predetermined concentrations and $LC_{50}$, indicating cell viability of 50% (in RAW 264.7 cells), was determined by nonlinear regression analysis of each concentration-response curve using GraphPad Prism 7 (GraphPad Software, USA), FIG. 4B is a graph of TLR3-dependent TNF-α secretion inhibition (%) to determine the inhibition of TNF-α secretion (pg/ml) induced by the TLR3 agonist poly I:C, FIG. 4C is a graph of TLR7-dependent TNF-α secretion inhibition (%) to determine the inhibition of TNF-α secretion (pg/ml) induced by the TLR7 agonist IMQ, FIG. 4D is a graph of TLR9-dependent TNF-α secretion inhibition (%) to determine the inhibition of TNF-α secretion induced by the TLR9 agonist ODN2395, in FIGS. 4B, 4C and 4D, RAW 264.7 cells were treated with predetermined concentrations of inhibitors for 1 hour, then stimulated with IMQ or ODN2395 for 4 hours and with poly I:C for 24 hours, secretion of TNF-α was measured by ELISA, values were averaged and shown as ratio based on the negative control (untreated, set at 0%) and positive control (agonist alone; set at 100% (the highest value in each case)), and the $IC_{50}$, which is the point at which TNF-α secretion is inhibited by 50%, was obtained through nonlinear regression analysis using GraphPad Prism 7 (GraphPad Software, USA), and FIG. 4E shows the therapeutic index of each drug for each TLR derived through the $LC_{50}$ and $IC_{50}$ obtained in FIGS. 4A to 4D.

FIGS. 5A to 5C show the inhibitory activities of SK01 on TLRs (TLR1/2, TLR2/6 and TLR4) exposed to the cell surface, and FIGS. 5D to 5G show the inhibitory activities of SK01 against endosome TLRs (TLR3, TLR7, TLR8 and TLR9), wherein RAW 264.7 cells were treated at predetermined concentrations with a negative control, a positive control (only ligand), additional positive control (ligand and 0.25% DMSO), or SK01 for 1 hour, and then stimulated with TLR-specific agonists for 4 or 24 hours (TLR3 only), a human monocytic cell line (THP-1) was used for TLR8 and THP-1 cells were treated with phorbol 12-myristate 13-acetate for 48 hours to induce cell differentiation, then treated with SK01 for 1 hour, and was treated with the TLR8 agonist TL8-506 for 4 hours, and the level of TNF-α secretion was measured by ELISA.

FIGS. 6A to 6C show the inhibitory activities of SK16 on cell surface TLRs (TLR1/2, TLR2/6 and TLR4), and FIGS. 6D to 6G show the inhibitory activities of SK16 on endosomal TLRs (TLR3, TLR7, TLR8 and TLR9), wherein RAW 264.7 cells were treated at predetermined concentrations with control (-), DMSO 0.25% or SK16 for 1 hour, and then stimulated with specific TLR agonists for 4 or 24 hours (for TLR3 only), a human monocyte cell line (THP-1) was used for TLR8, and THP-1 cells were treated with phorbol 12-myristate 13-acetate (PMA) for 48 hours to induce cell differentiation, followed by treatment with SK16 for 1 hour and treatment with the TLR8 agonist TL8-506 for 4 hours, and the level of TNF-α secretion was measured by ELISA, FIG. 6H shows the activity of signaling factors that transduce signals under TLR9, wherein a negative control group that was not treated with anything was set, a positive control group was set by administering SK16 to the RAW 264.7 cell line at each time point, the cells were treated with SK16 for 1 hour, followed by treatment with TLR9 agonist for 15 or 30 minutes, and the activity of the signal factor was determined through protein electrophoresis after quantifying the prepared sample.

FIG. 10 is a table comparing the measured $LC_{50}$, $IC_{50}$, and TI (therapeutic index) between 13 SK materials, including SK16, that showed effective inhibitory activities against TLR7 and TLR9, and hydroxychloroquine (HCQ).

DETAILED DESCRIPTION AND PREFERRED EMBODIMENTS OF THE INVENTION

Figure 1A:
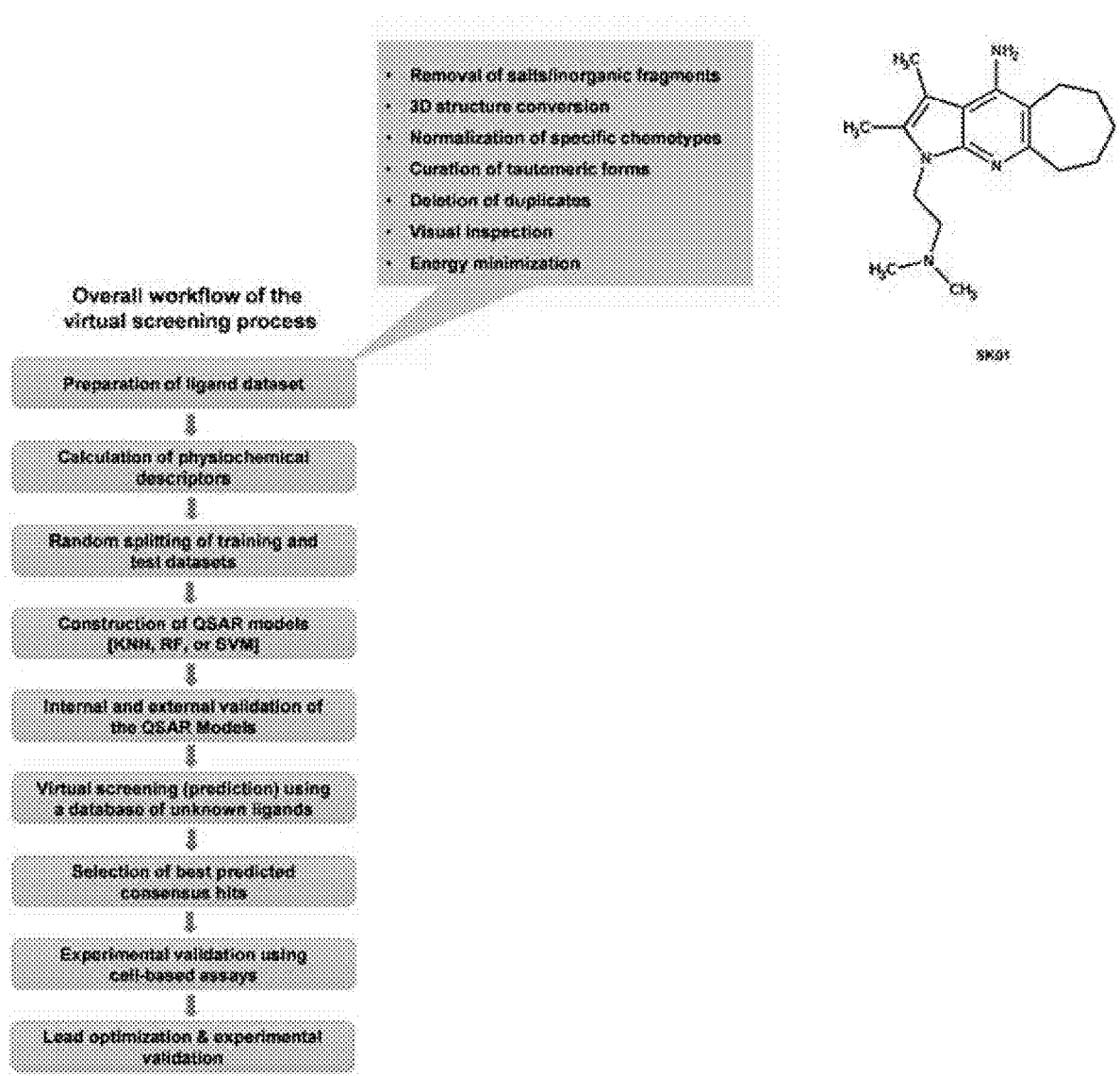
Figure 1B:
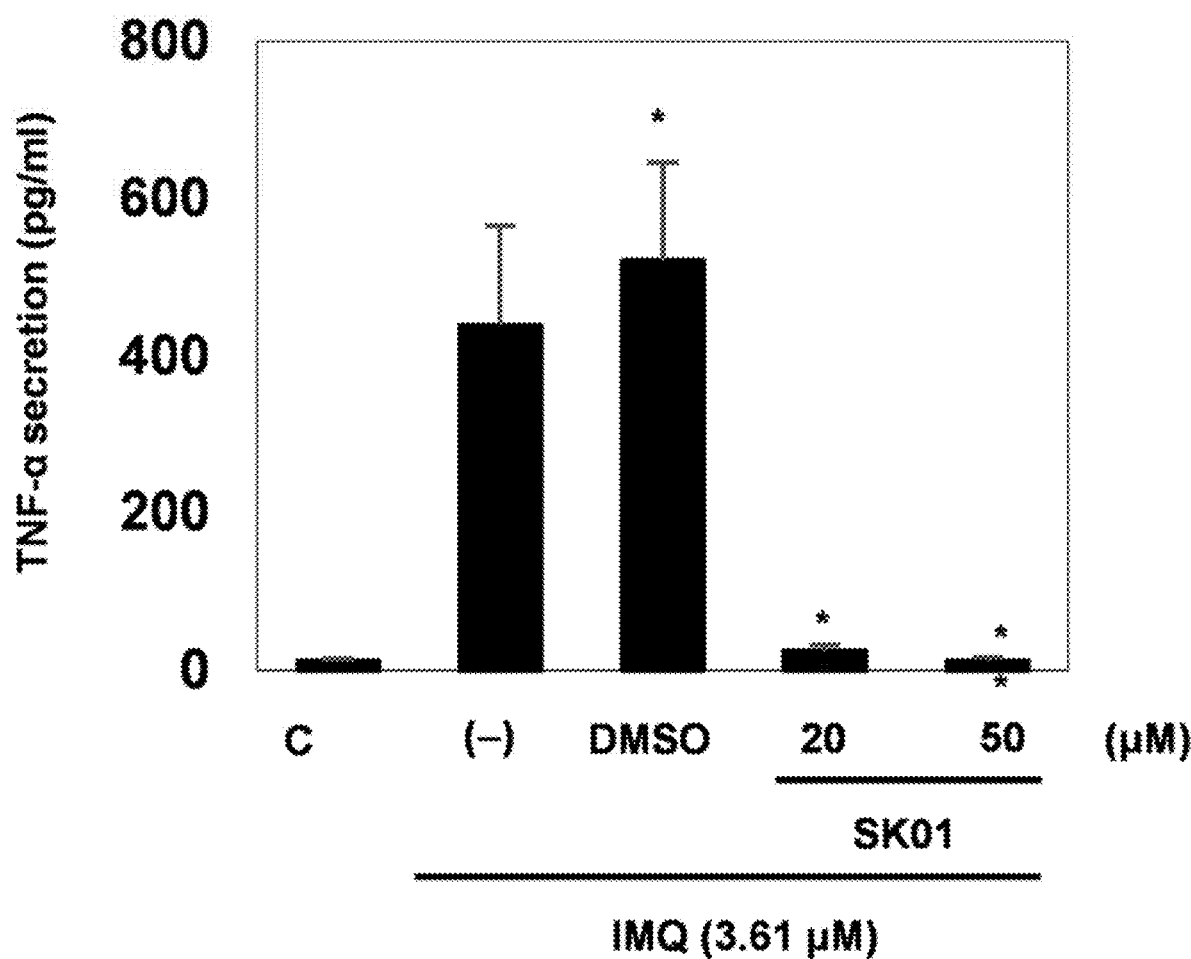
Figure 1C:
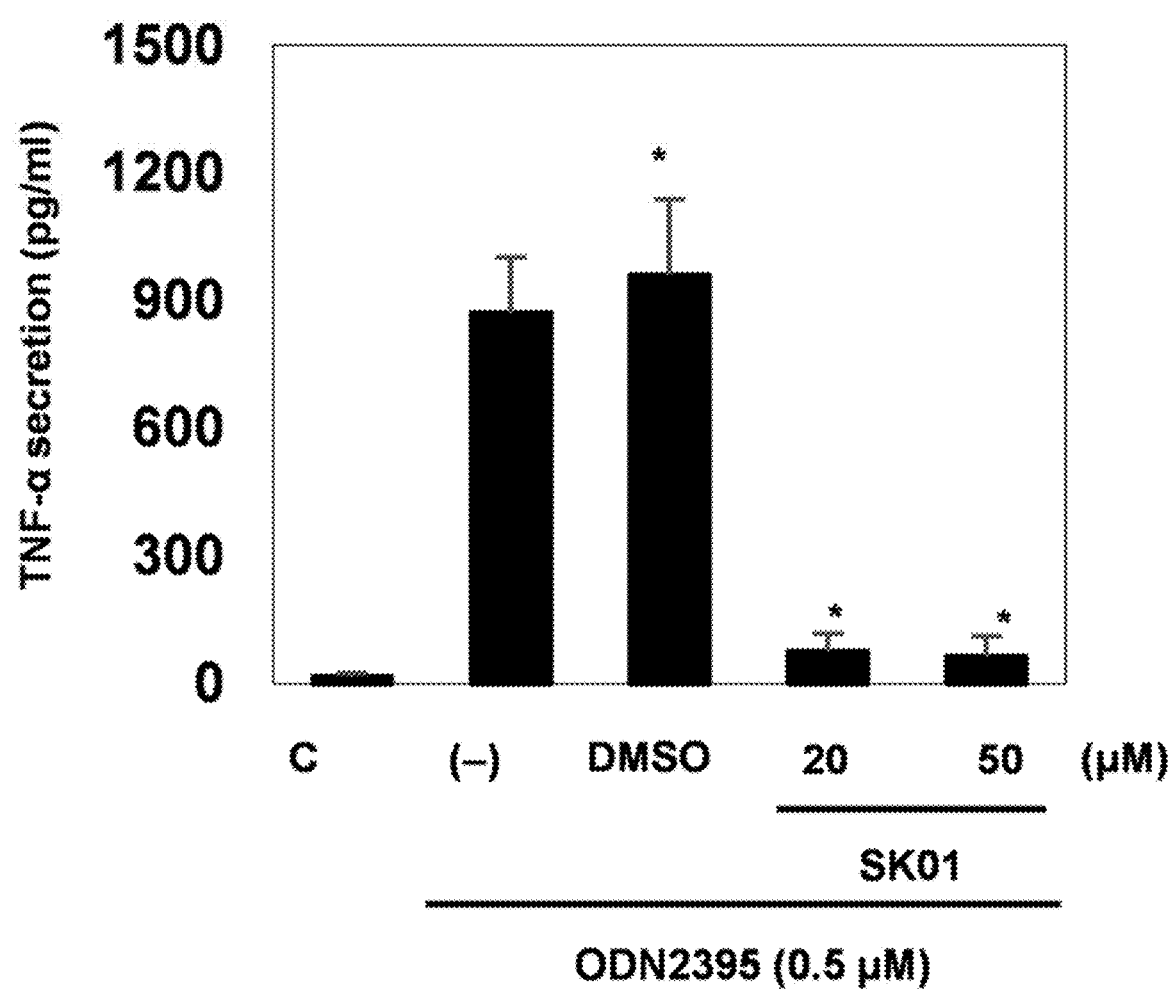
Figure 1D:
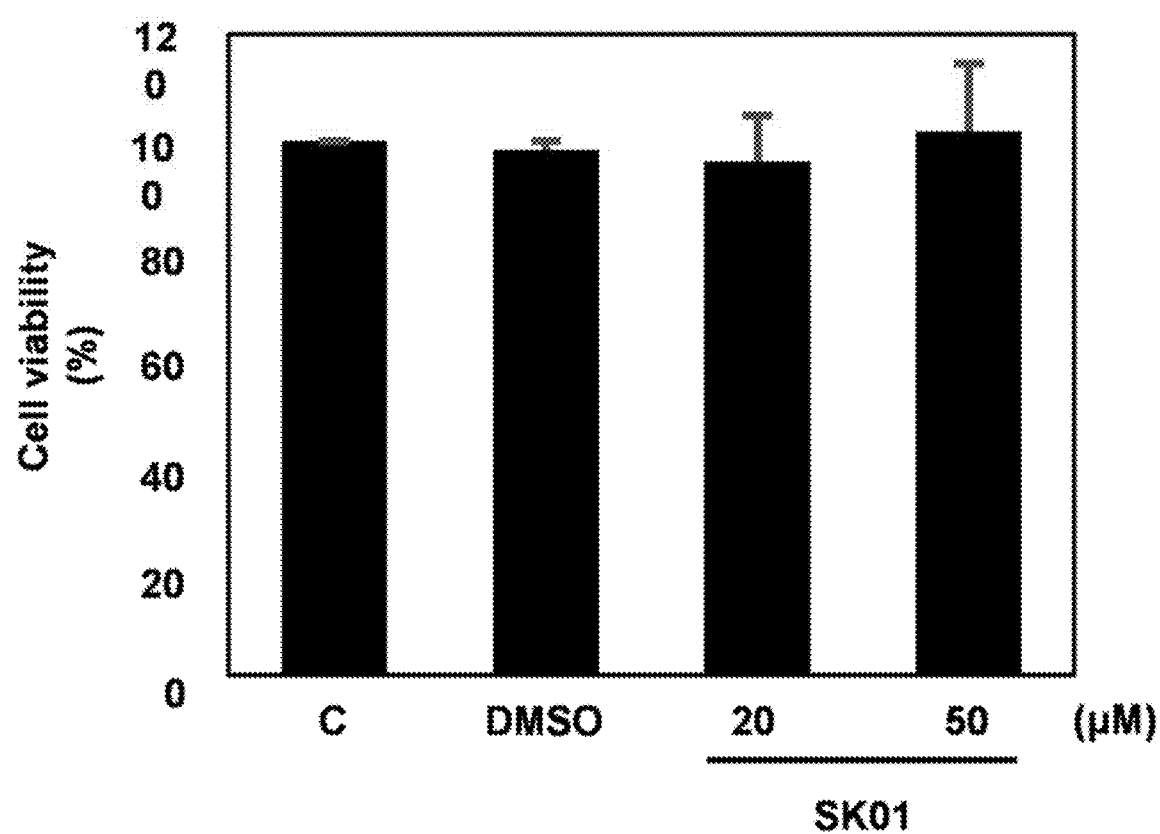
Figure 1E:
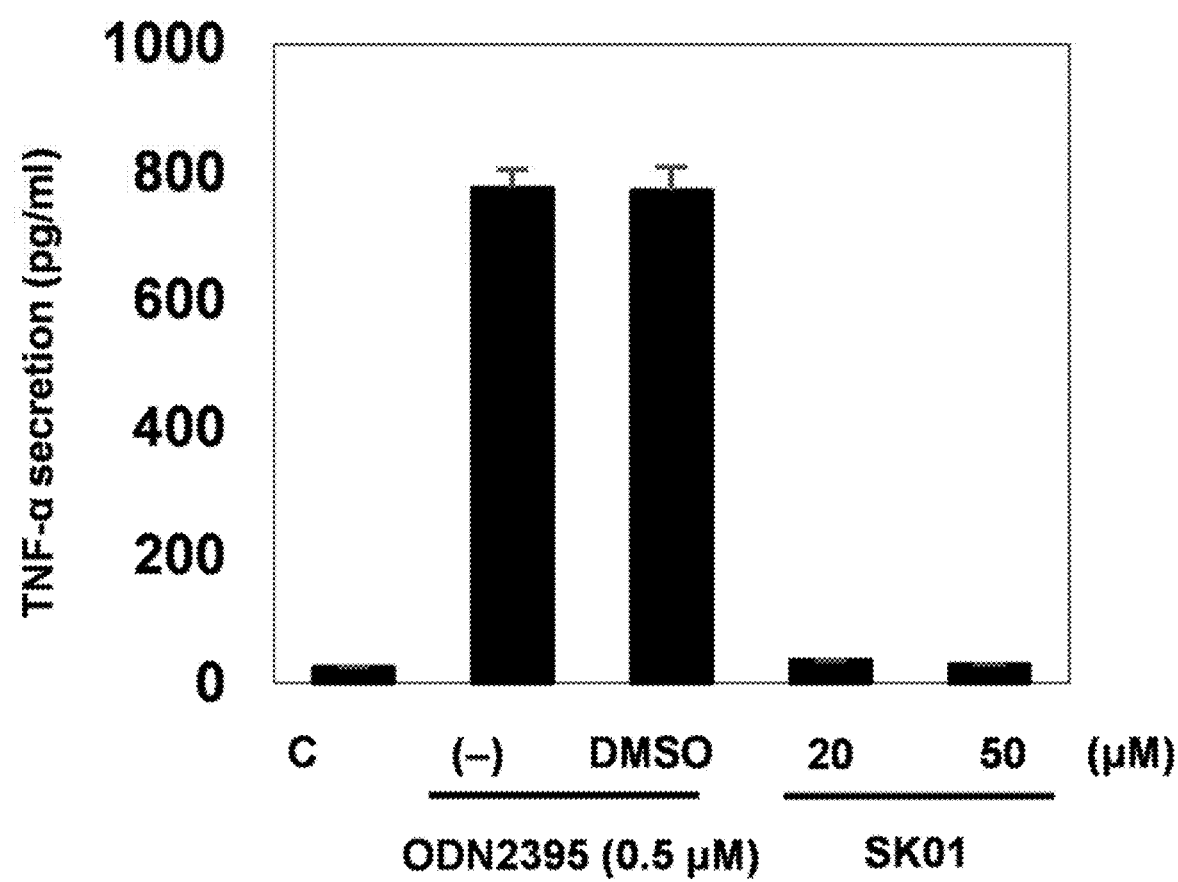

Unless defined otherwise, all technical and scientific terms used herein have the same meanings as appreciated by those skilled in the field to which the present invention pertains. In general, the nomenclature used herein is well-known in the art and is ordinarily used.

Innate immunity plays an important role in inducing adaptive immune responses against invading pathogens and endogenous/exogenous toxic molecules. Meanwhile, self-nucleic acid recognition through endosomal TLRs is involved in the pathogenesis of systemic autoimmune diseases such as RA or SLE (Marshak-Rothstein, A. *Nat Rev Immunol* 2006, 6, 823-35). A preliminary lead, SK01, that potently downregulates the production of excessive immunity, was identified because TLRs transmit signals through multiple redundant pathways involving common downstream adapters or kinases. A derivative (SK16) exhibiting in vitro efficacy equivalent to that of HCQ, a known endosomal TLR inhibitor, was identified through additional experiments with structures having identity of 80% or more. Recently, several chemical or biological agents have been developed for the treatment of autoimmune and inflammatory diseases, but none have been successfully prepared into pharmaceuticals due to early-stage safety issues (NCT00547014) or non-efficacy in late-stage clinical trials (Rice, T. W.; et al., *Crit Care Med* 2010, 38, 1685-94.). The only TLR antagonists approved for the treatment of SLE and RA are the antimalarial drugs HCQ, chloroquine and quinacrine (Rynes, R. I. *Br J Rheumatol* 1997, 36, 799-805). These drugs block endosomal acidification required for nucleic acids binding to TLRs or accumulate around TLRs, thereby effectively suppressing the production of proinflammatory cytokines in plasmacytoid dendritic cells and peripheral blood mononuclear cells. However, efficacy thereof can be greatly increased based on intermolecular interactions known through structure-activity relationship studies. Therefore, there is a need to develop novel antagonists with direct receptor-binding ability.

The present invention is based on the finding that the primary lead substance, SK01, and strong derivative thereof, SK16, which are two small molecules identified using a computer, specifically inhibit the function of endosomal TLR3/7/9 in RAW 264.7 cells, and novel compounds comprising compounds defined as SK23, SK24, SK29, SK36, SK39, SK40, SK41, SK50, SK52, SK54, SK55, SK58, SK59, SK60, SK61, SK62, SK63, SK64, SK65, SK69, SK70, SK71, SK72, SK74, SK75, SK81, and SK82 based on SK16 inhibit the secretion of cytokines by inhibiting the TLR signaling pathways induced by TLR3, TLR7, TLR8 and/or TLR9 activation. That suggests that the compounds have therapeutic effects for autoimmune, inflammatory or viral diseases such as systemic lupus erythematosus and psoriasis caused by TLR3, TLR7, TLR8 and/or TLR9 activation.

Accordingly, in one aspect, the present invention is directed to a compound represented by the following Formula 1, an isomer thereof, or a pharmaceutically acceptable salt thereof:

[Formula 1]

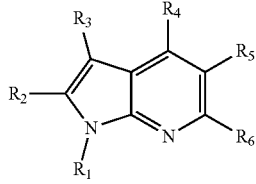

wherein $R_1$ to $R_6$ are identical to or different from each other, and are each independently a hydrogen atom, a halogen atom, straight- or branched-chain alkyl, amino, alkylamine, heterocyclic amine, a nitrile group, a nitro group, a nitroso group, hydroxy, cycloalkyl, benzyl, haloalkyl, allyl, alkoxy, alkoxyalkyl, alkylcarbonyl, cycloalkylcarbonyl, arylcarbonyl, alkylarylcarbonyl, alkoxycarbonyl, cycloalkoxy, aryl, heteroaryl, heterocycloalkyl, aryloxy, alkoxyheteroaryl, heteroaryloxyalkyl, alkylheteroaryl, alkylaryl, arylalkyl, alkylheteroaryl, alkylester, alkylether, alkylamide or acryl, or $R_2$ and $R_3$ are linked to each other to form a substituted or unsubstituted cyclic hydrocarbon or aromatic hydrocarbon, or $R_5$ and $R_6$ are linked to each other to form a substituted or unsubstituted cyclic hydrocarbon or aromatic hydrocarbon, wherein the alkyl, the alkylamine, the heterocyclic amine, the alkoxy, the alkoxyalkyl, the alkylester, the alkylether or the alkylamide is $C_{1-30}$, the cycloalkyl is $C_{3-30}$, the allyl is $C_{2-30}$, the aryl is $C_{6-30}$, and the heteroaryl and the heterocycloalkyl contain a heteroatom selected from fluorine, oxygen, sulfur, and nitrogen.

In the present invention, the alkyl, the alkylamine, and the heterocyclic amine are preferably $C_{1-15}$, more preferably $C_{1-10}$, and most preferably $C_{1-7}$.

As used herein, the term "$C_{1-30}$ alkyl" refers to a monovalent linear or branched saturated hydrocarbon moiety that has 1 to 30 carbon atoms and contains only carbon and hydrogen atoms. Examples of the alkyl group include, but are not limited to, methyl, ethyl, propyl, isopropyl, butyl, isobutyl, sec-butyl, tert-butyl, and the like. Examples of the "branched alkyl" include isopropyl, isobutyl, tert-butyl and the like.

As used herein, the term "$C_{1-30}$ alkoxy" refers to the formula —O—$C_{1-30}$ alkyl and includes, but is not limited to, methoxy, ethoxy, isopropoxy, tert-butoxy and the like.

Specific examples of the term "halogen (or halo)" include fluorine (F), chlorine (Cl), bromine (Br) and iodine (I).

As used herein, the term "amino" refers to a functional group in which one hydrogen atom is removed from ammonia, and includes an amine group in which one or more hydrogen atoms are substituted with a residue such as a hydrocarbon. The amine group may include primary, secondary, or tertiary alkylamines depending on the number of alkyls substituted. The term "heterocyclic amine" refers to a heterocyclic compound which is an amine that contains a nitrogen in the ring.

As used herein, the term "$C_{6-30}$ aryl" refers to a compound including at least one ring having a shared pi electron system, for example, a monocyclic or fused-ring polycyclic group (i.e., having rings sharing adjacent pairs of carbon atoms). That is, the aryl may include phenyl or biaryl such as naphthyl, unless otherwise defined herein. In one embodiment of the present invention, the aryl is an aromatic ring having 6 to 30 carbon atoms.

As used herein, the term "$C_{3-30}$ cyclic alkyl" refers to a cyclic saturated hydrocarbon moiety that has 5 to 6 carbon atoms and contains only carbon and hydrogen atoms. Examples of the cyclic alkyl group include, but are not limited to, cyclopentyl, cyclohexyl and the like.

As used herein, the term "heteroaryl" refers to an aromatic ring having 5 or 6 ring atoms containing 1 to 4 heteroatoms selected from the group consisting of N, O, and S, or a bicyclic ring having a heteroaryl ring fused to a benzene ring or another heteroaryl ring, unless otherwise defined. Examples of monocyclic heteroaryl include, but are not limited to, thiazolyl, oxazolyl, thiophenyl, furanyl, pyrrolyl, imidazolyl, isoxazolyl, isothiazolyl, pyrazolyl, triazolyl, triazinyl, thiadiazolyl, tetrazolyl, oxadiazolyl, pyridinyl, pyridazinyl, pyrimidinyl, pyrazinyl, and groups similar thereto. Examples of the bicyclic heteroaryl include, but are not limited thereto, indolyl, azaindolyl, indolinyl, benzothiophenyl, benzofuranyl, benzimidazolyl, benzoxazolyl, benzisoxazolyl, benzothiazolyl, benzothiadiazolyl, benzotriazolyl, quinolinyl, isoquinolinyl, purinyl, furopyridinyl, and groups similar thereto.

As used herein, the term "heterocycloalkyl" refers to a saturated or partially unsaturated carbocyclic ring having 5 to 9 ring atoms containing 1 to 3 heteroatoms selected from N, O, and S, in addition to carbon atoms. For example, the heterocycloalkyl may be azetidinyl, pyrrolidinyl, tetrahydrofuranyl, tetrahydro-thienyl, pyrazolidinyl, imidazolidinyl, oxazolidinyl, isoxazolidinyl, thiazolidinyl, piperidinyl, tetrahydropyranyl, tetrahydrothiopyranyl, piperazinyl, morpholinyl, thiomorpholinyl, 1,1-dioxo-thiomorpholin-4-yl, azepanyl, diazepanyl, homopiperazinyl, oxazepanyl, dihydroindolyl, dihydrofuryl, dihydroimidazolinyl, dihydrooxazolyl, tetrahydropyridinyl, dihydropyranyl, dihydrobenzofuranyl, benzodioxolyl, or benzodioxanyl.
As used herein, $R_1$ to $R_6$ may be substituents selected from the group consisting of the following substituents, but is not limited thereto.
$R_1$:
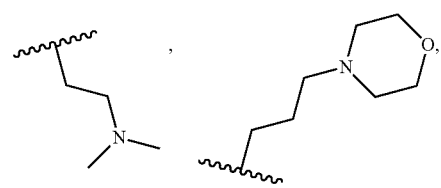,
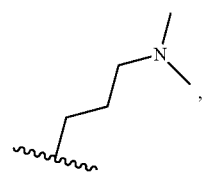,
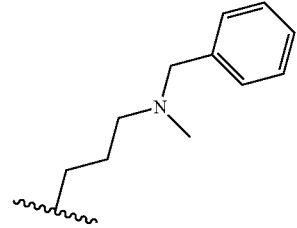 or 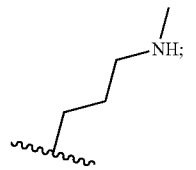;
$R_2$:
$R_3$:
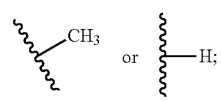
$R_2$ and $R_3$:
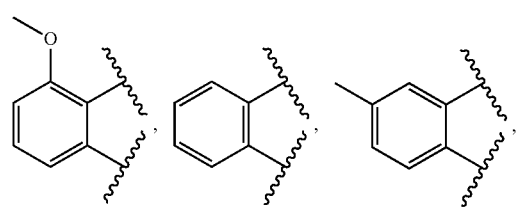
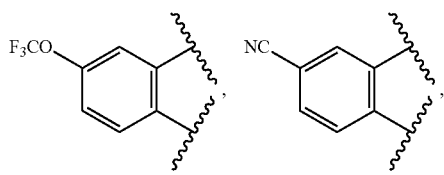,
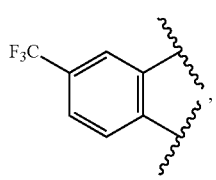,
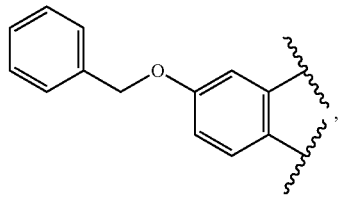,
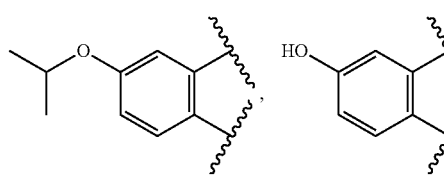
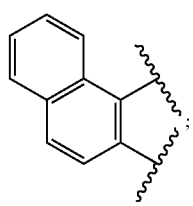;
$R_4$:
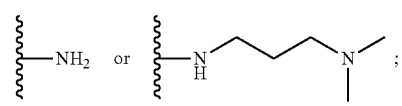
$R_5$:
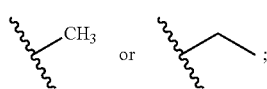
$R_6$:
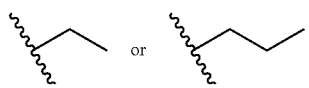

$R_5$ and $R_6$:
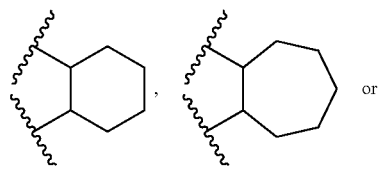 or
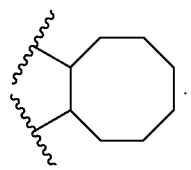.
In the present invention, the compound represented by Formula 1 may be a compound represented by any one selected from the group consisting of the following Formulas 1-1 to 1-34:
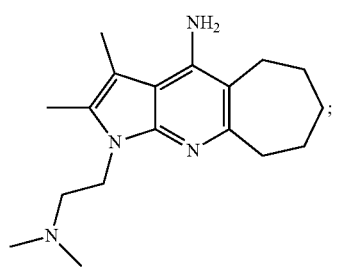
[Formula 1-1]
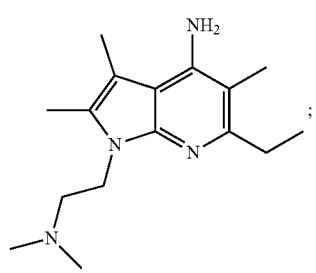
[Formula 1-2]
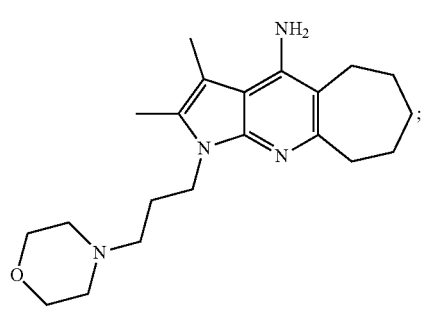
[Formula 1-3]
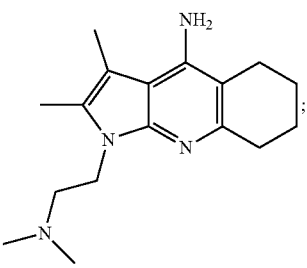
[Formula 1-4]
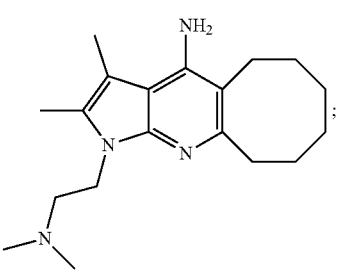
[Formula 1-5]
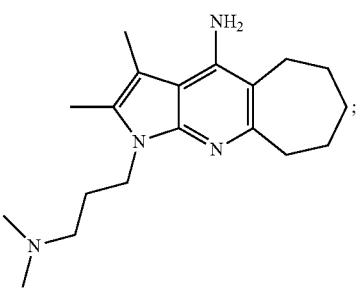
[Formula 1-6]
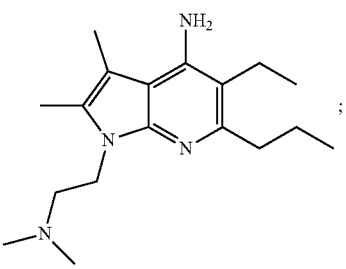
[Formula 1-7]
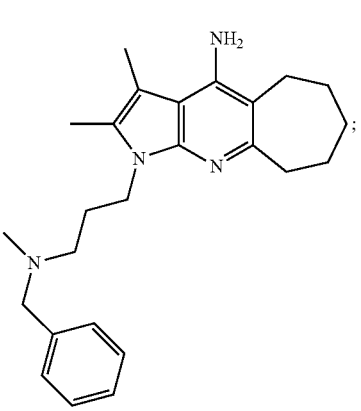
[Formula 1-8]

-continued
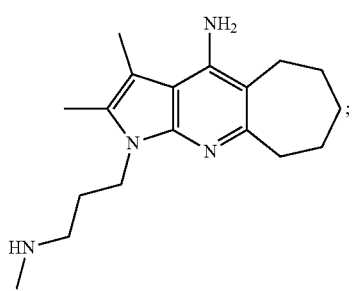
[Formula 1-9]
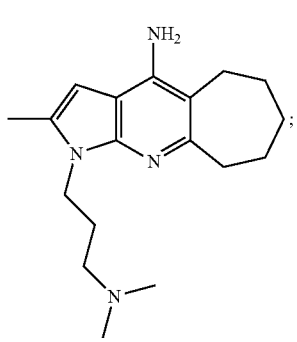
[Formula 1-10]
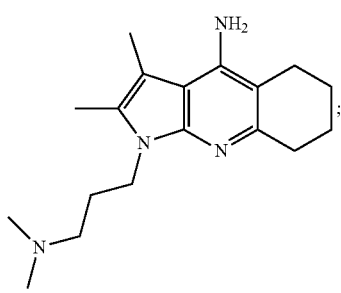
[Formula 1-11]
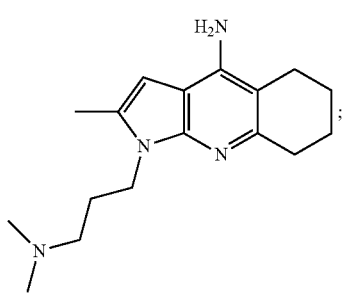
[Formula 1-12]
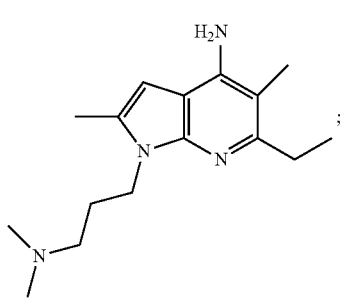
[Formula 1-13]
[Formula 1-14]
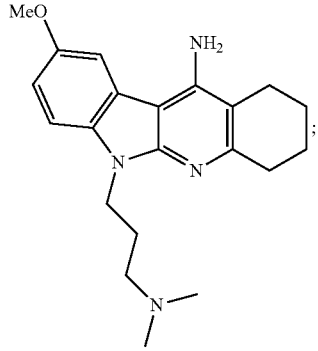
[Formula 1-15]
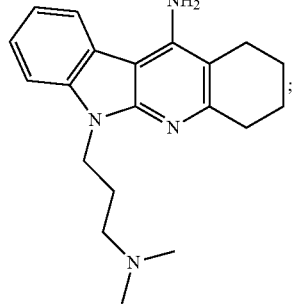
[Formula 1-16]
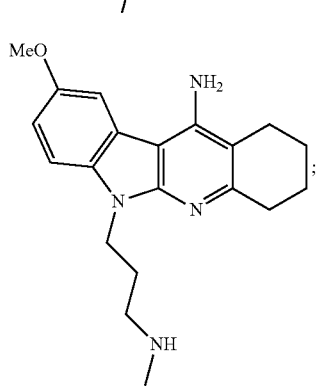
[Formula 1-17]
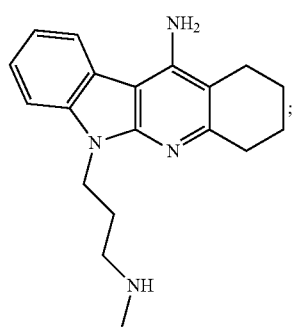
[Formula 1-18]

[Formula 1-19]
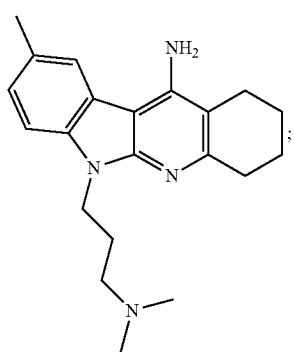
[Formula 1-20]
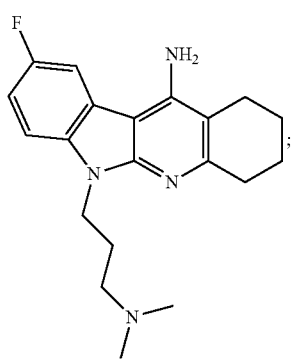
[Formula 1-21]
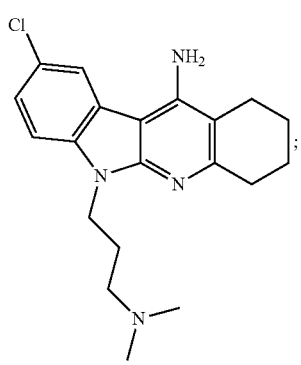
[Formula 1-22]
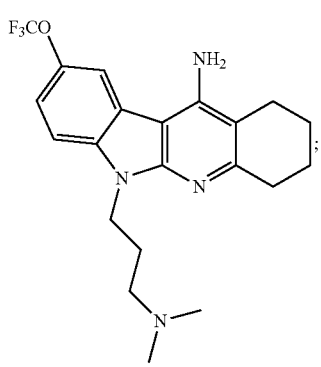
[Formula 1-23]
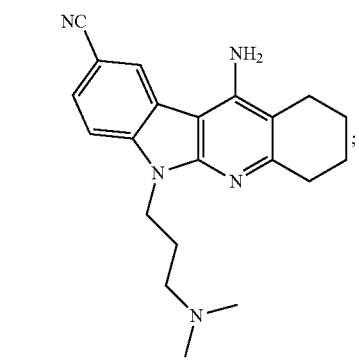
[Formula 1-24]
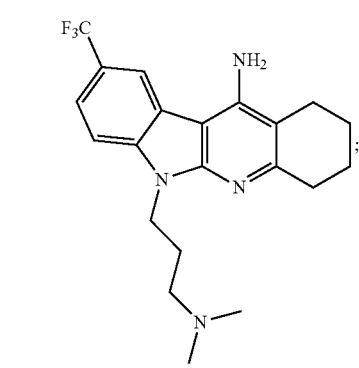
[Formula 1-25]
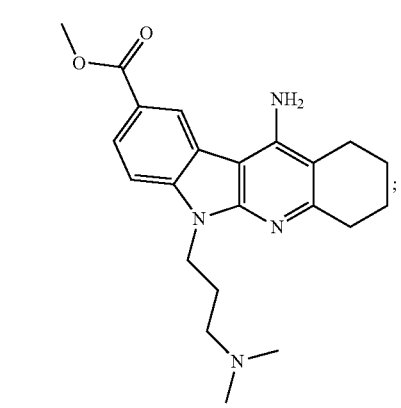
[Formula 1-26]
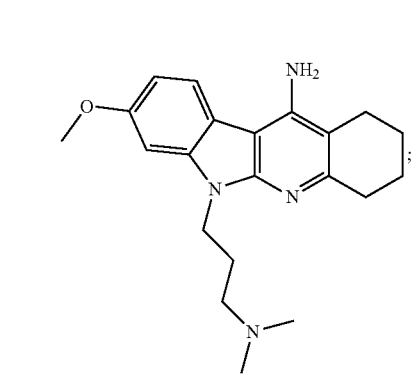

[Formula 1-27]
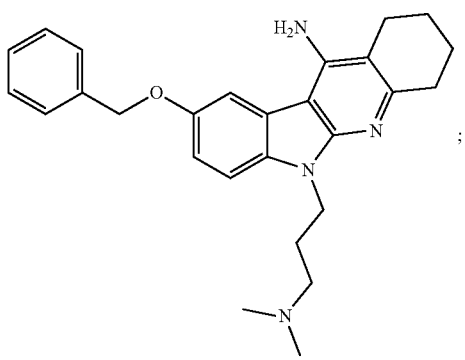
;

[Formula 1-28]
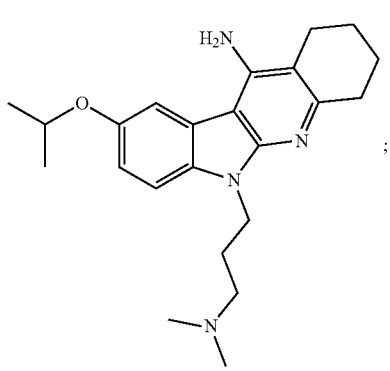
;

[Formula 1-29]
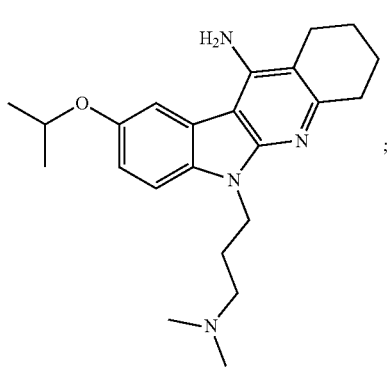
;

[Formula 1-30]
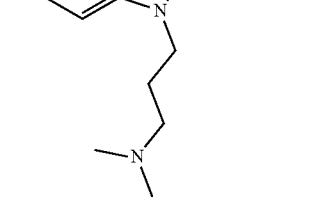
;

[Formula 1-31]
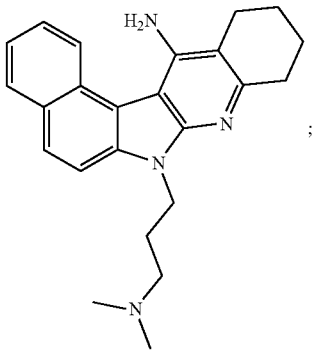
;

[Formula 1-32]
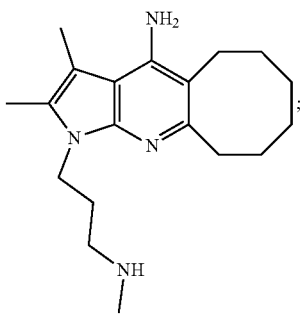
;

[Formula 1-33]
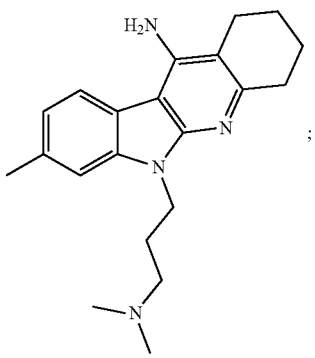
;

[Formula 1-34]
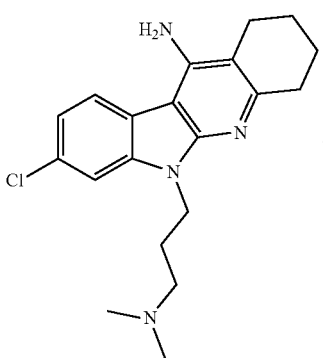
.

Here, the compound of Formula 1-1 is designated as "SK01", the compound of Formula 1-2 is designated as "SK09", the compound of Formula 1-3 is designated as "SK11", the compound of Formula 1-4 is designated as "SK413", the compound of Formula 1-5 is designated as "SK414", the compound of Formula 1-6 is designated as "SK416" and the compound of Formula 1-7 is designated as "SK419" (Table 1).

TABLE 1

| Name | structure | SMILES | IUPAC Name | MW (g/mol) |
|---|---|---|---|---|
| SK01 | | NC1=C2C(C)=C(C)N(CCN(C)C)C2=NC3=C1CCCCC3 | 1-(2-(dimethylamino)ethyl)-2,3-dimethyl-1,5,6,7,8,9-hexahydrocyclohepta[b]pyrrolo[3,2-e]pyridin-4-amine | |
| SK09 | | CCc1nc2n(CCN(C)C)c(C)c(C)c2c(N)c1C | 1-[2-(dimethylamino)ethyl]-6-ethyl-2,3,5-trimethyl-1H-pyrrolo[2,3-b]pyridin-4-amine | 274.41 |
| SK11 | | Cc1c(C)c2c(N)c3CCCCCc3nc2n1CCCN1CCOCC1 | 2,3-dimethyl-1-(3-morpholinopropyl)-1,5,6,7,8,9-hexahydrocyclohepta[b]pyrrolo[3,2-e]pyridin-4-amine | 356.51 |
| SK13 | | CN(C)CCn1c(C)c(C)c2c(N)c3CCCCc3nc12 | 1-(2-(dimethylamino)ethyl)-2,3-dimethyl-5,6,7,8-tetrahydro-1H-pyrrolo[2,3-b]quinolin-4-amine | 286.42 |
| SK14 | | CN(C)CCn1c(C)c(C)c2c(N)c3CCCCCCc3nc12 | 1-(2-(dimethylamino)ethyl)-2,3-dimethyl-5,6,7,8,9,10-hexahydro-1H-cycloocta[b]pyrrolo[3,2-e]pyridin-4-amine | 314.48 |

TABLE 1-continued

| Name | structure | SMILES | IUPAC Name | MW (g/mol) |
|------|-----------|--------|------------|------------|
| SK16 | | CN(C)CCCn1c(C)c(C)c2c(N)c3CCCCCc3nc12 | 1-(3-(dimethylamino)propyl)-2,3-dimethyl-1,5,6,7,8,9-hexahydrocyclohepta[b]pyrrolo[3,2-e]pyridin-4-amine | 314.48 |
| SK19 | | CCCc1nc2n(CCN(C)C)c(C)c(C)c2c(N)c1CC | 1-[2-(dimethylamino)ethyl]-5-ethyl-2,3-dimethyl-6-propyl-1H-pyrrolo[2,3-b]pyridin-4-amine | 302.47 |

In addition, in the present specification, the compound of Formula 1-8 is designated as "SK23", the compound of Formula 1-9 is designated as "SK24", the compound of Formula 1-10 is designated as "SK29", the compound of Formula 1-11 is designated as "SK36", the compound of Formula 1-12 is designated as "SK39", the compound of Formula 1-13 is designated as "SK40", the compound of Formula 1-14 is designated as "SK41", the compound of Formula 1-15 is designated as "SK50", the compound of Formula 1-16 is designated as "SK52", the compound of Formula 1-17 is designated as "SK54", the compound of Formula 1-18 is designated as "SK55", the compound of Formula 1-19 is designated as "SK58", the compound of Formula 1-20 is designated as "SK59", the compound of Formula 1-21 is "SK60", the compound of Formula 1-22 is designated as "SK61", the compound of Formula 1-23 is designated as "SK62", the compound of Formula 1-24 is designated as "SK63", the compound of Formula 1-25 is designated as "SK64", the compound of Formula 1-26 is designated as "SK65", the compound of Formula 1-27 is designated as "SK69", the compound of formula 1-28 is designated as "SK70", the compound of Formula 1-29 is designated as "SK71", the compound of Formula 1-30 is designated as "SK72", the compound of Formula 1-31 is designated as "SK74", the compound of Formula 1-32 is designated as "SK75", the compound of Formula 1-33 is designated as "SK33", and the compound of Formula 1-34 is designated as "SK34" (Table 2).

TABLE 2

| Name | Structure | IUPAC name | $^1$H NMR, MS | Yield (%) | HPLC r.t. (min) Purity |
|------|-----------|------------|---------------|-----------|------------------------|
| SK21 | | N-(1-(3-(dimethylamino)propyl)-2,3-dimethyl-1,5,6,7,8,9-hexahydrocyclohepta[b]pyrrolo[3,2-e]pyridin-4-yl)acetamide | 1H NMR (400 MHz, MeOD) δ 4.24 (t, J = 7.3 Hz, 2H), 3.14-3.05 (m, 2H), 2.84-2.76 (m, 2H), 2.39 (dd, J = 9.7, 5.5 Hz, 2H), 2.36 (s, 3H), 2.25 (d, J = 4.1 Hz, 8H), 2.21 (s, 3H), 1.97-1.83 (m, 4H), 1.76-1.61 (m, 4H); 357[M + H]$^+$ | 30 | 4.105 (A) 99% |

TABLE 2-continued

| Name | Structure | IUPAC name | ¹H NMR, MS | Yield (%) | HPLC r.t. (min) Purity |
|---|---|---|---|---|---|
| SK22 | | N-(1-(3-(dimethylamino)propyl)-2,3-dimethyl-1,5,6,7,8,9-hexahydrocyclohepta[b]pyrrolo[3,2-e]pyridin-4-yl)-2,2,2-trifluoroacetamide | 1H NMR (400 MHz, MeOD) δ 4.26 (t, J = 7.1 Hz, 2H), 3.15-3.07 (m, 2H), 2.81-2.74 (m, 2H), 2.49 (t, J = 8.0 Hz, 2H), 2.36 (s, 3H), 2.35 (s, 5H), 2.23 (s, 3H), 1.96 (dt, J = 14.5, 7.2 Hz, 2H), 1.92- 1.82 (m, 2H), 1.77-1.69 (m, 2H), 1.69-1.61 (m, 2H); 411[M + H]⁺ | 60 | 5.178 (A) 100% |
| SK23 | | 1-(3-(benzyl(methyl)amino)propyl)-2,3-dimethyl-1,5,6,7,8,9-hexahydrocyclohepta[b]pyrrolo[3,2-e]pyridin-4-amine | 1H NMR (400 MHz, MeOD) δ 7.29-7.20 (m, 5H), 4.14 (t, J = 7.2 Hz, 2H), 3.47 (s, 2H), 2.97-2.90 (m, 2H), 2.75-2.68 (m, 2H), 2.39 (s, 3H), 2.38-2.33 (m, 2H), 2.26 (s, 3H), 2.17 (s, 3H), 1.94-1.82 (m, 4H), 1.70-1.59 (m, 4H); 391[M + H]⁺ | 60 | 4.627 (A) 97% |
| SK24 | | 2,3-dimethyl-1-(3-(methylamino)propyl)-1,5,6,7,8,9-hexahydrocyclohepta[b]pyrrolo[3,2-e]pyridin-4-amine | 1H NMR (400 MHz, MeOD) δ 4.18 (t, J = 6.8 Hz, 2H), 2.98-2.90 (m, 2H), 2.75-2.67 (m, 2H), 2.48-2.42 (m, 2H), 2.41 (s, 3H), 2.34-2.30 (m, 2H), 2.29 (s, 3H), 1.93-1.83 (m, 4H), 1.72-1.59 (m, 4H); 301[M + H]⁺ | 53 | 4.267 (A) 98% |
| SK25 | | 3-(4-amino-2,3-dimethyl-6,7,8,9-tetrahydrocyclohepta[b]pyrrolo[3,2-e]pyridin-1(5H)-yl)-N,N-dimethylpropanamide | 1H NMR (400 MHz, CDCl3) δ 4.42 (t, J = 6.8 Hz, 2H), 4.37 (s, 2H), 3.02-2.94 (m, 2H), 2.92 (s, 3H), 2.90 (s, 3H), 2.83-2.76 (m, 2H), 2.68-2.60 (m, 2H), 2.42 (3H), 2.29 (s, 3H), 1.89-1.80 (m, 2H), 1.75-1.58 (m, 8H); 329[M + H]⁺ | 11 | 5.114 (A) 99% |

TABLE 2-continued

| Name | Structure | IUPAC name | ¹H NMR, MS | Yield (%) | HPLC r.t. (min) Purity |
|---|---|---|---|---|---|
| SK26 | | N-acetyl-N-(1-(3-(benzyl(methyl)amino)propyl)-2,3-dimethyl-1,5,6,7,8,9-hexahydrocyclohepta[b]pyrrolo[3,2-e]pyridin-4-yl)acetamide | 1H NMR (400 MHz, CDCl3) δ 7.35-7.26 (m, 5H), 4.23 (t, J = 7.4 Hz, 2H), 3.63 (s, 2H), 3.13-3.07 (m, 2H), 2.70-2.59 (m, 2H), 2.56 (t, J = 7.2 Hz, 2H), 2.31 (s, 3H), 2.27 (s, 6H), 2.07 (s, 3H), 2.04 (s, 3H), 2.02-1.98 (m, 2H), 1.86-1.80 (m, 2H), 1.75-1.69 (m, 2H), 1.64-1.59 (m, 2H); 475[M + H]⁺ | 12 | 5.641 (A) 98% |
| SK27 | | 3-(4-acetamido-2,3-dimethyl-6,7,8,9-tetrahydrocyclohepta[b]pyrrolo[3,2-e]pyridin-1(5H)-yl)-N,N-dimethylpropanamide | 1H NMR (400 MHz, CDCl3) δ 7.32 (m, 1H), 4.29-4.22 (m, 2H), 3.15-3.05 (m, 2H), 2.69-2.61 (m, 2H), 2.46 (t, J = 6.8 Hz, 2H), 2.32 (s, 3H), 2.27 (s, 6H), 2.20 (s, 3H), 2.07 (s, 3H), 2.02-1.92 (m, 2H), 1.87-1.78 (m, 2H), 1.76-1.68 (m, 2H); 371[M + H]⁺ | 24 | 4.643 (A) 97% |
| SK28 | | 3-(4-(N-acetylacetamido)-2,3-dimethyl-6,7,8,9-tetrahydrocyclohepta[b]pyrrolo[3,2-e]pyridin-1(5H)-yl)-N,N-dimethylpropanamide | 1H NMR (400 MHz, CDCl3) δ 4.54-4.44 (m, 2H), 3.16-3.06 (m, 2H), 2.94 (s, 3H), 2.91 (s, 3H), 2.83 (t, J = 8.0 Hz, 2H), 2.69-2.61 (m, 2H), 2.34 (s, 3H), 2.28 (s, 6H), 2.07 (s, 3H), 1.89-1.79 (m, 2H), 1.78-1.54 (m, 4H); 413[M + H]⁺ | 43 | 5.746 (A) 97% |
| SK29 | | 1-(3-(dimethylamino)propyl)-2-methyl-1,5,6,7,8,9-hexahydrocyclohepta[b]pyrrolo[3,2-e]pyridin-4-amine | ¹H NMR (400 MHz, CDCl₃) δ 5.96 (s, 1H), 4.19 (t, J = 7.2 Hz, 2H), 4.11 (s, 2H), 3.02-2.99 (m, 2H), 2.70-2.66 (m, 2H), 2.40 (s, 3H), 2.30 (t, J = 7.2 Hz, 2H), 2.22 (s, 6H), 1.97-1.91 (m, 2H), 1.89-1.75 (m, | 75 | (A) 4.144 99% |

TABLE 2-continued

| Name | Structure | IUPAC name | ¹H NMR, MS | Yield (%) | HPLC r.t. (min) Purity |
|---|---|---|---|---|---|
| | | | 2H), 1.70-1.60 (m, 6H); 301[M + H]⁺ | | |
| SK30 | | N-(1-(3-(dimethylamino)propyl)-2,3-dimethyl-1,5,6,7,8,9-hexahydrocyclohepta[b]pyrrolo[3,2-e]pyridin-4-yl)-2,2-difluoropropanamide | 1H NMR (400 MHz, CDCl3) δ 7.89 (br s, 1H), 4.22 (t, J = 8.1 Hz, 2H), 3.15-3.05 (m, 2H), 2.76-2.66 (m, 2H), 2.32 (s, 3H), 2.32-2.26 (m, 2H), 2.24 (s, 3H), 2.23 (s, 6H), 1.93-1.78 (m, 4H), 1.74-1.68 (m, 2H), 1.68-1.64 (s, 5H); 407[M + H]⁺ | 73 | 4.854 (A) 99% |
| SK31 | | 3-bromo-1-(3-(dimethylamino)propyl)-2-methyl-1,5,6,7,8,9-hexahydrocyclohepta[b]pyrrolo[3,2-e]pyridin-4-amine | ¹H NMR (400 MHz, CDCl₃) δ 4.86 (s, 2H), 4.20 (t, J = 7.3 Hz, 2H), 2.98-2.96 (m, 2H), 2.63-2.60 (m, 2H), 2.35 (s, 3H), 2.28 (t, J = 7.3 Hz, 2H), 2.21 (s, 6H), 1.92-1.81 (m, 4H), 1.70-1.59 (m, 4H); 380[M + H]⁺ | 11 | (A) 4.215 96% |
| SK32 | | 3-chloro-1-(3-(dimethylamino)propyl)-2-methyl-1,5,6,7,8,9-hexahydrocyclohepta[b]pyrrolo[3,2-e]pyridin-4-amine | ¹H NMR (400 MHz, CDCl₃) δ 4.78 (s, 2H), 4.18 (t, J = 7.2 Hz, 2H), 2.98-2.96 (m, 2H), 2.63-2.61 (m, 2H), 2.34 (s, 3H), 2.29 (t, J = 7.2 Hz, 2H), 2.22 (s, 6H), 1.93-1.81 (m, 4H), 1.68-1.60 (m, 4H); 335[M + H]⁺ | 9 | (A) 4.318 98% |
| SK33 | | 1-(3-(dimethylamino)propyl)-3-iodo-2-methyl-1,5,6,7,8,9-hexahydrocyclohepta[b]pyrrolo[3,2-e]pyridin-4-amine | ¹H NMR (400 MHz, CDCl₃) δ 4.90 (s, 2H), 4.24 (t, J = 7.3 Hz, 2H), 2.98-2.95 (m, 2H), 2.63-2.60 (m, 2H), 2.40 (s, 3H), 2.29 (t, J = 7.3 Hz, 2H), 2.22 (s, 6H), 1.93-1.81 (m, 4H), 1.69-1.60 (m, 4H); 427[M + H]⁺ | 20 | (A) 4.383 96% |

TABLE 2-continued

| Name | Structure | IUPAC name | ¹H NMR, MS | Yield (%) | HPLC r.t. (min) Purity |
|---|---|---|---|---|---|
| SK34 | | 1-(3-methoxypropyl)-2,3-dimethyl-1,5,6,7,8,9-hexahydrocyclohepta[b]pyrrolo[3,2-e]pyridin-4-amine | 1H NMR (400 MHz, CDCl3) δ 4.26 (br s, 2H), 3.36 (t, J = 5.9 Hz, 2H), 3.33 (s, 3H), 3.04 (br s, 2H), 2.67-2.60 (m, 2H), 2.43 (s, 3H), 2.28 (s, 3H), 2.06-1.96 (m, 3H), 1.89-1.81 (m, 4H), 1.72-1.66 (m, 2H), 1.65-1.59 (m, 2H); 302[M + H]⁺ | 4 | 5.253 (A) 97% |
| SK35 | | 1-(2-methoxyethyl)-2,3-dimethyl-1,5,6,7,8,9-hexahydrocyclohepta[b]pyrrolo[3,2-e]pyridin-4-amine | 1H NMR (400 MHz, CDCl3) δ 4.32 (t, J = 5.7 Hz, 2H), 3.66 (t, J = 5.8 Hz, 2H), 3.30 (s, 3H), 3.05-2.93 (m, 2H), 2.67 - 2.61 (m, 2H), 2.43 (s, 3H), 2.30 (s, 3H), 1.87-1.81 (m, 2H), 1.73-1.65 (m, 2H), 1.62 (dt, J = 11.2, 5.7 Hz, 2H); 288[M + H]⁺ | 6 | 5.157 (A) 98% |
| SK36 | | 1-(3-(dimethylamino)propyl)-2,3-dimethyl-5,6,7,8-tetrahydro-1H-pyrrolo[2,3-b]quinolin-4-amine | 1H NMR (400 MHz, CDCl3) δ 4.32 (br s, 2H), 4.19-4.11 (m, 2H), 2.89 (t, J = 5.9 Hz, 2H), 2.50 (t, J = 6.0 Hz, 2H), 2.42 (s, 3H), 2.32-2.25 (m, 5H), 2.21 (s, 6H), 1.92-1.80 (m, 6H); 301[M + H]⁺ | 25 | 4.147 (A) 100% |
| SK37 | | 1-(3-(dimethylamino)propyl)-2,3-dimethyl-1,5,6,7-tetrahydrocyclopenta[b]pyrrolo[3,2-e]pyridin-4-amine | 1H NMR (400 MHz, CDCl3) δ 4.26 (br s, 2H), 4.17 (t, J = 8.1, 2H), 2.99 (t, J = 7.6 Hz, 2H), 2.74 (t, J = 7.9 Hz, 2H), 2.41 (s, 3H), 2.32-2.25 (m, 5H), 2.20 (s, 6H), 2.17-2.09 (m, 2H), 1.92-1.84 (m, 2H); 287[M + H]⁺ | 5 | 3.950 (A) 92% |

TABLE 2-continued

| Name | Structure | IUPAC name | ¹H NMR, MS | Yield (%) | HPLC r.t. (min) Purity |
|---|---|---|---|---|---|
| SK38 | | 1-(3-(dimethylamino)propyl)-2,3-dimethyl-6-phenyl-1H-pyrrolo[2,3-b]pyridin-4-amine | 1H NMR (400 MHz, CDCl3) δ 8.03 (d, J = 7.4 Hz, 2H), 7.42 (t, J = 7.6 Hz, 2H), 7.32 (t, J = 7.3 Hz, 1H), 6.69 (s, 1H), 4.40 (br s, 2H), 4.32 - 4.22 (m, 2H), 2.44 (s, 3H), 2.38-2.34 (m, 2H), 2.33 (s, 3H), 2.24 (s, 6H), 1.97 (dt, J = 14.5, 7.3 Hz, 2H); 323[M + H]⁺ | 21 | 4.211 (A) 98% |
| SK39 | | 1-(3-(dimethylamino)propyl)-2-methyl-5,6,7,8-tetrahydro-1H-pyrrolo[2,3-b]quinolin-4-amine | ¹H NMR (400 MHz, CDCl₃) δ 5.97 (s, 1H), 4.18 (t, J = 7.3 Hz, 2H), 4.10 (s, 2H), 2.93-2.90 (m, 2H), 2.56-2.53 (m, 2H), 2.40 (s, 3H), 2.29 (t, J = 7.3 Hz, 2H), 2.21 (s, 6H), 1.97-1.86 (m, 6H); 287[M + H]⁺ | 40 | (A) 4.022 97% |
| SK40 | | 1-(3-(dimethylamino)propyl)-6-ethyl-2,5-dimethyl-1H-pyrrolo[2,3-b]pyridin-4-amine | ¹H NMR (400 MHz, CDCl₃) δ 5.96 (s, 1H), 4.20 (t, J = 7.2 Hz, 2H), 4.09 (s, 2H), 2.83 (q, J = 7.5 Hz, 2H), 2.40 (s, 3H), 2.30 (t, J = 7.2 Hz, 2H), 2.21 (s, 6H), 2.16 (s, 3H), 1.96-1.89 (m, 2H), 1.25 (t, J = 7.2 Hz, 3H); 275[M + H]⁺ | 60 | (A) 3.936 99% |
| SK41 | | 1-(3-(dimethylamino)propyl)-2-methyl-5,6,7,8,9,10-hexahydro-1H-cycloocta[b]pyrrolo[3,2-e]pyridin-4-amine | ¹H NMR (400 MHz, CDCl₃) δ 5.98 (s, 1H), 4.21 (t, J = 7.2 Hz, 2H), 4.13 (s, 2H), 2.98-2.94 (m, 2H), 2.80-2.77 (m, 2H), 2.40 (s, 3H), 2.28 (t, J = 7.2 Hz, 2H), 2.20 (s, 6H), 1.96-1.88 (m, 2H), 1.79-1.40 (m, 4H), 1.35-1.30 (m, 4H); 315[M + H]⁺ | 44 | (A) 4.226 94% |

TABLE 2-continued

| Name | Structure | IUPAC name | ¹H NMR, MS | Yield (%) | HPLC r.t. (min) Purity |
|------|-----------|------------|------------|-----------|------------------------|
| SK42 | | 1-(2-(dimethylamino)ethyl)-2-methyl-5,6,7,8-tetrahydro-1H-pyrrolo[2,3-b]quinolin-4-amine | ¹H NMR (400 MHz, CDCl$_3$) δ 5.97 (s, 1H), 4.25 (t, J = 7.2 Hz, 2H), 4.10 (s, 2H), 2.93-2.90 (m, 2H), 2.59 (t, J = 7.2 Hz, 2H), 2.55-2.52 (m, 2H), 2.40 (s, 3H), 2.30 (s, 6H), 1.90-1.85 (m, 4H); 273[M + H]$^+$ | 51 | (A) 3.947 99% |
| SK43 | | 1-(2-(dimethylamino)ethyl)-2-methyl-1,5,6,7,8,9-hexahydrocyclohepta[b]pyrrolo[3,2-e]pyridin-4-amine | ¹H NMR (400 MHz, CDCl$_3$) δ 5.96 (s, 1H), 4.26 (t, J = 7.4 Hz, 2H), 4.11 (s, 2H), 2.03-3. (m, 2H), 2.68-2.65 (m, 2H), 2.60 (t, J = 7.2 Hz, 2H), 2.41 (s, 3H), 2.31 (s, 6H), 1.86-1.81 (m, 2H), 1.72-1.62 (m, 4H); 287[M + H]$^+$ | 12 | (A) 4.094 97% |
| SK44 | | 1-benzyl-2,3-dimethyl-1,,5,6,7,8,9-hexahydrocyclohepta[b]pyrrolo[3,2-e]pyridin-4-amine | 1H NMR (400 MHz, CDCl3) δ 7.26 - 7.14 (m, 3H), 7.02 (d, J = 7.1 Hz, 2H), 5.41 (s, 2H), 4.42 (br s, 2H), 3.01-2.96 (m, 2H), 2.70-2.63 (m, 2H), 2.43 (s, 3H), 2.11 (s, 3H), 1.88-1.82 (m, 2H), 1.73-1.64 (m, 4H); 320[M + H]$^+$ | 14 | 4.956 (A) 99% |
| SK45 | | 2-(2-(4-amino-2,3-dimethyl-5,6,7,8,9,10-hexahydro-1H-cycloocta[b]pyrrolo[3,2-e]pyridin-1-yl)acetamido)-N-(benzo[d][1,3]dioxol-5-yl)-N-methyl-3-phenylpropanamide | 1H NMR (400 MHz, CDCl3) δ 7.19-7.10 (m, 3H), 6.83 (br s, 2H), 6.68 (d, J = 8.0 Hz, 1H), 5.98 (s, 2H), 4.88-4.74 (m, 2H), 4.65 (q, J = 7.0 Hz, 1H), 3.10 (s, 3H), 3.07-2.94 (m, 2H), 2.92-2.81 (m, 1H), 2.77-2.63 (m, 3H), 2.36 (s, 3H), 2.19 (s, 3H), 1.74-1.58 (m, 4H), 1.49-1.40 (m, 2H), 1.37-1.28 (m, 2H); 582[M + H]$^+$ | 23 | 5.808 (A) 99% |

TABLE 2-continued

| Name | Structure | IUPAC name | ¹H NMR, MS | Yield (%) | HPLC r.t. (min) Purity |
|---|---|---|---|---|---|
| SK46 | | 2-(2-(4-amino-2,3-dimethyl-5,6,7,8-tetrahydro-1H-pyrrolo[2,3-b]quinolin-1-yl)acetamido)-N-(benzo[d][1,3]dioxol-5-yl)-N-methyl-3-phenylpropanamide | 1H NMR (400 MHz, CDCl3) δ 7.23 (d, J = 8.0 Hz, 1H), 7.19-7.05 (m, 4H), 6.74 (d, J = 7.1 Hz, 2H), 6.68 (d, J = 8.3 Hz, 1H), 5.99 (s, 2H), 4.67 (d, J = 7.7 Hz, 1H), 4.39 (s, 2H), 3.09 (s, 3H), 2.95-2.87 (m, 2H), 2.54-2.48 (m, 2H), 2.42 (s, 3H), 2.17 (s, 3H), 2.06-1.96 (m, 2H), 1.95-1.82 (m, 4H); 554[M + H]⁺ | 13 | 5.613 (A) 90% |
| SK47 | | 2-(2-(4-amino-2,3-dimethyl-6,7,8,9-tetrahydrocyclohepta[b]pyrrolo[3,2-e]pyridin-1(5H)-yl)acetamido)-N-(benzo[d][1,3]dioxol-5-yl)-N-methyl-3-phenylpropanamide | 1H NMR (400 MHz, CDCl3) δ 7.25-7.24 (m, 2H), 7.20-7.10 (m, 2H), 6.80 (s, 1H), 6.69 (d, J = 8.3 Hz, 1H), 5.98 (s, 1H), 4.84-4.71 (m, 2H), 4.66 (q, J = 7.0 Hz, 1H), 3.10 (s, 3H), 3.09-2.96 (m, 2H), 2.90-2.78 (m, 1H), 2.70-2.56 (m, 2H), 2.38 (s, 3H), 2.19 (s, 2H), 1.75 1.92-1.50 (m, 7H); 568[M + H]⁺ | 6 | 5.725 (A) 98% |
| SK48 | | N-(3-(11-amino-1,2,3,4-tetrahydro-6H-6H-indolo[2,3-b]quinolin-6-yl)propyl)-5-methyl-3-phenylisoxazole-4-carboxamide | 1H NMR (400 MHz, CDCl3) δ 8.68 (t, J = 6.0 Hz, 1H), 7.81-7.73 (m, 3H), 7.46-7.37 (m, 4H), 7.33 (d, J = 8.0 Hz, 1H), 7.25-7.19 (m, 1H), 4.70 (br s, 2H), 4.12-4.03 (m, 2H), 3.14 (dd, J = 11.8, 6.1 Hz, 2H), 2.67 (s, 3H), 2.53 (t, J = 6.2 Hz, 2H), 2.42 (t, J = 6.2 Hz, 2H), 2.02-1.94 (m, 2H), 1.89-1.82 (m, 2H), 1.79-1.72 (m, 2H); 480[M + H]⁺ | 11 | 5.561 (A) 100% |

TABLE 2-continued

| Name | Structure | IUPAC name | ¹H NMR, MS | Yield (%) | HPLC r.t. (min) Purity |
|------|-----------|------------|------------|-----------|------------------------|
| SK49 | | 2,3-dimethyl-1-(2-nitrobenzyl)-5,6,7,8-tetrahydro-1H-pyrrolo[2,3-b]quinolin-4-amine | ¹H NMR (400 MHz, CDCl₃) δ 7.64 (dd, J = 8.0, 1.4 Hz, 1H), 7.32-7.27 (m, 1H), 7.26-7.21 (m, 1H), 6.90-6.85 (m, 1H), 3.93 (s, 2H), 3.86 (d, J = 15.1 Hz, 1H), 3.39 (d, J = 15.1 Hz, 1H), 2.80 (t, J = 5.8 Hz, 2H), 2.37 (t, J = 5.9 Hz, 2H), 2.33 (s, 3H), 1.85-1.70 (m, 2H), 1.44 (s, 3H), 1.30-1.15 (m, 2H); 351[M + H]⁺ | 55 | (A) 4.736 98% |
| SK50 | | 6-(3-(dimethylamino)propyl)-9-methoxy-2,3,4,6-tetrahydro-1H-indolo[2,3-b]quinolin-11-amine | ¹H NMR (400 MHz, CDCl₃) δ 7.36 (d, J = 8.8 Hz, 1H), 7.33 (s, 1H), 7.04 (dd, J = 8.8 Hz, 2.0 Hz, 1H), 4.66 (s, 2H), 4.41 (t, J = 7.0 Hz, 2H), 3.92 (s, 3H), 2.98-2.95 (m, 2H), 2.62-2.59 (m, 2H), 2.45-2.41 (m, 2H), 2.30 (s, 6H), 2.10-1.89 (m, 6H); 353[M + H]⁺ | 84 | (A) 4.276 98% |
| SK51 | | 12-(3-(dimethylamino)propyl)-9-methoxy-6,12-dihydro-5H-benzo[h]indolo[2,3-b]quinolin-7-amine | ¹H NMR (400 MHz, CDCl₃) δ 8.49 (d, J = 7.4 Hz, 1H), 7.41-7.37 (m, 3H), 7.29-7.17 (m, 2H), 7.06 (dd, J = 8.7 Hz, 2.3 Hz, 1H), 4.70 (s, 2H), 4.52 (t, J = 7.0 Hz, 2H), 3.93 (s, 3H), 3.02 (t, J = 6.7 Hz, 2H), 2.87 (t, J = 6.7 Hz, 2H), 2.39 (t, J = 6.9 Hz, 2H), 2.24 (s, 6H), 2.10 (t, J = 6.9 Hz, 2H); 401[M + H]⁺ | 43 | (A) 4.660 97% |

TABLE 2-continued

| Name | Structure | IUPAC name | $^1$H NMR, MS | Yield (%) | HPLC r.t. (min) Purity |
|---|---|---|---|---|---|
| SK52 | | 6-(3-(dimethylamino)propyl)-2,3,4,6-tetrahydro-1H-indolo[2,3-b]quinolin-11-amine | $^1$H NMR (400 MHz, CDCl$_3$) δ 7.82 (d, J = 7.7 Hz, 1H), 7.45-7.38 (m, 2H), 7.21 (m, 1H), 4.71 (s, 2H), 4.46 (t, J = 7.0 Hz, 2H), 2.99-2.98 (m, 2H), 2.63-2.60 (m, 2H), 2.51-2.49 (m, 2H), 2.34 (s, 6H), 2.16-2.12 (m, 2H), 1.96-1.89 (m, 4H); 323[M + H]$^+$ | 22 | (A) 4.166 99% |
| SK53 | | 6-benzyl-2,3,4,6-tetrahydro-1H-indolo[2,3-b]quinolin-11-amine | 1H NMR (400 MHz, CDCl3) δ 7.83 (d, J = 7.6 Hz, 1H), 7.32-7.27 (m, 1H), 7.26-7.16 (m, 7H), 5.64 (s, 2H), 4.70 (s, 2H), 2.99 (t, J = 6.0 Hz, 2H), 2.64 (t, J = 6.1 Hz, 2H), 2.02-1.87 (m, 4H); 328[M + H]$^+$ | 54 | 5.484 (A) 98% |
| SK54 | | 9-methoxy-6-(3-(methylamino)propyl)-2,3,4,6-tetrahydro-1H-indolo[2,3-b]quinolin-11-amine | $^1$H NMR (400 MHz, CDCl$_3$) δ 7.35 (d, J = 2.3 Hz, 1H), 7.30 (d, J = 8.8 Hz, 1H), 7.05 (dd, J = 8.8, 2.3 Hz, 1H), 4.68 (s, 2H), 4.43 (t, J = 6.4 Hz, 2H), 3.92 (s, 3H), 2.94 (t, J = 5.9 Hz, 2H), 2.60 (t, J = 5.9 Hz, 2H), 2.48 (t, J = 6.4 Hz, 2H), 2.41 (s, 3H), 2.14-2.04 (m, 2H), 1.97-1.84 (m, 4H); 339[M + H]$^+$ | 99 | (A) 4.271 94% |
| SK55 | | 6-(3-(methylamino)propyl)-2,3,4,6-tetrahydro-1H-indolo[2,3-b]quinolin-11-amine | $^1$H NMR (400 MHz, CDCl$_3$) δ 7.83 (d, J = 7.7 Hz, 1H), 7.45-7.35 (m, 2H), 7.30-7.24 (m, 1H), 4.79 (s, 2H), 4.47 (t, J = 5.9 Hz, 2H), 2.93 (t, J = 5.9 Hz, 2H), 2.61 (t, J = 5.9 Hz, 4H), 2.53 (s, 3H), 2.30-2.18 (m, 2H), | 99 | (A) 4.184 99% |

TABLE 2-continued

| Name | Structure | IUPAC name | ¹H NMR, MS | Yield (%) | HPLC r.t. (min) Purity |
|---|---|---|---|---|---|
| | | | 2.00-1.90 (m, 4H); 309[M + H]⁺ | | |
| SK56 | | 9-methoxy-6-(4-methylpent-3-en-1-yl)-2,3,4,6-tetrahydro-1H-indolo[2,3-b]quinolin-11-amine | ¹H NMR (400 MHz, CDCl₃) δ 7.35 (d, J = 2.3 Hz, 1H), 7.30 (d, J = 8.7 Hz, 1H), 7.03 (dd, J = 8.7, 2.3 Hz, 1H), 5.23 (t, J = 7.3 Hz, 1H), 4.61 (s, 2H), 4.37-4.27 (m, 2H), 3.92 (s, 3H), 2.99 (d, J = 5.8 Hz, 2H), 2.61 (t, J = 5.8 Hz, 2H), 2.63-2.45 (m, 2H), 1.95-1.90 (m, 4H), 1.64 (s, 3H), 1.53 (s, 3H); 350[M + H]⁺ | 12 | (B) 4.350 99% |
| SK57 | | Ethyl4-(11-amino-9-methoxy-1,2,3,4-tetrahydro-6H-indolo[2,3-b]quinolin-6-yl)butanoate | ¹H NMR (400 MHz, CDCl₃) δ 7.35 (s, 1H), 7.34 (d, J = 8.7 Hz, 2H), 7.04 (d, J = 8.7 Hz, 1H), 4.62 (s, 2H), 4.42 (t, J = 6.9 Hz, 2H), 4.10 (q, J = 6.9 Hz, 2H), 3.92 (s, 3H), 2.96 (t, J = 5.8 Hz, 2H), 2.61 (t, J = 5.8 Hz, 2H), 2.32 (q, J = 7.3 Hz, 2H), 2.35-2.15 (m, 2H), 2.00-1.90 (m, 4H), 1.23 (t, J = 7.3 Hz, 3H); 382[M + H]⁺ | 74 | (A) 5.430 95% |
| SK58 | | 6-(3-(dimethylamino)propyl)-9-methyl-2,3,4,6-tetrahydro-1H-indolo[2,3-b]quinolin-11-amine | 1H NMR (400 MHz, CDCl3) δ 7.61 (s, 1H), 7.34 (d, J = 8.2 Hz, 1H), 7.22 (d, J = 8.2 Hz, 1H), 4.68 (s, 2H), 4.44 (t, J = 6.9 Hz, 2H), 2.98 (t, J = 5.8 Hz, 2H), 2.77 (s, 2H), 2.61 (t, J = 5.9 Hz, 2H), 2.53 (s, 3H), 2.46 (t, J = 7.0 Hz, 2H), 2.31 (s, 6H), 2.16-2.05 (m, 2H), 1.99-1.85 | 63 | 4.354 (A) 98% |

TABLE 2-continued

| Name | Structure | IUPAC name | ¹H NMR, MS | Yield (%) | HPLC r.t. (min) Purity |
|---|---|---|---|---|---|
| | | | (m, 4H); 337[M + H]⁺ | | |
| SK59 | | 6-(3-(dimethylamino)propyl)-9-fluoro-2,3,4,6-tetrahydro-1H-indolo[2,3-b]quinolin-11-amine | 1H NMR (400 MHz, CDCl3) δ 7.49 (dd, J = 9.2, 2.4 Hz, 1H), 7.36 (dd, J = 8.8, 4.4 Hz, 1H), 7.13 (td, J = 9.1, 2.4 Hz, 1H), 4.63 (s, 2H), 4.44 (t, J = 6.9 Hz, 2H), 2.97 (t, J = 5.9 Hz, 2H), 2.61 (t, J = 6.0 Hz, 2H), 2.41 (t, J = 6.9 Hz, 2H), 2.29 (s, 6H), 2.13-2.03 (m, 2H), 1.98-1.84 (m, 4H); 341[M + H]⁺ | 46 | 4.254 (A) 100% |
| SK60 | | 9-chloro-6-(3-(dimethylamino)propyl)-2,3,4,6-tetrahydro-1H-indolo[2,3-b]quinolin-11-amine | 1H NMR (400 MHz, CDCl3) δ 7.77 (d, J = 1.3 Hz, 1H), 7.40-7.32 (m, 2H), 4.67 (s, 2H), 4.44 (t, J = 6.8 Hz, 2H), 2.97 (t, J = 5.9 Hz, 2H), 2.61 (t, J = 6.0 Hz, 2H), 2.53-2.42 (m, 2H), 2.34 (s, 6H), 2.20-2.06 (m, 2H), 1.99-1.86 (m, 4H); 357[M + H]⁺ | 42 | 4.406 (A) 99% |
| SK61 | | 6-(3-(dimethylamino)propyl)-9-(trifluoromethoxy)-2,3,4,6-tetrahydro-1H-indolo[2,3-b]quinolin-11-amine | 1H NMR (400 MHz, CDCl3) δ 7.64 (s, 1H), 7.42 (d, J = 8.8 Hz, 1H), 7.29 (s, 1H), 4.65 (s, 2H), 4.45 (t, J = 6.9 Hz, 2H), 2.98 (t, J = 5.9 Hz, 2H), 2.61 (t, J = 5.9 Hz, 2H), 2.41 (t, J = 6.8 Hz, 2H), 2.30 (s, 6H), 2.15-2.01 (m, 2H), 2.01-1.85 (m, 4H); 407[M + H]⁺ | 50 | 4.621 (A) 100% |

TABLE 2-continued

| Name | Structure | IUPAC name | ¹H NMR, MS | Yield (%) | HPLC r.t. (min) Purity |
|---|---|---|---|---|---|
| SK62 | | 11-amino-6-(3-(dimethylamino)propyl)-2,3,4,6-tetrahydro-1H-indolo[2,3-b]quinolin-9-carbonitrile | 1H NMR (400 MHz, CDCl3) δ 8.10 (s, 1H), 7.64 (dd, J = 8.5, 1.1 Hz, 1H), 7.52 (d, J = 8.5 Hz, 1H), 4.72 (s, 2H), 4.46 (t, J = 6.9 Hz, 2H), 2.99 (t, J = 5.9 Hz, 2H), 2.62 (t, J = 6.0 Hz, 2H), 2.32 (t, J = 6.9 Hz, 2H), 2.25 (s, 6H), 2.11-2.02 (m, 2H), 2.01-1.87 (m, 4H); 348[M + H]⁺ | 49 | 4.199 (A) 96% |
| SK63 | | 6-(3-(dimethylamino)propyl)-9-(trifluoromethyl)-2,3,4,6-tetrahydro-1H-indolo[2,3-b]quinolin-11-amine | 1H NMR (400 MHz, CDCl3) δ 8.04 (s, 1H), 7.64 (d, J = 8.5 Hz, 1H), 7.53 (d, J = 8.5 Hz, 1H), 4.72 (s, 2H), 4.48 (t, J = 7.0 Hz, 2H), 2.99 (t, J = 5.9 Hz, 2H), 2.63 (t, J = 6.0 Hz, 2H), 2.42 - 2.33 (m, 2H), 2.27 (s, 6H), 2.12-2.07 (m, 2H), 1.98-1.87 (m, 4H); 391[M + H]⁺ | 45 | 4.534 (A) 99% |
| SK64 | | Methyl 11-amino-6-(3-(dimethylamino)propyl)-2,3,4,6-tetrahydro-1H-indolo[2,3-b]quinolin-9-carboxylate | 1H NMR (400 MHz, CDCl3) δ 7.69 (d, J = 8.5 Hz, 1H), 6.98 (d, J = 2.2 Hz, 1H), 6.82 (dd, J = 8.5, 2.2 Hz, 1H), 4.56 (s, 2H), 4.40 (t, J = 7.0 Hz, 2H), 3.93 (s, 3H), 2.97 (t, J = 5.8 Hz, 2H), 2.61 (t, J = 5.9 Hz, 2H), 2.34 (t, J = 7.0 Hz, 2H), 2.24 (s, 6H), 2.10-1.99 (m, 2H), 1.98-1.86 (m, 4H); 381[M + H]⁺ | 65 | 4.347 (A) 99% |

TABLE 2-continued

| Name | Structure | IUPAC name | ¹H NMR, MS | Yield (%) | HPLC r.t. (min) Purity |
|------|-----------|------------|------------|-----------|------------------------|
| SK65 | | 6-(3-(dimethylamino)propyl)-8-methoxy-2,3,4,6-tetrahydro-1H-indolo[2,3-b]quinolin-11-amine | 1H NMR (400 MHz, CDCl3) δ 8.54 (d, J = 1.1 Hz, 1H), 8.11 (dd, J = 8.6, 1.4 Hz, 1H), 7.46 (d, J = 8.6 Hz, 1H), 4.79 (s, 2H), 4.47 (t, J = 7.0 Hz, 2H), 3.96 (s, 3H), 2.98 (t, J = 5.9 Hz, 2H), 2.63 (t, J = 5.9 Hz, 2H), 2.35 (t, J = 6.9 Hz, 2H), 2.25 (s, 6H), 2.11-2.02 (m, 2H), 1.99-1.88 (m, 4H); 353[M + H]⁺ | 65 | 4.277 (A) 97% |
| SK66 | | 1-((6-(3-(dimethylamino)propyl)-9-methoxy-2,3,4,6-tetrahydro-1H-indolo[2,3-b]quinolin-11-yl)amino)propan-2-ol | ¹H NMR (400 MHz, DMSO) δ 7.88 (d, J = 2.2 Hz, 1H), 7.45 (d, J = 8.9 Hz, 1H), 6.96 (dd, J = 8.9, 2.2 Hz, 1H), 6.13 (s, 2H), 5.58 (s, 1H), 4.35-4.20 (m, 2H), 4.17 (s, 1H), 3.85 (s, 3H), 3.06 (d, J = 6.4 Hz, 6H), 2.85-2.75 (m, 2H), 1.90-1.75 (m, 4H), 1.06 (d, J = 6.3 Hz, 3H); 411[M + H]⁺ | 60 | (A) 4.255 99% |
| SK67 | | 11-amino-6-(3-(dimethylamino)propyl)-9-methoxy-3,3-dimethyl-2,3,4,6-tetrahydro-1H-indolo[2,3-b]quinolin-1-one | 1H NMR (400 MHz, CDCl3) δ 10.74 (br s, 1H), 7.16 (d, J = 8.9 Hz, 1H), 7.12 (d, J = 2.4 Hz, 1H), 6.91 (dd, J = 8.9, 2.4 Hz, 1H), 5.53 (s, 1H) 4.15-4.07 (m, 2H), 3.87 (s, 3H), 2.42 (s, 2H), 2.35-2.25 (m, 8H), 2.17-2.10 (m, 2H), 2.10-2.01 (m, 2H), 1.13 (s, 6H); 395[M + H]⁺ | 43 | 4.753 (A) 97% |

TABLE 2-continued

| Name | IUPAC name | ¹H NMR, MS | Yield (%) | HPLC r.t. (min) Purity |
|---|---|---|---|---|
| SK68 | 11-amino-6-(3-(dimethylamino)propyl)-9-methoxy-3-phenyl-2,3,4,6-tetrahydro-1H-indolo[2,3-b]quinolin-1-one | 1H NMR (400 MHz, MeOD) δ 7.46 (d, J = 9.0 Hz, 1H), 7.42-7.33 (m, 4H), 7.31-7.24 (m, 1H), 7.09 (d, J = 2.4 Hz, 1H), 6.98 (dd, J = 9.0, 2.4 Hz, 1H), 4.24-4.16 (m, 2H), 3.86 (s, 3H), 3.57-3.45 (m, 1H), 3.05 (dd, J = 16.7, 11.1 Hz, 1H), 2.87-2.76 (m, 1H), 2.76-2.67 (m, 1H), 2.58 (dd, J = 16.2, 4.0 Hz, 1H), 2.30-2.19 (m, 8H), 2.02 (dd, J = 13.3, 6.7 Hz, 2H); 443[M + H]⁺ | 47 | 5.071 (A) 92% |
| SK69 | 9-(benzyloxy)-6-(3-(dimethylamino)propyl)-2,3,4,6-tetrahydro-1H-indolo[2,3-b]quinolin-11-amine | ¹H NMR (400 MHz, CDCl₃) δ 7.50 (d, J = 7.3 Hz, 2H), 7.45-7.31 (m, 5H), 7.10 (dd, J = 8.8, 2.3 Hz, 1H), 5.15 (s, 2H), 4.60 (s, 2H), 4.40 (t, J = 7.1 Hz, 2H), 2.98 (t, J = 5.7 Hz, 2H), 2.59 (t, J = 5.7 Hz, 2H), 2.31 (t, J = 7.1 Hz, 2H), 2.22 (s, 6H), 2.06-1.95 (m, 2H), 1.20-1.90 (m, 4H); 429[M + H]⁺ | 46 | (A) 4.826 100% |
| SK70 | 6-(3-(dimethylamino)propyl)-9-isopropoxy-2,3,4,6-tetrahydro-1H-indolo[2,3-b]quinolin-11-amine | ¹H NMR (400 MHz, CDCl₃) δ 7.37 (d, J = 2.3 Hz, 1H), 7.33 (d, J = 8.7 Hz, 1H), 7.03 (dd, J = 8.7, 2.3 Hz, 1H), 4.60 (s, 2H), 4.60-4.40 (m, 1H), 4.40 (t, J = 7.1 Hz, 2H), 2.97 (t, J = 5.9 Hz, 2H), 2.60 (t, J = 5.9 Hz, 2H), 2.32 (t, J = 7.1 Hz, 2H), 2.22 (s, 6H), 2.05-2.00 (m, 2H), 1.97-1.83 (m, 4H), 1.38 (d, | 74 | (A) 4.507 98% |

TABLE 2-continued

| Name | Structure | IUPAC name | $^1$H NMR, MS | Yield (%) | HPLC r.t. (min) Purity |
|---|---|---|---|---|---|
| | | | J = 6.1 Hz, 6H); 381[M + H]$^+$ | | |
| SK71 | | 11-amino-6-(3-(dimethylamino)propyl)-2,3,4,6-tetrahydro-1H-indolo[2,3-b]quinolin-9-ol | $^1$H NMR (400 MHz, DMSO) δ 8.80 (s, 1H), 7.62 (d, J = 2.2 Hz, 1H), 7.24 (d, J = 8.6 Hz, 1H), 6.82 (dd, J = 8.6, 2.2 Hz, 1H), 5.87 (s, 2H), 4.23 (t, J = 7.0 Hz, 2H), 3.40-3.10 (m, 4H), 2.80-2.75 (m, 2H), 2.71-2.18 (t, J = 7.0 Hz, 2H), 2.11 (s, 6H), 1.87-1.71 (m, 4H); 339[M + H]$^+$ | 50 | (A) 3.975 96% |
| SK72 | | N1-(7-(3-(dimethylamino)propyl)-9,10,11,12-tetrahydro-7H-benzo[4,5]indolo[2,3-b]quinolin-13-yl)-N3,N3-dimethylpropane-1,3-diamine | $^1$H NMR (400 MHz, DMSO) δ 9.24 (d, J = 8.4 Hz, 1H), 7.98 (d, J = 8.4 Hz, 1H), 7.93 (d, J = 8.8 Hz, 1H), 7.86 (d, J = 8.8 Hz, 1H), 7.58 (dd, J = 7.0 Hz, 7.0 Hz, 1H), 7.39 (dd, J = 7.0 Hz, 7.0 Hz, 1H), 5.45 (t, J = 6.7 Hz, 1H), 4.51 (t, J = 7.1 Hz, 2H), 3.10-3.02 (m, 2H), 2.95-2.85 (m, 2H), 2.82-2.75 (m, 2H), 2.23 (t, J = 6.7 Hz, 2H), 2.13 (s, 6H), 2.05 (t, J = 6.7 Hz, 2H), 1.98 (s, 6H), 1.95-1.80 (m, 6H), 1.62-1.52 (m, 2H); 458[M + H]$^+$ | 60 | (A) 4.175 99% |

TABLE 2-continued

| Name | Structure | IUPAC name | $^1$H NMR, MS | Yield (%) | HPLC r.t. (min) Purity |
|---|---|---|---|---|---|
| SK73 | | 5-(11-amino-9-methoxy-1,2,3,4-tetrahydro-6H-indolo[2,3-b]quinolin-6-yl)-2-methylpentan-2-ol | $^1$H NMR (400 MHz, CDCl$_3$) δ 7.36 (d, J = 2.3 Hz, 1H), 7.30 (d, J = 8.8 Hz, 1H), 7.05 (dd, J = 8.8, 2.3 Hz, 1H), 4.70 (s, 2H), 4.57 (t, J = 6.3 Hz, 2H), 3.92 (s, 3H), 2.98 (t, J = 6.0 Hz, 2H), 2.61 (t, J = 6.0 Hz, 2H), 2.05-1.85 (m, 6H), 1.40-1.34 (m, 2H), 1.19 (s, 6H); 368[M + H]$^+$ | 12 | (A) 5.251 97% |
| SK74 | | 7-(3-(dimethylamino)propyl)-9,10,11,12-tetrahydro-7H-benzo[4,5]indolo[2,3-b]quinolin-13-amine | $^1$H NMR (400 MHz, CDCl$_3$) δ 8.89 (d, J = 8.3 Hz, 1H), 7.99 (d, J = 8.3 Hz, 1H), 7.86 (d, J = 8.7 Hz, 1H), 7.72 (d, J = 8.7 Hz, 1H), 7.63-7.57 (m, 1H), 7.44-7.40 (m, 1H), 4.87 (s, 2H), 4.59 (t, J = 7.1 Hz, 2H), 3.03 (t, J = 6.1 Hz, 2H), 2.69 (t, J = 6.1 Hz, 2H), 2.34 (t, J = 7.1 Hz, 2H), 2.24 (s, 6H), 2.16-1.86 (m, 6H); 373[M + H]$^+$ | 34 | (A) 4.583 100% |
| SK75 | | 2,3-dimethyl-1-(3-(methylamino)propyl)-5,6,7,8,9,10-hexahydro-1H-cycloocta[b]pyrrolo[3,2-e]pyridin-4-amine | $^1$H NMR (400 MHz, CDCl$_3$) δ 4.60 (s, 2H), 4.26-4.15 (m, 2H), 2.88-2.79 (m, 2H), 2.81-2.65 (m, 4H), 2.61 (s, 3H), 2.42 (s, 3H), 2.26 (s, 3H), 2.24-2.15 (m, 2H), 1.80-1.64 (m, 4H), 1.50-1.45 (m, 2H), 1.37-1.28 (m, 2H); 315[M + H]$^+$ | 99 | (A) 4.446 98% |

TABLE 2-continued

| Name | Structure | IUPAC name | ¹H NMR, MS | Yield (%) | HPLC r.t. (min) Purity |
|---|---|---|---|---|---|
| SK76 | | 1-isobutyl-2,3-dimethyl-5,6,7,8-tetrahydro-1H-pyrrolo[2,3-b]quinolin-4-amine | ¹H NMR (400 MHz, CDCl₃) δ 4.31 (s, 2H), 3.91 (d, J = 7.6 Hz, 2H), 2.88 (t, J = 6.0 Hz, 2H), 2.50 (t, J = 6.0 Hz, 2H), 2.42 (s, 3H), 2.26 (s, 3H), 2.25-2.15 (m, 1H) 1.93-1.78 (m, 4H), 0.86 (d, J = 6.7 Hz, 6H); 272[M + H]⁺ | 35 | (A) 5.419 98% |
| SK77 | | 2,3-dimethyl-1-(pyridin-2-ylmethyl)-5,6,7,8-tetrahydro-1H-pyrrolo[2,3-b]quinolin-4-amine | ¹H NMR (400 MHz, CDCl₃) δ 8.53 (d, J = 4.2 Hz, 1H), 7.50-7.46 (td, J = 7.9, 1.7 Hz, 1H), 7.10 (dd, J = 6.9, 4.2 Hz, 1H), 6.69 (d, J = 7.9 Hz, 1H), 5.52 (s, 2H), 4.38 (s, 2H), 2.87 (t, J = 6.0 Hz, 2H), 2.52 (t, J = 6.0 Hz, 2H), 2.43 (s, 3H), 2.13 (s, 3H), 1.92-1.80 (m, 4H); 307[M + H]⁺ | 15 | (A) 4.622 98% |
| SK78 | | 10-(3-(dimethylamino)propyl)-8,9-dimethyl-6,10-dihydro-5H-benzo[h]pyrrolo[2,3-b]quinolin-7-amine | ¹H NMR (400 MHz, CDCl₃) δ 8.39 (d, J = 7.5 Hz, 1H), 7.35-7.28 (m, 1H), 7.25-7.17 (m, 2H), 4.39 (s, 2H), 4.32-4.21 (m, 2H), 3.04-2.86 (m, 2H), 2.76 (dd, J = 8.3, 6.2 Hz, 2H), 2.46 (s, 3H), 2.42-2.35 (m, 2H), 2.33 (s, 3H), 2.25 (s, 6H), 2.08-1.92 (m, 2H); 349[M + H]⁺ | 17 | (A) 4.375 94% |
| SK79 | | 2,3-dimethyl-1-phenyl-5,6,7,8-tetrahydro-1H-pyrrolo[2,3-b]quinolin-4-amine | ¹H NMR (400 MHz, CDCl₃) δ 7.47 (dd, J = 7.6, 7.6 Hz, 2H), 7.42-7.30 (m, 3H), 4.40 (s, 2H), 2.79 (t, J = 6.2 Hz, 2H), 2.57-2.43 (m, 2H), 2.49 (s, 3H), 2.13 (s, 3H), 1.90-1.77 (m, 6H); 292[M + H]⁺ | 11 | (A) 5.397 98% |

TABLE 2-continued

| Name | Structure | IUPAC name | ¹H NMR, MS | Yield (%) | HPLC r.t. (min) Purity |
|---|---|---|---|---|---|
| SK80 | | 2,3-dimethyl-1-(pyridin-3-yl)-5,6,7,8-tetrahydro-1H-pyrrolo[2,3-b]quinolin-4-amine | ¹H NMR (400 MHz, CDCl₃) δ 8.64 (d, J = 2.3 Hz, 1H), 8.58 (dd, J = 4.8, 1.3 Hz, 1H), 7.83-7.74 (m, 1H), 7.43 (dd, J = 8.1, 4.8 Hz, 1H), 4.42 (s, 2H), 2.79 (t, J = 6.1 Hz, 2H), 2.61-2.39 (m, 2H), 2.49 (s, 3H), 2.18 (s, 3H), 1.91-1.79 (m, 4H); 293[M + H]⁺ | 27 | (A) 4.607 99% |
| SK81 | | 6-(3-(dimethylamino)propyl)-8-methyl-2,3,4,6-tetrahydro-1H-indolo[2,3-b]quinolin-11-amine | ¹H NMR (400 MHz, CDCl₃) δ 7.69 (d, J = 7.9 Hz, 1H), 7.04 (d, J = 7.9 Hz, 1H), 4.61 (s, 2H), 4.41 (t, J = 7.2 Hz, 2H), 2.98 (t, J = 5.9 Hz, 2H), 2.61 (t, J = 5.9 Hz, 2H), 2.54 (s, 6H), 2.33 (t, J = 7.2 Hz, 2H), 2.23 (s, 6H), 2.07-1.87 (m, 6H); 337[M + H]⁺ | 62 | (A) 4.347 100% |
| SK82 | | 8-chloro-6-(3-(dimethylamino)propyl)-2,3,4,6-tetrahydro-1H-indolo[2,3-b]quinolin-11-amine | ¹H NMR (400 MHz, CDCl₃) δ 7.70 (d, J = 8.2 Hz, 1H), 7.43 (J = 1.3 Hz, 1H), 7.20 (dd, J = 8.2, 1.3 Hz, 1H), 4.69 (s, 2H), 4.45 (t, J = 6.7 Hz, 2H), 2.97 (t, J = 5.8 Hz, 2H), 2.70-2.58 (m, 4H), 2.46 (s, 6H), 2.26-2.15 (m, 2H), 2.01-1.91 (m, 4H); 367[M + H]⁺ | 28 | (A) 4.423 98% |

The compound according to the present invention may be used in the form of a pharmaceutically acceptable salt, and an acid addition salt formed by pharmaceutically acceptable free acid is useful as the salt. The free acid may be an inorganic acid or organic acid. The inorganic acid includes hydrochloric acid, hydrobromic acid, sulfuric acid, phosphoric acid, and the like, and the organic acid includes citric acid, acetic acid, lactic acid, maleic acid, fumaric acid, gluconic acid, methanesulfonic acid, glycolic acid, succinic acid, tartaric acid, 4-toluenesulfonic acid, galacturonic acid, embonic acid, glutamic acid, aspartic acid, and the like.

The compound according to the present invention comprises any salt, isomer, hydrate and solvate that can be prepared through conventional methods, along with the pharmaceutically acceptable salt.

In addition, the compound according to the present invention may be prepared in a crystalline or amorphous form. When the compound of Formula 1 is prepared in a crystalline form, it may optionally be hydrated or solvated.

In the present invention, the compound represented by Formula 1 exhibits an effect of inhibiting the secretion of inflammatory cytokines such as TNF-α by inhibiting the TLR3, TLR7, TLR8, or TLR9 signaling pathway.

Accordingly, in another aspect, the present invention is directed to a composition for inhibiting Toll-like receptors (TLRs) comprising the compound represented by Formula 1, the isomer thereof, or the pharmaceutically acceptable salt thereof.

The compound represented by Formula 1 may be a compound represented by any one selected from the group consisting of Formula 1-1 to Formula 1-34, but is not limited thereto.

In the present invention, the compound may inhibit the signaling pathway of at least one TLR selected from the group consisting of TLR3, TLR7, TLR8 and TLR9, which are endosomal TLRs.

As used herein, the term "inhibition" refers to a phenomenon in which biological activity or signaling activity is deteriorated due to some deficiency, imbalance or other causes, and may include partial or complete blocking, reduction or prevention of activity of TLR, delaying of activation, inactivation, or down-regulation.

As used herein, the term "inhibitor" refers to a molecule that partially or completely inhibits influences on other molecules such as receptors or intracellular mediators by any mechanism. Herein, the composition for inhibiting TLRs has the same meaning as the TLR inhibitor.

As used herein, the term "TLR3, TLR7, TLR8 or TLR9 inhibitor" refers to a substance capable of directly or indirectly or substantially interfering with, reducing or inhibiting the biological activity of TLR3, TLR7, TLR8 or TLR9, and preferably, refers to a substance that binds to the TLR3, TLR7, TLR8 or TLR9 receptors and neutralizes the activity thereof to block TLR3, TLR7, TLR8 or TLR9 signaling pathway and thereby reduces the secretion of NF-κB (nuclear factor k-light-chain-enhancer of activated B cells), MAPK (mitogen-activated protein kinase), inflammatory cytokines, NO and ROS.

According to one embodiment of the present invention, SK23, SK24, SK29, SK36, SK39, SK40, SK41, SK50, SK52, SK54, SK55, SK58, SK59, SK60, SK61, SK62, SK63, SK64, SK65, SK69, SK70, SK71, SK72, SK74, SK75, SK81, and SK82 inhibit overactivation of cytokines such as TNF-α (tumor necrosis factor-α) by inhibiting the TLR signaling pathways induced by TLR3, TLR7, TLR8, or TLR9 activation. Therefore, these substances have excellent effects of reducing inflammatory cytokines (ameliorating inflammatory response) and thus can be useful as a composition for preventing or treating autoimmune diseases, inflammatory diseases and viral diseases caused by TLR3, TLR7, TLR8 or TLR9 activation.

As used herein, the term "TLR3" refers to a protein that is categorized as a Toll-like receptor (TLR) which is a family of transmembrane proteins that function as monitors for pathogen infection, is a protein encoded by a TLR3 gene, and is also called "CD283" or "IIAE2". The TLR3 recognizes double-stranded RNA or poly I:C to activate the innate immune system.

As used herein, the term "TLR7" refers to a protein that is categorized as a Toll-like receptor (TLR) which is a family of transmembrane proteins that function as monitors for pathogen infection, is a protein encoded by a TLR7 gene, and is also called "UNQ248/PRO285". The TLR7 recognizes ssRNA (single-stranded RNA) of RNA viruses or synthetic small molecules such as imidazoquinoline, loxoribine, and bropirimine to activate the innate immune system.

As used herein, the term "TLR8" refers to a protein that is categorized as a Toll-like receptor (TLR) which is a family of transmembrane proteins that function as monitors for pathogen infection, is a protein encoded by a TLR8 gene, and is also called "CD288 (cluster of differentiation 288)" or "UNQ249/PRO286". The TLR8 is activated by single-stranded viral RNA, phagocytized bacterial RNA that enters cells through phagocytosis, or by the synthetic small molecule, TL8-506.

As used herein, the term "TLR9" refers to a protein that is categorized as a Toll-like receptor (TLR) which is a family of transmembrane proteins that function as monitors for pathogen infection, is a protein encoded by a TLR9 gene, and is also called "CD289" or "UNQ5798/PRO19605". The TLR9 recognizes unmethylated CpG oligodeoxynucleotide DNA fragments from bacteria or DNA viruses to activate the innate immune system.

As used herein, the term "TLR-signaling pathway" refers to a signaling pathway through TLR, which may be a reaction that depends on a complex formed by TLR and the adapter protein MyD88 (for TLR7/8/9) or a complex formed by TLR and the adapter protein TRIF (for TLR3) and functions to transmit a signal. Activated TLR7/8/9 activates NF-κB through a Myd88-dependent signaling process, transmits the same to the nucleus, and induces activation of MAPK. The activation of NF-κB and MAPK causes inflammatory cytokines such as TNF-α, IL-13 and IL-6 to be secreted and oxidative stressors such as nitrogen monoxide (hereinafter referred to as NO) and reactive oxygen species (hereinafter referred to as ROS) to be produced in macrophages. In addition, TLR3 activates TRIF, interferon-regulator (IRF), and NF-κB, thus inducing MyD88-independent signaling process and secretion of type 1 interferon.

According to one embodiment of the present invention, the compound of Formula 1 according to the present invention has an excellent effect of inhibiting the TLR3, TLR7, TLR8 and TLR9 signaling pathways, and is useful as a composition for preventing or treating autoimmune diseases, inflammatory diseases and viral diseases which are caused by the TLR3, TLR7, TLR8 or TLR9 signaling pathways.

Accordingly, in another aspect, the present invention is directed to a composition for preventing or treating an autoimmune disease, an inflammatory disease or a viral disease comprising the compound (isomer thereof or pharmaceutically acceptable salt thereof) or the composition for inhibiting Toll-like receptors (TLRs).

In another aspect, the present invention is directed to a method for preventing or treating an autoimmune disease, an inflammatory disease or a viral disease comprising administering the compound (isomer thereof or pharmaceutically acceptable salt thereof) or the composition for inhibiting Toll-like receptors (TLRs).

In another aspect, the present invention is directed to the use of the compound (isomer thereof or pharmaceutically acceptable salt thereof) or the composition for inhibiting Toll-like receptors (TLRs) for the prevention or treatment of an autoimmune disease, an inflammatory disease or a viral disease.

In another aspect, the present invention is directed to the use of the compound (isomer thereof or pharmaceutically acceptable salt thereof) or the composition for inhibiting Toll-like receptors (TLRs) for the manufacture of a medicament for the prevention or treatment of an autoimmune disease, an inflammatory disease or a viral disease.

In the present invention, the compound represented by Formula 1 may be a compound represented by any one selected from the group consisting of Formulas 1-1 to 1-34, but is not limited thereto.

In the present invention, the autoimmune disease or inflammatory disease is selected from the group consisting of psoriasis, systemic lupus erythematosus (SLE), skin rash, photosensitive skin diseases, rheumatoid arthritis, juvenile rheumatoid arthritis, psoriatic arthritis, discoid lupus erythematosus, malaria, oral ulcer, nephritis, hemocytopenia, vasculitis, serositis, inflammatory bowel disease (IBD), diabetes, multiple sclerosis, skin sclerosis, pemphigus, atopic dermatitis, urethritis, cystitis, arteriosclerosis, allergic diseases, rhinitis, asthma, acute pain, chronic pain, periodontitis, gingivitis, gout, myocardial infarction, congestive heart failure, high blood pressure, angina pectoris, gastric ulcer, cerebral infarction, Down's syndrome, obesity, dementia, depression, schizophrenia, tuberculosis, sleep disorders, sepsis, burns, pancreatitis, Parkinson's disease, and stroke, but is not limited thereto.

As used herein, the term "autoimmune disease" refers to a disease caused by a process in which a problem occurs in inducing or maintaining self-tolerance, leading to an immune response to a self-antigen and thus an attack on the organism's own tissue. The term "self-tolerance" refers to immunologic unresponsiveness, meaning the lack of harmful response to a potentially antigenic substance constituting the self-body. An autoimmune disease includes a disease resulting from the breakdown of self-resistance in which the adaptive immune system responds to a self-antigen and mediates cellular and tissue damage. In certain embodiments, the autoimmune disease results at least partially from a humoral immune response.

Autoimmune diseases pertinent to the present invention include systemic lupus erythematosus, insulin-dependent diabetes mellitus, multiple sclerosis, autoimmune encephalomyelitis, rheumatoid arthritis, juvenile rheumatoid arthritis, psoriatic arthritis, discoid lupus erythematosus, photosensitive skin disease, autoimmune arthritis, myasthenia gravis, thyroiditis, experimental uveitis, Hashimoto's thyroiditis, primary myxedema, thyroid toxicosis, pernicious anemia, autoimmune atrophic gastritis, Addison's disease, early menopause, male infertility, childhood diabetes, Goodpasture syndrome, pemphigus vulgaris, bullous pemphigoid, sympathetic ophthalmitis, lens uveitis, autoimmune hemolytic anemia, idiopathic leukocytosis, primary biliary cirrhosis, chronic active hepatitis Hbs-ve, latent cirrhosis, ulcerative colitis, Sjogren's syndrome, scleroderma, Wegener's granulomatosis, polymyositis/dermatomyositis, and discoid LE, but are not limited thereto.

In addition, non-limiting examples of the autoimmune disease include acute disseminated encephalomyelitis (ADEM), acute necrotizing hemorrhagic leukoencephalitis, Addison's disease, agammaglobulinemia, allergic asthma, allergic rhinitis, alopecia areata, amyloidosis, ankylosing spondylitis, antibody-mediated transplant rejection, anti-GBM/anti-TBM nephritis, antiphospholipid antibody syndrome (APS), autoimmune angioedema, autoimmune aplastic anemia, autoimmune autonomic dystrophy, autoimmune hepatitis, autoimmune hyperlipidemia, autoimmune immunodeficiency syndrome, autoimmune inner-ear disease (AIED), autoimmune myocarditis, autoimmune pancreatitis, autoimmune diabetic retinopathy, autoimmune thrombocytopenia purpura (ATP), autoimmune thyroid disease, autoimmune urticaria, axon and neuronal neuropathy, Balo disease, Bechet's disease, pemphigus, cardiomyopathy, Castleman's disease, celiac disease, Chagas disease, chronic fatigue syndrome, chronic inflammatory demyelinating polyneuropathy (CIDP), chronic recurrent multifocal osteomyelitis (CRMO), Churg-Strauss syndrome, scarring pemphigus/benign mucosal pemphigus, Crohn's disease, Cogan syndrome, cold agglutinin disease, congenital heart blockage, coxsackie myocarditis, CREST disease, essential mixed cryoglobulinemia, demyelinating neuropathies, herpetic dermatitis, dermatitis, Devic's disease (optic neuromyelitis), discoid lupus, Dressler's syndrome, endometriosis, eosinophilic fasciitis, nodular erythema, experimental allergic encephalomyelitis, Evans syndrome, fibromyalgia, fibrous alveolitis, giant-cell arteritis (temporal arteritis), glomerulonephritis, Goodpasture syndrome, granulomatosis with polyangiitis (GPA), Graves' disease, Guillain-Barre syndrome, Hashimoto's encephalitis, Hashimoto thyroiditis, hemolytic anemia, Henoch-Schoenlein purpura, gestational herpes, hypogammaglobulinemia, hypergammaglobulinemia, idiopathic thrombocytopenia purpura (ITP), IgA kidney disease, IgG4-related sclerotic disease, immunomodulatory lipoprotein, inclusion body myositis, inflammatory bowel disease, insulin-dependent diabetes (type 1), interstitial cystitis, juvenile arthritis, juvenile diabetes, Kawasaki syndrome, Eaton-Lambert syndrome, leukopenia vasculitis, lichen planus, lichen sclerosis, ligneous conjunctivitis, linear IgA disease (LAD), lupus (SLE), Lyme disease, Meniere's disease, microscopic polyangiitis, mixed connective tissue disease (MCTD), monoclonal gammopathy of undetermined significance (MGUS), encroaching corneal ulcer, Mucha-Habermann disease, multiple sclerosis, myasthenia gravis, myositis, narcolepsy, neuromyelitis (Devic's disease), neutropenia, ocular cicatricial pemphigoid, optic neuritis, recurrent rheumatism, PANDAS (pediatric autoimmune neuropsychiatric disorders associated with streptococcal infections), antitumor cerebellar degeneration, paroxysmal nocturnal hemoglobinuria (PNH), facial unilateral atrophy, Parsonage-Turner syndrome, pars planitis (peripheral uveitis), pemphigus, peripheral neuropathy, perivenous encephalomyelitis, pernicious anemia, POEMS syndrome, polyarteritis nodosa, type I, type II, and type III autoimmune polyglandular syndrome, multiple muscle pain rheumatism, polymyositis, post-myocardial-infarction syndrome, post-pericardiectomy syndrome, progesterone dermatitis, primary biliary cirrhosis, primary sclerosing cholangitis, psoriasis, psoriatic arthritis, idiopathic pulmonary fibrosis, gangrene pyoderma, pure red blood cell aplasia, Raynaud's phenomenon, reflex sympathetic dystrophy, Reiter's syndrome, recurrent polychondritis, restless legs syndrome, retroperitoneal fibrosis, rheumatoid fever, rheumatoid arthritis, sarcoidosis, scimitar syndrome, scleritis, scleroderma, Sjogren's syndrome, sperm and testicular autoimmunity, stiff person syndrome, subacute bacterial endocarditis (SBE), Susac's syndrome, sympathetic ophthalmitis, Takayasu's arteritis, temporal arteritis/giant-cell arteritis, thrombocytopenic purpura (TTP), Tolosa-Hunt syndrome, transverse myelitis, ulcerative colitis, undifferentiated connective tissue disease (UCTD), uveitis, vasculitis, vesiculobullous dermatosis, vitiligo, Waldenstrom macroglobulinemia (WM), and Wegener's granulomatosis (granulomatosis with polyangiitis; GPA).

As used herein, the term "inflammatory disease" refers to a disease caused by an inflammatory substance (inflammatory cytokine) such as TNFα, IL-1, IL-6, prostaglandin, leukotriene or NO secreted by immune cells such as macrophages due to excessive excitation of the immune system by harmful stimulation such as inflammation-inducing factors or irradiation. The "inflammatory disease" may be an acute or chronic inflammatory condition, and may be caused by an infectious or non-infectious factor.

The inflammatory disease of the present invention includes psoriasis, asthma, eczema, allergies, rheumatoid arthritis, psoriatic arthritis, contact dermatitis, atopic dermatitis, acne, atopic rhinitis, allergic dermatitis, chronic sinusitis, seborrheic dermatitis, gastritis, gout, gouty arthritis, ulcers, chronic bronchitis, pulmonary inflammation, Crohn's disease, ulcerative colitis, ankylosing spondylitis, sepsis, vasculitis, bursitis, lupus, rheumatoid polymyalgia, temporal arteritis, multiple sclerosis, solid cancer, Alzheimer's disease, arteriosclerosis, obesity, malaria and viral infections, but is not limited thereto.

In addition, non-limiting examples of the inflammatory disease include atherosclerosis, arteriosclerosis, autoimmune disorders, multiple sclerosis, systemic lupus erythematosus, multiple muscle pain rheumatism (PMR), gouty arthritis, degenerative arthritis, tendinitis, bursitis, psoriasis, cystic fibrosis, osteoarthritis, rheumatoid arthritis, inflammatory arthritis, Sjogren's syndrome, giant-cell arteritis, progressive systemic sclerosis (scleroderma), ankylosing spondylitis, polymyositis, dermatitis, pemphigus, pemphigoid, diabetes (e.g., type I diabetes), myasthenia gravis, Hashimoto's thyroiditis, Graves' disease, Goodpasture disease, mixed connective tissue disease, sclerosing cholangitis, inflammatory bowel disease, Crohn's disease, ulcerative colitis, pernicious anemia, inflammatory skin disease, usual interstitial pneumonia (UIP), asbestos diseases, silicosis, bronchiectasis, beryllium poisoning, talcosis, pneumoconiosis, sarcoidosis, detachable interstitial pneumonia, lymphocytic interstitial pneumonia, giant-cell interstitial pneumonia, cellular interstitial pneumonia, exogenous allergic alveolitis, Wegener's granulomatosis and vasculitis-associated forms (temporal arteritis and polyarteritis nodosa), inflammatory skin disease, hepatitis, delayed-type hypersensitivity (e.g. poison ivy dermatitis), pneumonia, airway inflammation, adult respiratory disorder syndrome (ARDS), encephalitis, immediate hypersensitivity, asthma, hay fever, allergies, acute anaphylaxis, rheumatic fever, glomerulonephritis, pyelonephritis, cellulitis, cystitis, chronic cholecystitis, ischemia (ischemic injury), allograft rejection, host-to-transplant rejection, appendicitis, arteritis, blepharitis, bronchiolitis, bronchitis, cervicitis, cholangitis, chorionic amnionitis, conjunctivitis, psoriasis, dermatitis, endocarditis, endometritis, enteritis, intestinal inflammation, epididymitis, fasciitis, connective tissue infection, gastritis, gastroenteritis, gingivitis, ileitis, iritis, laryngitis, myocarditis, nephritis, omphalitis, ovaritis, orchitis, osteitis, otitis, pancreatitis, mumps, pericarditis, pharyngitis, nephritis, phlebitis, interstitial pneumonia, proctitis and anusitis, prostatitis, rhinitis, salpingitis, sinusitis, stomatitis, synovitis, orchitis, tonsillitis, urethritis, urocystitis, uveitis, vaginitis, vasculitis, vulvitis, vulvovaginitis, vasculitis, chronic bronchiolitis, osteomyelitis, optic neuritis, temporal arteritis, transverse myelitis, depression, cerebral fasciitis, and cerebral encephalopathy. In certain embodiments, the inflammatory disease is selected from the group consisting of atherosclerosis, arteriosclerosis, autoimmune disorders, multiple sclerosis, systemic lupus erythematosus, rheumatoid arthritis, inflammatory arthritis, and myocarditis.

In the present invention, the viral disease encompasses any viral disease that includes all virus groups consisting of ssRNA, dsRNA, dsDNA, and ssDNA. ssRNA viruses include Astroviridae (positive-sense ssRNA; human astrovirus), Caliciviridae (positive-sense ssRNA; norovirus), Picornaviridae (positive-sense ssRNA; coxsackievirus, hepatitis A, poliovirus, rhinovirus), coronavirus (positive-sense ssRNA; severe acute respiratory syndrome virus, SARS-CoV-2), Flaviviridae (positive-sense ssRNA; Hepatitis C virus, yellow fever virus, dengue virus, West Nile virus TBE virus), Togaviridae (positive-sense ssRNA; rubella virus), Hepeviridae (positive-sense ssRNA; Hepatitis E virus), Retroviridae (ssRNA-RT; human immunodeficiency virus HIV), Orthomyxoviridae (negative-sense ssRNA; orthomyxovirus), Arenaviridae (negative-sense ssRNA; Lassa virus), Buniaviridae (negative-sense ssRNA; Crimean-Congo hemorrhagic fever, Hantaan virus), filoviridae (negative-sense ssRNA; Ebola virus, Marburg virus), Paramyxoviridae (negative-sense ssRNA; Measles virus, Mumps virus, Parainfluenza virus, respiratory syncytial virus), Rabdoviridae (negative-sense ssRNA; Rabies virus), and Hepatitis D (negative-sense ssRNA), dsRNA viruses include Reoviridae (dsRNA; rotavirus, Orbivirus, Coltivirus, Banna virus), dsDNA viruses include Adenoviridae (dsDNA; adenovirus) and herpes simplex virus (dsDNA; herpes simplex type 1, herpes simplex type 2, Varicella-zoster virus, Epstein-Barr virus, Human cytomegalovirus, KSHV), Papillomaviridae (dsDNA; human papillomavirus), Polyomaviridae (dsDNA; BK virus, JC virus), Poxviridae (dsDNA; smallpox), and Hepadnaviridae (dsDNA-RT; hepatitis B virus), and ssDNA viruses include Parvoviridae (ssDNA; parvovirus B19). The viral disease may be selected from viral diseases caused by this viral group, but is not limited thereto.

Examples of viral diseases include, but are not limited to, cold, flu (influenza), chickenpox, herpes zoster, herpes simplex, infectious mononucleosis, cytomegalovirus infection, measles, mumps, rubella, parvovirus infection, polio, virus hemorrhagic fever, yellow fever, dengue fever, rabies, AIDS and Covid-19.

As herein used, the term "prevention" means any action that inhibits or delays an autoimmune disease, an inflammatory disease, and/or a viral disease by administration of the pharmaceutical composition comprising the compound represented by Formula 1 or a pharmaceutically acceptable salt thereof. As used herein, the term "treatment" means any action that ameliorates or completely cures the symptoms of an autoimmune disease, an inflammatory disease, and/or a viral disease by administration of the pharmaceutical composition comprising the compound of Formula 1 or a pharmaceutically acceptable salt thereof.

The composition for preventing or treating an autoimmune disease, an inflammatory disease, and/or a viral disease according to the present invention may comprise a pharmaceutically effective amount of the compound represented by Formula 1 alone, or may further comprise at least one pharmaceutically acceptable carrier, excipient or diluent, in addition to the compound. The term "pharmaceutically effective amount" refers to an amount sufficient to prevent, ameliorate, and treat symptoms of an autoimmune disease, an inflammatory disease, and/or a viral disease.

The term "pharmaceutically acceptable" used herein means being physiologically acceptable without causing ordinary allergic reactions such as gastrointestinal disorders or dizziness or similar reactions thereto upon administration to humans. Examples of the carrier, excipient and diluent include lactose, dextrose, sucrose, sorbitol, mannitol, xylitol, erythritol, maltitol, starch, gum acacia, alginate, gelatin, calcium phosphate, calcium silicate, cellulose, methyl cellulose, polyvinylpyrrolidone, water, methylhydroxybenzoate, propylhydroxybenzoate, talc, magnesium stearate, and mineral oils. In addition, the composition may further comprise fillers, anti-aggregating agents, lubricants, wetting agents, flavoring agents, emulsifying agents, and preservatives.

As used herein, the term "carrier" refers to a substance that facilitates the addition of a compound to a cell or tissue.

As used herein, the term "diluent" is defined as a substance that stabilizes the biological activity of a subject compound and is diluted in water to dissolve the compound.

In addition, the composition of the present invention may comprise one or more known active ingredients having a therapeutic effect on autoimmune diseases, inflammatory diseases and/or viral diseases along with the compound represented by Formula 1.

The composition of the present invention may be formulated using a method known in the art to provide rapid, sustained, or delayed release of the active ingredient after administration to a non-human mammal. The formulation may be in the form of a powder, granule, tablet, emulsion, syrup, aerosol, soft or hard gelatin capsule, a sterile injectable solution, or sterile powder.

The composition of the present invention may be administered through various routes, including oral, transdermal, subcutaneous, intravenous or intramuscular administration, and the dosage of the active ingredient depends on various factors such as the route of administration, the patient's age, gender and weight, and the severity of disease of the patient. The composition according to the present invention may be administered in combination with a known compound having an effect of preventing, ameliorating or treating symptoms of autoimmune diseases, inflammatory diseases, and/or viral diseases.

Other terms and abbreviations used in the present specification may be interpreted as having meanings commonly understood by those skilled in the art to which the present invention pertains, unless otherwise defined.

Hereinafter, the present invention will be described in more detail with reference to the following examples. However, it will be obvious to those skilled in the art that the following examples are merely provided for illustration of the present invention, and should not be construed as limiting the scope of the present invention.

Example 1: Materials and Methods

Example 1-1: In Silico (Computer Programming in Virtual Experiment) Screening for Endosome TLR Inhibitory Molecules and Design of Novel Compounds First, a multiconformational library of screening compounds was prepared using molecules from ChemBridge, Chemspace, Mcule, MOE Leadlike, MolPort, ZINC druglike and ZINC lead-like chemical databases. The ligand structure was washed using the MOE wash protocol. Briefly, salts and broken fragments were removed, the protonation state was calculated at pH 6.5, and the energy was minimized. Duplicate conformations were removed and then a BIT:MACCS fingerprint similarity search (80% similarity cutoff) was performed on a series of known TLR3/7/8/9 inhibitors reported in the literature. Based on the pharmacophore model of the screened highly active antagonists, the resulting ligands were screened. Next, a ligand that satisfies the pharmacophore constraint was docked to the R848 binding site of TLR7 (PDB ID: 5GMH (Zhang, Z. et al. Immunity 45, 737-748 (2016)) using the MOE software (Molecular Operating Environment (MOE), 2013.08; Chemical Computing Group ULC, 1010 Sherbooke St. West, Suite #910, Montreal, QC, Canada, H3A 2R7, 2017 (2013)). Docking poses were ranked based on the S score (binding affinity) implemented in the London DG scoring function. The resulting docking poses were re-scored by a guided-fit method and "GBVI/WSA dG" force-field refinement. Finally, to determine the TLR3/7/8/9 inhibitory activity in a cell-based assay, a set of top ligands was secured (SK02-SK20). Based on the compounds with effectiveness, a series of novel compounds were designed and synthesized.

Example 1-2: Cell Culture and Seeding

RAW 264.7 cells were purchased from the Korean Cell Line Bank and cultured in Dulbecco's Modified Eagle Medium containing 10% FBS (Gibco), 1% penicillin and streptomycin solution (Hyclone).

For cytotoxicity detection and TLR1/2, 2/6, 3, 4, 7, 8, and 9 ligand screening, the cells were seeded at a density of $2 \times 10^4$ cells/well into 96-well cell culture plates and incubated overnight (approximately 18-24 hours).

The THP-1 cell line (a human monocytic cell line derived from acute leukemia) was obtained from Professor Changhee Seo, Ajou University College of Medicine (Suwon, Korea). The cells were cultured in RPMI1640 (HyClone Laboratories, Inc., San Angelo, Texas, USA) containing 10% FBS (Gibco), 1% penicillin and streptomycin solution (Hyclone), and then differentiated into MO macrophages using 80 nM phorbol 12-myristate 13-acetate (PMA; Sigma-Aldrich Co., St. Louis, MO, USA) for 24 hours.

For TLR5 ligand screening, the cells were seeded in a 96-well cell culture plate at a density of $1 \times 10^5$ cells/well and cultured overnight (about 18 hours).

Both RAW 264.7 and THP-1 cell lines were maintained in a humidified incubator (5% $CO_2$, 37° C.) during the experiment, the medium of RAW 264.7 was replaced every day, and the medium of THP-1 was replaced every 2 days.

Example 1-3: MTT (3-(4,5-dimethylthiazol-2-yl)-2, 5-diphenyltetrazolium bromide) analysis RAW 264.7 cells were seeded at a density of $2 \times 10^4$ cells/well in a 96-well cell culture plate and stabilized overnight in a humidified incubator. Each well was treated with a test compound or negative control (dimethyl sulfoxide; DMSO). The plates were allowed to stand in an incubator for 24 hours. Then, the medium of the 96-well culture dish was discarded and 500 µg/ml MTT solution (InvivoGen Ltd.) was added to each well. After incubation for 3 hours, the solution was removed and the residue was incubated in DMSO (Biosesang Co. Ltd., Korea) for 30 minutes to completely dissolve the formazan dye. The absorbance was measured at a wavelength of 595 nm with a microplate colorimetric reader and normalized based on the untreated control. All cultures were performed under the same conditions as in the cell culture described above.

Example 1-4: Enzyme-Linked Immunosorbent Assay (ELISA)

In order to determine the inhibitory activities of the test-ligand, RAW 264.7 cells were pretreated with each candidate compound for 1 hour, then treated with $Pam_3CSK_4$ (synthetic triacyl lipopeptide; TLR1/2, Invitrogen), FSL-1 (synthetic diacyl lipoprotein, TLR2/6, 100 ng/ml), lipopolysaccharide (LPS, TLR4, Sigma Aldrich), imiquimod (IMQ, TLR7, Invitrogen), and ODN2395 (type C CpG repeat motif DNA oligo(5'-tcgtcgttttcggcgcgcgccg-3), TLR9, Bioneer) ligand for 4 hours, and treated with poly I:C (I:C repeat motif double-stranded RNA, TLR3, Invitrogen) and TL8-506 (TLR8, Invitrogen) showing delayed reactivity for 24 hours. After activation of TLR, the supernatant was diluted in an appropriate ratio so as to measure within the standard dose range, transferred to a pre-coated 96-well assay plate, and then treated with mouse TNF-alpha secretion level in accordance with the manufacturer's instructions using a mouse-TNF-alpha ELISA-kit (Invitrogen).

In order to determine the inhibitory activity of the test-ligand against TLR5, differentiated THP-1 cells were pre-treated with each compound for 1 hour and then treated with FLA-ST (E. coli-derived flagellar protein, TLR5, Invitrogen) for 4 hours. After activation of the TLRs, the supernatant was diluted and transferred to a pre-coated 96-well assay plate, and the level of human TNF-alpha secretion was measured in accordance with the manufacturer's instructions using the human TNF-alpha ELISA-kit (Invitrogen).

Example 1-5: Protein Electrophoresis

RAW 264.7 cells were seeded in a 60 mm cell culture dish at a density of 2×10⁶ cells/well, and stabilized for 2 days, and experiments were performed. The cells were treated with antagonists, stabilized for 1 hour, and stimulated with agonists for TLR9 for 15 minutes and 30 minutes. The cell lysate was obtained through a protease and phosphatase inhibitor cocktail (Thermo Fisher Scientific, Inc.) treated along with a mammalian protein extraction kit (M-PER; Thermo Fisher Scientific, Inc.). All samples were quantified by bicinchoninic acid assay (Sigma-Aldrich, Co.) using SoftMax Pro 5.3 software (Molecular Devices, Inc.). During the experiment, the membranes were treated with specific primary antibodies, which were phospho-JNK, phospho-p38-MAPK, JNK, ERK 1/2, p38-MAPK, IκBα (Cell Signaling Technology, Inc., Danvers, MA, USA), phospho-ERK 1/2, and β-actin (Santa Cruz Biotechnology, Inc., Dallas, TX, USA). The proteins were then treated with HRP-conjugated anti-rabbit or anti-mouse IgG (Thermo Fisher Scientific, Inc.) antibodies, and protein levels were detected using chemiluminescent substrates (SuperSignal™ West Pico PLUS, Thermo Fisher Scientific, Inc.) and a luminescence detection system (Fusion Solo S, VILBER, France).

Example 1-6: $LC_{50}$ (Lethal Concentration 50%), $IC_{50}$ (Inhibition Concentration 50%) and TI (Therapeutic Index) Analysis In order to plot the concentration-dependent $LC_{50}$ curves, treatment with the SK series ligands at different concentrations up to 200 μM (the highest concentration that could be treated within the level of 0.5% DMSO) was performed. Then, cell viability and toxicity response upon treatment with ligands were analyzed by MTT as described in Examples 1-3. Cell viability in each plot was normalized from negative control (100%; no treatment) to positive control (highest concentration of test-ligand), and $LC_{50}$ was determined by non-linear regression (Graph Pad Prism 7.0). In order to plot the concentration-dependent $IC_{50}$ curves, pre-treatment with the SK series ligands was performed at different concentrations up to 50 μM (twice the initial concentration). Cell responses mediated by TLR7 and TLR9 (levels of TNF-α secretion) were analyzed by ELISA as described in Examples 1-4. The cytokine level in each plot was normalized from negative control (non-treated) to positive control (treatment with ligand), and $IC_{50}$ was determined by non-linear regression (Graph Pad Prism 7.0).

Then, $LC_{50}$ and $IC_{50}$ were applied to the following function to calculate TI.

$$\frac{LC50}{IC50} = TI \text{ (Therapeutic Index)}$$

Example 1-7: Statistical Analysis

Statistical analysis was performed using two-tailed pair Student's t-test in Microsoft Excel software. Calculation of $LC_{50}$ and $IC_{50}$ was performed with the GraphPad Prism program.

Example 2: Novel Compound Synthesis

Example 2-1: Analysis and Purification Conditions

1) HPLC analysis conditions (method A; (A) in Table 2 above)
Device Name: Shimadzu
Column: YMC-pack pro C18, 150×4.6 mm I.D., 5 μm, 40° C.
Mobile phase: 5%->100% acetonitrile/$H_2O$+0.1% trifluoroacetic acid
Analysis time: 9 minutes, flow rate: 1 mL/min
UV detector: 254 nm
2) HPLC analysis conditions (method B; (B) in Table 2 above)
Device Name: Thermo Scientific Ultimate 3000RSLC
Column: Kinetex® 2.6 μM Biphenyl 100 Å, 100×2.1 mm
Mobile phase: 5%->100% acetonitrile/$H_2O$+0.1% trifluoroacetic acid
Analysis time: 9 minutes, flow rate: 0.7 mL/min
UV detector: 254 nm
3) LC-MS analysis conditions
Device Name: Shimadzu LCMS-2020
Column: ACE Excel2 C18, 75×2.1 mm
Mobile phase: acetonitrile/$H_2O$+0.1% trifluoroacetic acid
Flow rate: 0.5 mL/min
UV detector: 254 nm
4) MPLC purification conditions
Device name: CombiFlash®Rf+
UV detector: 254 nm
5) Prep-HPLC purification conditions
Device name: Gilson GX-281, 321 pump, UV/VIS-155
Column: Luna® 10 μM C18 (2) 100 Å, 250×21.2 mm
Mobile phase: Acetonitrile/0.1% trifluoroacetic acid $H_2O$
Flow rate: 15 mL/min
UV detector: 254 nm
6) ¹H NMR
Device Name: Bruker Avance (400 MHz)

Example 2-2: Synthesis Procedure

[Experimental Example 1] N-(1-(3-(dimethylamino) propyl)-2,3-dimethyl-1,5,6,7,8,9-hexahydrocyclohepta[b]pyrrolo[3,2-e] pyridin-4-yl)acetamide

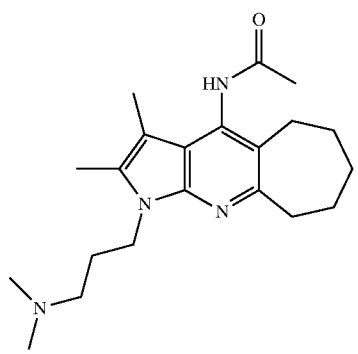 [SMILES: CC(=O)Nc1c2c(nc3c1c(C)c(C)n3CCCN(C)C)CCCCC2]

Step 1: 2-amino-1-(3-(dimethylamino)propyl)-4,5-dimethyl-1H-pyrrole-3-carbonitrile

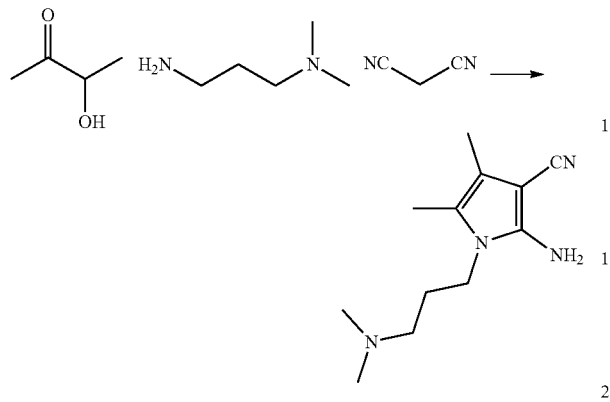

N1,N1-dimethylpropane-1,3-diamine (5.68 mL, 45.4 mmol) and 3-hydroxybutan-2-one (4 g, 45.4 mmol) were dissolved in toluene (60 mL), and concentrated hydrochloric acid (0.05 mL, 2.27 mmol) was added thereto at room temperature. The reaction mixture was stirred under reflux for 1 hour, cooled to room temperature, and then malononitrile (3.0 g, 45.4 mmol) was added thereto. Then, the reaction mixture was stirred under reflux for 1 hour. After completion of the reaction, the mixture was cooled to room temperature and concentrated under reduced pressure. The resulting residue was separated and purified by amine silica gel chromatography (0-50% ethyl acetate/hexane) to obtain the target compound (8.14 g, 81%, yellow solid).

Step 2: 1-(3-(dimethylamino)propyl)-2,3-dimethyl-1,5,6,7,8,9-hexahydrocyclohepta[b]pyrrolo[3,2-e]pyridine-4-amine

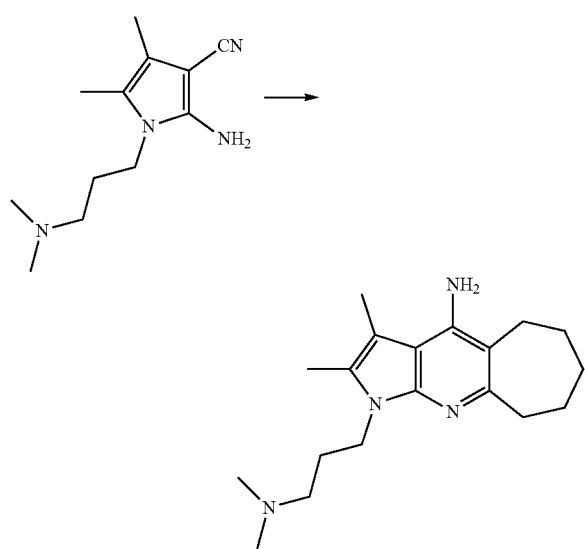

Cycloheptanone (1.07 mL, 9.08 mmol) was dissolved in dichloroethane (25 mL), and then aluminum chloride (1.21 g, 9.08 mmol) was added thereto. The resulting mixture was stirred at room temperature for 10 minutes, 2-amino-1-(3-(dimethylamino)propyl)-4,5-dimethyl-1H-pyrrole-3-carbonitrile (1.0 g, 4.54 mmol) prepared in Step 1 was added thereto and the reaction mixture was stirred under reflux for 3 hours. The resulting mixture was cooled to room temperature, an aqueous solution of sodium bicarbonate was added dropwise thereto to terminate the reaction, and the result was washed with brine and extracted using a mixed solution (10% methanol/dichloromethane). The extracted organic layer was dried over anhydrous sodium sulfate, filtered, and then concentrated under reduced pressure. The resulting residue was separated and purified by amine silica gel chromatography (0-30% ethyl acetate/hexane) to obtain the target compound (1.1 g, 77%, pale yellow solid).

Step 3: N-(1-(3-(dimethylamino)propyl)-2,3-dimethyl-1,5,6,7,8,9-hexahydrocyclohepta[b]pyrrolo[3,2-e]pyridin-4-yl)acetamide

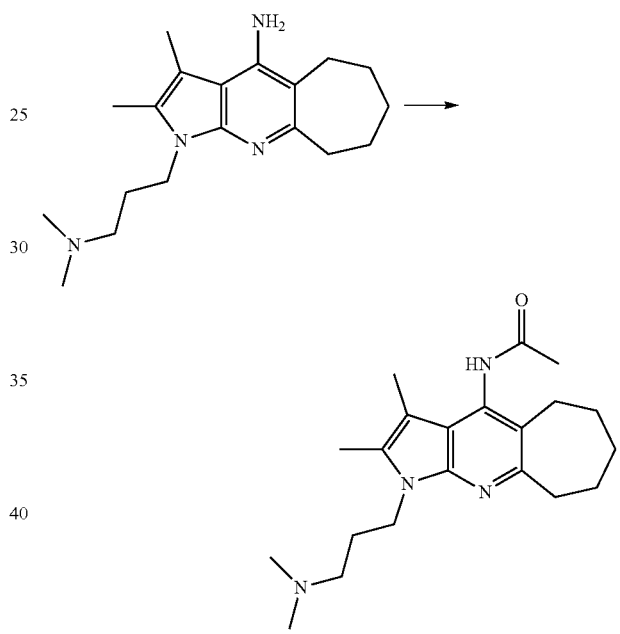

1-(3-(dimethylamino)propyl)-2,3-dimethyl-1,5,6,7,8,9-hexahydrocyclohepta[b]pyrrolo[3,2-e]pyridin-4-amine (30 mg, 0.095 mmol), the compound prepared in Step 2, was dissolved in dichloromethane (1 mL), and then acetyl chloride (0.014 mL, 0.191 mmol) and triethylamine (0.027 mL, 0.191 mmol) were added thereto at 0° C. Then, the reaction mixture was stirred at room temperature for 2 hours. A supersaturated aqueous solution of sodium bicarbonate was added dropwise thereto to terminate the reaction, and then the mixture was extracted with dichloromethane and washed with distilled water. The extracted organic layer was dried over anhydrous sodium sulfate, filtered, and then concentrated under reduced pressure. The resulting residue was separated and purified by silica gel chromatography (0-30% methanol/dichloromethane) to obtain the target compound (10.2 mg, 30%, pale yellow solid).

$^1$H NMR (400 MHz, MeOD) δ 4.24 (t, J=7.3 Hz, 2H), 3.14-3.05 (m, 2H), 2.84-2.76 (m, 2H), 2.39 (dd, J=9.7, 5.5 Hz, 2H), 2.36 (s, 3H), 2.25 (d, J=4.1 Hz, 8H), 2.21 (s, 3H), 1.97-1.83 (m, 4H), 1.76-1.61 (m, 4H); 357 [M+H]$^+$; LCMS, m/z 612 [M−H]$^+$; HPLC $t_R$ 4.105 min (method A).

[Experimental Example 2] The target compound (N-(1-(3-(dimethylamino)propyl)-2,3-dimethyl-1,5,6,7,8,9-hexahydrocyclohepta[b]pyrrolo[3,2-e]pyridin-4-yl)-2,2,2-trifluoroacetamide) was obtained in a similar manner to Experimental example 1.

[Experimental examples 3, 4, and 5] The target compounds (1-(3-(benzyl(methyl)amino)propyl)-2,3-dimethyl-1,5,6,7,8,9-hexahydrocyclohepta[b]pyrrolo[3,2-e]pyridin-4-amine; 2,3-dimethyl-1-(3-(methylamino)propyl)-1,5,6,7,8,9-hexahydrocyclohepta[b]pyrrolo[3,2-e]pyridin-4-amine; 3-(4-amino-2,3-dimethyl-6,7,8,9-tetrahydrocyclohepta[b]pyrrolo[3,2-e]pyridin-1(5H)-yl)-N,N-dimethylpropanamide) were obtained in a similar manner to steps 1 to 2 of Experimental example 1 above.

[Experimental Example 6] N-acetyl-N-(1-(3-(benzyl(methyl)amino)propyl)-2,3-dimethyl-1,5,6,7,8,9-hexahydrocyclohepta[b]pyrrolo[3,2-e]pyridin-4-yl)acetamide

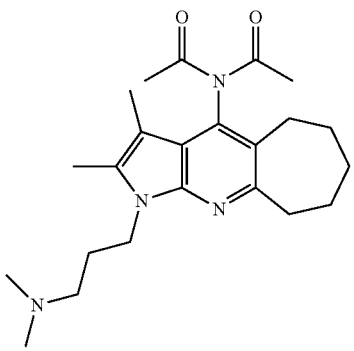 [SMILES: CC(=O)N(C(C)=O)c1c2c(nc3c1c(C)c(C)n3CCCN(C)C)CCCCC2]

1-(3-(benzyl(methyl)amino)propyl)-2,3-dimethyl-1,5,6,7,8,9-hexahydrocyclohepta[b]pyrrolo[3,2-e]pyridin-4-amine (50 mg, 0.128 mmol) prepared in a similar manner to steps 1 to 2 of Experimental example 1 above was dissolved in dichloromethane (3 mL), followed by addition of acetyl chloride (0.037 mL, 0.512 mmol) and triethylamine (0.036 mL, 0.256 mmol) at 0° C. Then, the reaction mixture was stirred at room temperature for 1 hour. A supersaturated aqueous solution of sodium bicarbonate was added dropwise thereto to terminate the reaction, and the mixture was extracted with dichloromethane and washed with distilled water. The extracted organic layer was dried over anhydrous sodium sulfate, filtered, and then concentrated under reduced pressure. The resulting residue was separated and purified by amine silica gel chromatography (0-20% ethyl acetate/hexane) to obtain the target compound (7.0 mg, 11.5%, yellow solid).

$^1$H NMR (400 MHz, CDCl$_3$) δ 7.35-7.26 (m, 5H), 4.23 (t, J=7.4 Hz, 21-1), 3.63 (s, 2H), 3.13-3.07 (m, 2H), 2.70-2.59 (m, 2H), 2.56 (t, J=7.2 Hz, 2H), 2.31 (s, 3H), 2.27 (s, 6H), 2.07 (s, 3H), 2.04 (s, 3H), 2.02-1.98 (m, 2H), 1.86-1.80 (m, 2H), 1.75-1.69 (m, 2H), 1.64-1.59 (m, 2H); LCMS, m/z 475 [M+H]$^+$; HPLC t$_R$ 5.641 min (method A).

[Experimental Example 7] The target compound, (3-(4-acetamido-2,3-dimethyl-6,7,8,9-tetrahydrocyclohepta[b]pyrrolo[3,2-e]pyridin-1(5H)-yl)-N,N-dimethylpropanamide) was obtained in a similar manner to Experimental example 1 above.

[Experimental Example 8] The target compound (3-(4-(N-acetylacetamido)-2,3-dimethyl-6,7,8,9-tetrahydrocyclohepta[b]pyrrolo[3,2-e]pyridin-1(5H)-yl)-N,N-dimethylpropanamide) was obtained in a similar manner to Experimental example 6 above.

[Experimental Example 9] 1-(3-(dimethylamino)propyl)-2-methyl-1,5,6,7,8,9-hexahydrocyclohepta[b]pyrrolo[3,2-e]pyridin-4-amine

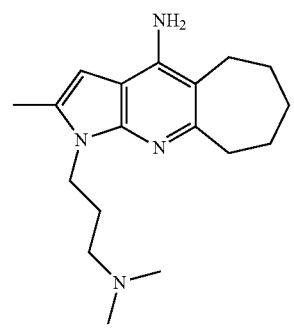 [SMILES: Cc1cc2c(N)c3c(nc2n1CCCN(C)C)CCCCC3]

Step 1: 2-(2-oxopropyl)malononitrile

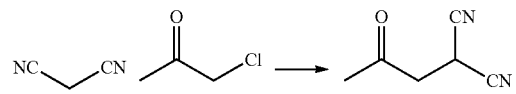

Malononitrile (4.4 g, 66.60 mmol) was dissolved in tetrahydrofuran (100 mL) and then a solution of 1M potassium t-butoxide (in tetrahydrofuran) (66 mL, 66.60 mmol) was added thereto at 0° C. The resulting mixture was stirred for 30 seconds, 1-(chloropropan)-2-one (4.7 ml, 59.03 mmol) was added thereto, followed by stirring for 30 seconds. After completion of the reaction, distilled water was added dropwise thereto at 0° C. to terminate the reaction, the result was washed with brine and extracted with dichloromethane. The extracted organic layer was dried over anhydrous sodium sulfate, filtered, and then concentrated under reduced pressure. The resulting residue was separated and purified by silica gel chromatography (0-20% ethyl acetate/hexane) to obtain the target compound (2.7 g, 33%, white solid).

Step 2: 2-amino-1-(3-(dimethylamino)propyl)-5-methyl-1H-pyrrole-3-carbonitrile

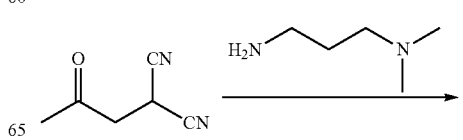

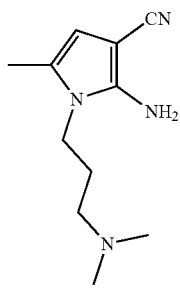

2-(2-oxopropyl)malononitrile (1.25 g, 10.23 mmol) prepared in Step 1 was dissolved in ethanol (10 mL), concentrated hydrochloric acid (3 drops) was added thereto at room temperature, and N,N-dimethylpropane-1,3-diamine (0.7 mL, 10.23 mmol) was further added thereto. The reaction mixture was stirred under reflux for 2 hours. After completion of the reaction, distilled water was added dropwise thereto at 0° C. to terminate the reaction, and the result was washed with brine and extracted with dichloromethane. The extracted organic layer was dried over anhydrous sodium sulfate, filtered, and then concentrated under reduced pressure. The resulting residue was separated and purified by silica gel chromatography (0-50% ethyl acetate/hexane) to obtain the target compound (400 mg, 31%, white solid).

Step 3: 1-(3-(dimethylamino)propyl)-2-methyl-1,5,6,7,8,9-hexahydrocyclohepta[b]pyrrolo[3,2-e]pyridin-4-amine

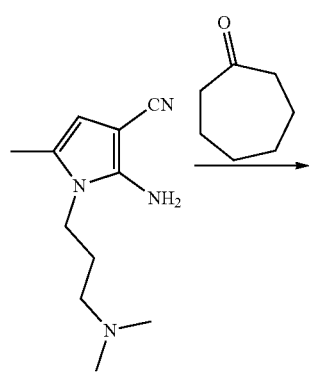

Cycloheptanone (0.33 mL, 2.76 mmol) was dissolved in toluene (3 mL), and then aluminum chloride (368 mg, 2.76 mmol) was added thereto. The mixture was stirred at room temperature for 10 minutes, the 2-amino-1-(3-(dimethylamino)propyl)-5-methyl-1H-pyrrole-3-carbonitrile (285 mg, 1.38 mmol) prepared in Step 2 above was added thereto and the reaction mixture was stirred under reflux for 2 hours. The mixture was cooled to room temperature, and a supersaturated aqueous solution of sodium bicarbonate was added dropwise thereto to terminate the reaction, and the result was washed with brine and extracted with dichloromethane. The extracted organic layer was dried over anhydrous sodium sulfate, filtered, and then concentrated under reduced pressure. The resulting residue was separated and purified by silica gel chromatography (0-100% ethyl acetate mixed solution (1% triethylamine)) to obtain the target compound (315 mg, 75%, yellow syrup).

$^1$H NMR (400 MHz, CDCl$_3$) δ 5.96 (s, 1H), 4.19 (t, J=7.2 Hz, 2H), 4.11 s, 2H), 3.02-2.99 (m, 2H), 2.70-2.66 (m, 2H), 2.40 (s, 3H), 2.30 (t, J=7.2 Hz, 2H), 2.22 (s, 6H), 1.97-1.91 (m, 2H), 1.89-1.75 (m, 2H), 170-1.60 (m, 6H); LCMS, mf/z 301 [M+H]$^+$; HPLC t$_R$ 4.144 min (method A).

[Experimental Example 10] The target compound (N-(1-(3-(dimethylamino)propyl)-2,3-dimethyl-1,5,6,7,8,9-hexahydrocyclohepta[b]pyrrolo[3,2-e]pyridin-4-yl)-2,2-difluoropropanamide) was obtained in a similar manner to Experimental example 1.

[Experimental Example 11] 3-bromo-1-(3-(dimethylamino)propyl)-2-methyl-1,5,6,7,8,9-hexahydrocyclohepta[b]pyrrolo[3,2-e]pyridin-4-amine

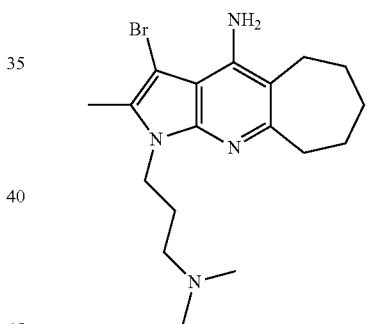

Step 1: 3-bromo-1-(3-(dimethylamino)propyl)-2-methyl-1,5,6,7,8,9-hexahydrocyclohepta[b]pyrrolo[3,2-e]pyridin-4-amine

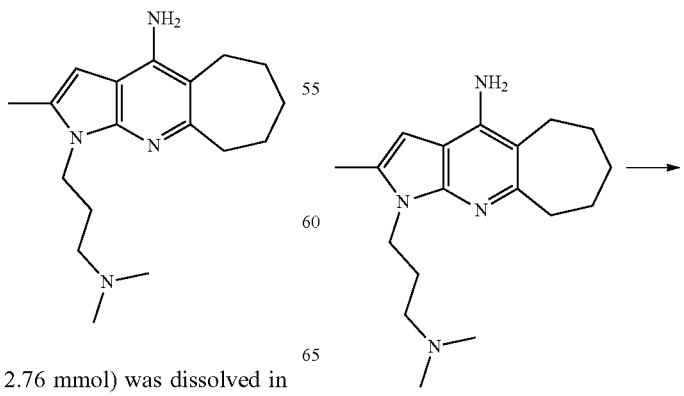

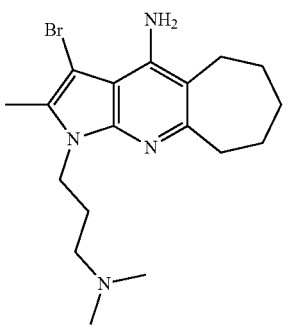

1-(3-(dimethylamino)propyl)-2-methyl-1,5,6,7,8,9-hexahydrocyclohepta[b]pyrrolo[3,2-e]pyridin-4-amine (65 mg, 0.21 mmol) prepared in Experimental example 9, Step 3 above was dissolved in acetonitrile, and N-bromosuccinimide (46 mg, 0.25 mmol) was added thereto at 0° C., followed by stirring for 1 hour at 0° C. After completion of the reaction, the reaction mixture was diluted in dichloroethane and the solid was filtered. The filtered liquid was concentrated and then was separated and purified by preparative HPLC (0.1% trifluoroacetic acid $H_2O$/acetonitrile). The obtained trifluoroacetate compound was neutralized with a supersaturated aqueous solution of sodium hydrogen carbonate to obtain the target compound (9 mg, 11%, yellow solid).

$^1$H NMR (400 MHz, CDCl$_3$) δ 4.86 (s, 2H), 4.20 (t, J=7.3 Hz, 2H), 2.98-2.96 (m, 2H), 2.63-2.60 (m, 2H), 2.35 (s, 3H), 2.28 (t, J=7.3 Hz, 2H), 2.21 (s, 6H), 1.92-1.81 (m, 4H), 1.70-1.59 (m, 4H); LCMS, m/z 380[M+H]$^+$; HPLC t$_R$ 4.215 min (method A).

[Experimental examples 12, 13] The target compounds (3-chloro-1-(3-(dimethylamino)propyl)-2-methyl-1,5,6,7,8,9-Hexahydrocyclohepta[b]pyrrolo[3,2-e]pyridin-4-amine; 1-(3-(dimethylamino)propyl)-3-iodo-2-methyl-1,5,6,7,8,9-hexahydrocyclohepta[b]pyrrolo[3,2-e]pyridin-4-amine) were obtained in a similar manner to Steps 1 to 2 of Experimental example 9.

[Experimental example 14, 15, 16, 17, 18] The target compounds (1-(3-methoxypropyl)-2,3-dimethyl-1,5,6,7,8,9-hexahydrocyclohepta[b]pyrrolo[3,2-e]pyridin-4-amine; 1-(2-methoxyethyl)-2,3-dimethyl-1,5,6,7,8,9-hexahydrocyclohepta[b]pyrrolo[3,2-e]pyridin-4-amine; 1-(3-(dimethylamino)propyl)-2,3-dimethyl-5,6,7,8-tetrahydro-1H-pyrrolo[2,3-b]quinolin-4-amine; 1-(3-(dimethylamino)propyl)-2,3-dimethyl-1,5,6,7-tetrahydrocyclopenta[b]pyrrolo[3,2-e]pyridin-4-amine; 1-(3-(dimethylamino)propyl)-2,3-dimethyl-6-phenyl-1H-pyrrolo[2,3-b]pyridin-4-amine) were obtained in a similar manner to Steps 1 to 2 of Experimental example 1.

[Experimental Example 19] 1-(3-(dimethylamino)propyl)-2-methyl-5,6,7,8-tetrahydro-1H-pyrrolo[2,3-b]quinolin-4-amine

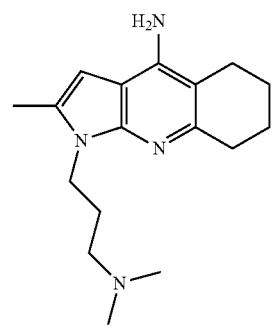 [SMILES: Cc1cc2c(N)c3c(nc2n1CCCN(C)C)CCCC3]

Step 1: 1-(3-(dimethylamino)propyl)-2-methyl-5,6,7,8-tetrahydro-1H-pyrrolo[2,3-b]quinolin-4-amine

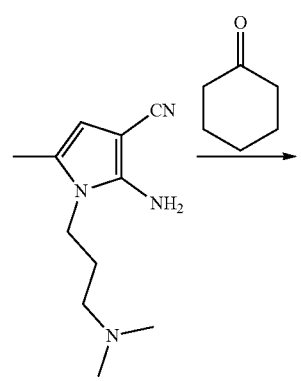

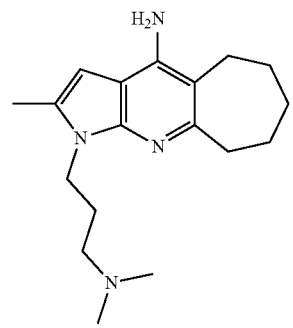

Cyclohexanone (50 μL, 0.48 mmol) was dissolved in toluene (1 mL), and then aluminum chloride (64 mg, 0.48 mmol) was added thereto. The mixture was stirred at room temperature for 10 minutes, 2-amino-1-(3-(dimethylamino)propyl)-5-methyl-1H-pyrrole-3-carbonitrile (285 mg, 1.38 mmol) prepared in Step 2 above was added thereto and the reaction mixture was stirred under reflux for 2 hours. The mixture was cooled to room temperature, a supersaturated aqueous solution of sodium bicarbonate was added dropwise thereto to terminate the reaction, and the result was washed with brine, and extracted with dichloromethane. The extracted organic layer was dried over anhydrous sodium sulfate, filtered, and then concentrated under reduced pressure. The obtained residue was separated and purified by silica gel chromatography (0-100% ethyl acetate mixed solution (1% triethylamine)/hexane) to obtain the target compound (28 mg, 40%, white solid).

$^1$H NMR (400 MHz, CDCl$_3$) δ 5.97 (s, 1H), 4.18 (t, J=7.3 Hz, 2H), 4.10 (s, 2H), 2.93-2.90 (m, 2H), 2.56-2.53 (m, 2H), 2.40 (s, 3H), 2.29 (t, J=7.3 Hz, 2H), 2.21 (s, 6H), 1.97-1.86 (m, 6H); LCMS, m/z 287[M+H]$^+$; HPLC $t_R$ 4.022 min (method A).

[Experimental examples 20, 21] The target compounds (1-(3-(dimethylamino)propyl)-6-ethyl-2,5-dimethyl-1H-pyrrolo[2,3-b]pyridin-4-amine; 1-(3-(dimethylamino)propyl)-2-methyl-5,6,7,8,9,10-hexahydro-1H-cyclooctа[b]pyrrolo[3,2-e]pyridin-4-amine) were obtained in a similar manner to Step 1 of Experimental example 19.

[Experimental Example 22] 1-(2-(dimethylamino)ethyl)-2-methyl-5,6,7,8-tetrahydro-1H-pyrrolo[2,3-b]quinolin-4-amine

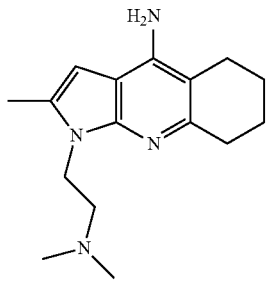 [SMILES: Cc1cc2c(N)c3c(nc2n1CCN(C)C)CCCC3]

Step 1: 2-amino-1-(2-(dimethylamino)ethyl)-5-methyl-1H-pyrrole-3-carbonitrile

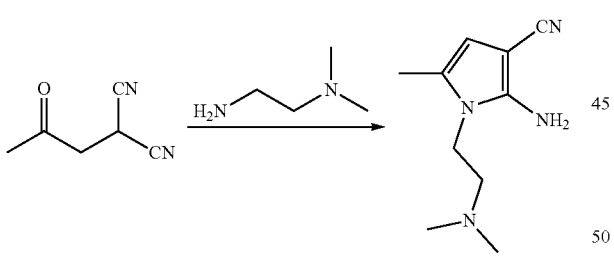

2-(2-oxopropyl)malononitrile (1 g, 8.2 mmol) prepared in Experimental example 9, Step 2 was dissolved in ethanol (5 mL), concentrated hydrochloric acid (3 drops) was added thereto at room temperature, and N,N-dimethylethane-1,3-diamine (1.07 ml, 9.84 mmol) was further added thereto. The reaction mixture was stirred under reflux for 2 hours. After completion of the reaction, distilled water was added dropwise at 0° C. to terminate the reaction, and the result was washed with brine and extracted with dichloromethane. The extracted organic layer was dried over anhydrous sodium sulfate, filtered, and then concentrated under reduced pressure. The resulting residue was separated and purified by silica gel chromatography (0-50% ethyl acetate/hexane) to obtain the target compound (524 mg, 33%, brown solid).

Step 2: 1-(2-(dimethylamino)ethyl)-2-methyl-5,6,7,8-tetrahydro-1H-pyrrolo[2,3-b]quinolin-4-amine

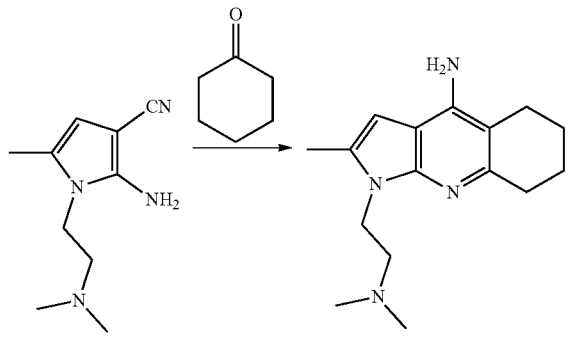

Cyclohexanone (53 μL, 0.52 mmol) was dissolved in toluene (1 mL), and then 2-amino-1-(2-(dimethylamino)ethyl)-5-methyl-1H-pyrrole-3-carbonitrile (50 mg, 0.26 mmol) prepared in Experimental example 22, Step 1 above and aluminum chloride (69 mg, 0.52 mmol) were added thereto. The reaction mixture was stirred under reflux for 2 hours. After completion of the reaction, a supersaturated aqueous solution of sodium bicarbonate was added dropwise at 0° C. to terminate the reaction, and the result was washed with brine and extracted with dichloromethane. The extracted organic layer was dried over anhydrous sodium sulfate, filtered, and then concentrated under reduced pressure. The obtained residue was separated and purified by silica gel chromatography (0-100% ethyl acetate mixed solution (1% triethylamine)/hexane) to obtain the target compound (36 mg, 51%, white solid).

$^1$H NMR (400 MHz, CDCl$_3$) δ 5.97 (s, 1H), 4.25 (t, J=7.2 Hz, 2H), 4.10 (s, 2H), 2.93-2.90 (m, 2H), 2.59 (t, J=7.2 Hz, 2H), 2.55-2.52 (m, 2H), 2.40 (s, 3H), 2.30 (s, 6H), 1.90-1.85 (m, 4H); LCMS, m/z 273 [M+H]$^+$; HPLC $t_R$ 3.947 min (method A).

[Experimental example 23] The target compound (1-(2-(dimethylamino)ethyl)-2-methyl-1,5,6,7,8,9-hexahydrocyclohepta[b]pyrrolo[3,2-e]pyridin-4-amine) was obtained in a similar manner to Step 3 of Experimental example 9.

[Experimental Example 24] 1-benzyl-2,3-dimethyl-1,5,6,7,8,9-hexahydrocyclohepta[b]pyrrolo[3,2-e]pyridin-4-amine

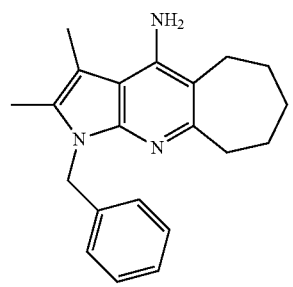 [SMILES: Cc1c(C)n(Cc2ccccc2)c2nc3c(c(N)c12)CCCCC3]

2,3-dimethyl-1,5,6,7,8,9-hexahydrocyclohepta[b]pyrrolo[3,2-e]pyridine-4-amine (30 mg, 0.131 mmol) prepared in a similar manner to Steps 1 to 2 of Experimental example 1 above was dissolved in dimethylformamide (1 mL), and then sodium hydride (7.85 mg, 0.196 mmol) was added thereto at 0° C. The mixture was stirred at 0° C. for 30 minutes and then at room temperature for 30 minutes. Then, benzyl bromide (0.023 mL, 0.196 mmol) was added thereto, and the mixture was stirred at room temperature for 16 hours. Ice water was added dropwise at 0° C. to terminate the reaction, and then the result was washed with brine and extracted with ethyl acetate. The extracted organic layer was dried over anhydrous sodium sulfate, filtered, and then concentrated under reduced pressure. The resulting residue was separated and purified by silica gel chromatography (0-20% methanol/dichloromethane) to obtain the target compound (6.0 mg, 14.7%, yellow solid).
$^1$H NMR (400 MHz, CDCl$_3$) δ 7.26-7.14 (m, 3H), 7.02 (d, J=7.1 Hz, 2H), 5.41 (s, 2H), 4.42 (br s, 2H), 3.01-2.96 (m, 2H), 2.70-2.63 (m, 2H), 2.43 (s, 3H), 2.11 (s, 3H), 1.88-1.82 (m, 2H), 1.73-1.64 (m, 4H); LCMS, m/z 320[M+H]$^+$; HPLC t$_R$ 4.956 min (method A).

[Experimental Example 25] 2-(2-(4-amino-2,3-dimethyl-5,6,7,8-tetrahydro-1H-pyrrolo[2,3-b]quinolin-1-yl)acetamido)-N-(benzo[d][1,3]dioxol-5-yl)-N-methyl-3-phenylpropanamide

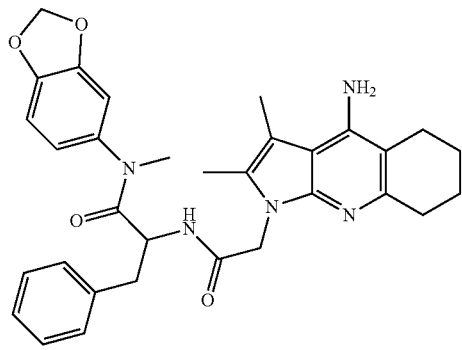 [SMILES: Cc1c(C)n(CC(=O)NC(Cc2ccccc2)C(=O)N(C)c2ccc3c(c2)OCO3)c2nc3c(c(N)c12)CCCC3]

Step 1: t-Butyl(1-(benzo[d][1,3]dioxol-5-yl(methyl)amino)-1-oxo-3-phenylpropan-2-yl)carbamate

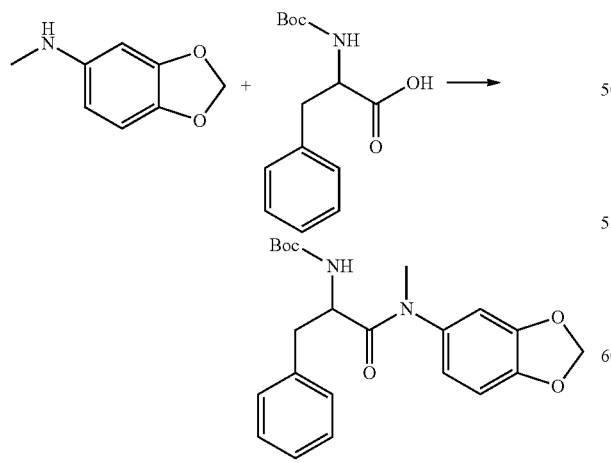

t-butyl(1-(benzo[d][1,3]dioxol-5-yl(methyl)amino)-1-oxo-3-phenylpropan-2-yl)carbamate (1.2 g, 80%, yellow oil) was obtained using a method similar to the reference [Patent WO 2012/65062 A (2012.05.18; page 49)]

Step 2: 2-amino-N-(benzo[d][1,3]dioxol-5-yl)-N-methyl-3-phenylpropanamide

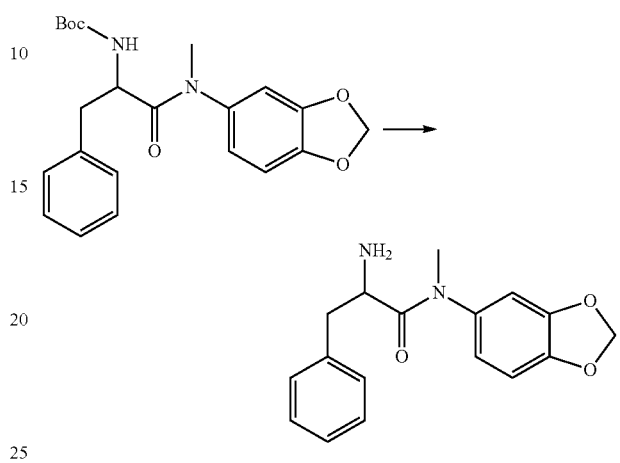

t-butyl(1-(benzo[d][1,3]dioxol-5-yl(methyl)amino)-1-oxo-3-phenylpropan-2-yl)carbamate (1.2 g, 3.01 mmol) prepared in Step 1 above was dissolved in dichloromethane (10 mL), and then trifluoroacetic acid (5 mL, 64.9 mmol) was added at room temperature. The reaction mixture was stirred for 1 hour. After completion of the reaction, the mixture was concentrated under reduced pressure without additional purification to obtain the target compound (1.24 g, 100%, brown oil) in the form of trifluoroacetate.

Step 3: N-(benzo[d][1,3]dioxol-5-yl)-2-(2-bromoacetamido)-N-methyl-3-phenylpropanamide

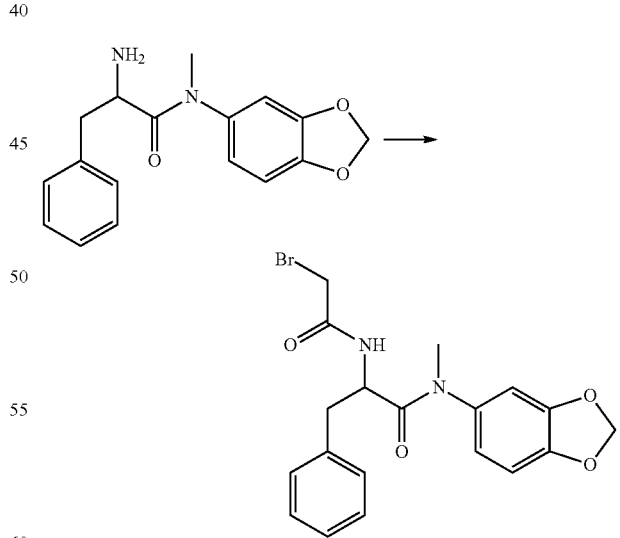

2-amino-N-(benzo[d][1,3]dioxol-5-yl)-N-methyl-3-phenylpropanamide (0.5 g, 1.676 mmol) prepared in Step 2 above was dissolved in dichloromethane (10 mL), and N,N-diisopropylethylamine (0.878 mL, 5.028 mmol) and bromoacetyl bromide (1.015 g, 5.03 mmol) were added thereto at 0° C. The mixture was stirred at 0° C. for 30 minutes and then the reaction mixture was stirred at room temperature for 1 hour. After completion of the reaction, the mixture was diluted with distilled water and extracted with ethyl acetate. The extracted organic layer was washed with brine, dried over anhydrous sodium sulfate, filtered, and concentrated under reduced pressure. The obtained residue was separated and purified by silica gel chromatography (0-60% ethyl acetate/hexane) to obtain the target compound (0.27 g, 38%, pale yellow solid).

Step 4: 2-(2-(4-amino-2,3-dimethyl-5,6,7,8-tetrahydro-1H-pyrrolo[2,3-b]quinolin-1-yl)acetamido)-N-(benzo[d][1,3]dioxol-5-yl)-N-methyl-3-phenylpropanamide

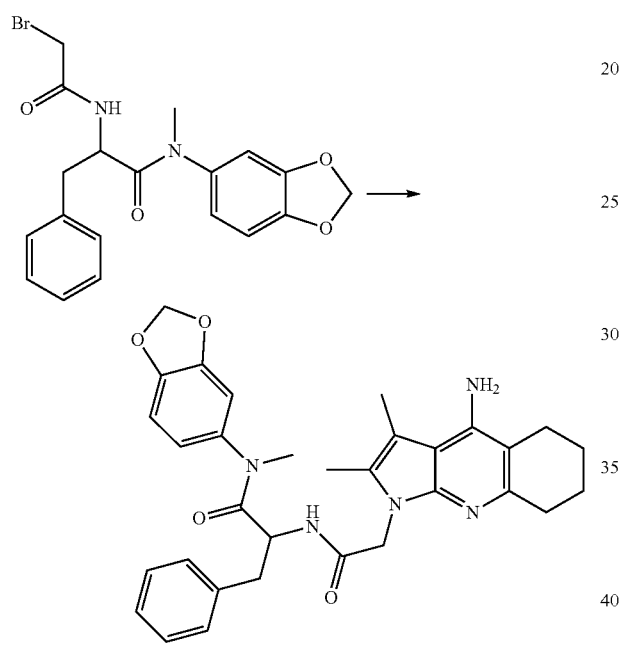

2,3-dimethyl-5,6,7,8,9,10-hexahydro-1H-cyclohepta[b]pyrrolo[3,2-e]pyridin-4-amine (30 mg, 0.123 mmol) was dissolved in dimethylformamide (1 mL) prepared in a similar manner to Steps 1 to 2 of Experimental example 1 above, and sodium hydride (5.92 mg, 0.247 mmol) was added thereto at 0° C., followed by stirring for 1 hour. Then, N-(benzo[d][1,3]dioxol-5-yl)-2-(2-bromoacetamido)-N-methyl-3-phenylpropanamide (51.7 mg, 0.123 mmol) prepared in a similar manner to Step 3 above was added thereto. The reaction mixture was stirred at room temperature for 3 hours and then ice water was added dropwise thereto at 0° C. to terminate the reaction. The reaction product was extracted with ethyl acetate and then was washed with brine. The extracted organic layer was dried over anhydrous sodium sulfate, filtered, and concentrated under reduced pressure. The resulting residue was separated and purified by preparative HPLC (0.1% trifluoroacetic acid $H_2O$/acetonitrile). The obtained trifluoroacetate compound was neutralized with a supersaturated aqueous solution of sodium bicarbonate to obtain the target compound (15.8 mg, 23%, ivory solid).

$^1$H NMR (400 MHz, $CDCl_3$) δ 7.19-7.10 (m, 3H), 6.83 (br s, 2H), 6.68 (d, J=8.0 Hz, 1H), 5.98 (s, 2H), 4.88-4.74 (m, 2H), 4.65 (q, J=7.0 Hz, 1H), 3.10 (s, 3H), 3.07-2.94 (m, 2H), 2.92-2.81 (m, 1H), 2.77-2.63 (m, 3H), 2.36 (s, 3H), 2.19 (s, 3H), 1.74-1.58 (m, 4H), 1.49-1.40 (m, 2H), 1.37-1.28 (m, 2H); LCMS, m/z 582[M+H]$^+$; HPLC $t_R$ 5.808 min (method A).

[Experimental examples 26, 27] The target compounds (2-(2-(4-amino-2,3-dimethyl-5,6,7,8,9,10-hexahydro-1H-cyclo octa[b]pyrrolo[3,2-e]pyridin-1-yl)acetamido)-N-(benzo[d][1,3]dioxol-5-yl)-N-methyl-3-phenylpropanamide; 2-(2-(4-amino-2,3-dimethyl-6,7,8,9-tetrahydrocyclohepta[b]pyrrolo[3,2-e]pyridine-1(5H)-yl)acetamido)-N-(benzo[d][1,3]dioxol-5-yl)-N-methyl-3-phenylpropanamide) were obtained in a similar manner to Experimental example 25.

[Experimental Example 28] N-(3-(11-amino-1,2,3,4-tetrahydro-6H-indolo[2,3-b]quinolin-6-yl)propyl)-5-methyl-3-phenylisoxazole-4-carboxamide

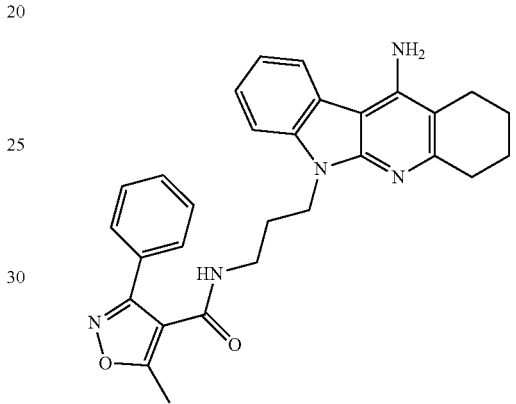

Step 1: N-(3-chloropropyl)-5-methyl-3-phenylisoxazole-4-carboxamide

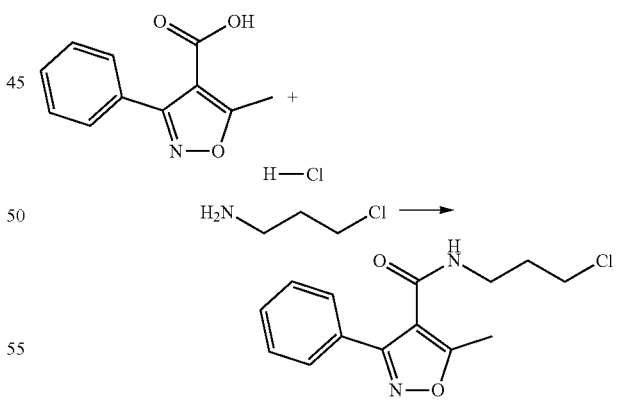

5-methyl-3-phenylisoxazole-4-carboxylic acid (0.5 g, 2.461 mmol) was dissolved in dimethylformamide (7 mL), and 3-chloropropan-1-amine hydrochloride (0.416 g, 3.20 mmol), EDCI (0.708 g, 3.69 mmol) and DMAP (0.15 g, 1.23 mmol) were added thereto. The reaction mixture was stirred at room temperature for 30 minutes. After completion of the reaction, the mixture was extracted with dichloromethane, washed with brine, and the extracted organic layer was dried over anhydrous sodium sulfate, filtered, and concentrated under reduced pressure. The resulting residue was separated and purified by silica gel chromatography (0-10% methanol/dichloromethane) to obtain the target compound (0.27 g, 39%, white solid).

Step 2: 2,3,4,6-tetrahydro-1H-indolo[2,3-b]quinolin-11-amine

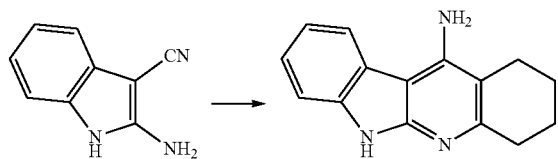 [SMILES: N#Cc1c(N)[nH]c2ccccc12 ; Nc1c2c(nc3[nH]c4ccccc4c13)CCCC2]

2,3,4,6-tetrahydro-1H-indolo[2,3-b]quinolin-11-amine (0.25 g, 33%, yellow solid) was obtained in a similar manner to the reference [Yang, Xiaobo, et al., Advanced Synthesis and Catalysis, 2010, vol. 352, #6, p. 1035-1038].

Step 3: N-(3-(11-amino-1,2,3,4-tetrahydro-6H-indolo[2,3-b]quinolin-6-yl)propyl)-5-methyl-3-phenylisoxazole-4-carboxamide

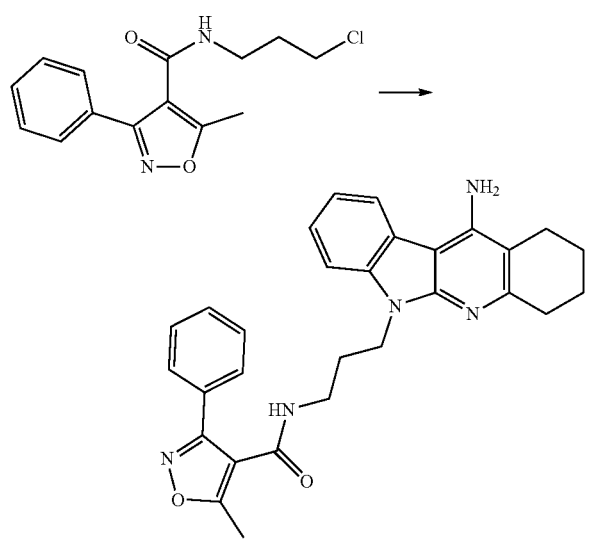

2,3,4,6-tetrahydro-1H-indolo[2,3-b]quinolin-11-amine (30 mg, 0.126 mmol) prepared in Step 2 was dissolved in dimethylformamide (1 mL) and then sodium hydroxide (10.1 mg, 0.253 mmol) was added thereto at 0° C. The mixture was stirred for 1 hour and then N-(3-chloropropyl)-5-methyl-3-phenylisoxazole-4-carboxamide (35.2 mg, 0.126 mmol) prepared in Step 1 above was added thereto. The reaction mixture was stirred at room temperature for 1 hour. Ice water was added dropwise to the mixture at 0° C. to terminate the reaction, followed by extraction with ethyl acetate and washing with brine. The extracted organic layer was dried over anhydrous sodium sulfate, filtered, and concentrated under reduced pressure. The resulting residue was separated and purified by preparative HPLC (0.1% trifluoroacetic acid H$_2$O/acetonitrile). The obtained trifluoroacetate compound was neutralized with a supersaturated aqueous solution of sodium bicarbonate to obtain the target compound (6.6 mg, 11%, white solid).

$^1$H NMR (400 MHz, CDCl$_3$) δ 8.68 (t, J=6.0 Hz, 1H), 7.81-7.73 (m, 3H), 7.46-7.37 (m, 4H), 7.33 (d, J=8.0 Hz, 1H), 7.25-7.19 (m, 1H), 4.70 (br s, 2H), 4.12-4.03 (m, 2H), 3.14 (dd, J=11.8, 6.1 Hz, 2H), 2.67 (s, 3H), 2.53 (t, J=6.2 Hz, 2H), 2.42 (t, J=6.2 Hz, 2H), 2.02-1.94 (m, 2H), 1.89-1.82 (m, 2H), 1.79-1.72 (m, 2H); LCMS, m/z 480[M+H]$^+$; HPLC t$_R$ 5.561 min (method A).

[Experimental Example 29] 2,3-dimethyl-1-(2-nitrobenzyl)-5,6,7,8-tetrahydro-1H-pyrrolo[2,3-b]quinolin-4-amine

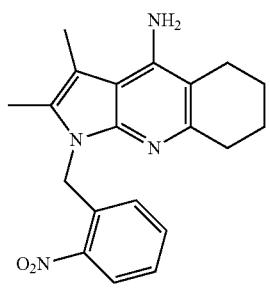 [SMILES: Cc1c(C)n(Cc2ccccc2[N+](=O)[O-])c2nc3c(c(N)c12)CCCC3]

Step 1: 2,3-dimethyl-5,6,7,8-tetrahydro-1H-pyrrolo[2,3-b]quinolin-4-amine

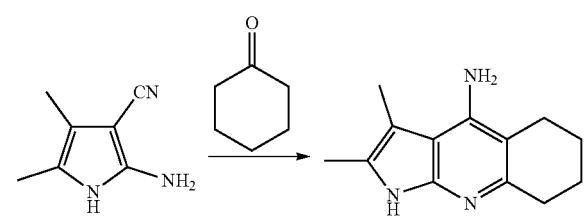

Cyclohexanone (1.53 mL, 14.79 mmol) was dissolved in toluene (6 mL) and then aluminum chloride (1.97 g, 14.79 mmol) and 2-amino-4,5-dimethyl-1H-pyrrole-3-carbonitrile (1 g, 7.39 mmol) were added thereto. The reaction mixture was stirred under reflux for 3 hours. After completion of the reaction, a supersaturated aqueous solution of sodium bicarbonate was added dropwise at 0° C. to terminate the reaction, and the result was washed with brine and extracted with dichloromethane. The extracted organic layer was dried over anhydrous sodium sulfate, filtered, and then concentrated under reduced pressure. The resulting residue was separated and purified by silica gel chromatography (0-50% ethyl acetate/hexane) to obtain the target compound (271 mg, 17%, brown solid).

Step 2: 2,3-dimethyl-1-(2-nitrobenzyl)-5,6,7,8-tetrahydro-1H-pyrrolo[2,3-b]quinolin-4-amine

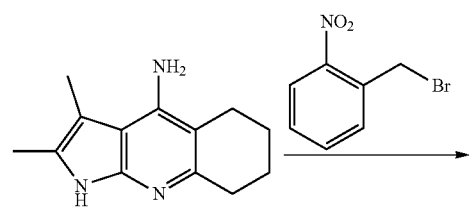

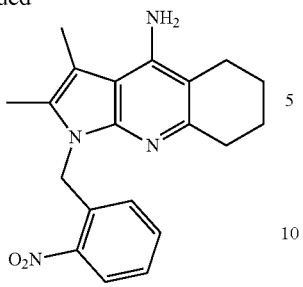

2,3-dimethyl-5,6,7,8-tetrahydro-1H-pyrrolo[2,3-b]quinolin-4-amine (200 mg, 0.92 mmol) prepared in Step 1 was dissolved in dimethylformamide (3 mL), and then sodium hydroxide (80 mg, 1.11 mmol) was added thereto at 0° C. The mixture was allowed to stand at 0° C. for 30 minutes and then 2-nitrobenzylbromide (300 mg, 1.39 mmol) was added thereto. The mixture was warmed to room temperature and stirred for 1 hour. After completion of the reaction, ice water was added dropwise thereto at 0° C. to terminate the reaction. The reaction product was extracted with ethyl acetate and then was washed with brine. The extracted organic layer was dried over anhydrous sodium sulfate, filtered, and concentrated under reduced pressure. The obtained residue was separated and purified by silica gel chromatography (0-100% ethyl acetate mixed solution (1% triethylamine)/hexane) to obtain the target compound (172 mg, 55%, brown solid).

$^1$H NMR (400 MHz, CDCl$_3$) δ 7.64 (dd, J=8.0, 1.4 Hz, 1H), 7.32-7.27 (m, 1H), 7.26-7.21 (m, 1H), 6.90-6.85 (m, 1H), 3.93 (s, 2H), 3.86 (d, J=15.1 Hz, 1H), 3.39 (d, J=15.1 Hz, 1H), 2.80 (t, J=5.8 Hz, 2H), 2.37 (t, J=5.9 Hz, 2H), 2.33 (s, 3H), 1.85-1.70 (m, 2H), 1.44 (s, 3H), 1.30-1.15 (m, 2H); LCMS, m/z 351[M+H]$^+$; HPLC t$_R$ 4.736 min (method A).

[Experimental Example 30] 6-(3-(dimethylamino)propyl)-9-methoxy-2,3,4,6-tetrahydro-1H-indolo[2,3-b]quinolin-11-amine

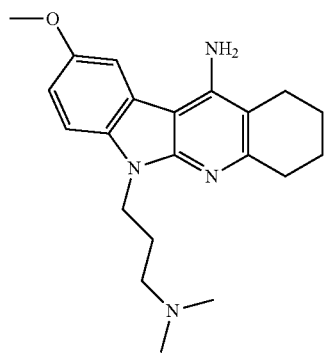 [SMILES: COc1ccc2c(c1)c1c(N)c3c(nc1n2CCCN(C)C)CCCC3]

Step 1: N-(2-bromo-4-methoxyphenyl)-2,2,2-trifluoroacetamide

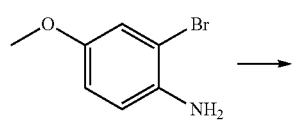

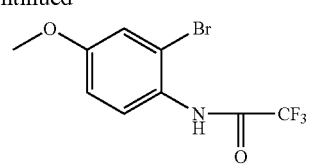

2-Bromo-4-methoxyaniline (10 g, 49.49 mmol) was dissolved in dichloromethane (30 mL) and then triethylamine (13.8 mL, 98.98 mmol) and trifluoroacetic anhydride (7.6 mL, 54.44 mmol) were added slowly thereto at 0° C. The reaction mixture was stirred at 0° C. for 30 minutes. A supersaturated aqueous solution of sodium bicarbonate was slowly added dropwise to the mixture to terminate the reaction, followed by extraction with dichloromethane and washing with distilled water. The extracted organic layer was dried over anhydrous sodium sulfate, filtered, and concentrated under reduced pressure to obtain the target compound (15.6 g, 100%, brown solid).

Step 2:
2-amino-5-methoxy-1H-indole-3-carbonitrile

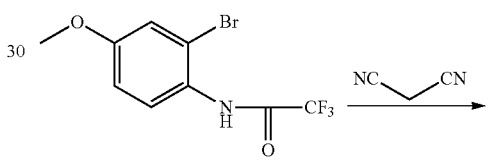

N-(2-bromo-4-methoxyphenyl)-2,2,2-trifluoroacetamide (1 g, 3.35 mmol) prepared in Step 1 was dissolved in a solution (10 mL) of dimethyl sulfoxide in distilled water (1/1), and filled with N2 gas, malononitrile (266 mg, 4.02 mmol), and then potassium carbonate (924 mg, 6.7 mmol), n-proline (77 mg, 0.67 mmol) and copper iodide (63 mg, 0.033 mmol) were added thereto. The reaction mixture was stirred at 60° C. for 15 hours. After completion of the reaction, the mixture was cooled to room temperature and filtered through celite. The filtrate was concentrated under reduced pressure, diluted with distilled water, extracted with ethyl acetate, and washed with brine. The extracted organic layer was dried over anhydrous sodium sulfate, filtered, and concentrated under reduced pressure. The obtained residue was separated and purified by silica gel chromatography (0-50% ethyl acetate/hexane) to obtain the target compound (412 mg, 65%, gray solid).

Step 3: 9-methoxy-2,3,4,6-tetrahydro-1H-indolo[2,3-b]quinolin-11-amine

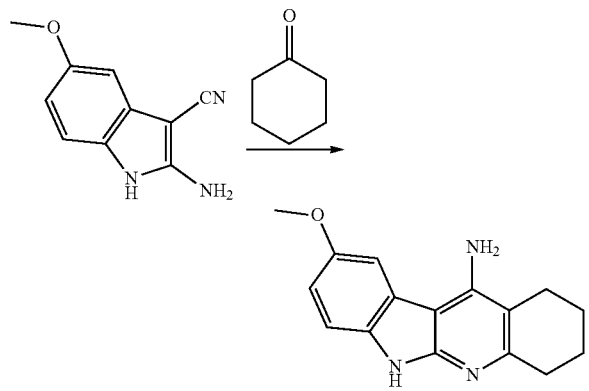

Cyclohexanone (1.2 ml, 11.05 mmol) was dissolved in dichloroethane (7 mL), and then aluminum chloride (1.47 g, 11.05 mmol) was added thereto. Then, 2-amino-5-methoxy-1H-indole-3-carbonitrile (1.38 g, 7.37 mmol) prepared in Step 2 was added thereto and the reaction mixture was stirred under reflux for 5 hours. The mixture was cooled to room temperature, and a supersaturated aqueous solution of sodium bicarbonate was added dropwise thereto to terminate the reaction, followed by extraction with a 10% methanol/dichloromethane mixed solution and washing with brine. The extracted organic layer was dried over anhydrous sodium sulfate, filtered, and concentrated under reduced pressure. The resulting residue was separated and purified by silica gel chromatography (0-50% ethyl acetate/hexane) to obtain the target compound (1.61 g, 81%, white solid).

Step 4: 6-(3-(dimethylamino)propyl)-9-methoxy-2,3,4,6-tetrahydro-1H-indolo[2,3-b]quinolin-11-amine

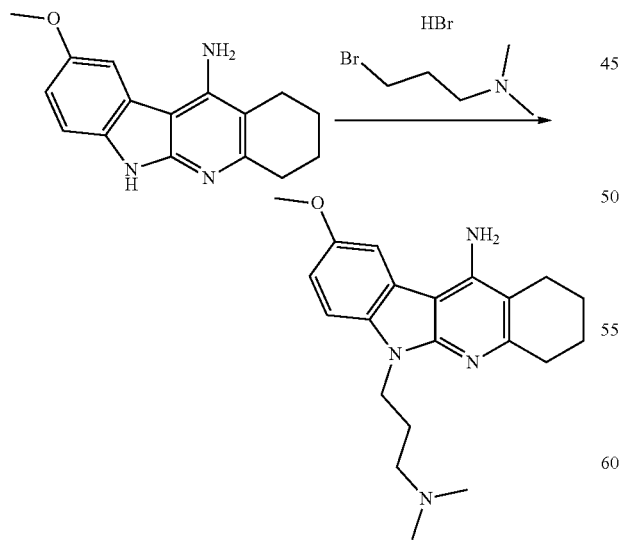

9-methoxy-2,3,4,6-tetrahydro-1H-indolo[2,3-b]quinolin-11-amine (1 g, 3.74 mmol) prepared in Step 3 was dissolved in dimethylformamide (7 mL), and then sodium hydroxide (500 mg, 18.7 mmol) was added thereto at 0° C. The reaction mixture was stirred for 30 minutes and then 3-bromo-N,N-dimethylpropan-1-amine hydrobromide (1.3 g, 7.48 mmol) was added thereto. The reaction mixture was allowed to slowly warm to room temperature and was then reacted for 15 hours. Ice water was added dropwise to the mixture at 0° C. to terminate the reaction and the mixture was extracted with ethyl acetate and washed with brine. The extracted organic layer was dried over anhydrous sodium sulfate, filtered, and concentrated under reduced pressure. The resulting residue was purified by silica gel chromatography (0-100% ethyl acetate mixed solution (1% triethylamine)/hexane) to obtain the target compound (695 mg, 53%, yellow solid).

$^1$H NMR (400 MHz, CDCl$_3$) δ 7.36 (d, J=8.8 Hz, 1H), 7.33 (s, 1H), 7.04 (dd, J=8.8 Hz, 2.0 Hz, 1H), 4.66 (s, 2H), 4.41 (t, J=7.0 Hz, 2H), 3.92 (s, 3H), 2.98-2.95 (m, 2H), 2.62-2.59 (m, 2H), 2.45-2.41 (m, 2H), 2.30 (s, 6H), 2.10-1.89 (m, 6H); LCMS, m/z 353[M+H]$^+$; HPLC t$_R$ 4.276 min (method A).

[Experimental example 31] The target compound (12-(3-(dimethylamino)propyl)-9-methoxy-6,12-dihydro-5H-benzo[h]indolo[2,3-b]quinolin-7-amine) was obtained in a similar manner to Step 3 of Experimental example 30 above.

[Experimental example 32] The target compound (6-(3-(dimethylamino)propyl)-2,3,4,6-tetrahydro-1H-indolo[2,3-b]quinolin-11-amine) was obtained in a similar manner to Experimental example 30 above.

[Experimental example 33] The target compound (6-benzyl-2,3,4,6-tetrahydro-1H-indolo[2,3-b]quinolin-11-amine) was obtained in a similar manner to Step 3 of Experimental example 28.

[Experimental Example 34] 9-methoxy-6-(3-(methylamino)propyl)-2,3,4,6-tetrahydro-1H-indolo[2,3-b]quinolin-11-amine

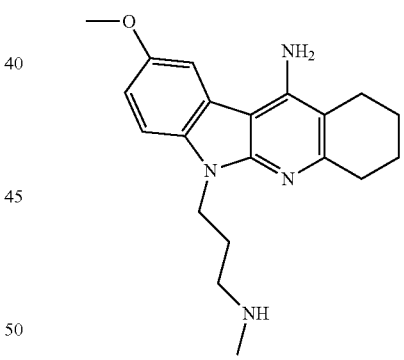

Step 1: t-butyl(3-(11-amino-9-methoxy-1,2,3,4-tetrahydro-6H-indolo[2,3-b]quinolin-6-yl)propyl)(methyl)carbamate

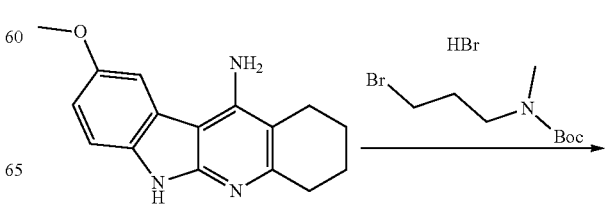

-continued

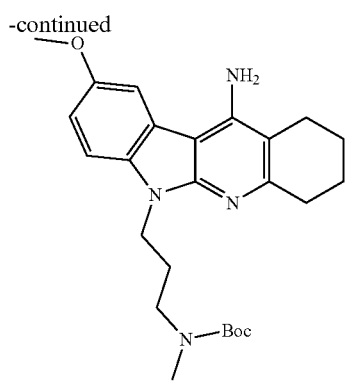

9-methoxy-2,3,4,6-tetrahydro-1H-indolo[2,3-b]quinolin-11-amine (50 mg, 0.18 mmol) prepared in Experimental example 30, Step 3 above was dissolved in dimethyl formamide (1 mL), and then sodium hydroxide (15 mg, 0.37 mmol) was added thereto at 0° C. The reaction product was stirred for 30 minutes and then t-butyl(3-bromopropyl)(methyl)carbamate hydrobromide (58 mg, 0.28 mmol) was added thereto. The reaction mixture was slowly warmed to room temperature and stirred for 3 hours. Ice water was added dropwise to the mixture at 0° C. to terminate the reaction, and then the mixture was extracted with ethyl acetate and washed with brine. The extracted organic layer was dried over anhydrous sodium sulfate, filtered, and concentrated under reduced pressure. The resulting residue was purified by silica gel chromatography (0-100% ethyl acetate mixed solution (1% triethylamine)/hexane) to obtain the target compound (47 mg, 57%, white solid).

Step 2: 9-methoxy-6-(3-(methylamino)propyl)-2,3,4,6-tetrahydro-1H-indolo [2,3-b] quinolin-11-amine

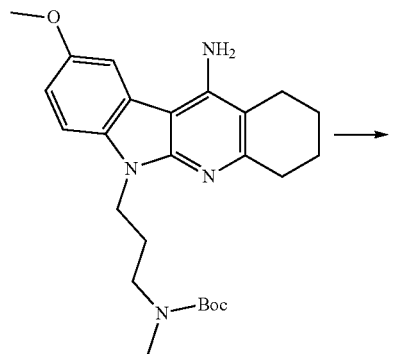

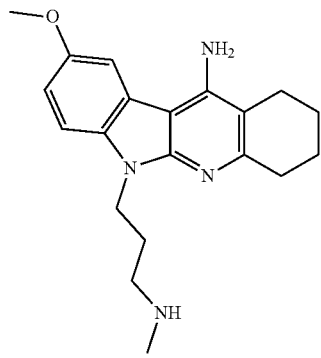

t-butyl(3-(11-amino-9-methoxy-1,2,3,4-tetrahydro-6H-indolo[2,3-b]quinolin-6-yl)propyl) (methyl)carbamate (47 mg, 0.10 mmol) prepared in Step 1 above was dissolved in dichloromethane (1 mL), and trifluoroacetic acid (200 μL) was added thereto at room temperature, followed by stirring for 2 hours. After completion of the reaction, the reaction product was neutralized with a supersaturated aqueous solution of sodium bicarbonate, extracted with dichloromethane, and washed with water. The extracted organic layer was dried over anhydrous sodium sulfate, filtered, and concentrated to obtain the target compound (39 mg, 99%, white solid).

$^1$H NMR (400 MHz, CDCl$_3$) δ 7.35 (d, J=2.3 Hz, 1H), 7.30 (d, J=8.8 Hz, 1H), 7.05 (dd, J=8.8, 2.3 Hz, 1H), 4.68 (s, 2H), 4.43 (t, J=6.4 Hz, 2H), 3.92 (s, 3H), 2.94 (t, J=5.9 Hz, 2H), 2.60 (t, J=5.9 Hz, 2H), 2.48 (t, J=6.4 Hz, 2H), 2.41 (s, 3H), 2.14-2.04 (m, 2H), 1.97-1.84 (m, 4H); LCMS, m/z 339[M+H]$^+$; HPLC t$_R$ 4.271 min (method A).

[Experimental example 35] The target compound (6-(3-(methylamino)propyl)-2,3,4,6-tetrahydro-1H-indolo[2,3-b]quinolin-11-amine) was obtained in a similar manner to Experimental example 34.

[Experimental Example 36] 9-methoxy-6-(4-methylpent-3-en-1-yl)-2,3,4,6-tetrahydro-1H-indolo[2,3-b]quinolin-11-amine

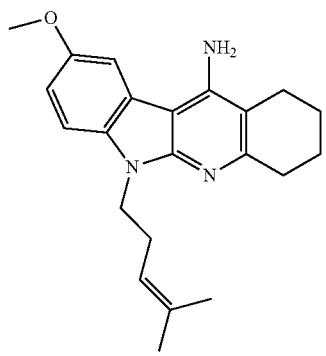 [SMILES: COc1ccc2c(c1)c1c(N)c3c(nc1n2CCC=C(C)C)CCCC3]

Step 1: 9-methoxy-6-(4-methylpent-3-en-1-yl)-2,3,4,6-tetrahydro-1H-indolo[2,3-b]quinolin-11-amine

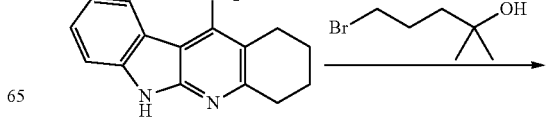

-continued

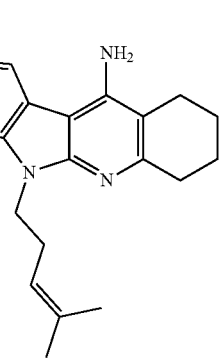

9-methoxy-2,3,4,6-tetrahydro-1H-indolo[2,3-b]quinolin-11-amine (30 mg, 0.11 mmol) prepared in Experimental example 30, Step 3 above was dissolved in dimethyl formamide (1 mL), and then sodium hydroxide (20 mg, 0.44 mmol) was added thereto at 0° C. The reaction mixture was stirred for 30 minutes and then 5-bromo-2-methylpentan-2-ol (22 mg, 0.13 mmol) was added thereto. The reaction mixture was slowly warmed to room temperature and then stirred for 5 hours. Ice water was added dropwise to the mixture at 0° C. to terminate the reaction, and then the mixture was extracted with ethyl acetate and washed with brine. The extracted organic layer was dried over anhydrous sodium sulfate, filtered, and concentrated under reduced pressure. The obtained residue was purified by silica gel chromatography (0-100% ethyl acetate mixed solution (1% triethylamine)/hexane) to obtain the target compound (4 mg, 12%, white solid).

$^1$H NMR (400 MHz, CDCl$_3$) δ 7.35 (d, J=2.3 Hz, 1H), 7.30 (d, J=8.7 Hz, 1H), 7.03 (dd, J=8.7, 2.3 Hz, 1H), 5.23 (t, J=7.3 Hz, 1H), 4.61 (s, 2H), 4.37-4.27 (m, 2H), 3.92 (s, 3H), 2.99 (d, J=5.8 Hz, 2H), 2.61 (t, J=5.8 Hz, 2H), 2.63-2.45 (m, 2H), 1.95-1.90 (m, 4H), 1.64 (s, 3H), 1.53 (s, 3H); LCMS, m/z 350[M+H]$^+$; HPLC t$_R$ 4.350 min (method A).

[Experimental Example 37] Ethyl 4-(11-amino-9-methoxy-1,2,3,4-tetrahydro-6H-indolo[2,3-b]quinolin-6-yl)butanoate

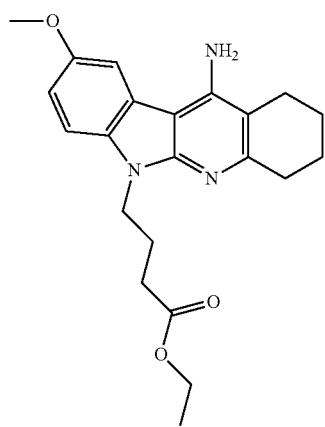 [SMILES: CCOC(=O)CCCn1c2ccc(OC)cc2c2c(N)c3c(nc21)CCCC3]

Step 1: Ethyl 4-(11-amino-9-methoxy-1,2,3,4-tetrahydro-6H-indolo[2,3-b]quinolin-6-yl)butanoate

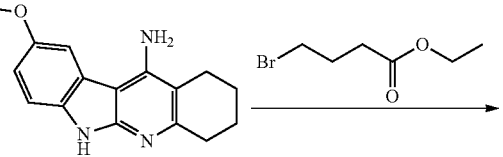

9-methoxy-2,3,4,6-tetrahydro-1H-indolo[2,3-b]quinolin-11-amine (100 mg, 0.39 mmol) prepared in Experimental example 30, Step 3 above was dissolved in dimethyl formamide (3 mL), and then sodium hydroxide (30 mg, 0.74 mmol) was added thereto at 0° C. The reaction mixture was stirred for 30 minutes and then ethyl 4-bromobutanoate (102 mg, 0.56 mmol) was added thereto. The reaction mixture was slowly warmed to room temperature and then stirred for 3 hours. Ice water was added dropwise to the mixture at 0° C. to terminate the reaction, and then the mixture was extracted with ethyl acetate and washed with brine. The extracted organic layer was dried over anhydrous sodium sulfate, filtered, and concentrated under reduced pressure. The obtained residue was purified by silica gel chromatography (0-100% ethyl acetate mixed solution (1% triethylamine)/hexane) to obtain the target compound (18 mg, 12%, white solid).

$^1$H NMR (400 MHz, CDCl$_3$) δ 7.35 (s, 1H), 7.34 (d, J=8.7 Hz, 2H), 7.04 (d, J=8.7 Hz, 1H), 4.62 (s, 2H), 4.42 (t, J=6.9 Hz, 2H), 4.10 (q, J=6.9 Hz, 2H), 3.92 (s, 3H), 2.96 (t, J=5.8 Hz, 2H), 2.61 (t, J=5.8 Hz, 2H), 2.32 (q, J=7.3 Hz, 2H), 2.35-2.15 (m, 2H), 2.00-1.90 (m, 4H), 1.23 (t, J=7.3 Hz, 3H); LCMS, m/z 382[M+H]$^+$; HPLC t$_R$ 5.430 min (method A).

[Experimental example 38] 6-(3-(dimethylamino)propyl)-9-methyl-2,3,4,6-tetrahydro-1H-indolo[2,3-b]quinolin-11-amine

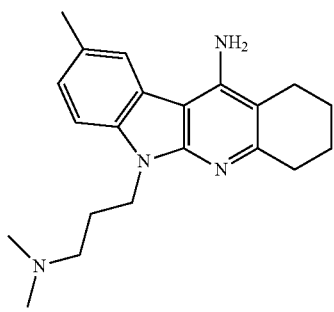 [SMILES: Cc1ccc2c(c1)c1c(N)c3c(nc1n2CCCN(C)C)CCCC3]

Step 1: N-(2-bromo-4-methylphenyl)-2,2,2-trifluoroacetamide

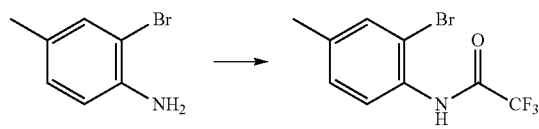

2-bromo-4-methylaniline (1 g, 5.37 mmol) was dissolved in dichloroethane and then triethylamine (1.5 mL, 10.75 mmol) and trifluoroacetic anhydride (0.91 mL, 6.45 mmol) were added thereto at 0° C. The resulting mixture was stirred at 0° C. for 30 minutes and stirred at room temperature for 2 hours. The mixture was cooled to 0° C. and a supersaturated aqueous solution of sodium bicarbonate was slowly added dropwise to terminate the reaction. Then, the reaction product was extracted with dichloromethane and washed with distilled water. The extracted organic layer was dried over anhydrous sodium sulfate, filtered, concentrated under reduced pressure, and the obtained residue was separated and purified by silica gel chromatography (0-5% methanol/dichloromethane) to obtain the target compound (1.25 g, 82%, ivory solid).

Step 2: 2-amino-5-methyl-1H-indole-3-carbonitrile

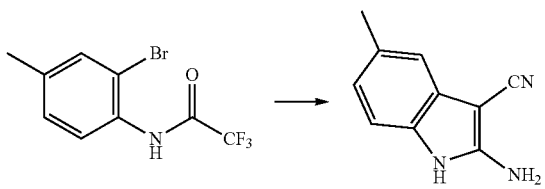

N-(2-bromo-4-methoxyphenyl)-2,2,2-trifluoroacetamide (1.25 g, 4.43 mmol) prepared in Step 1 was dissolved in a solution of dimethyl sulfoxide in distilled water (1/1), and filled with N2 gas, malononitrile (266 mg, 4.02 mmol), and then malononitrile (0.35 g, 5.32 mmol), potassium carbonate (1.225 g, 8.86 mmol), n-proline (0.102 g, 0.886 mmol) and copper iodide (0.084 g, 0.443 mmol) were added thereto. The reaction mixture was stirred at 60° C. for 4 hours. After completion of the reaction, the mixture was cooled to room temperature and filtered through celite. The filtrate was concentrated under reduced pressure, diluted with distilled water, extracted with ethyl acetate, and washed with brine. The extracted organic layer was dried over anhydrous sodium sulfate, filtered, and concentrated under reduced pressure. The obtained residue was separated and purified by silica gel chromatography (0-10% methanol/dichloromethane) to obtain the target compound (0.75 g, 95%, dark yellow solid).

Step 3: 9-methyl-2,3,4,6-tetrahydro-1H-indolo[2,3-b]quinolin-11-amine

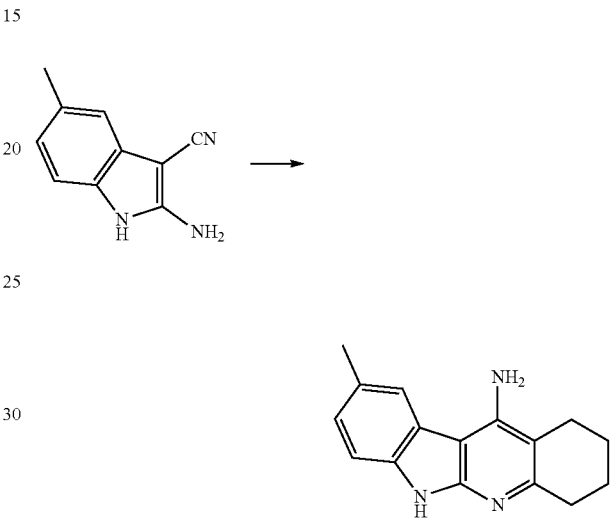

Cyclohexanone (0.665 mL, 6.43 mmol) was dissolved in dichloroethane (10 mL), and then aluminum chloride (1.07 g, 8.03 mmol) was added thereto. Then, 2-amino-5-methoxy-1H-indole-3-carbonitrile (0.55 g, 3.21 mmol) prepared in Step 2 was added thereto and the reaction mixture was stirred under reflux for 5 hours. The mixture was cooled to room temperature, and a supersaturated aqueous solution of sodium bicarbonate was added dropwise thereto to terminate the reaction, followed by extraction with a 10% methanol/dichloromethane mixed solution and washing with brine. The extracted organic layer was dried over anhydrous sodium sulfate, filtered, and concentrated under reduced pressure. The resulting residue was separated and purified by silica gel chromatography (0-5% methanol/dichloromethane) to obtain the target compound (0.65 g, 89%, yellow solid).

Step 4: 6-(3-(dimethylamino)propyl)-9-methyl-2,3,4,6-tetrahydro-1H-indolo[2,3-b]quinolin-11-amine

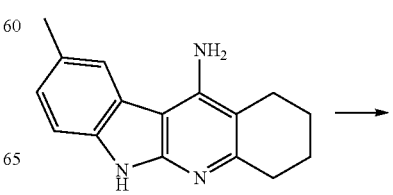

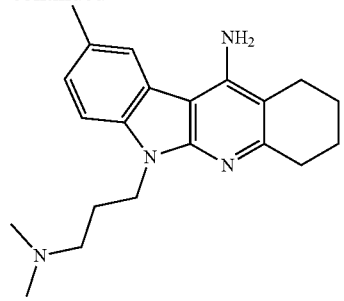

9-methyl-2,3,4,6-tetrahydro-1H-indolo[2,3-b]quinolin-11-amine (40 mg, 0.159 mmol) prepared in Step 3 was dissolved in dimethylformamide (1 mL) and then sodium hydroxide (9.5 mg, 0.179 mmol) was added thereto at 0° C. The reaction mixture was stirred for 1 hour and then 3-chloro-N,N-dimethylpropyl-1-amine hydrochloride (0.03 g, 0.191 mmol) was added thereto. The reaction mixture was allowed to slowly warm to room temperature, followed by stirring for 1 hour. Further, sodium hydroxide (6.4 mg, 0.159 mmol) was added thereto, followed by stirring for 16 hours. Ice water was added dropwise to the mixture at 0° C. to terminate the reaction and the mixture was extracted with ethyl acetate and washed with brine. The extracted organic layer was dried over anhydrous sodium sulfate, filtered, and concentrated under reduced pressure. The resulting residue was purified by silica gel chromatography (0-80% ethyl acetate mixed solution (10% ammonia water)/hexane) to obtain the target compound (33.6 mg, 63%, yellow solid).

$^1$H NMR (400 MHz, CDCl$_3$) δ 7.61 (s, 1H), 7.34 (d, J=8.2 Hz, 1H), 7.22 (d, J=8.2 Hz, 1H), 4.68 (s, 2H), 4.44 (t, J=6.9 Hz, 2H), 2.98 (t, J=5.8 Hz, 2H), 2.77 (s, 2H), 2.61 (t, J=5.9 Hz, 2H), 2.53 (s, 3H), 2.46 (t, J=7.0 Hz, 2H), 2.31 (s, 6H), 2.16-2.05 (m, 2H), 1.99-1.85 (m, 4H); LCMS, m/z 337[M+H]$^+$; HPLC t 4.354 min (method A).

[Experimental examples 39, 40, 41, 42, 43, 44, 45] Target compounds (6-(3-(dimethylamino)propyl)-9-fluoro-2,3,4,6-tetrahydro-1H-indolo[2,3-b]quinolin-11-amine; 9-chloro-6-(3-(dimethylamino)propyl)-2,3,4,6-tetrahydro-1H-indolo[2,3-b]quinolin-11-amine; 6-(3-(dimethylamino)propyl)-9-(trifluoromethoxy)-2,3,4,6-tetrahydro-1H-indolo[2,3-b]quinolin-11-amine; 11-amino-6-(3-(dimethylamino)propyl)-2,3,4,6-tetrahydro-1H-indolo[2,3-b]quinolin-9-carbonitrile; 6-(3-(dimethylamino)propyl)-9-(trifluoromethyl)-2,3,4,6-tetrahydro-1H-indolo[2,3-b]quinolin-11-amine; methyl 11-amino-6-(3-(dimethylamino)propyl)-2,3,4,6-tetrahydro-1H-indolo[2,3-b]quinoline-9-carboxylate; 6-(3-(dimethylamino)propyl)-8-methoxy-2,3,4,6-tetrahydro-1H-indolo[2,3-b]quinolin-11-amine) were obtained in a similar manner to Experimental example 38.

[Experimental Example 46] 1-((6-(3-(dimethylamino)propyl)-9-methoxy-2,3,4,6-tetrahydro-1H-indolo[2,3-b]quinolin-11-yl)amino)propan-2-ol

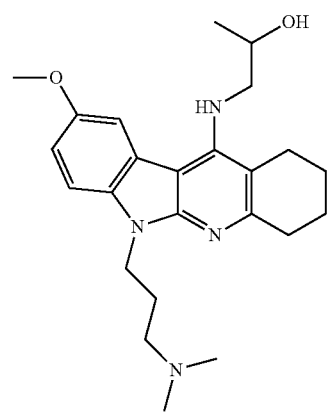 [SMILES: COc1ccc2c(c1)c1c(NCC(C)O)c3c(nc1n2CCCN(C)C)CCCC3]

Step 1: 1-((6-(3-(dimethylamino)propyl)-9-methoxy-2,3,4,6-tetrahydro-1H-indolo[2,3-b]quinolin-11-yl)amino)propan-2-ol

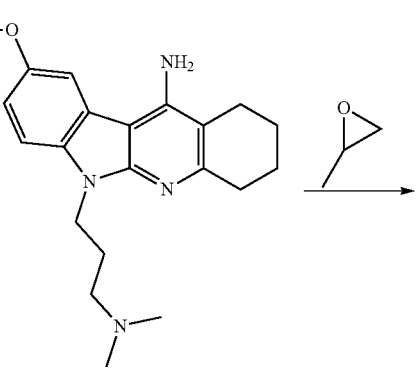

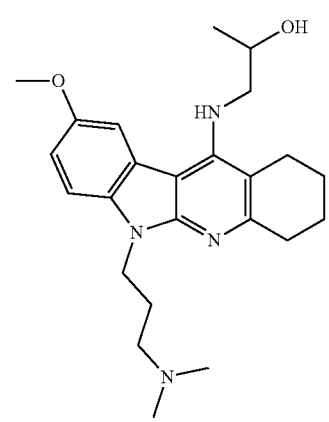

6-(3-(dimethylamino)propyl)-9-methoxy-2,3,4,6-tetrahydro-1H-indolo[2,3-b]quinolin-11-amine (50 mg, 0.15 mmol) prepared in Experimental example 30 was dissolved in 2-methyloxirane (2 ml, excess) and lithium perchlorate (160 mg, 1.61 mmol) was added thereto, followed by stirring at 50° C. for 2 hours. After completion of the reaction, the reaction product was cooled to room temperature and then concentrated under reduced pressure. The residue was isolated and purified by preparative HPLC (0.1% trifluoroacetic acid H$_2$O/acetonitrile). The obtained trifluoroacetate compound was neutralized with a supersaturated aqueous solution of sodium bicarbonate to obtain the target compound (35 mg, 60%, white solid).

$^1$H NMR (400 MHz, DMSO) δ 7.88 (d, J=2.2 Hz, 1H), 7.45 (d, J=8.9 Hz, 1H), 6.96 (dd, J=8.9, 2.2 Hz, 1H), 6.13 (s, 2H), 5.58 (s, 1H), 4.35-4.20 (m, 2H), 4.17 (s, 1H), 3.85 (s, 3H), 3.06 (d, J=6.4 Hz, 6H), 2.85-2.75 (m, 2H), 1.90-1.75 (m, 4H), 1.06 (d, J=6.3 Hz, 3H); LCMS, m/z 411 [M+H]$^+$; HPLC t$_R$ 4.255 min (method A).

[Experimental examples 47, 48] Target compounds (11-amino-6-(3-(dimethylamino)propyl)-9-methoxy-3,3-dimethyl-2,3,4,6-tetrahydro-1H-indolo[2,3-b]quinolin-1-one; 11-amino-6-(3-(dimethylamino)propyl)-9-methoxy-3-phenyl-2,3,4,6-tetrahydro-1H-indolo[2,3-b]quinolin-1-one) were obtained in a similar manner to Experimental example 38.

[Experimental examples 49, 50] Target compounds (9-(benzyloxy)-6-(3-(dimethylamino)propyl)-2,3,4,6-tetrahydro-1H-indole[2,3-b]quinolin-11-amine; 6-(3-(dimethylamino)propyl)-9-isopropoxy-2,3,4,6-tetrahydro-1H-indolo[2,3-b]quinolin-11-amine) were obtained in a similar manner to Experimental example 30.

[Experimental Example 51] 11-amino-6-(3-(dimethylamino)propyl)-2,3,4,6-tetrahydro-1H-indolo[2,3-b]quinolin-9-ol

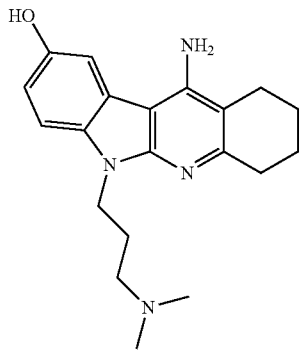

Step 1: 11-amino-6-(3-(dimethylamino)propyl)-2,3,4,6-tetrahydro-1H-indolo[2,3-b]quinolin-9-ol

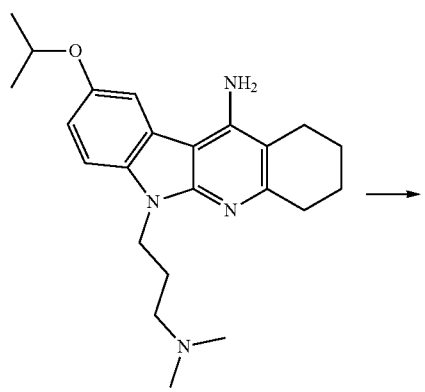

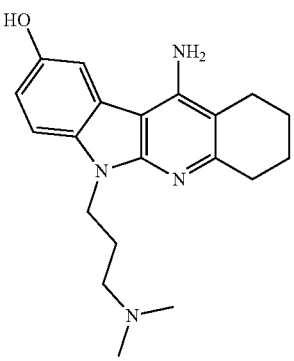

6-(3-(dimethylamino)propyl)-9-isopropoxy-2,3,4,6-tetrahydro-1H-indolo[2,3-b]quinolin-11-amine (50 mg, 0.13 mmol) prepared in Experimental example 50 above was dissolved in dichloromethane (1 mL), aluminum chloride (87 mg, 0.65 mmol) was added thereto, and the mixture was stirred at room temperature for 3 hours. After completion of the reaction, a supersaturated aqueous solution of sodium bicarbonate was added dropwise thereto to terminate the reaction. The reaction mixture was extracted with dichloromethane and then washed with brine. The extracted organic layer was dried over anhydrous sodium sulfate, filtered, and concentrated under reduced pressure. The resulting residue was separated and purified by silica gel chromatography (0-20% methanol/dichloromethane) to obtain the target compound (22 mg, 50%, white solid).

$^1$H NMR (400 MHz, DMSO) δ 8.80 (s, 1H), 7.62 (d, J=2.2 Hz, 1H), 7.24 (d, J=8.6 Hz, 1H), 6.82 (dd, J=8.6, 2.2 Hz, 1H), 5.87 (s, 2H), 4.23 (t, J=7.0 Hz, 2H), 3.40-3.10 (m, 4H), 2.80-2.75 (m, 2H), 2.71-2.18 (t, J=7.0 Hz, 2H), 2.11 (s, 6H), 1.87-1.71 (m, 4H); LCMS, m/z 339[M+H]$^+$; HPLC t$_R$ 3.975 min (method A).

[Experimental Example 52] N1-(7-(3-(dimethylamino)propyl)-9,10,11,12-tetrahydro-7H-benzo[4,5]indolo[2,3-b]quinolin-13-yl)-N3,N3-dimethylpropane-1,3-diamine

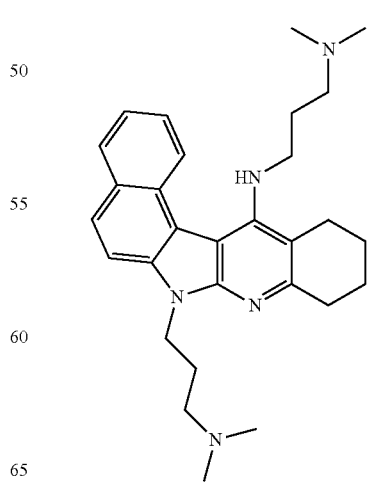

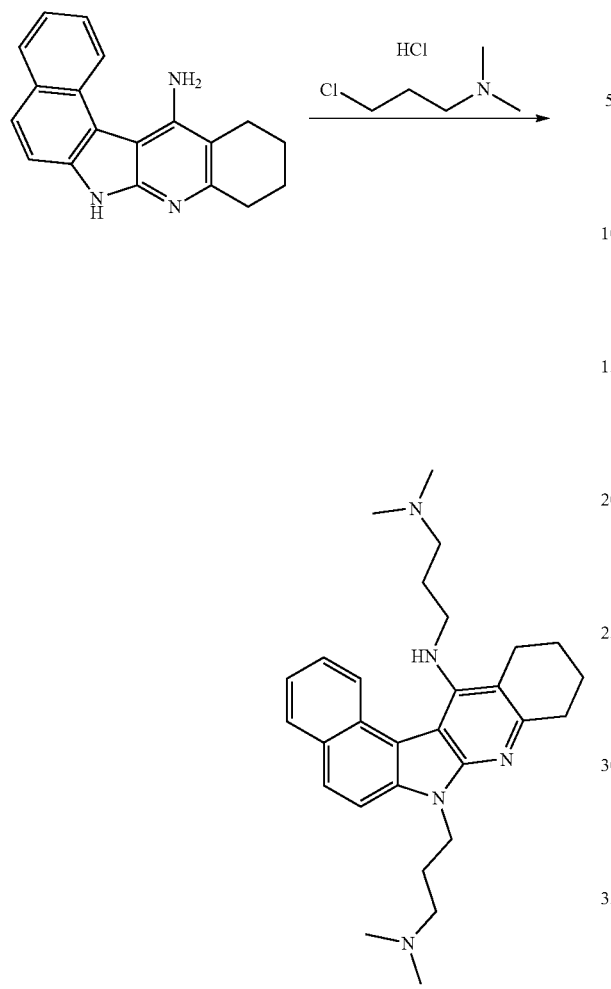

9,10,11,12-tetrahydro-7H-benzo[4,5]indolo[2,3-b]quinolin-13-amine (50 mg, 0.17 mmol) prepared in a similar manner to Experimental example 34 above was dissolved in dimethyl formamide (2 mL), and then sodium hydroxide (56 mg, 1.38 mmol) was added thereto at 0° C. The reaction mixture was stirred for 30 minutes and then 3-chloro-N,N-dimethylpropan-1-amine hydrochloride (220 mg, 1.38 mmol) was added thereto. The reaction mixture was slowly warmed to room temperature and then stirred for 15 hours. Ice water was added dropwise to the mixture at 0° C. to terminate the reaction, and then the mixture was extracted with ethyl acetate and washed with brine. The extracted organic layer was dried over anhydrous sodium sulfate, filtered, and concentrated under reduced pressure. The obtained residue was purified by silica gel chromatography (0-100% ethyl acetate mixed solution (1% triethylamine)/hexane) to obtain the target compound (48 mg, 60%, yellow syrup).

$^1$H NMR (400 MHz, DMSO) δ 9.24 (d, J=8.4 Hz, 1H), 7.98 (d, J=8.4 Hz, 1H), 7.93 (d, J=8.8 Hz, 1H), 7.86 (d, J=8.8 Hz, 1H), 7.58 (dd, J=7.0 Hz, 7.0 Hz, 1H), 7.39 (dd, J=7.0 Hz, 7.0 Hz, 1H), 5.45 (t, J=6.7 Hz, 1H), 4.51 (t, J=7.1 Hz, 2H), 3.10-3.02 (m, 2H), 2.95-2.85 (m, 2H), 2.82-2.75 (m, 2H), 2.23 (t, J=6.7 Hz, 2H), 2.13 (s, 6H), 2.05 (t, J=6.7 Hz, 2H), 1.98 (s, 6H), 1.95-1.80 (m, 6H), 1.62-1.52 (m, 2H); LCMS, m/z 458[M+H]$^+$; HPLC $t_R$ 4.175 min (method A).

[Experimental Example 53] 5-(11-amino-9-methoxy-1,2,3,4-tetrahydro-6H-indolo[2,3-b]quinolin-6-yl)-2-methylpentan-2-ol

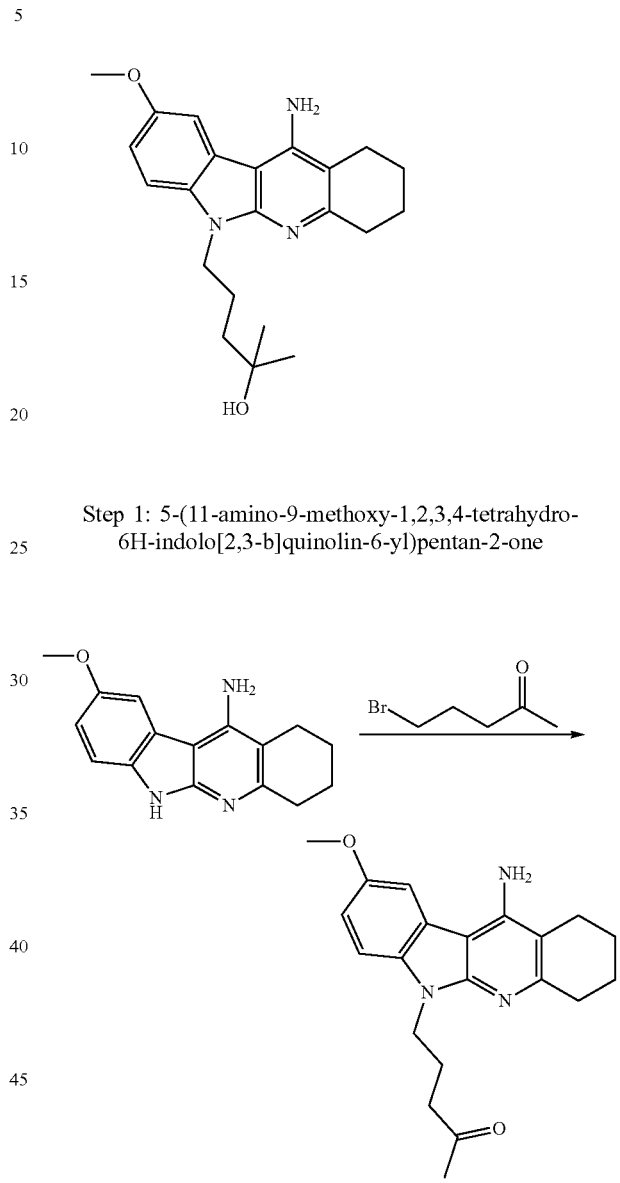

Step 1: 5-(11-amino-9-methoxy-1,2,3,4-tetrahydro-6H-indolo[2,3-b]quinolin-6-yl)pentan-2-one 9-methoxy-2,3,4,6-tetrahydro-1H-indolo[2,3-b]quinolin-11-amine (80 mg, 0.29 mmol) prepared in Experimental example 30, Step 3 above was dissolved in dimethyl formamide (1 mL), and then sodium hydroxide (20 mg, 1.45 mmol) was added thereto at 0° C. The reaction mixture was stirred for 30 minutes and 5-bromophantan-2-one (239 mg, 1.45 mmol) was added thereto. The reaction mixture was slowly warmed to room temperature and stirred for 7 hours. Ice water was added dropwise to the mixture at 0° C. to terminate the reaction and then the mixture was extracted with ethyl acetate and washed with brine. The extracted organic layer was dried over anhydrous sodium sulfate, filtered, and concentrated under reduced pressure. The resulting residue was separated and purified by silica gel chromatography (0-50% ethyl acetate/hexane) to obtain the target compound (22 mg, yellow solid).

101

Step 2: 5-(11-amino-9-methoxy-1,2,3,4-tetrahydro-6H-indolo[2,3-b]quinolin-6-yl)-2-methylpentan-2-ol

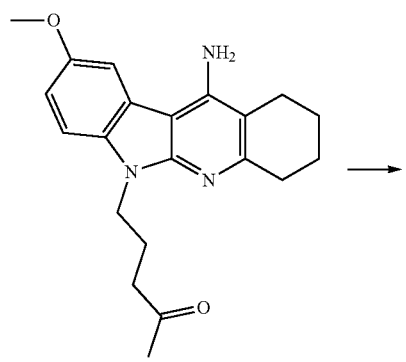

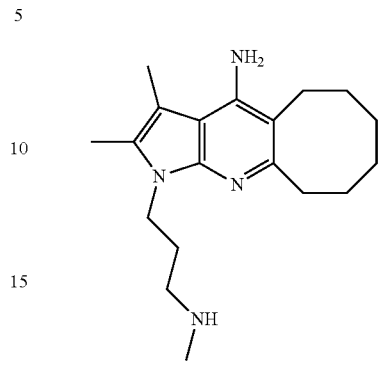

Step 1: 2,3-dimethyl-5,6,7,8,9,10-hexahydro-1H-cycloocta[b]pyrrolo[3,2-e]pyridin-4-amine

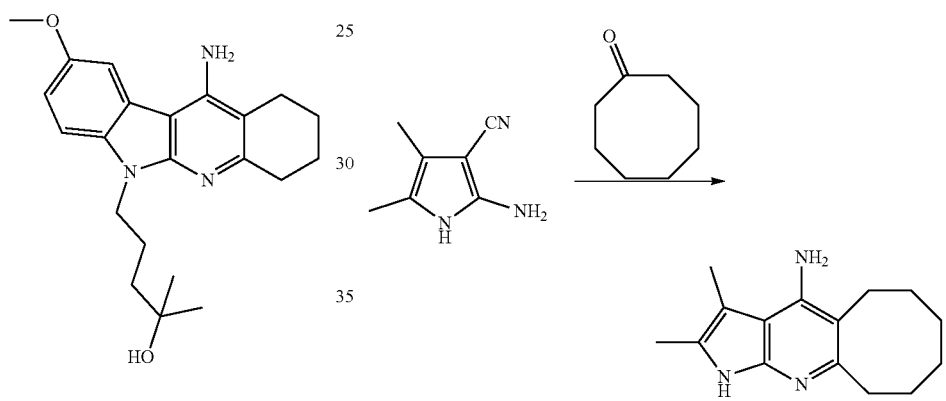

5-(11-amino-9-methoxy-1,2,3,4-tetrahydro-6H-indolo[2,3-b]quinolin-6-yl)pentan-2-one (9 mg, 0.02 mmol) prepared in Step 1 above was dissolved in diethyl ether (1 ml), and a solution (100 μL, excess) of 3M methylmagnesium bromide (in diethyl ether) was added thereto, followed by stirring at room temperature for 5 hours. After completion of the reaction, a supersaturated aqueous solution of sodium bicarbonate was added dropwise thereto to terminate the reaction. Then, the reaction product was extracted with dichloromethane and washed with brine. The extracted organic layer was dried over anhydrous sodium sulfate, filtered, and concentrated under reduced pressure, and the resulting residue was separated and purified by preparative HPLC (0.1% trifluoroacetic acid H₂O/acetonitrile). The obtained trifluoroacetate compound was neutralized with a supersaturated aqueous solution of sodium bicarbonate to obtain the target compound (1 mg, 12%, white solid).

$^{1}$H NMR (400 MHz, CDCl$_3$) δ 7.36 (d, J=2.3 Hz, 1H), 7.30 (d, J=8.8 Hz, 1H), 7.05 (dd, J=8.8, 2.3 Hz, 1H), 4.70 (s, 2H), 4.57 (t, J=6.3 Hz, 2H), 3.92 (s, 3H), 2.98 (t, J=6.0 Hz, 2H), 2.61 (t, J=6.0 Hz, 2H), 2.05-1.85 (m, 6H), 1.40-1.34 (m, 2H), 1.19 (s, 6H); LCMS, m/z 368[M+H]$^+$; HPLC t$_P$ 5.251 min (method A).

[Experimental example 54] The target compound (7-(3-(dimethylamino)propyl)-9,10,11,12-tetrahydro-7H-benzo[4,5]indolo[2,3-b]quinolin-13-amine) was obtained in a similar manner to Experimental example 30.

102

[Experimental Example 55] 2,3-dimethyl-1-(3-(methylamino)propyl)-5,6,7,8,9,10-hexahydro-1H-cycloocta[b]pyrrolo[3,2-e]pyridin-4-amine 2-amino-4,5-dimethyl-1H-pyrrole-3-carbonitrile (1 g, 7.39 mmol) was dissolved in dichloroethane (5 mL), and cyclooctanone (1.46 mL, 11.09 mmol) and aluminum chloride (1.48 g, 11.09 mmol) were added thereto. The reaction mixture was stirred under reflux for 15 hours and then was cooled to room temperature and a supersaturated aqueous solution of sodium bicarbonate was added dropwise thereto to terminate the reaction. Then, the reaction product was extracted with dichloromethane and washed with brine. The extracted organic layer was dried over anhydrous sodium sulfate, filtered, concentrated under reduced pressure, and the obtained residue was separated and purified by silica gel chromatography (0-10% methanol/dichloromethane) to obtain the target compound (718 mg, 39%, brown solid).

Step 2: t-butyl(3-(4-amino-2,3-dimethyl-5,6,7,8,9,10-hexahydro-1H-cycloocta[b]pyrrolo[3,2-e]pyridin-1-yl)propyl) (methyl)carbamate

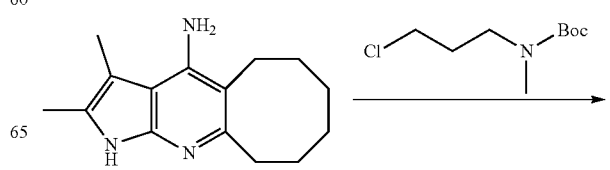

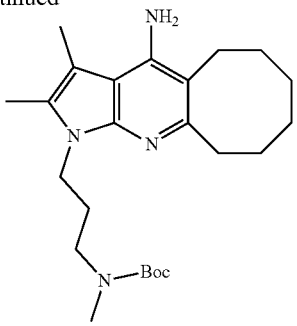

2,3-dimethyl-5,6,7,8,9,10-hexahydro-1H-cycloocta[b]pyrrolo[3,2-e]pyridin-4-amine (100 mg, 0.41 mmol) prepared in Step 1 was dissolved in dimethylformamide (2 mL) and then sodium hydroxide (24 mg, 0.61 mmol) was added thereto at 0° C. The mixture was stirred at 0° C. for 30 minutes and t-butyl(3-chloropropyl) (methyl)carbamate (127 mg, 0.61 mmol) was added thereto. The mixture was stirred at room temperature for 15 hours and then was cooled to 0° C. and ice water was added dropwise thereto to terminate the reaction. The reaction product was extracted with dichloromethane and washed with distilled water. The extracted organic layer was dried over anhydrous sodium sulfate, filtered, concentrated under reduced pressure, and the obtained residue was separated and purified by silica gel chromatography (0-100% ethyl acetate/hexane) to obtain the target compound (52 mg, 30%, brown oil).

Step 3: 2,3-dimethyl-1-(3-(methylamino)propyl)-5,6,7,8,9,10-hexahydro-1H-cycloocta[b]pyrrolo[3,2-e]pyridin-4-amine

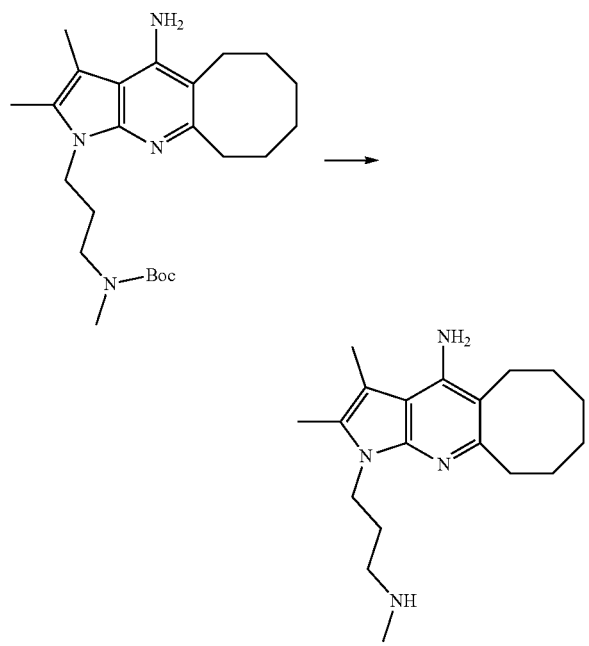

t-butyl (3-(4-amino-2,3-dimethyl-5,6,7,8,9,10-hexahydro-1H-cycloocta[b]pyrrolo[3,2-e]pyridin-1-yl) propyl) (methyl) carbamate (52 mg, 0.125 mmol) prepared in Step 2 was dissolved in dichloromethane (1 mL), trifluoroacetic acid (200 μL) was added thereto at room temperature, and the mixture was stirred at room temperature for 2 hours. After completion of the reaction, a supersaturated aqueous solution of sodium bicarbonate was added thereto to terminate the reaction, and the mixture was extracted with dichloromethane and washed with brine. The extracted organic layer was dried over anhydrous sodium sulfate, filtered, and concentrated under reduced pressure to obtain the target compound (39 mg, 99%, brown syrup).

$^1$H NMR (400 MHz, CDCl$_3$) δ 4.60 (s, 2H), 4.26-4.15 (m, 2H), 2.88-2.79 (m, 2H), 2.81-2.65 (m, 4H), 2.61 (s, 3H), 2.42 (s, 3H), 2.26 (s, 3H), 2.24-2.15 (m, 2H), 1.80-1.64 (m, 4H), 1.50-1.45 (m, 2H), 1.37-1.28 (m, 2H); LCMS, m/z 315[M+H]$^+$; HPLC $t_R$ 4.446 min (method A).

[Experimental example 56] 1-isobutyl-2,3-dimethyl-5,6,7,8-tetrahydro-1H-pyrrolo[2,3-b]quinolin-4-amine

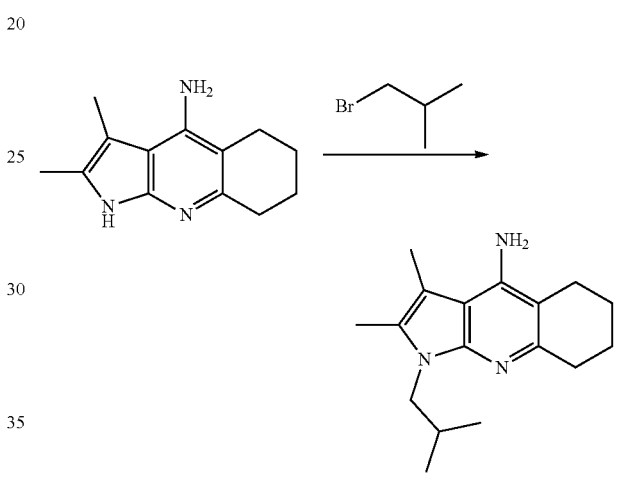

2,3-dimethyl-5,6,7,8-tetrahydro-1H-pyrrolo[2,3-b]quinolin-4-amine prepared in Experimental example 29, Step 1 (50 mg, 0.23 mmol) was dissolved in dichloroethane (1 mL), and sodium hydroxide (14 mg, 0.34 mmol) was added thereto at 0° C. The mixture was stirred at 0° C. for 30 minutes and then 1-bromo-2-methylpropane (37 μL, 0.34 mmol) was added thereto. The mixture was warmed to room temperature and then was stirred for 15 hours. The mixture was cooled to 0° C. and ice water was added dropwise to terminate the reaction. Then, the reaction product was extracted with dichloromethane and washed with distilled water. The extracted organic layer was dried over anhydrous sodium sulfate, filtered, concentrated under reduced pressure, and the obtained residue was separated and purified by silica gel chromatography (0-50% ethyl acetate/hexane) to obtain the target compound (22 mg, 35%, white solid).

$^1$H NMR (400 MHz, CDCl$_3$) δ 4.31 (s, 2H), 3.91 (d, J=7.6 Hz, 2H), 2.88 (t, J=6.0 Hz, 2H), 2.50 (t, J=6.0 Hz, 2H), 2.42 (s, 3H), 2.26 (s, 3H), 2.25-2.15 (m, 1H) 1.93-1.78 (m, 4H), 0.86 (d, J=6.7 Hz, 6H); LCMS, m/z 272[M+H]$^+$; HPLC $t_R$ 5.419 min (method A).

[Experimental example 57] The target compound (2,3-dimethyl-1-(pyridin-2-ylmethyl)-5,6,7,8-tetrahydro-1H-pyrrolo[2,3-b]quinolin-4-amine) was obtained in a similar manner to Experimental example 56.

[Experimental example 58] The target compound (10-(3-(dimethylamino)propyl)-8,9-dimethyl-6,10-dihydro-5H-benzo[h]pyrrolo[2,3-b]quinolin-7-amine) was obtained in a similar manner to Experimental example 29.

[Experimental Example 59] 2,3-dimethyl-1-phenyl-5,6,7,8-tetrahydro-1H-pyrrolo[2,3-b]quinolin-4-amine

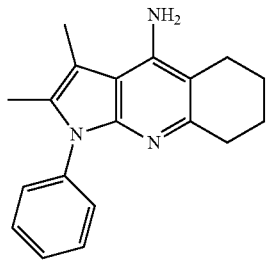 [SMILES: Cc1c(C)n(-c2ccccc2)c2nc3c(c(N)c12)CCCC3]

Step 1: 2-amino-4,5-dimethyl-1-phenyl-1H-pyrrole-3-carbonitrile

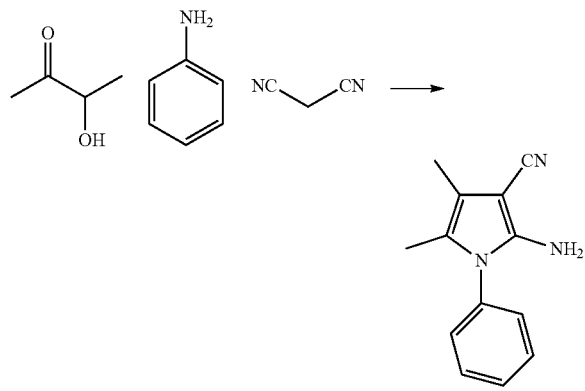

3-hydroxybutan-2-one (2 g, 22.69 mmol) and aniline (2.03 mL, 22.69 mmol) were dissolved in toluene (30 mL), and then para-toluenesulfonic acid (100 mg, 1.55 mmol) was added thereto. The reaction mixture was stirred under reflux for 2 hours and cooled to room temperature, and then malononitrile (1.5 g, 22.69 mmol) was added thereto. The reaction mixture was then stirred under reflux for 15 hours. After completion of the reaction, the mixture was cooled to room temperature and concentrated under reduced pressure, and the resulting residue was separated and purified by silica gel chromatography (0-100% dichloromethane/hexane) to obtain the target compound (450 mg, 9%, brown solid).

Step 2: 2,3-dimethyl-1-phenyl-5,6,7,8-tetrahydro-1H-pyrrolo[2,3-b]quinolin-4-amine

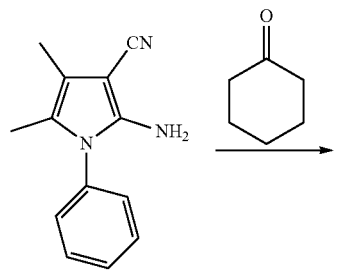

-continued

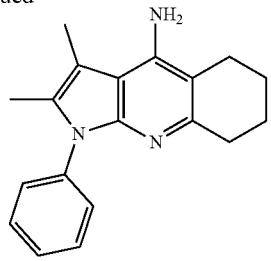

Cyclohexanone (48 µL, 0.47 mmol) was dissolved in dichloroethane (1 mL), and then aluminum chloride (63 mg, 0.47 mmol) was added thereto. The mixture was stirred at room temperature for 10 minutes, 2-amino-4,5-dimethyl-1-phenyl-1H-pyrrole-3-carbonitrile (50 mg, 0.23 mmol) prepared in Step 1 was further added thereto, and the reaction mixture was stirred under reflux for 15 hours. The mixture was cooled to room temperature, a supersaturated aqueous solution of sodium bicarbonate was added dropwise thereto to terminate the reaction, and the reaction product was washed with brine and extracted with dichloromethane. The extracted organic layer was dried over anhydrous sodium sulfate, filtered, and then concentrated under reduced pressure. The resulting residue was separated and purified by preparative HPLC (0.1% trifluoroacetic acid $H_2O$/acetonitrile). The obtained trifluoroacetate compound was neutralized with a supersaturated aqueous solution of sodium bicarbonate to obtain the target compound (7 mg, 11%, brown solid).

$^1$H NMR (400 MHz, $CDCl_3$) δ 7.47 (dd, J=7.6, 7.6 Hz, 2H), 7.42-7.30 (m, 3H), 4.40 (s, 2H), 2.79 (t, J=6.2 Hz, 2H), 2.57-2.43 (m, 2H), 2.49 (s, 3H), 2.13 (s, 3H), 1.90-1.77 (m, 6H); LCMS, m/z 292[M+H]$^+$; HPLC $t_R$ 5.397 min (method A).

[Experimental example 60] The target compound (2,3-dimethyl-1-(pyridin-3-yl)-5,6,7,8-tetrahydro-1H-pyrrolo[2,3-b]quinolin-4-amine) was obtained in a similar manner to Experimental example 59.

[Experimental examples 61, 62] The target compounds (6-(3-(dimethylamino)propyl)-8-methyl-2,3,4,6-tetrahydro-1H-indolo[2,3-b]quinolin-11-amine; 8-chloro-6-(3-(dimethylamino)propyl)-2,3,4,6-tetrahydro-1H-indolo[2,3-b]quinolin-11-amine) were obtained in a similar manner to Experimental example 38.

Example 3: Systemic Lupus Erythematosus Mouse Model Experiment

Example 3-1: Animal Breeding and Drug Administration 14-weeks-old, 36-40 g, female MRL/lpr (or MRL/Fas$^{lpr}$) mice (purchased from the Jackson Laboratory, USA through Orient Bio) were used for the lupus treatment effect experiment and breeding was performed in accordance with the breeding and ethics regulations of the Laboratory Animal Research Center of the Ajou University Medical Center. Prior to the experiment, 4 to 5 animals were randomly assigned to each of a negative control group (Vehicle), a positive control group (HCQ), and an experimental compound group (SK41, SK50, SK58 and SK64) for blinding, and each of SK41, SK50, SK58, and SK64 compounds was completely dissolved in a vehicle consisting of ethanol (ethyl alcohol) 10%, polyethylene glycol 400 40% and sterile distilled water 50%, and then the solution was orally administered to experimental animals.

As for the administration method, only the same amount of vehicle was administered to the negative control group, 15-60 MPK (15-60 mg/Kg) of HCQ was administered daily to the positive control group, and SK41, SK50, SK58 and SK64 was administered daily in an amount of 15-30 MPK (15-30 mg/Kg) to the experimental compound group, and the administration was performed for 40 days from the time at which the experimental mice were 14 weeks old.

As for the sample collection method, the weight of the experimental mice was measured at 3-day intervals, and the mice were subjected to inhalational anesthesia and euthanasia using IFRAN liquid (Hana Pharmaceutical, Korea; ingredient name: Isoflurane) on the day of expiry of 40 days, and then blood, kidney, spleen and axillary lymph nodes and inguinal lymph nodes were collected therefrom.

Example 3-2: Analysis of Systemic Lupus Erythematosus Mouse Model Sample

Blood samples were collected from the heart of an anesthetized mouse, the serum was extracted therefrom using a serum separation tube and a centrifuge (4,000 rpm, 10 minutes, 4° C.), and blood concentrations of ANA (anti-nuclear Antibody, MyBioSourse, USA) as a lupus severity indicator molecule and C3 complement (MyBioSourse, USA), a comprehensive inflammatory indicator molecule, were measured through enzyme-linked immunosorbent assay (ELISA).

Organs were treated with an RNA stabilization agent (RNA Stabilization Reagent, Germany, QUIAGEN) immediately after extraction to preserve the condition and prepare specimens, the organs were imaged and weighed to determine whether or not the organs are damaged and to measure the degree of immune organ hypertrophy, and the sum of the weights of one pair of axillary lymph nodes and one pair of inguinal lymph nodes was recorded as the weight of the lymph nodes.

Example 4: Identification of Lead Substances Based on TLR7/9 Inhibitory Activity The putative binding mode and interaction pattern of SK01 to TLR7 was predicted through molecular docking. A docking assay was performed using the R848-bound crystal structure of TLR7 (PDB ID: 5GMH) because the inhibitor exhibited no activity against TLR8 and the small molecule-binding cavities on TLR3 and TLR9 were not determined through X-ray crystallography. The receptors were washed by removing non-essential elements including water molecules and heteroatoms, excluding the bound agonist R848. Protonation was achieved in the presence of an Amber12:EHT force field. Energy minimization was performed until a root mean square (RMS) slope reached 0.1 kcal/mol/Å$^2$. Residues around R848 were defined as ligand-binding sites and docking was performed using mplate similarity placement and the Affinity dG scoring function. Docking hits were scored again using the Amber12:EHT force field and the GBVI/WSA dG scoring function. The best scoring pose with a lower RMS deviation was selected from R848 to visualize the ligand's binding mode and intermolecular interactions. A potential inhibitory ability for TLR7/TLR9 activation was verified by ELISA to identify the small molecule compound called "SK01" (FIG. 1).

Figure 2:
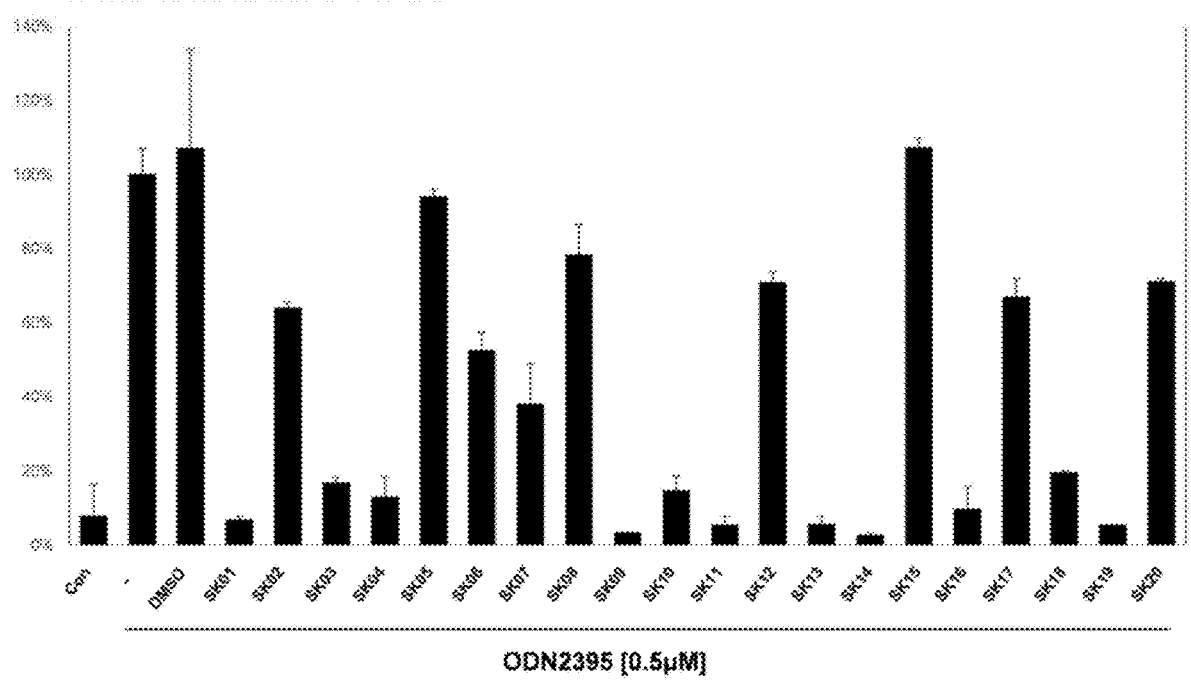
FIG. 2 shows the primary comparative inhibitory activities against TLR9 of SK01 and structural derivatives thereof (SK02-SK20).
Figure 3A:
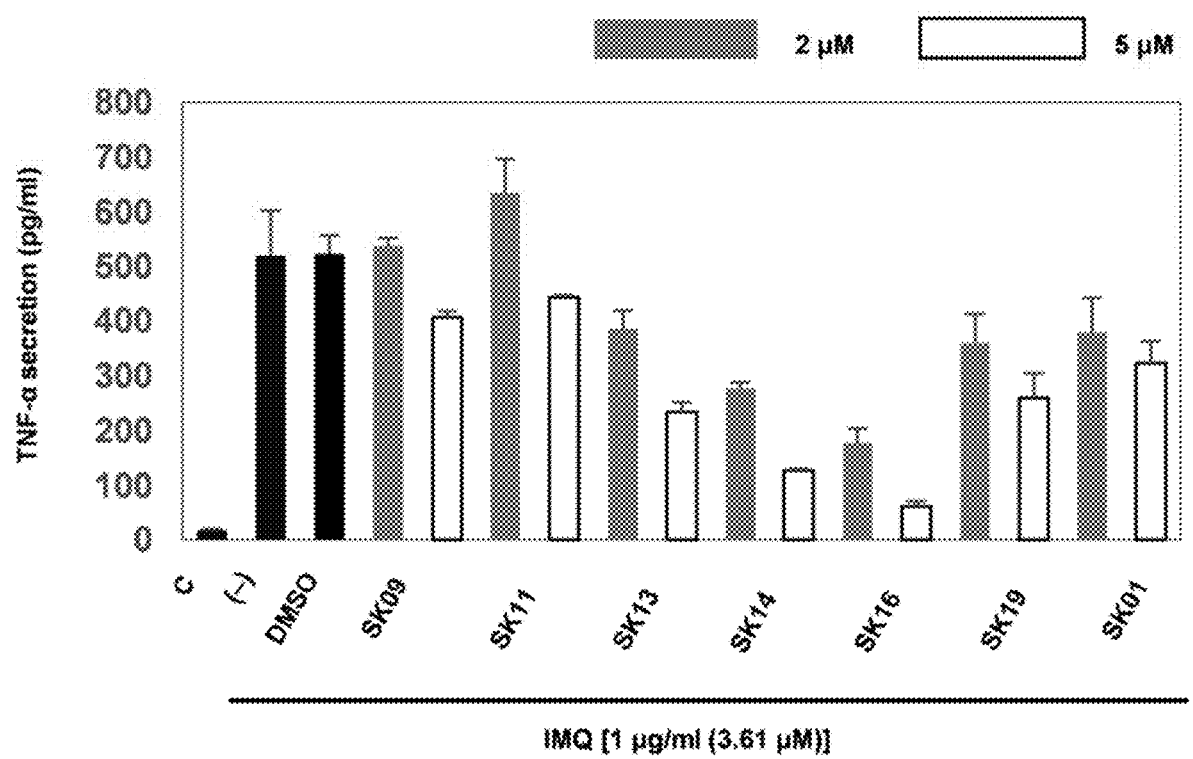
Figure 3B:
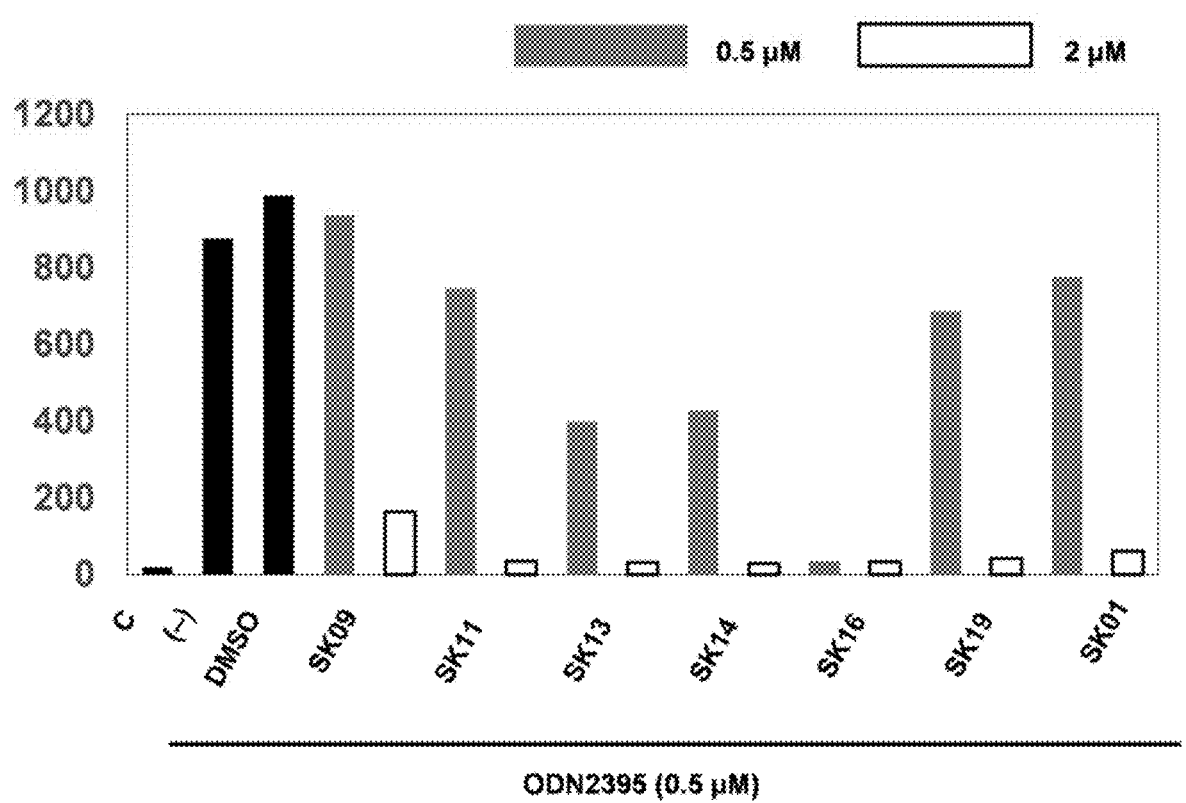
Figure 3C:
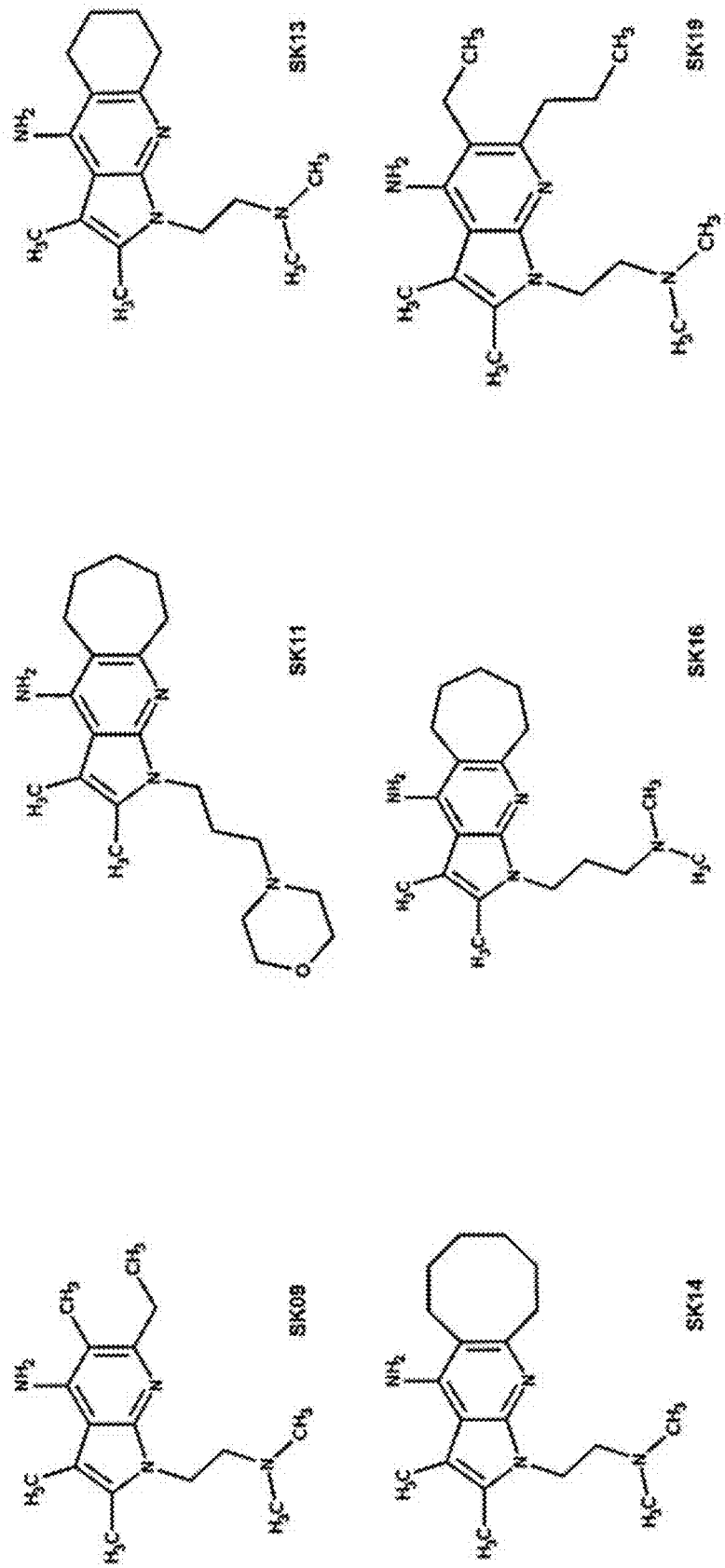
Figure 4A:
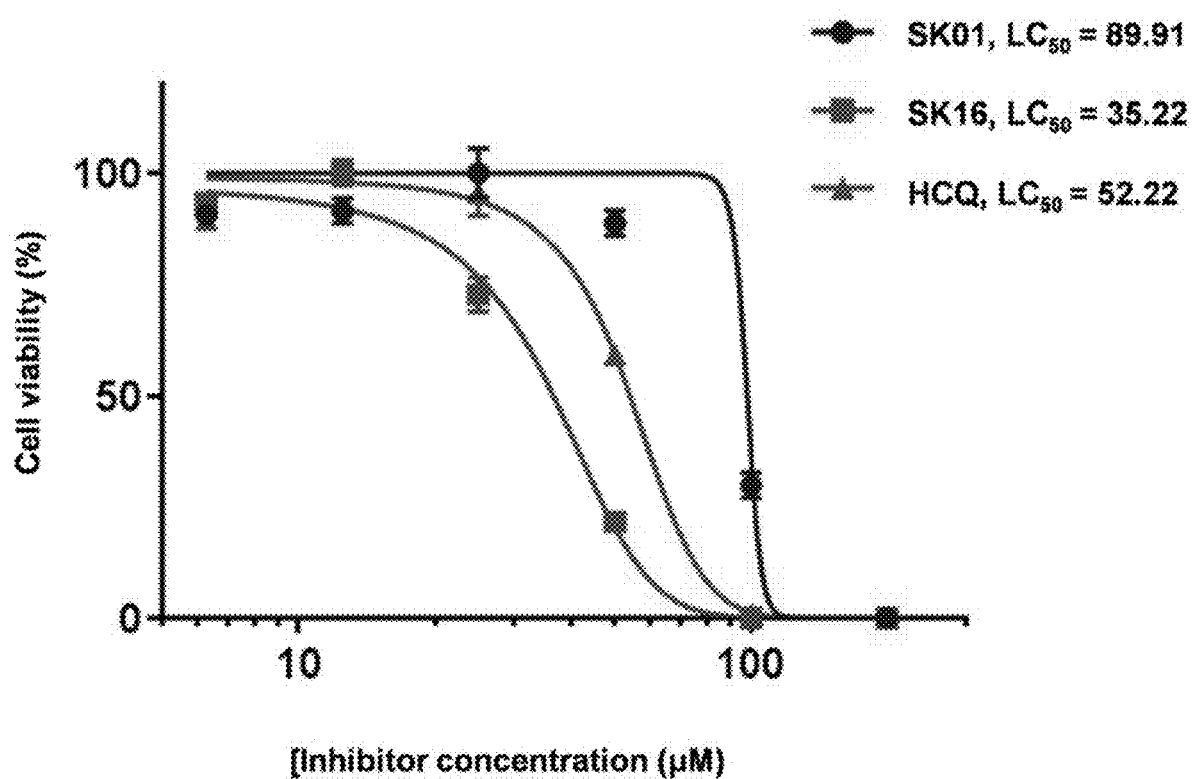
Figure 4B:
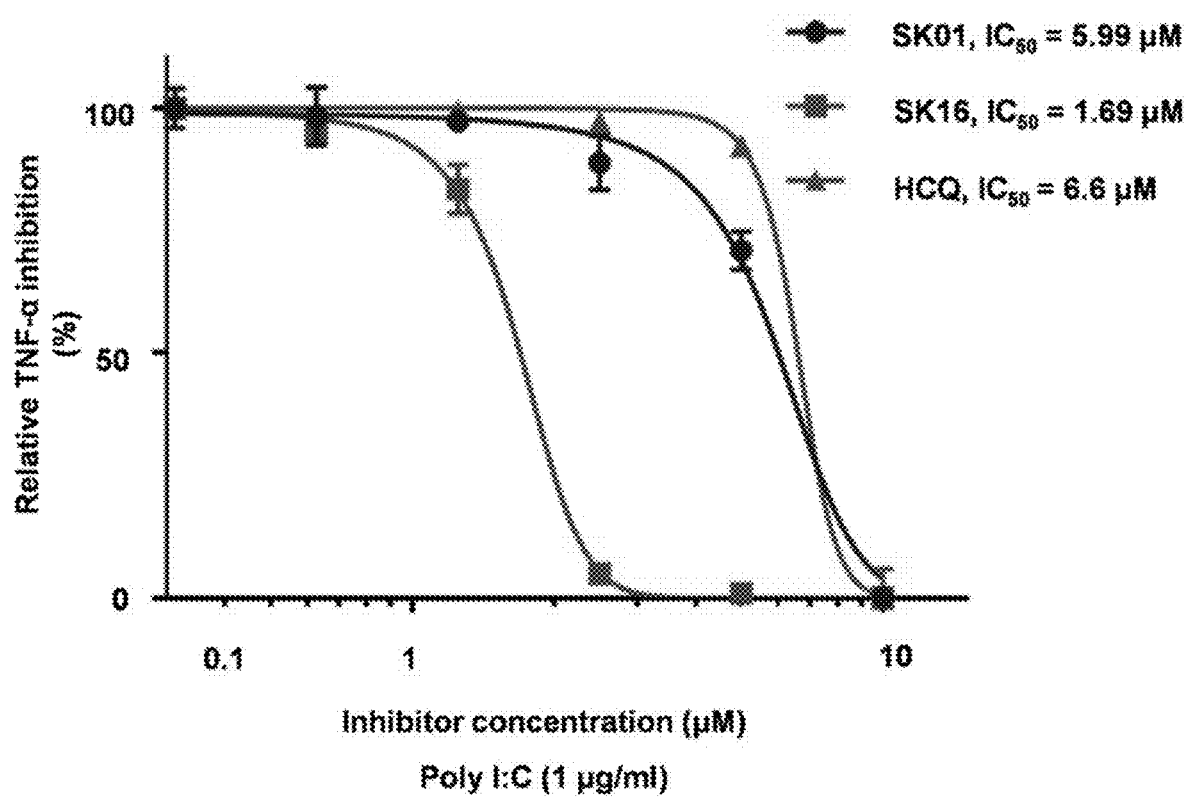
Figure 4C:
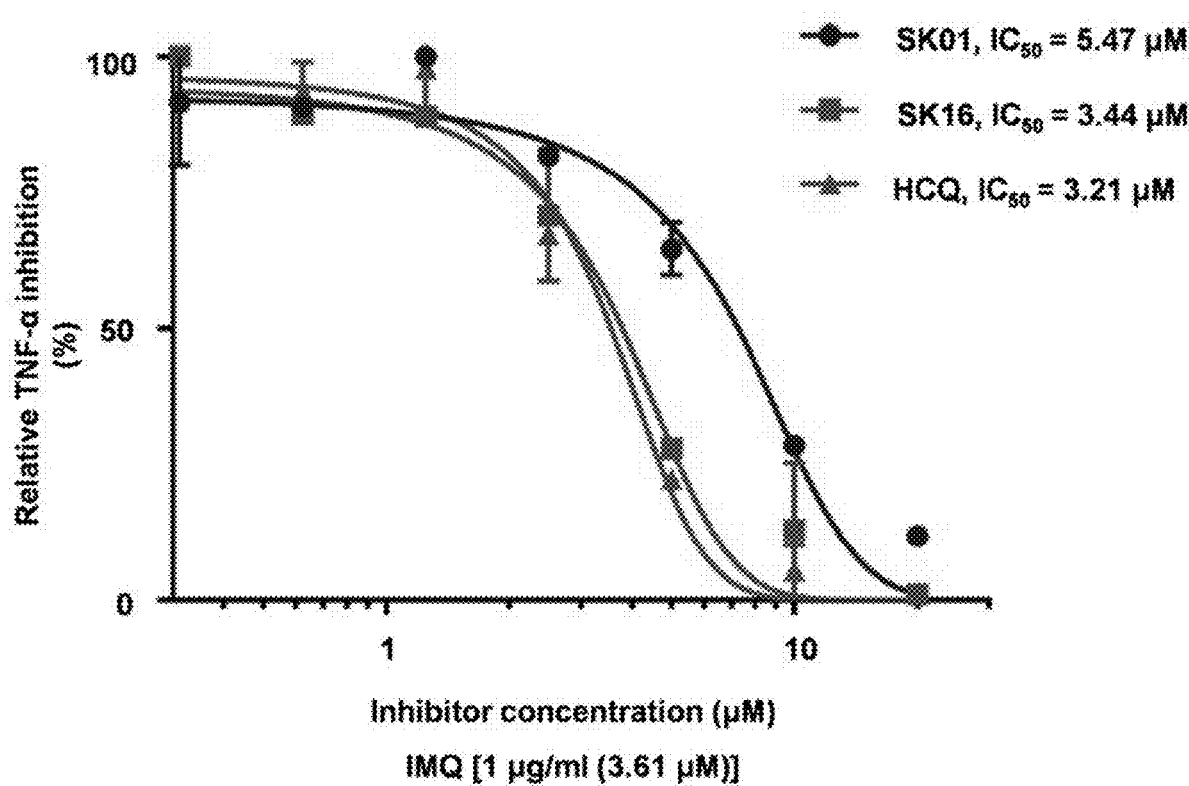
Figure 4D:
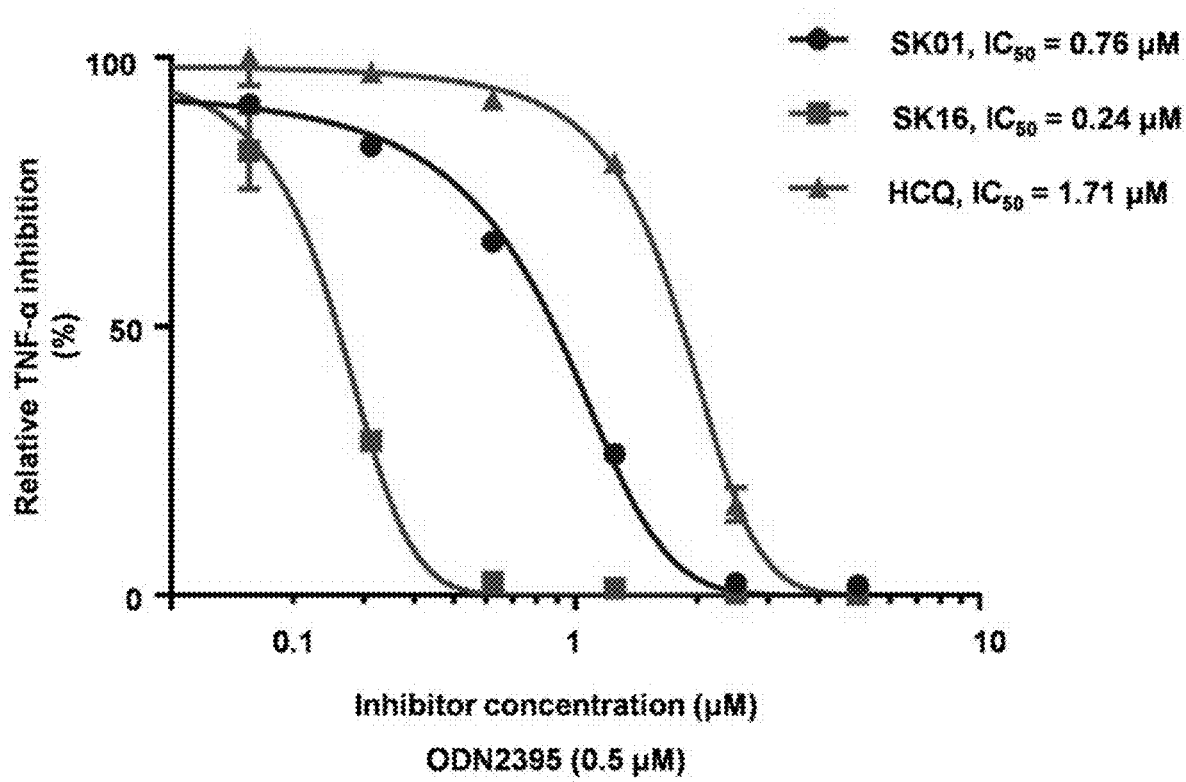
Figure 5A:
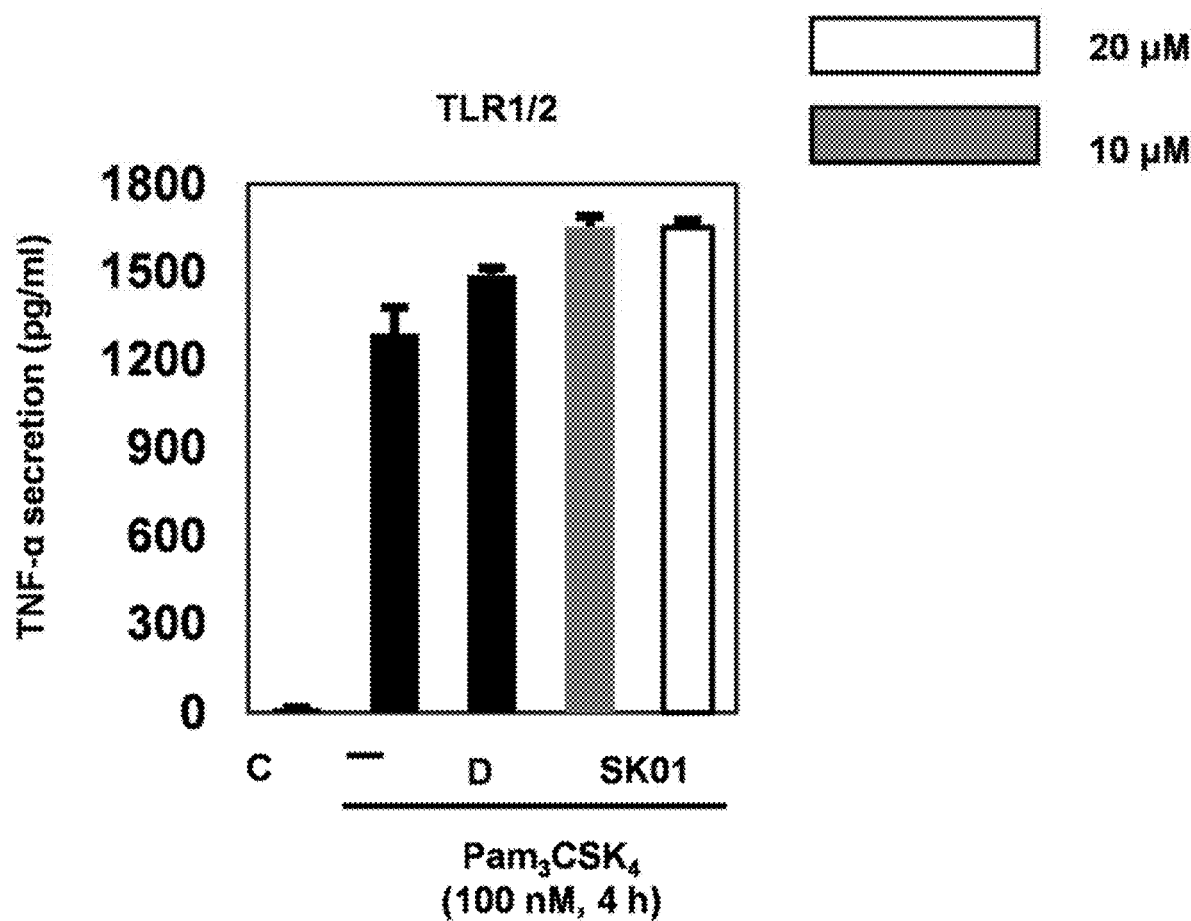
FIG. 5A to 5G are graphs showing the effects of SK01 on the signaling pathway of the cognate TLR.
Figure 5B:
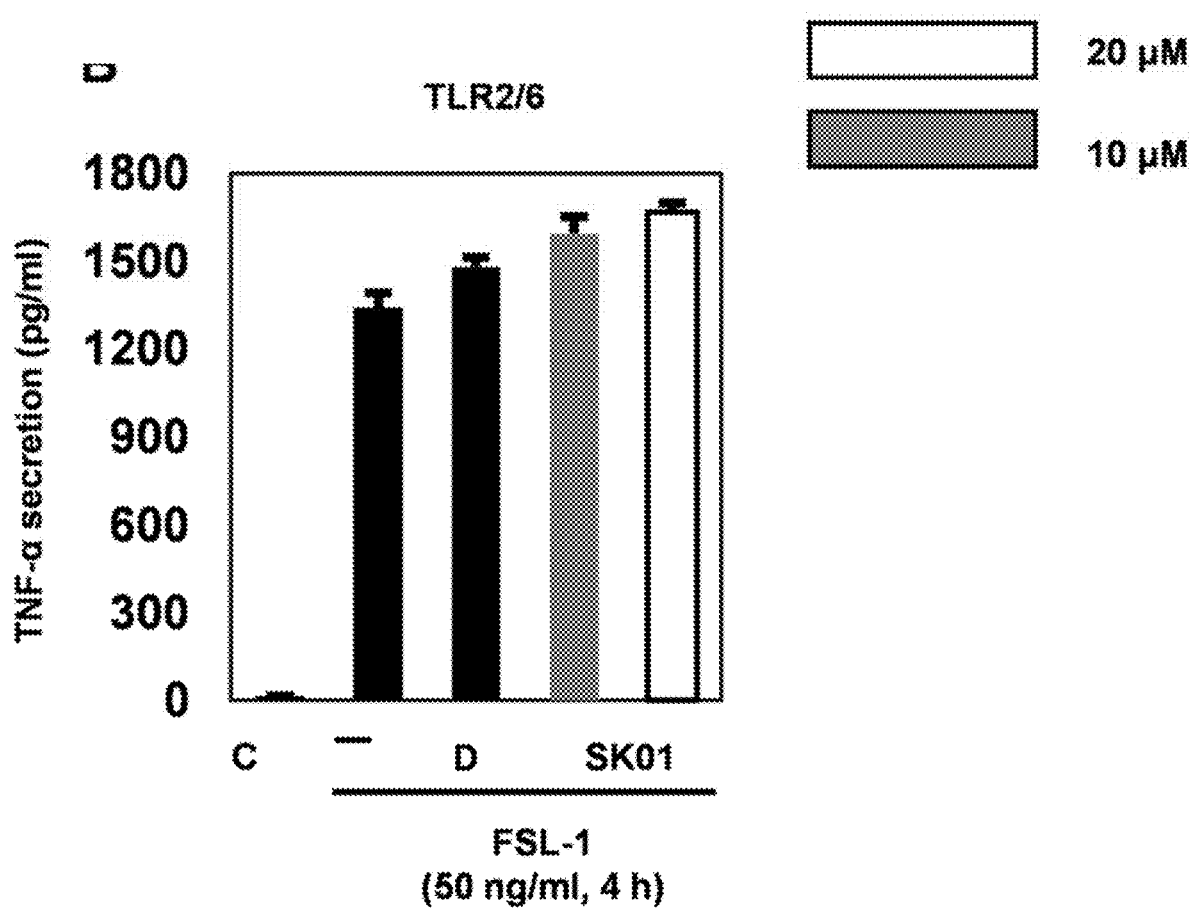
Figure 5C:
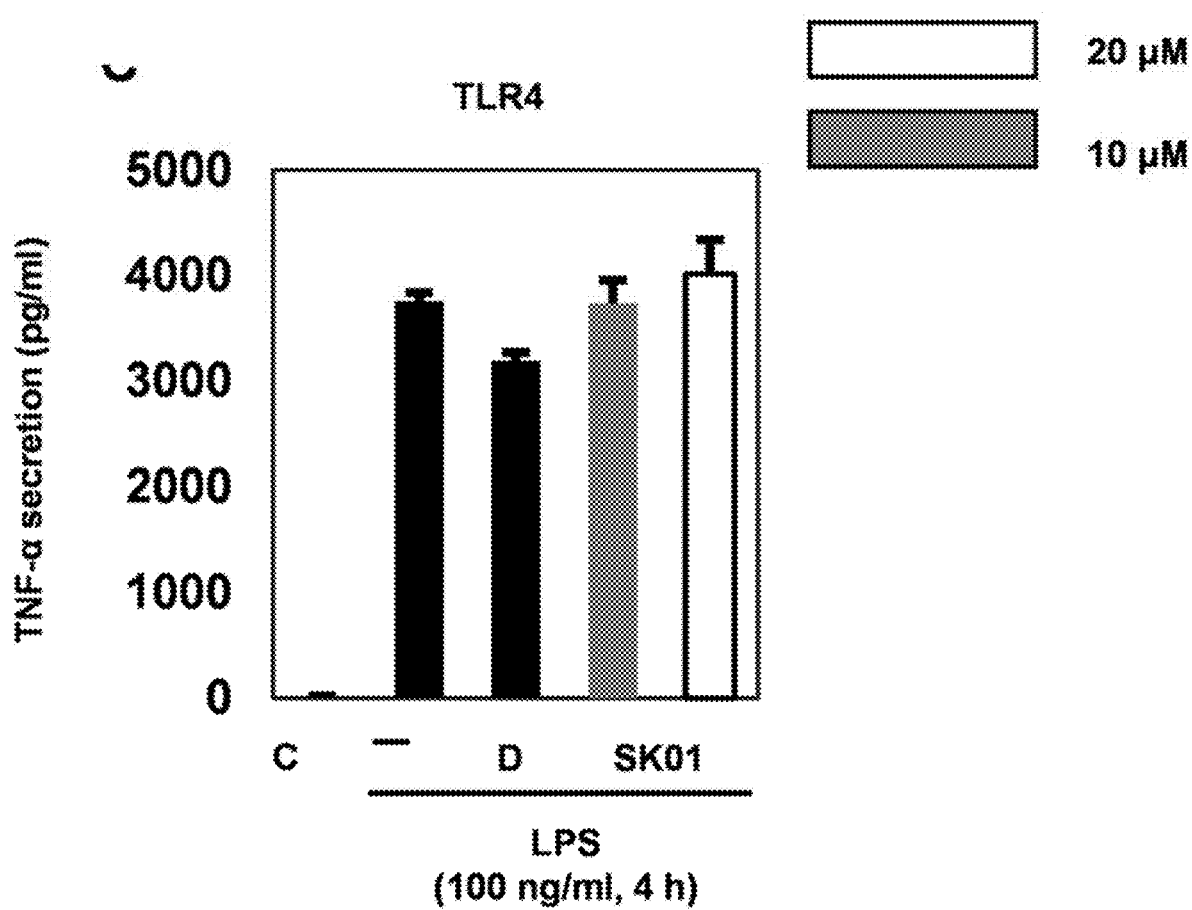
Figure 5D:
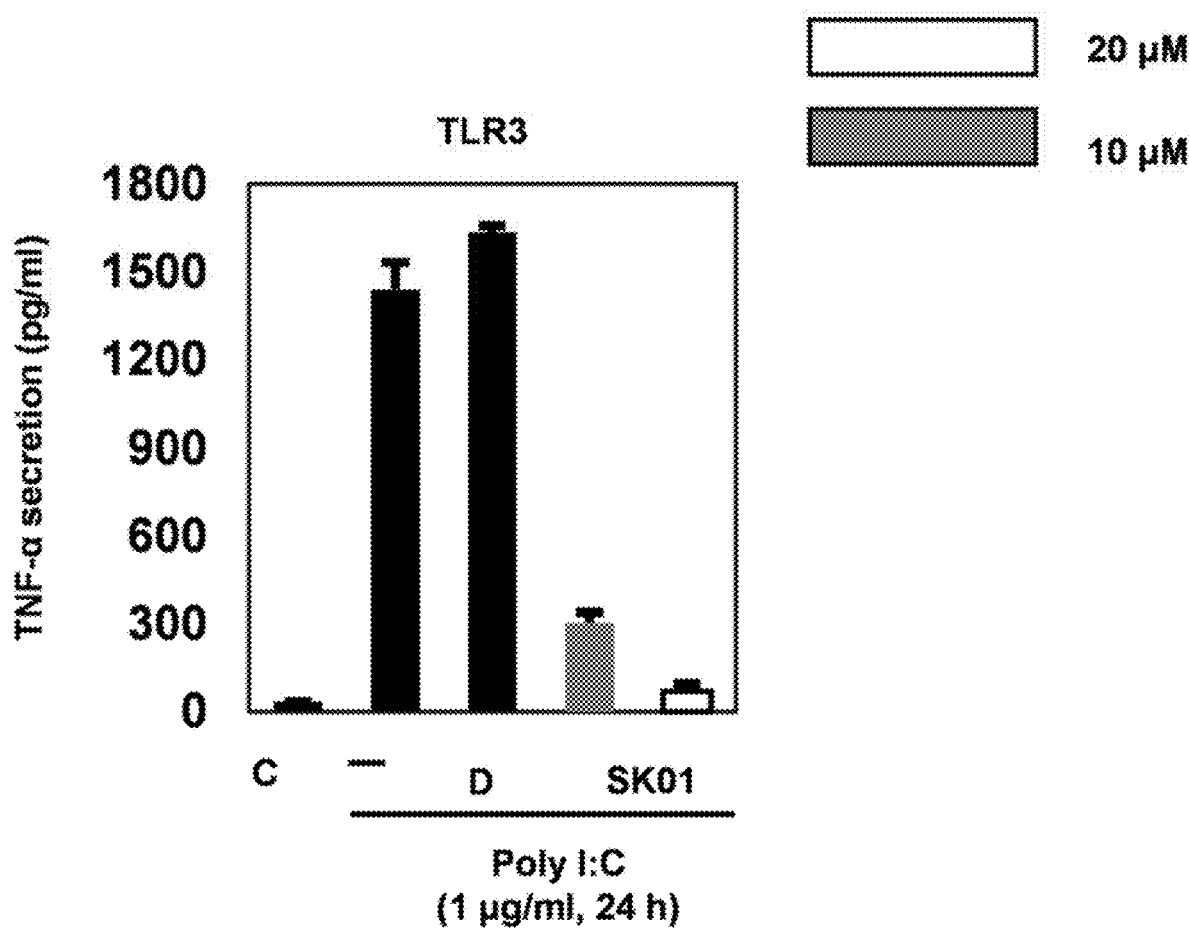
Figure 5E:
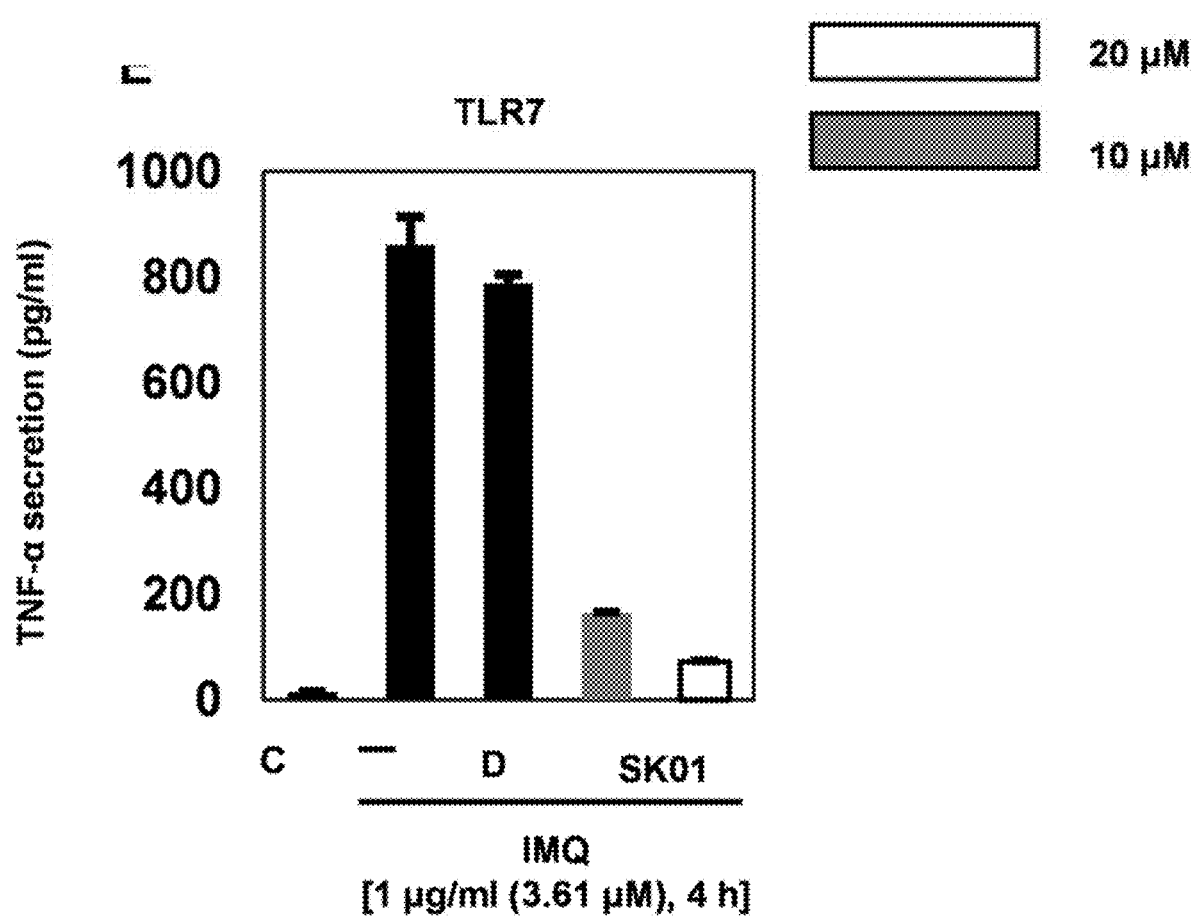
Figure 5F:
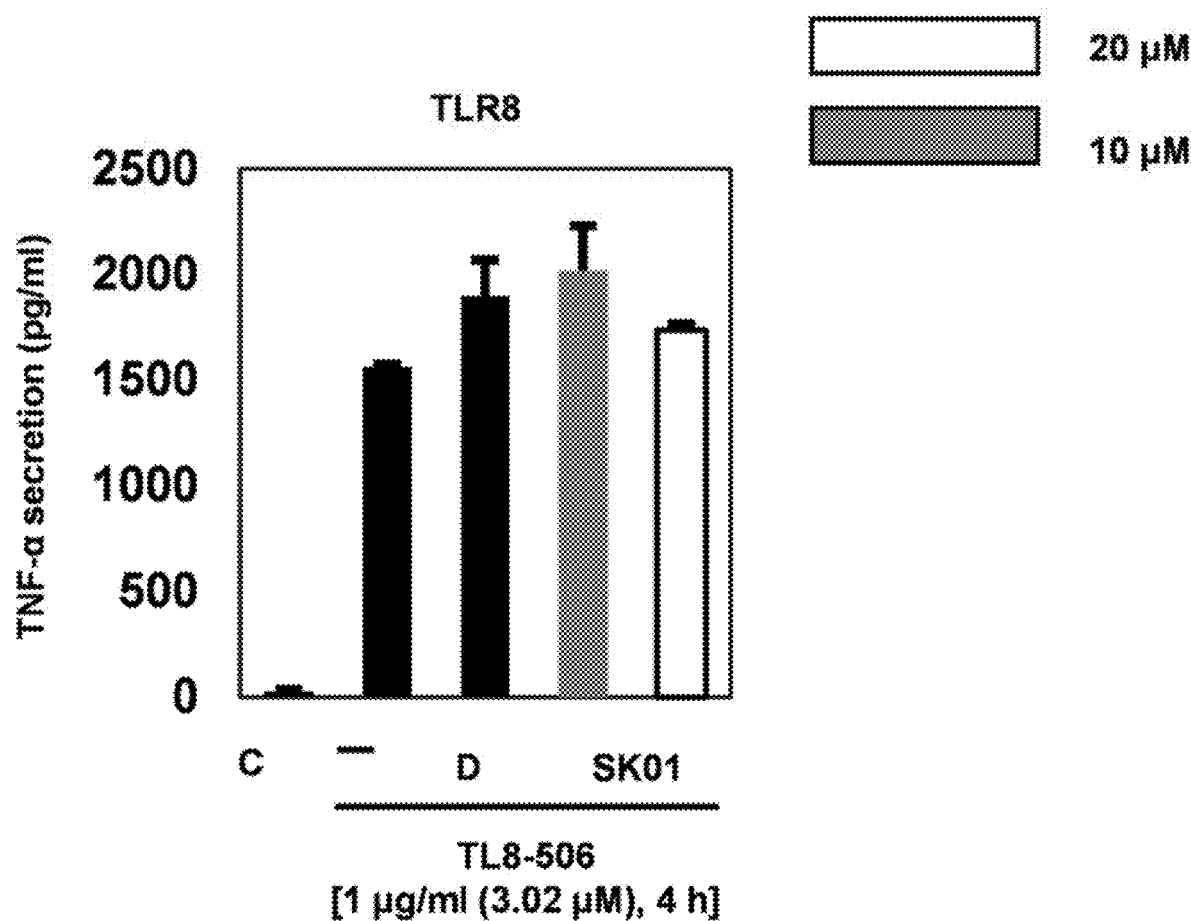
Figure 5G:
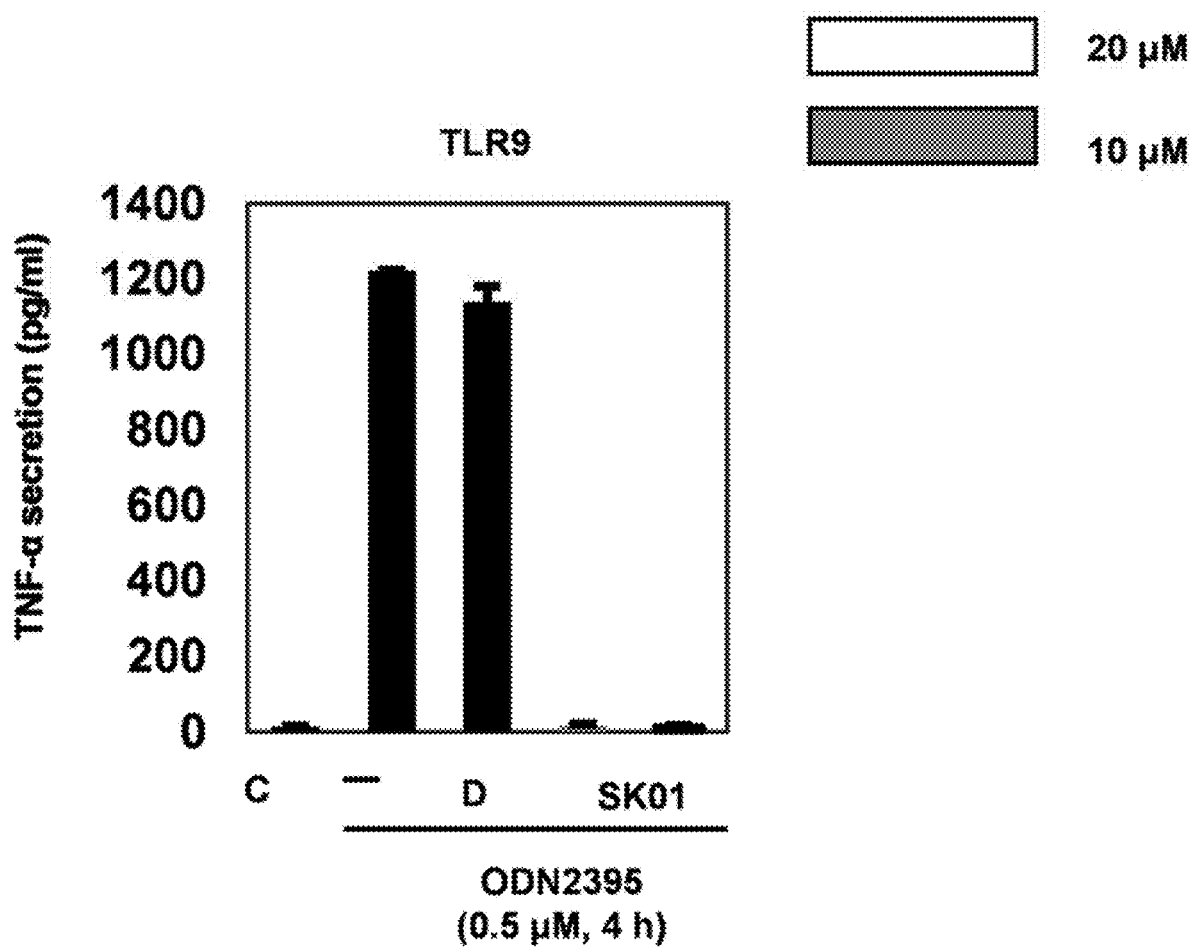
Figure 6A:
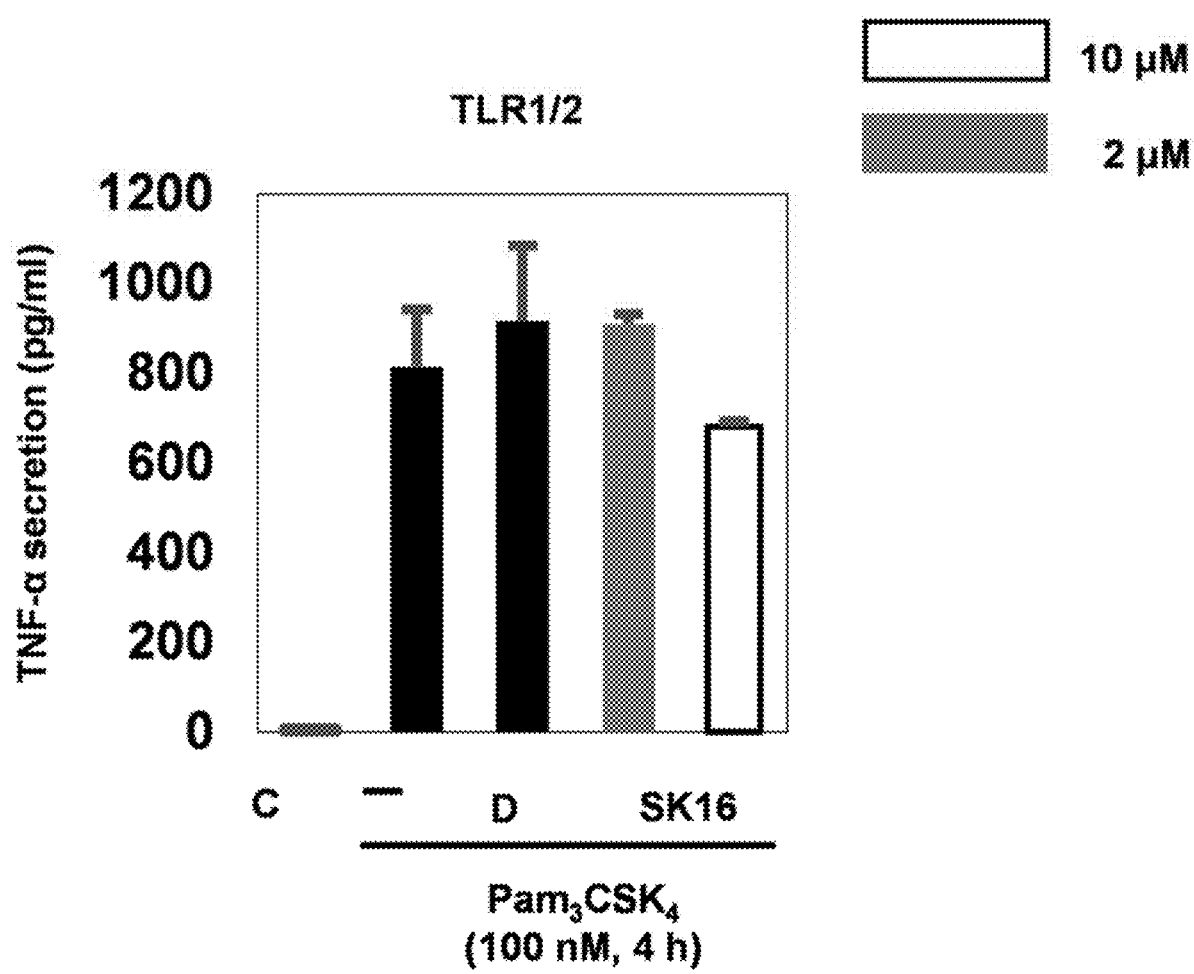
FIGS. 6A to 6H are graphs showing the effect of SK16 on the signaling pathway of the cognate TLR.
Figure 6B:
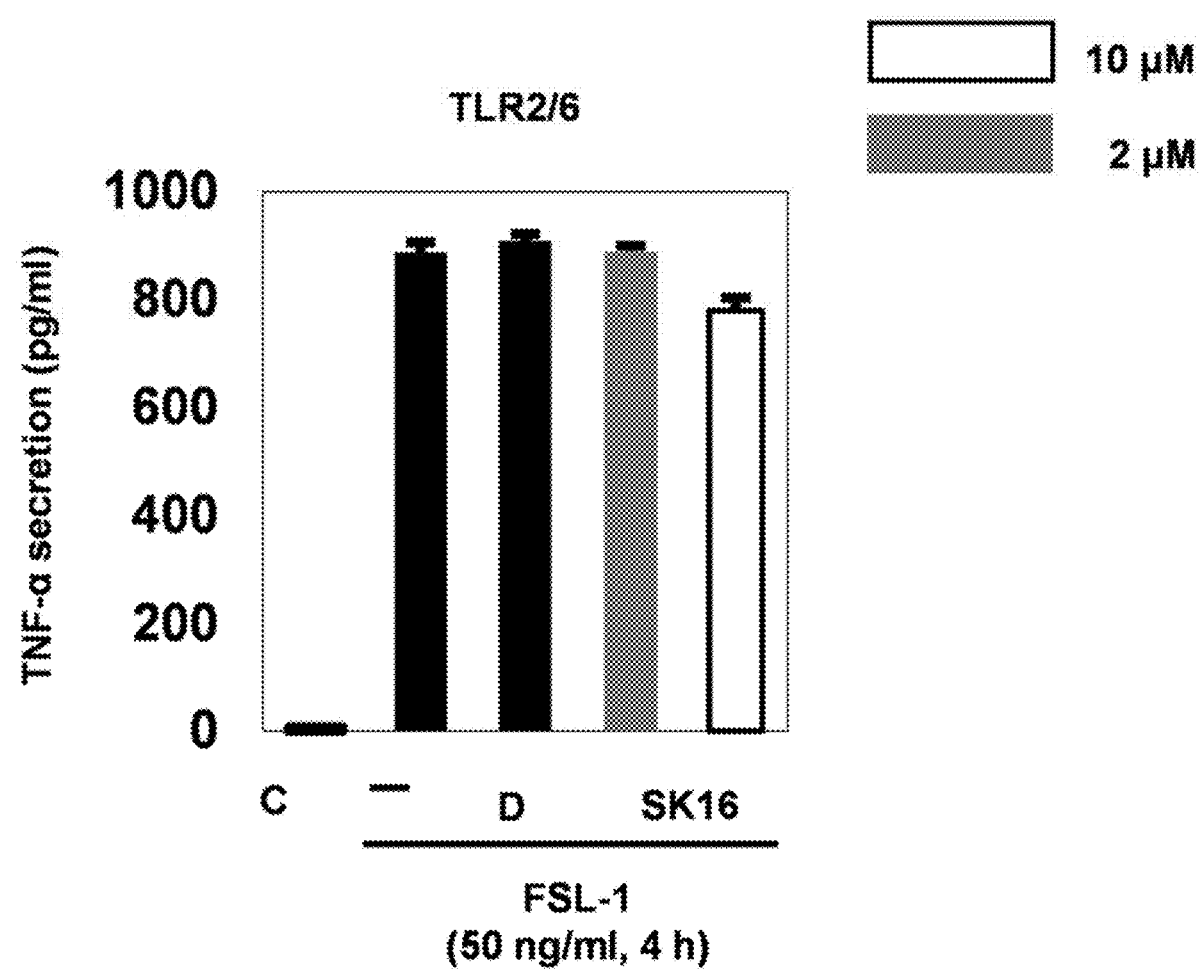
Figure 6C:
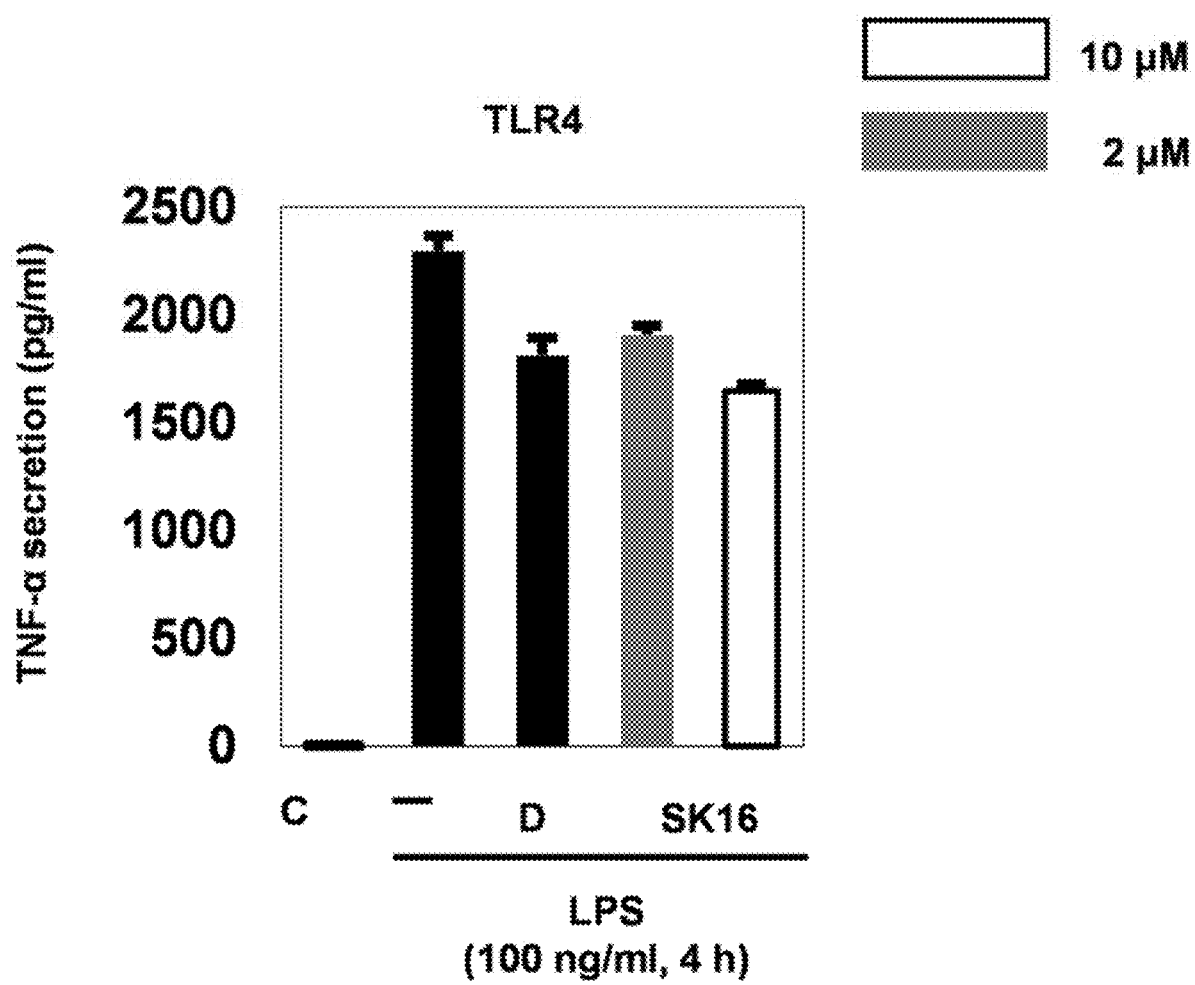
Figure 6D:
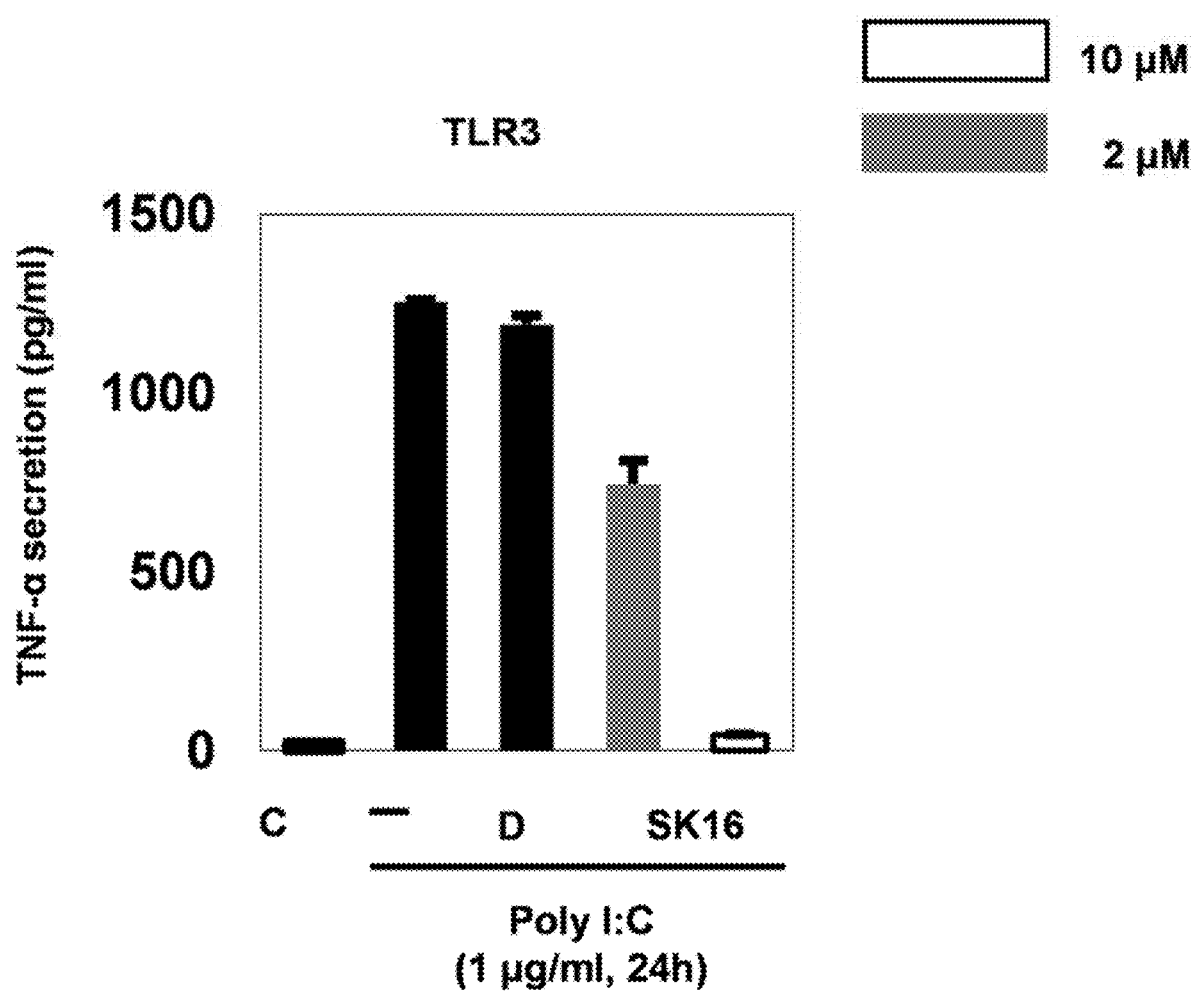
Figure 6E:
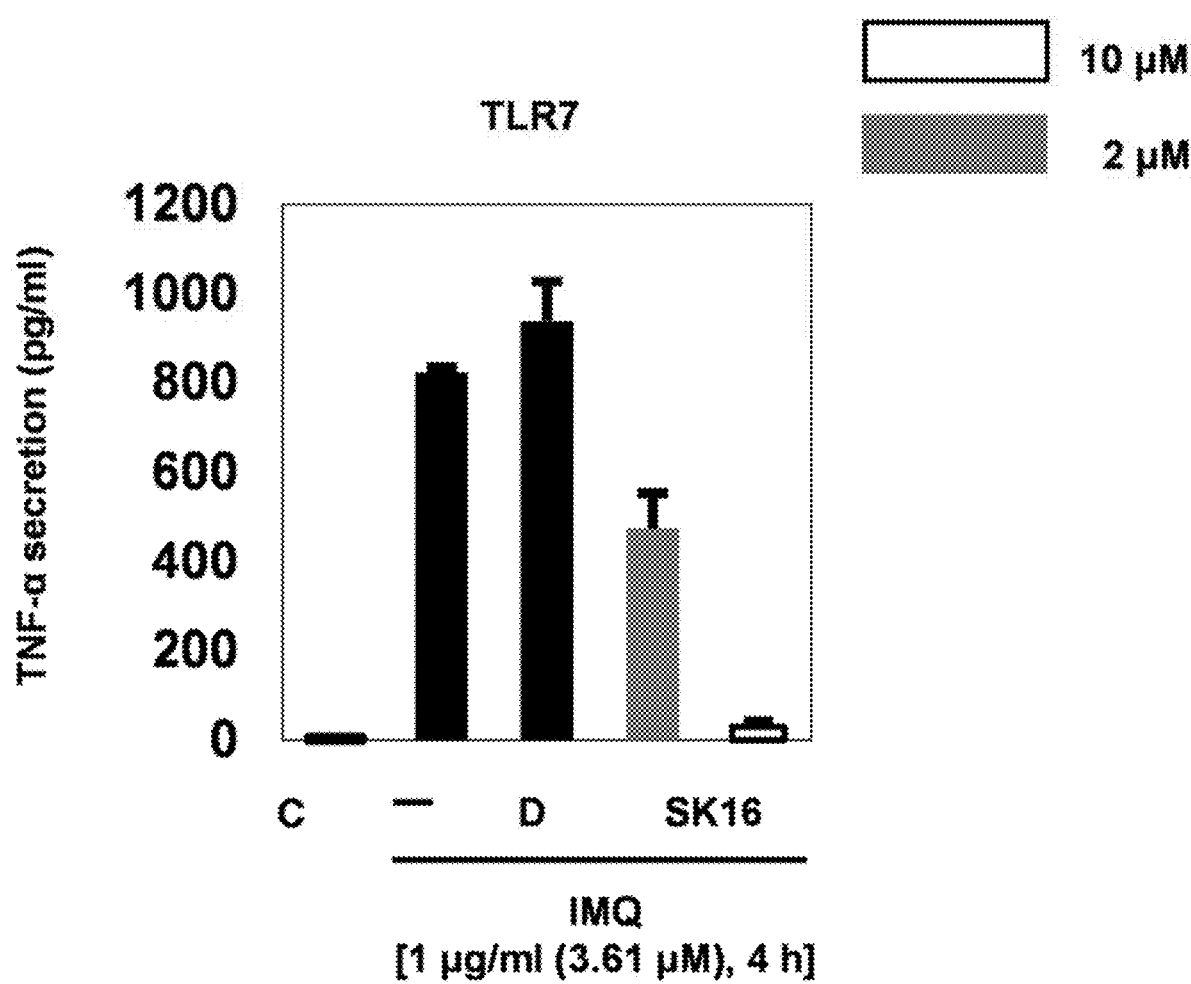
Figure 6F:
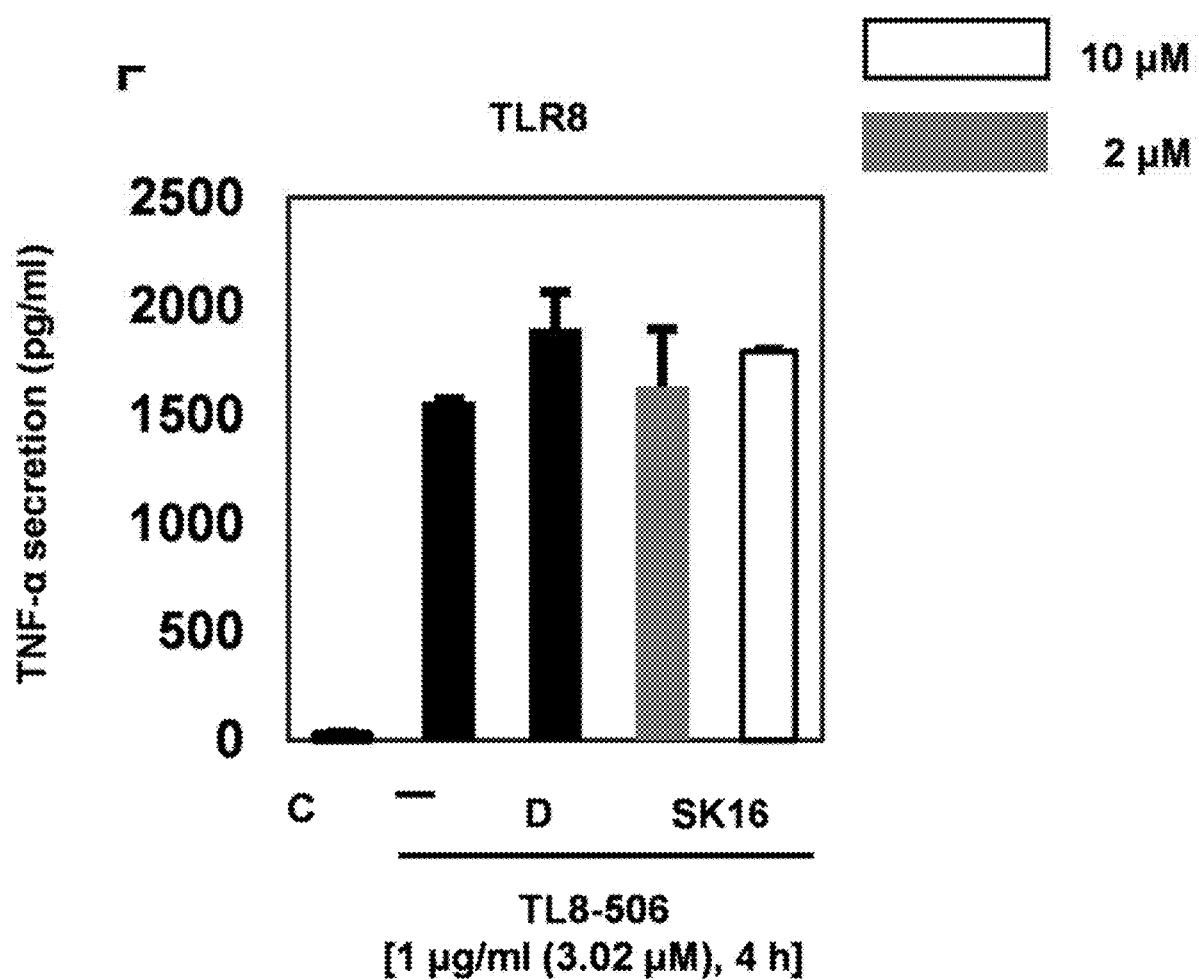
Figure 6G:
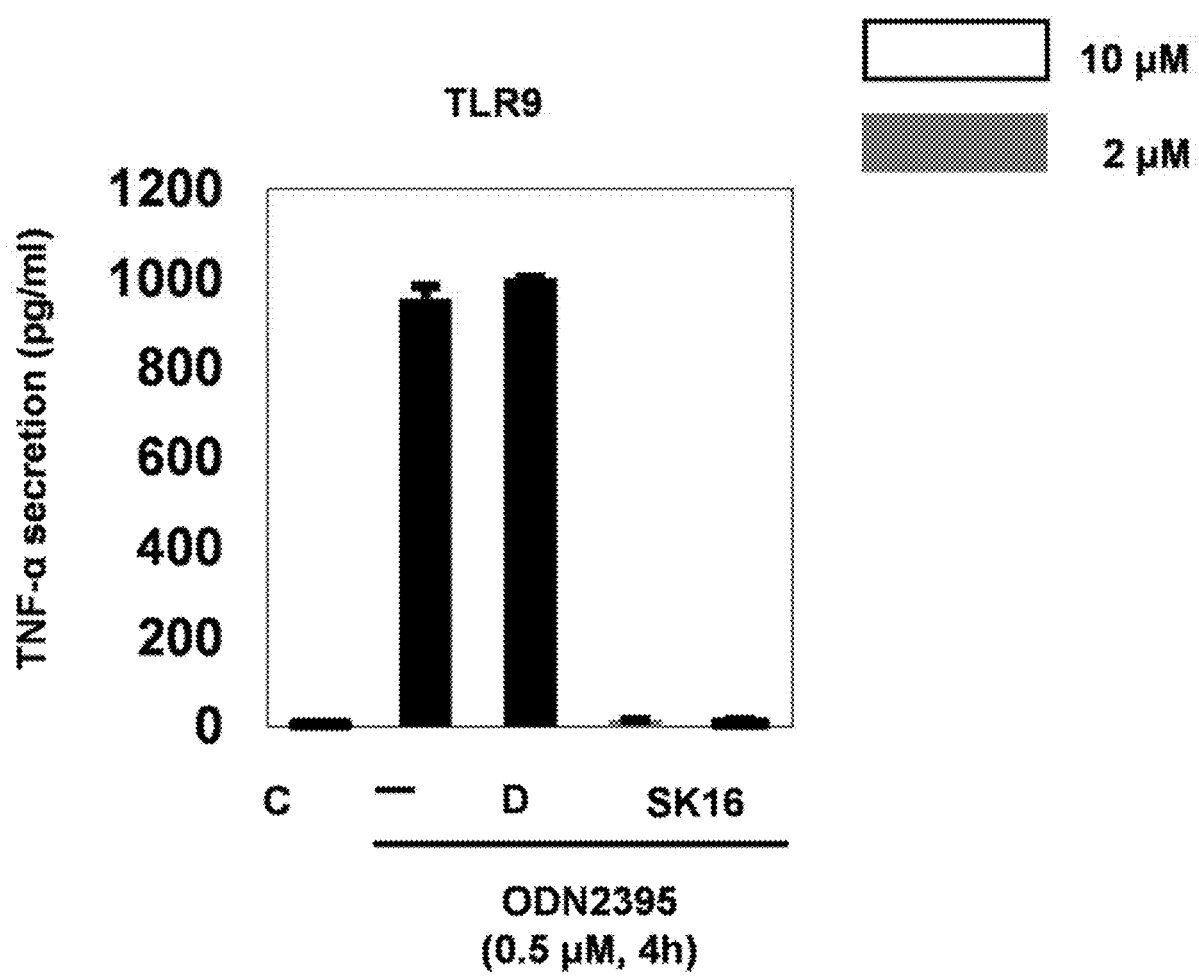
Figure 6H:
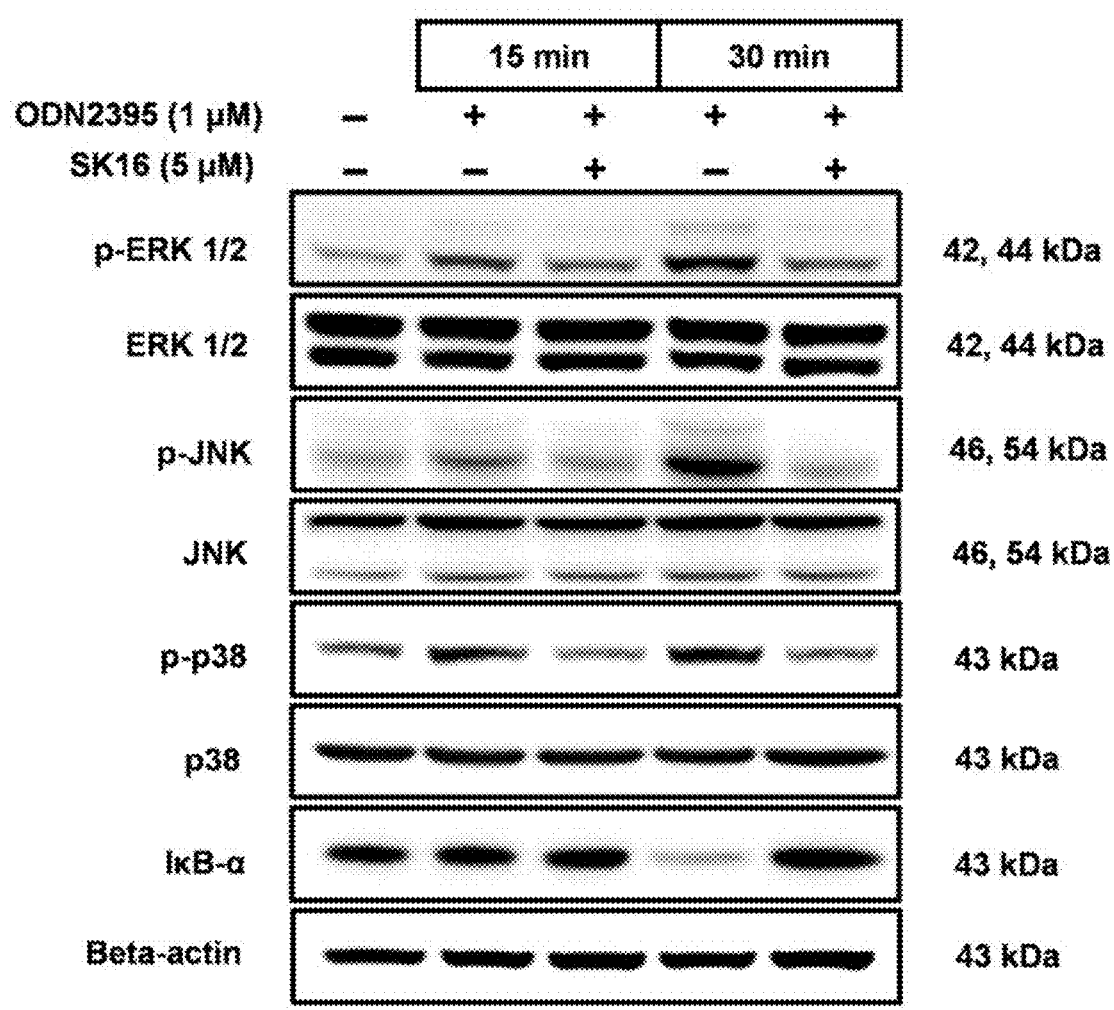

In order to identify ligands with a structural similarity of 80% or more (i.e., Tanimoto metrics, cutoff=0.8), the Mol-Port database (https://www.molport.com/shop/index) was searched to find the SK01 structure. A total of 100 derivatives were downloaded as SDF files and processed in MOE. The ligands were washed using MOE's sdwash protocol and the energy was minimized. Assuming that SK01 must bind to the extracellular domain of the receptor to exert the inhibitory activity thereof, all ligands were docked along with SK01 into the small molecule-binding cavity (R848) of the TLR7 structure. Docking poses were ranked according to the calculated binding affinity designated as the S score. Ligands having greater affinity for TLR7 than SK01 were selected for experimental validation of activity. The inhibitory ability against TLR9 of the selected SK02 to SK20 candidates at 5 uM was detected (FIG. 2), and based on this, six compounds were selected to determine the inhibitory activity with conventional SK01 at lower concentrations (2 and 5 µM) (FIG. 3). This process shows that SK16 exhibited the best inhibitory activity among the structural analogues of SK01 (FIG. 4A to FIG. 6H) and modification was further performed based thereon.

Example 5: Identification of Potential Inhibitors of Endosomal TLRs

Figure 7:
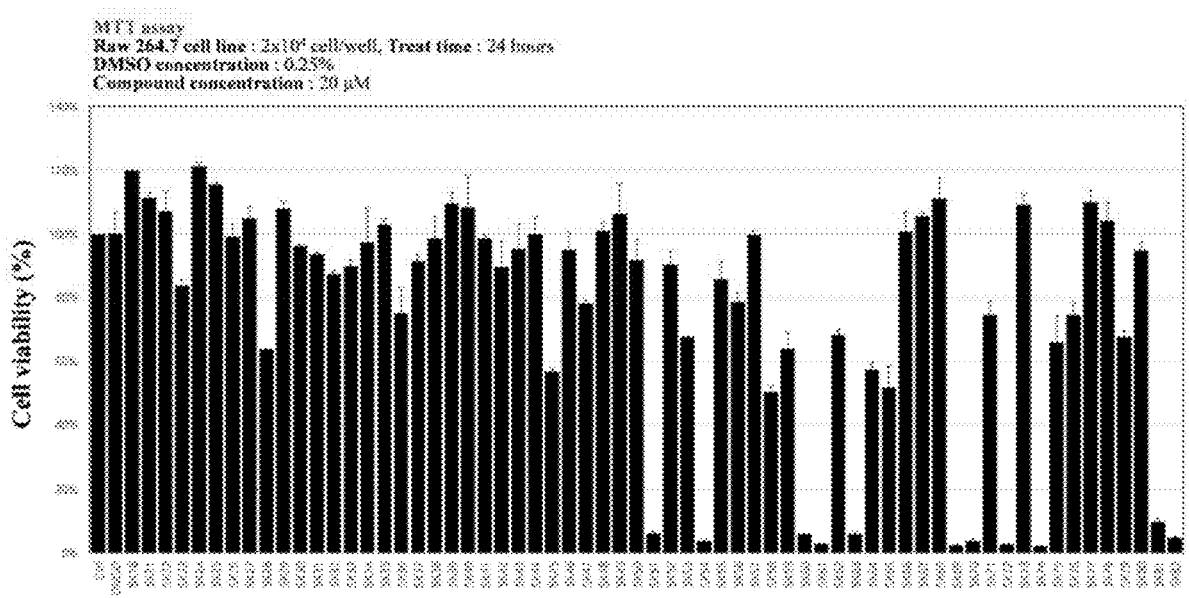
FIG. 7 is a graph showing the cytotoxicity of inhibitor candidates SK21 to SK82, including SK16.
Figure 8:
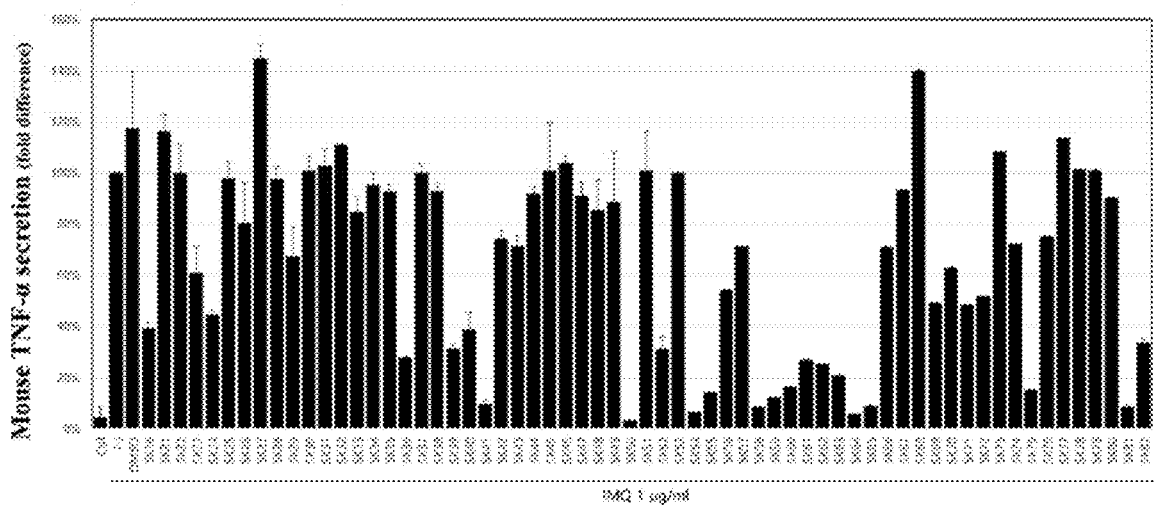
FIG. 8 is a graph showing the inhibition of TLR7 by inhibitor candidates SK21 to SK82, including SK16.
Figure 9:
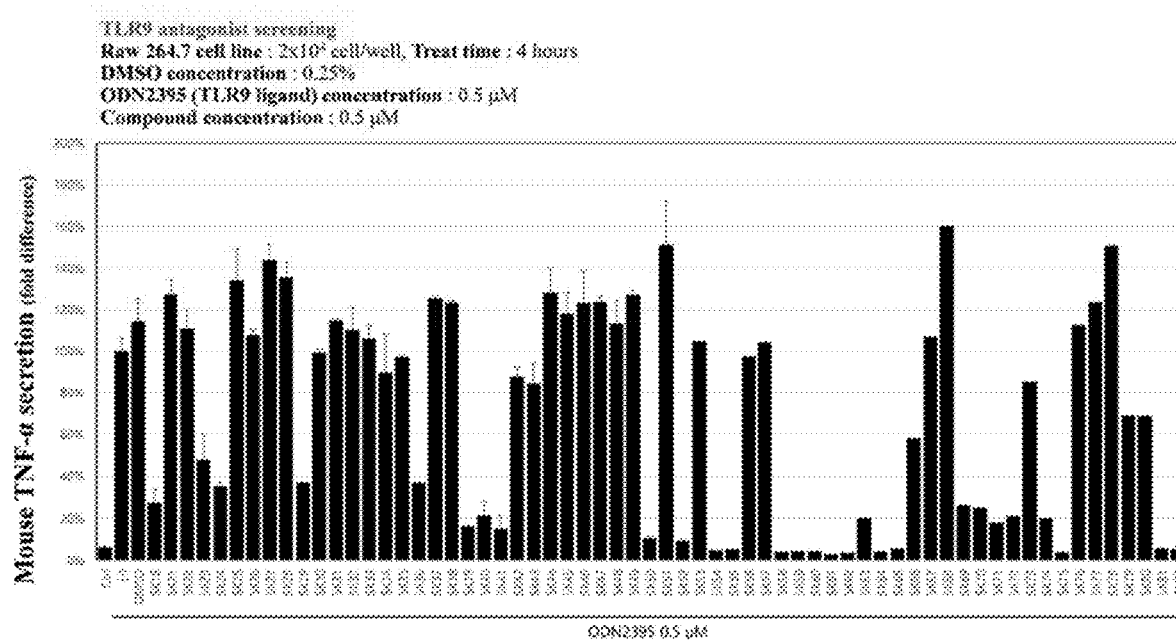
FIG. 9 is a graph showing the inhibition of TLR9 by inhibitor candidates SK21 to SK82, including SK16.

In order to select potential inhibitory molecules against TLR3/TLR7/TLR8/TLR9 activation, first, MTT (3-(4,5-dimethylthiazol-2-yl)-2,5-diphenyltetrazolium bromide) cell viability assay (FIG. 7) was performed upon treatment with a set of ligands from SK21 to SK82 at a concentration of 20 µM and the inhibitory activity thereof was evaluated by an ELISA assay to monitor the level of TNF-α secretion in RAW 264.7 cells. The experimental ligands from SK21 to SK82 were administered at 0.5 µM or 2 µM to the RAW 264.7 cells and stimulated with Imiquimod (TLR7, 1 µg/ml) and OND2395 (TLR9, 0.5 µM). Among the tested ligands, SK23, SK24, SK29, SK36, SK39, SK40, SK41, SK50, SK52, SK54, SK55, SK58, SK59, SK60, SK61, SK62, SK63, SK64, SK65, SK69, SK70, SK71, SK72, SK 74, SK75, SK81, and SK82 exhibited significant inhibitory activity against TLR7 and TLR9 in a dose-dependent manner (FIGS. 8 and 9).

In order to verify, as specific novel drugs, the potential of 13 compounds among the significant candidates identified in the initial screening stage, the $LC_{50}$ of each compound and positive control, HCQ, and $IC_{50}$ of TLR7 and TLR9, and therapeutic indexes calculated using these two values are shown in a table (FIG. 10). All of the primarily selected 13 compounds had higher inhibitory concentrations in TLR7 and TLR9 than HCQ, and 4 candidates (SK41, SK50, SK58 and SK64) having lower toxicity ($LC_{50}$) and excellent TI were selected therefrom.

Figure 11:
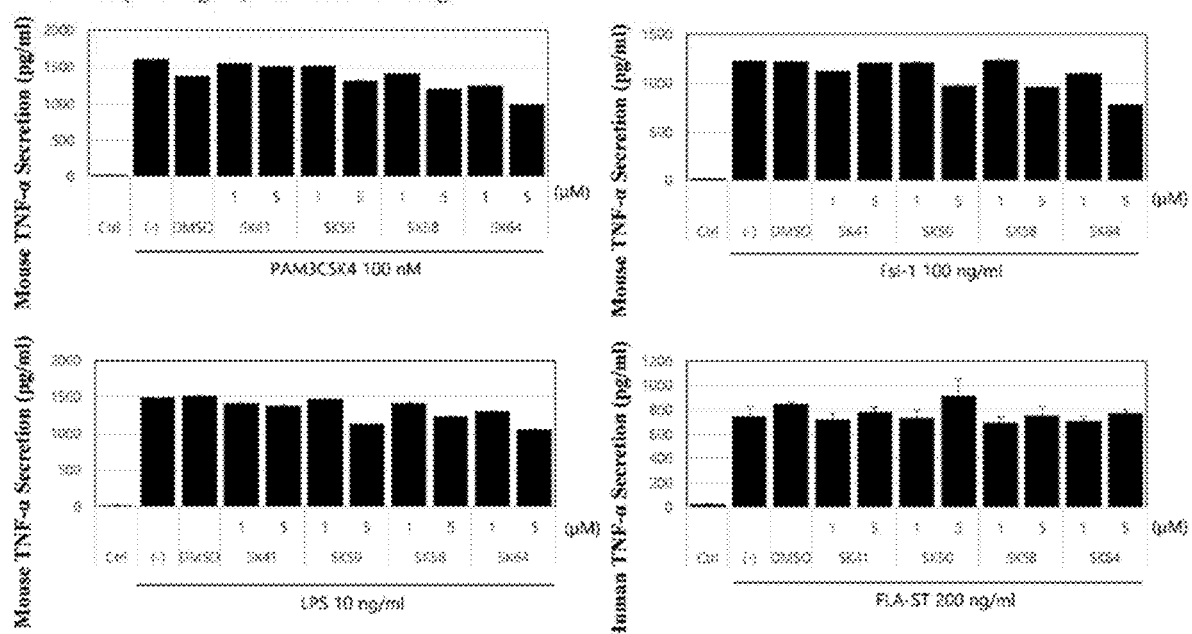
FIG. 11 is a graph showing the inhibitory effects of SK41, SK50, SK58, and SK64 against surface TLRs, TLR1/2, TLR2/6, TLR4, and TLR5.
Figure 12:
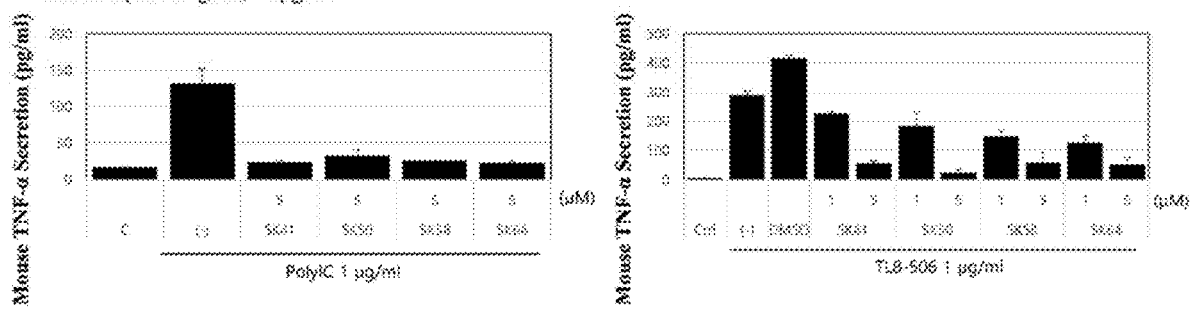
FIG. 12 is a graph showing the inhibitory effects of SK41, SK50, SK58 and SK64 against TLR3 and TLR8, which are endosome TLRs.

In order to determine the inhibitory activities of SK41, SK50, SK58 and SK64 on various TLR signaling pathways, RAW 264.7 cells were cultured along with each compound and then stimulated with different TLR agonists. The TLR agonists used herein were Pam3CSK4 (TLR1/2), FSL-1 (TLR2/6), LPS (TLR4) and FLA-ST (TLR5) as cell surface TLRs, and poly I:C (TLR3) and TL8-506 (TLR8) as endosomal TLRs. The result of measurement of the TNF-α secretion level using ELISA showed that SK41, SK50, SK58 and SK64 did not exhibit a specific inhibitory activity against cell surface TLRs, TLR1/2, TLR2/6, TLR4 and TLR5 (FIG. 11), but exhibited strong inhibitory activity against endosomal TLRs, TLR3 and TLR8 (FIG. 12).

Figure 13:
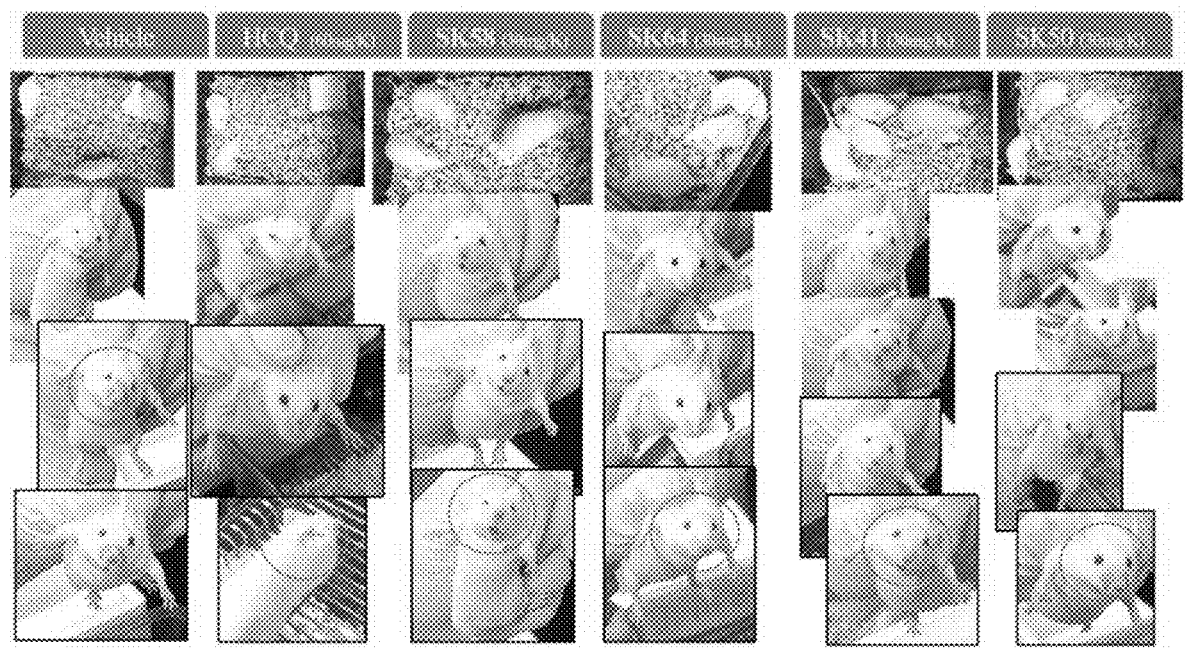
FIG. 13 is images showing changes in appearance in mouse lupus model (MRL/Fas$^{lpr}$ or MRL/lpr) animal experiments after oral administration once a day for 3 weeks (oral administration 2 weeks after onset; 60 mg/Kg for HCQ, 30 mg/Kg for SK series).
Figure 14:
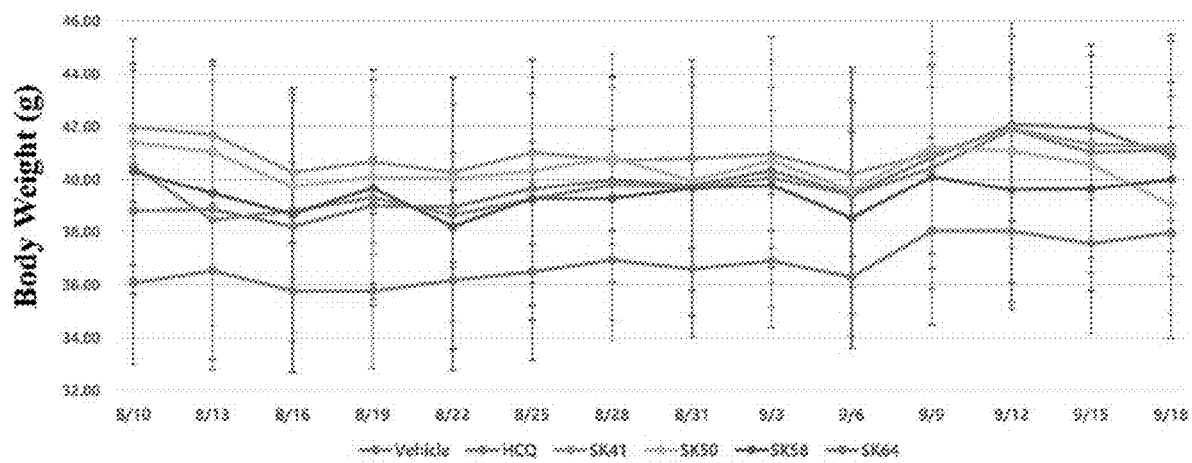
FIG. 14 is a chart showing the result of monitoring of the average weights of mouse experimental groups during the lupus animal experiment.

Example 6: Confirmation of SK Derivatives Exhibiting Therapeutic Effect in MRL/Lpr Lupus Disease Mouse Model SK41, SK50, SK58, and SK64 were selected as test substances to verify efficacy through in vivo animal experiments, and then animal experiments were performed in the MRL/lpr mouse model, which is a naturally occurring lupus animal model. A group administered only vehicle (Vehicle) and a group administered HCQ, which was known as an endosome-TLR inhibitor, were added as experimental control groups. The weight change of all mice was monitored at 3-day intervals during the entire period, which was used as an index for long-term administration toxicity evaluation due to the administration of the test substance. As a result, all administration groups did not exhibit a change in body weight, which means that the visual therapeutic effects (SK41, SK58, and SK64 were superior to HCQ) or changes thereof were not related to toxicity when SK41, SK50, SK58, and SK64 were administered (FIGS. 13 and 14).

Figure 15:
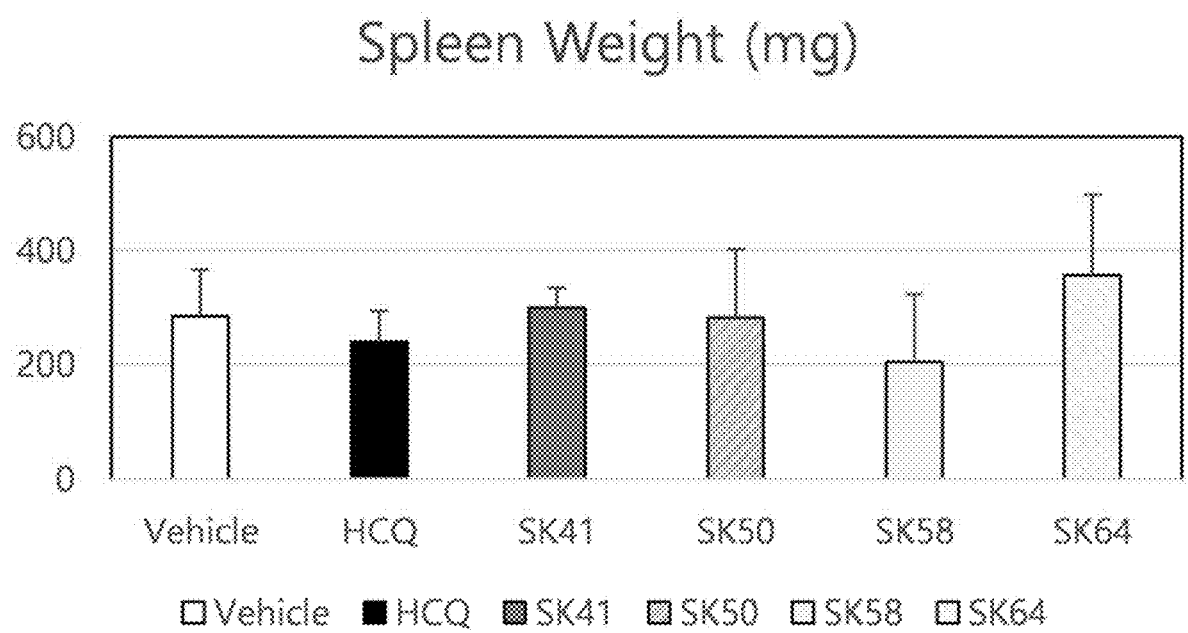
FIG. 15 is a chart showing the weights of the spleen and lymph nodes collected at the end of lupus animal experiments (40 days after oral administration).
Figure 15:
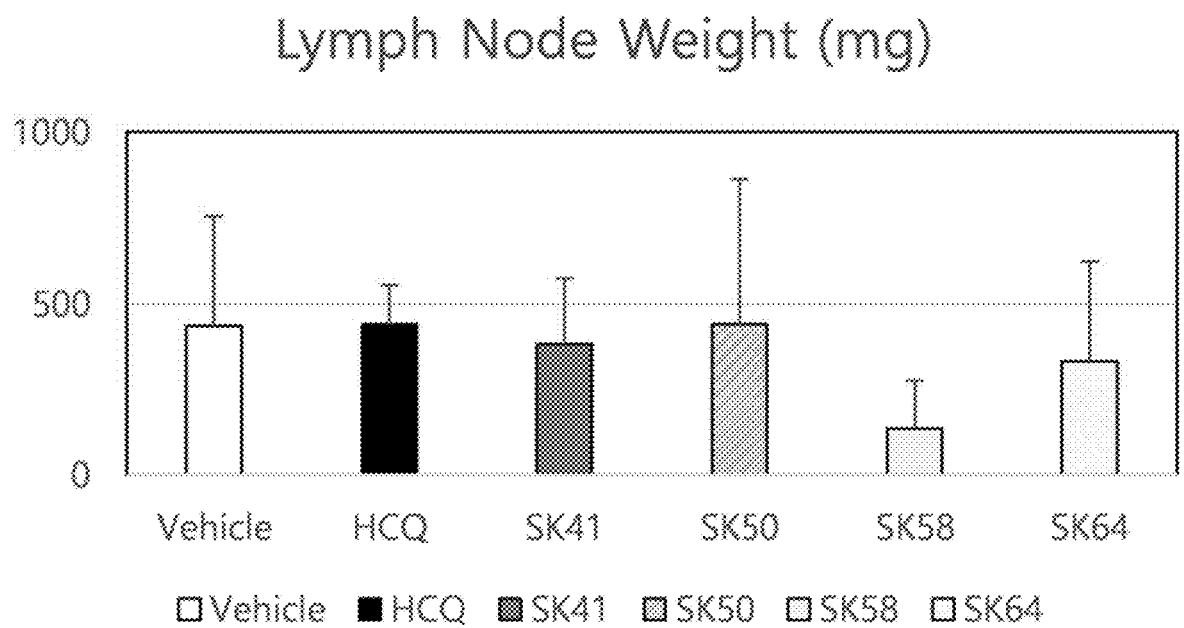

After administration for 40 days, the mice were euthanized and samples of spleen, lymph nodes, and kidneys were collected therefrom. No specific visual changes were observed in the spleen. The appearance of the lymph nodes where antigens in the lymph fluid result in immune reactions was observed. As a result, it was relatively good in the SK58 experimental group, whereas all of the SK41 experimental group had small inguinal lymph node sizes. The weight of the spleen and lymph node of each mouse was measured and the result showed that the spleen and lymph node of the SK58 experimental group were relatively less swollen (FIG. 15).

Figure 16:
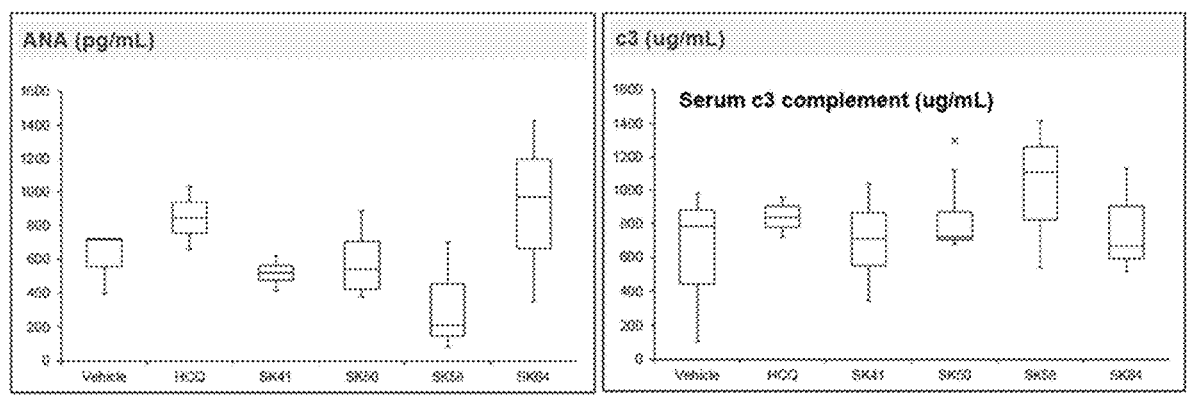
FIG. 16 is a chart showing the result of enzyme-linked immunosorbent assay to analyze the concentration of the anti-nuclear antibody (ANA) and the $C_3$ complement in plasma collected at the end of the lupus animal experiments.

The antinuclear antibody (reaches normal as it decreases) and C3 complement (reaches normal as it increases), which are molecular markers of lupus disease, in blood plasma collected from the heart of mice immediately after euthanasia of the mice were tracked, and as a result, significant results were obtained in SK41 and SK58 (FIG. 16). Compared to the negative control group treated with only the vehicle and the positive control group treated with HCQ, especially, the SK58 experimental group included low antinuclear antibody and high C3 complement, which means that it has a high potential as a potent candidate.

Figure 17:
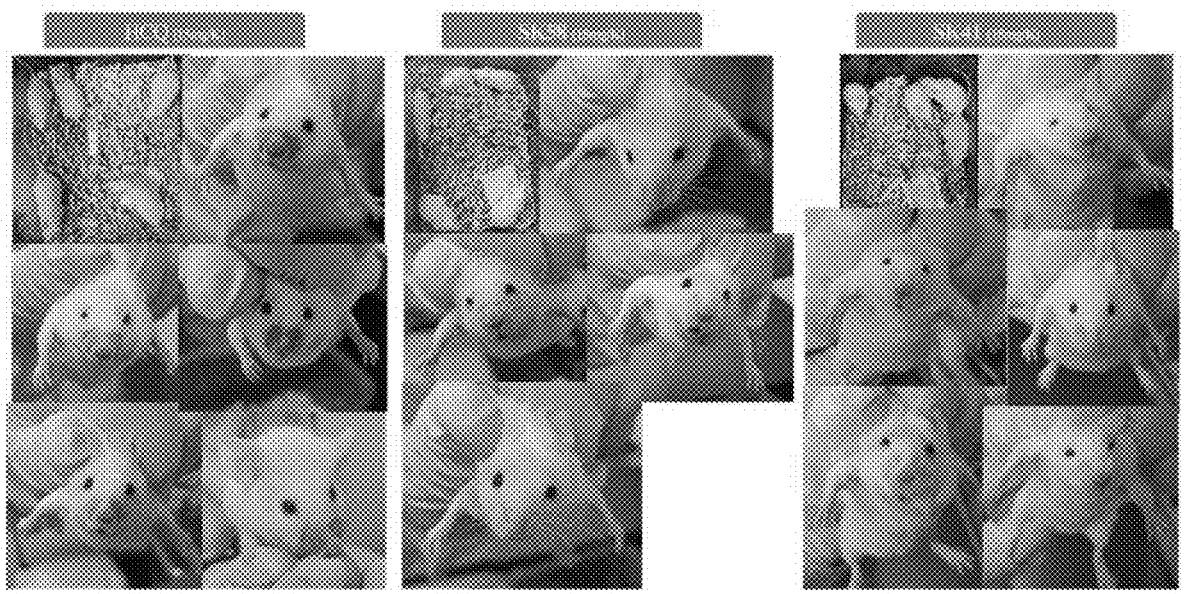
FIG. 17 is images showing changes in appearance in mouse lupus model (MRL/Fas$^{lpr}$) animal experiments after oral administration once a day for 4 weeks (oral administration 3 weeks after onset; 15 mg/Kg for HCQ, 15 mg/Kg for SK series).

The results of FIGS. 13 to 16 are obtained by treatment with HCQ (60 mg/Kg) at twice the dose of the SK series (30 mg/Kg), and the result of FIG. 17 is obtained by administration of 15 mg/Kg which is identical to a daily dose for direct comparison of the therapeutic effect with HCQ, a competitive substance. SK41 and SK58 exhibited superior visual (apparent) healing effect to that of HCQ (FIG. 17).

The results of determination of the inhibitory activities of TLR7 and TLR9 at low concentrations showed that SK23, SK24, SK29, SK36, SK39, SK40, SK41, SK50, SK52, SK54, SK55, SK58, SK59, SK60, SK61, SK62, SK63, SK64, SK65, SK69, SK70, SK71, SK72, SK74, SK75, SK81, and SK82, were identified as effective novel compounds and all of these substances significantly reduced the levels of TLR7/TLR9-mediated TNF-α secretion, suggesting that they are effective inhibitors of TLR7/9 signaling. In addition, SK41, SK50, SK58, and SK64 exhibited no inhibitory activities against TLR1/2, TLR2/6, TLR4, or TLR5 in the cell surface TLR signaling pathways, but exhibited specific inhibitory activities against TLR3 and TLR8. This indicates that all of SK24, SK29, SK36, SK39, SK40, SK41, SK50, SK52, SK54, SK55, SK58, SK59, SK60, SK61, SK62, SK63, SK64, SK65, SK69, SK70, SK71, SK72, SK74, SK75, SK81, and SK82 have the effect of controlling endosomal TLRs.

INDUSTRIAL APPLICABILITY

The novel compound according to the present invention can block the secretion of TNF-α induced by Poly I:C (TLR3 agonist), Imiquimod (TLR7 agonist), TL8-506 (TLR8 agonist) or ODN2395 (TLR9 agonist) and inhibit the production of inflammatory cytokines, thus being particularly useful for prevention or treatment of TLR3, TLR7, TLR8 or TLR9-related autoimmune diseases, inflammatory diseases and viral diseases, including systemic lupus erythematosus and psoriasis.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A compound represented by of the following Formula 1, an isomer thereof, or a pharmaceutically acceptable salt thereof:

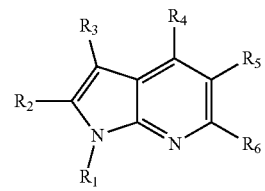

[Formula 1]

wherein $R_1$ to $R_6$ are substituents selected from the group consisting of the following substituents:

$R_1$:

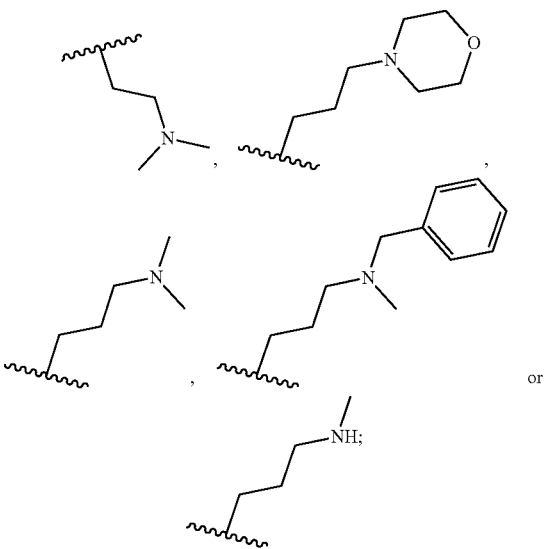

R₂:
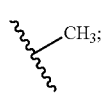
R₃:
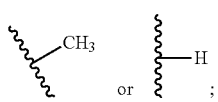
or
R₂ and R₃:
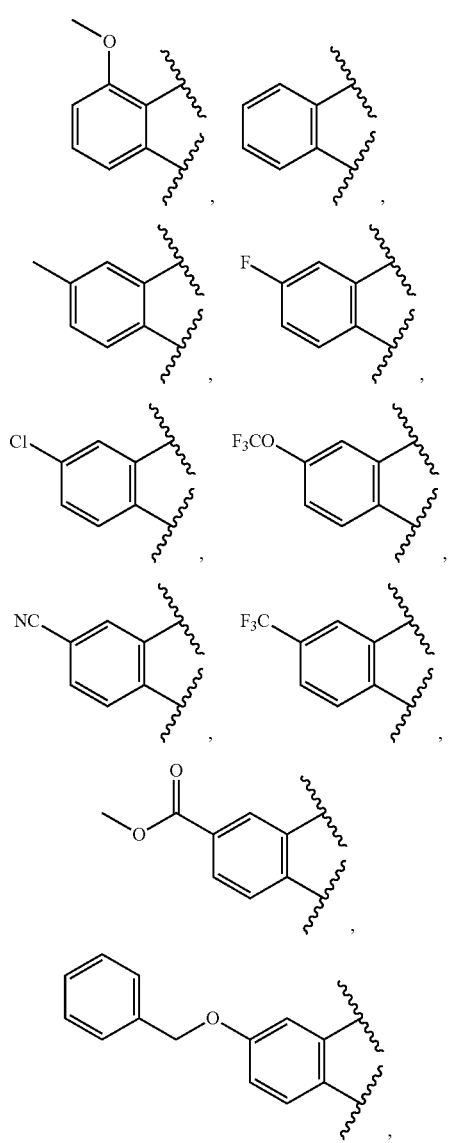
-continued
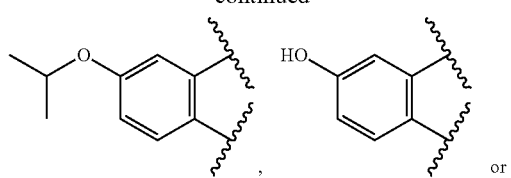
;
R₄:
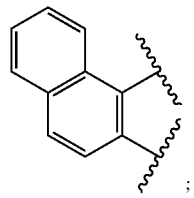
;
R₅:
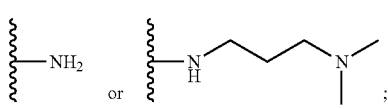
;
R₆: or
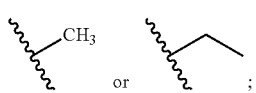
or
R₅ and R₆:
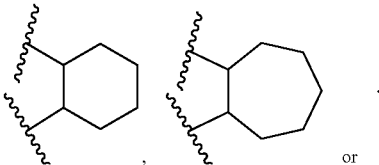
.
2. The compound according to claim 1, wherein the compound of Formula 1 is a compound represented by any one selected from the group consisting of the following Formulas 1-1 to 1-34:

[Formula 1-1]
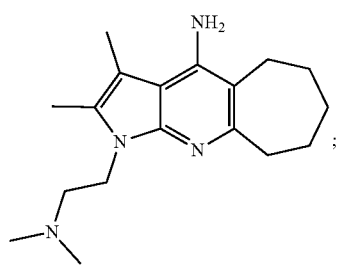
[Formula 1-2]
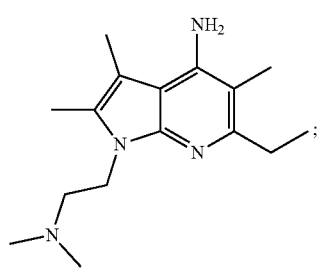
[Formula 1-3]
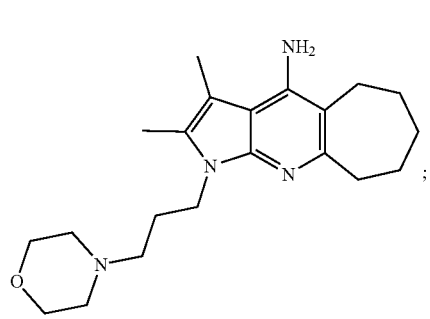
[Formula 1-4]
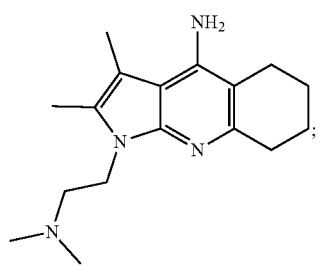
[Formula 1-5]
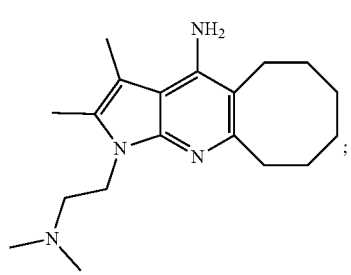
-continued
[Formula 1-6]
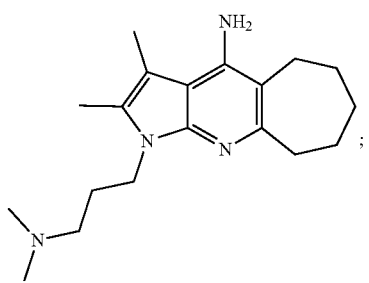
[Formula 1-7]
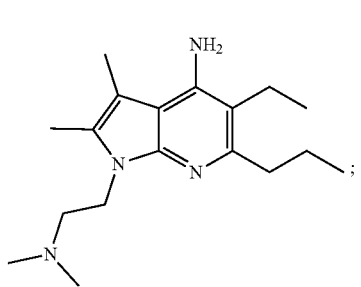
[Formula 1-8]
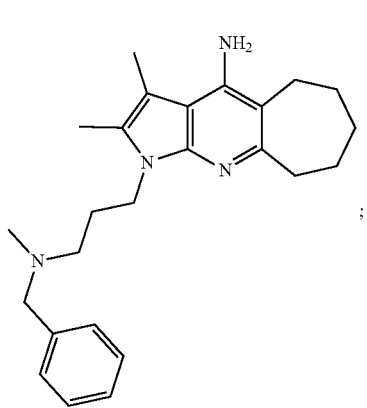
[Formula 1-9]
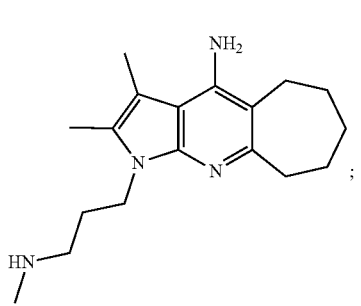
[Formula 1-10]
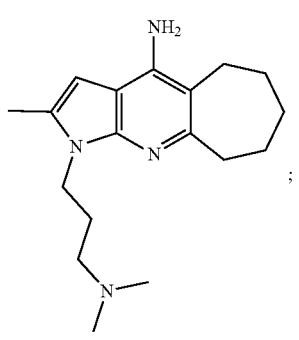

-continued
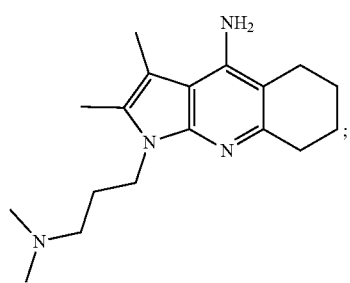
[Formula 1-11]
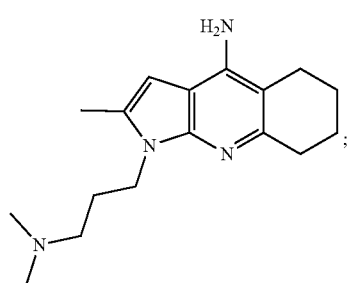
[Formula 1-12]
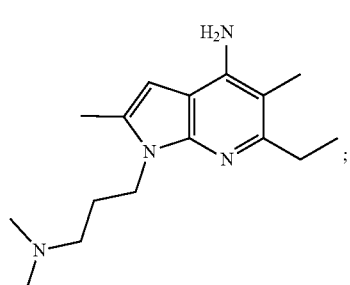
[Formula 1-13]
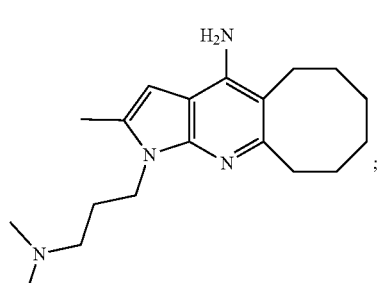
[Formula 1-14]
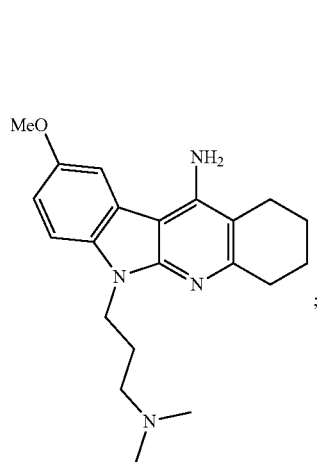
[Formual 1-15]
-continued
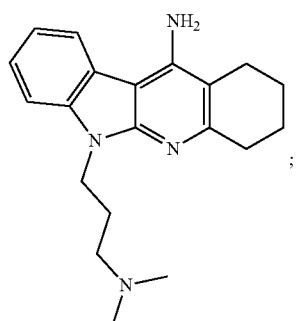
[Formula 1-16]
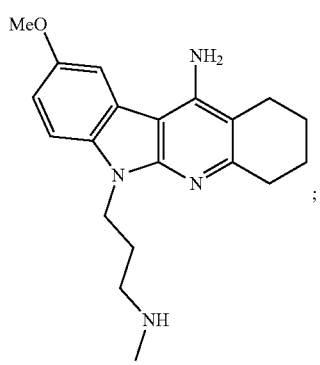
[Formula 1-17]
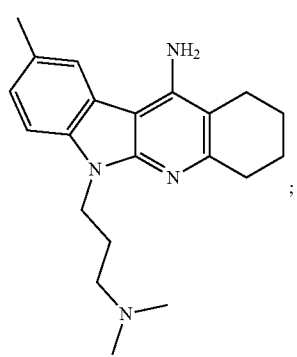
[Formula 1-18]
[Formula 1-19]

[Formula 1-20]
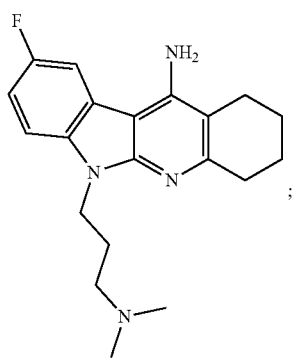
[Formula 1-21]
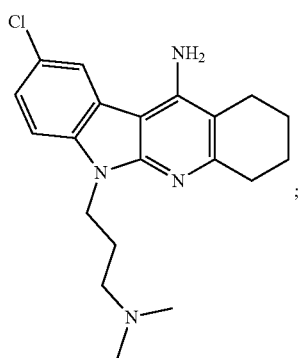
[Formula 1-22]
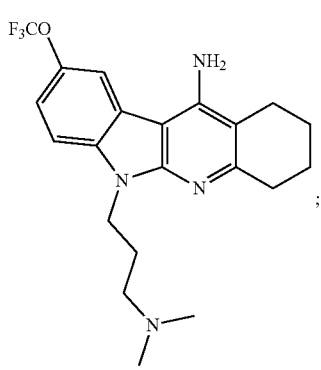
[Formula 1-23]
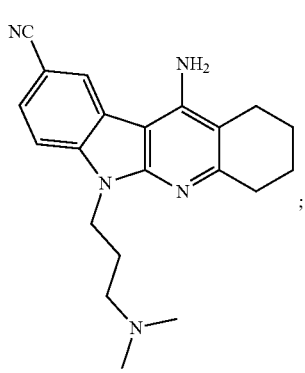
[Formula 1-24]
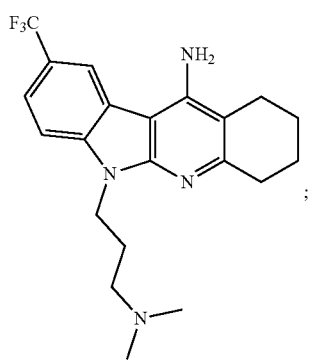
[Formula 1-25]
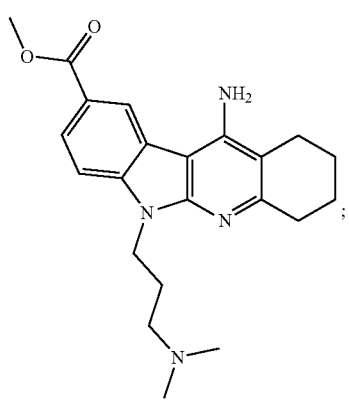
[Formula 1-26]
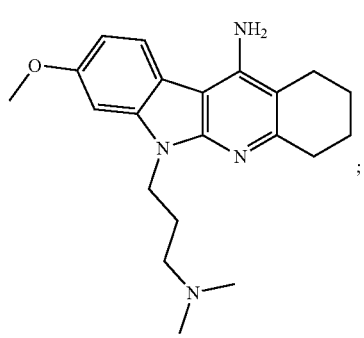
[Formula 1-27]
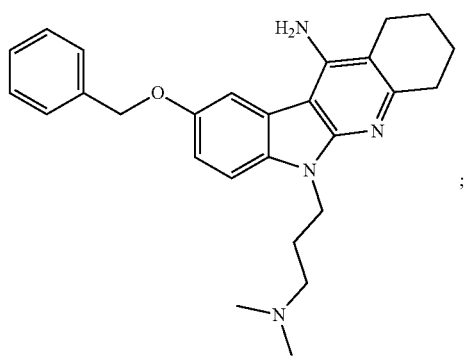

[Formula 1-28]
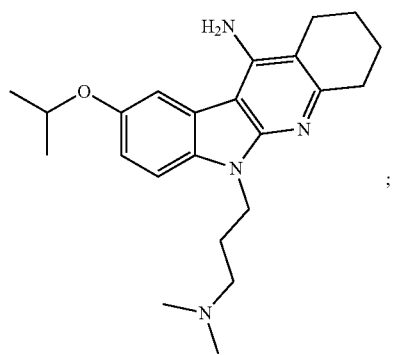
[Formula 1-29]
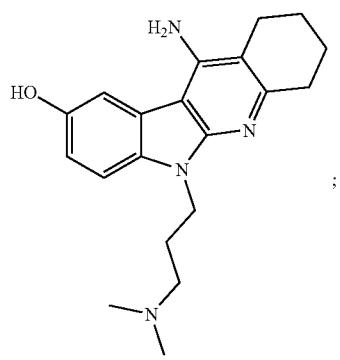
[Formula 1-30]
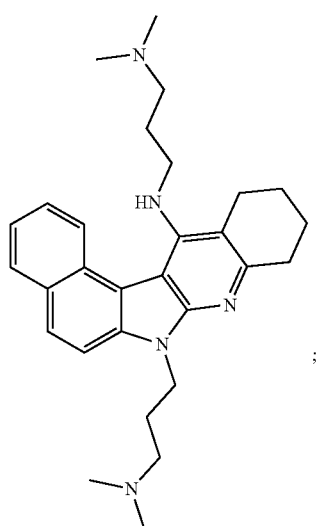
[Formula 1-31]
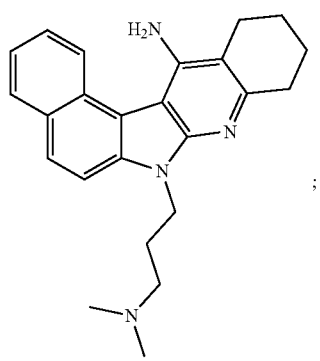
[Formula 1-32]
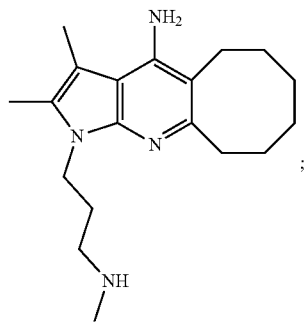
[Formula 1-33]
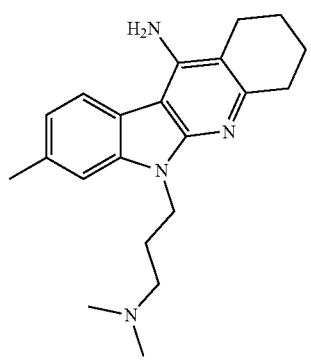
[Formula 1-34]
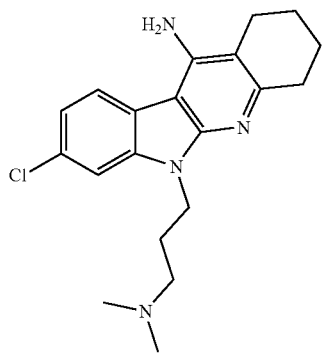
3. A composition comprising a compound of the following Formula 1, an isomer thereof, or a pharmaceutically acceptable salt thereof:
[Formula 1]
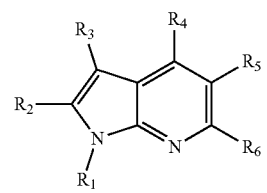
wherein $R_1$ to $R_6$ are substituents selected from the group consisting of the following substituents:

$R_1$:
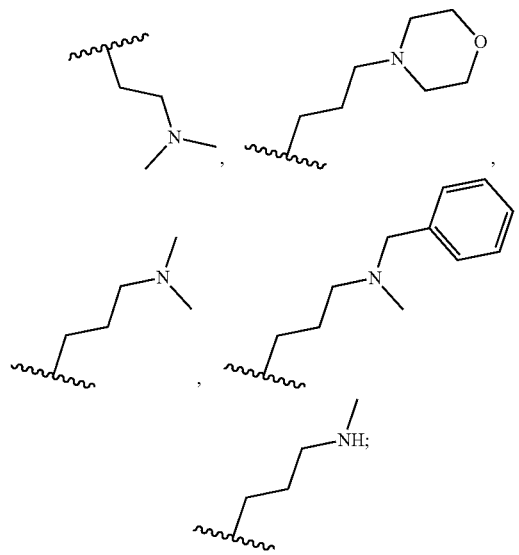
$R_2$:
$R_3$:
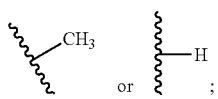
or
$R_2$ and $R_3$:
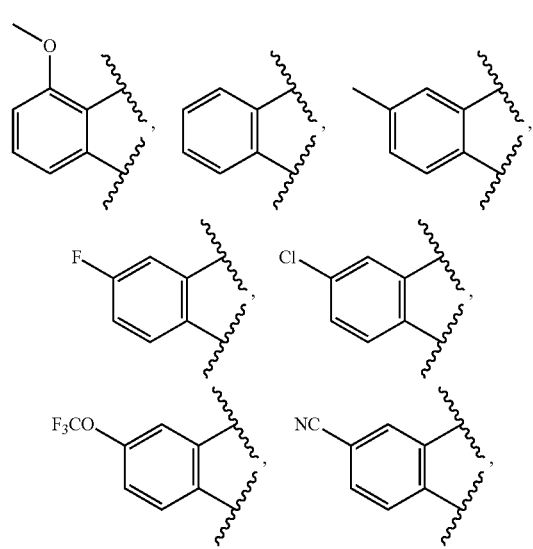
-continued
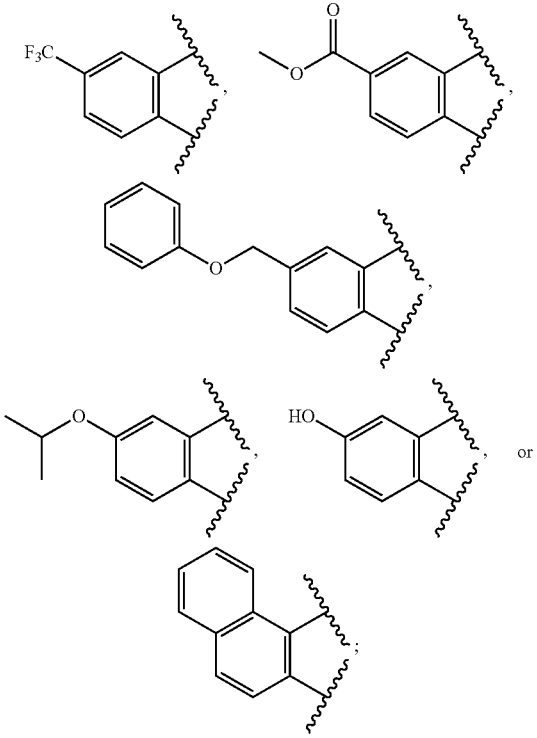
$R_4$:
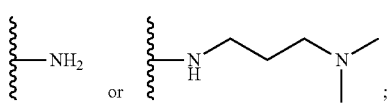
$R_5$:
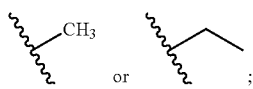
$R_6$:
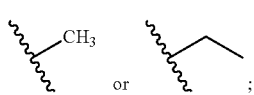
or
$R_5$ and $R_6$:
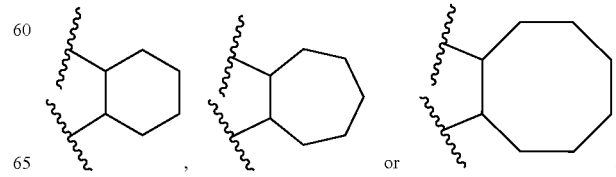

4. The composition according to claim 3, wherein the compound of Formula 1 is a compound represented by any one selected from the group consisting of the following Formulas 1-1 to 1-34:
[Formula 1-1]
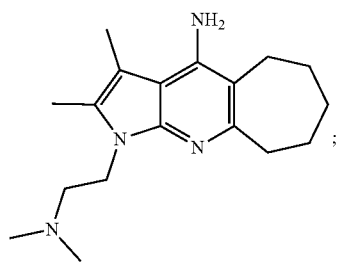
[Formula 1-2]
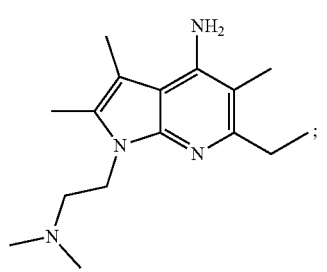
[Formula 1-3]
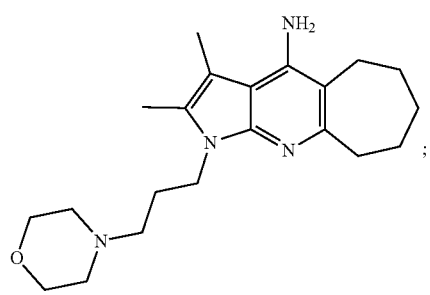
[Formula 1-4]
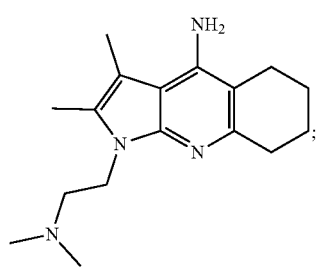
[Formula 1-5]
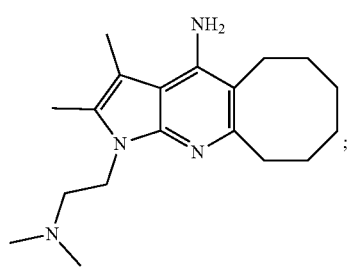
[Formula 1-6]
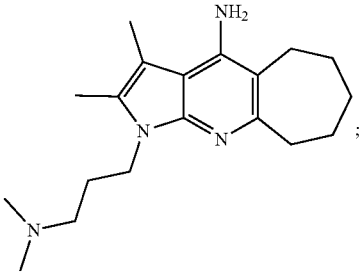
[Formula 1-7]
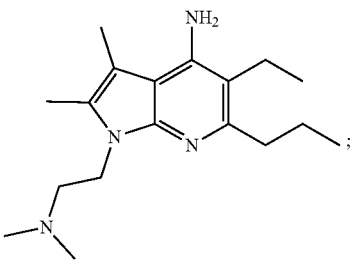
[Formula 1-8]
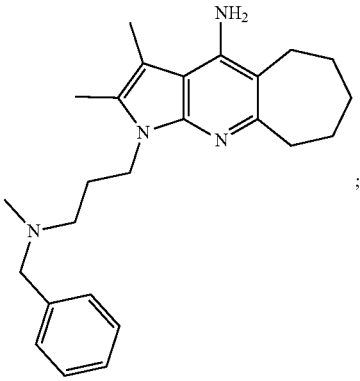
[Formula 1-9]
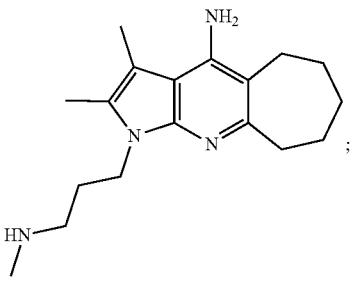
[Formula 1-10]
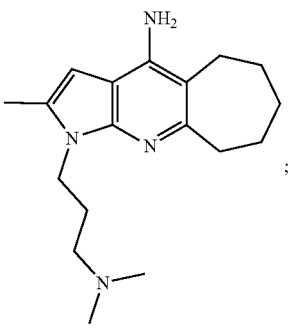

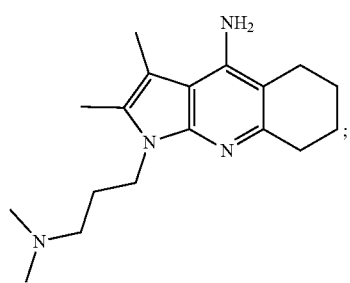
[Formula 1-11]
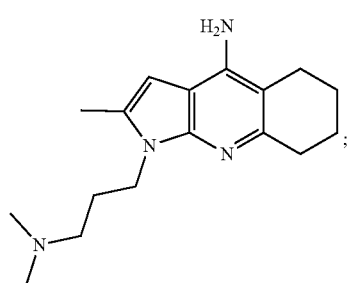
[Formula 1-12]
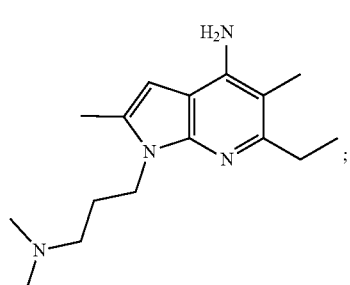
[Formula 1-13]
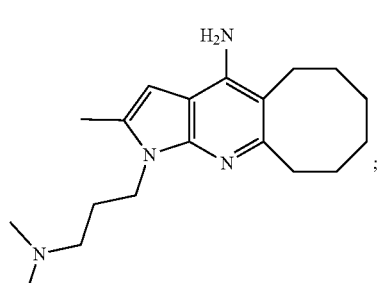
[Formula 1-14]
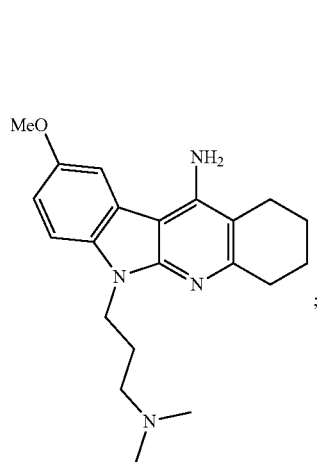
[Formual 1-15]
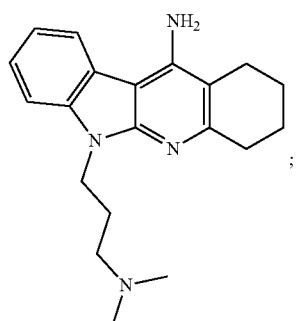
[Formula 1-16]
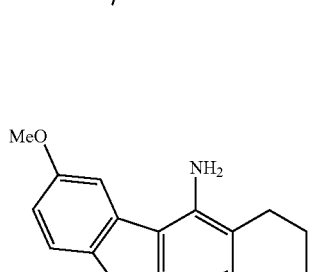
[Formula 1-17]
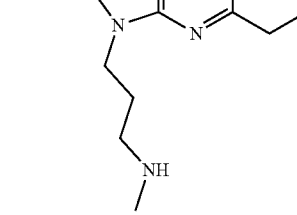
[Formula 1-18]
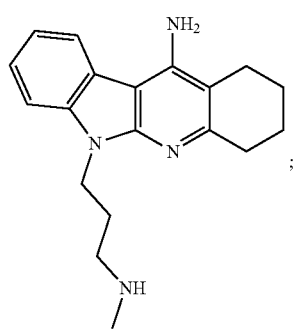
[Formula 1-19]

[Formula 1-20]
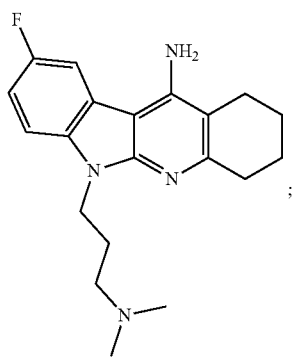
[Formula 1-21]
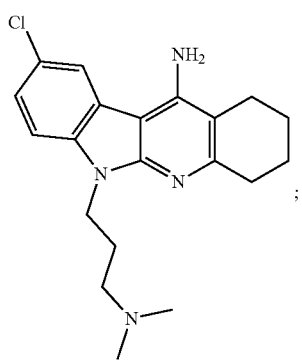
[Formula 1-22]
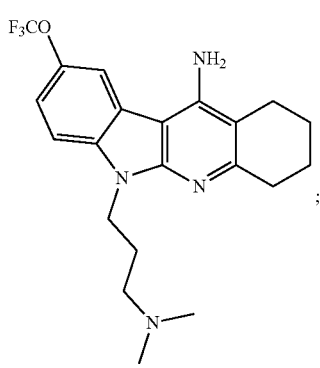
[Formula 1-23]
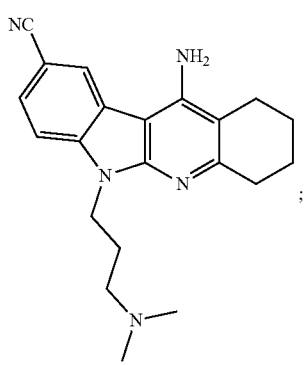
[Formula 1-24]
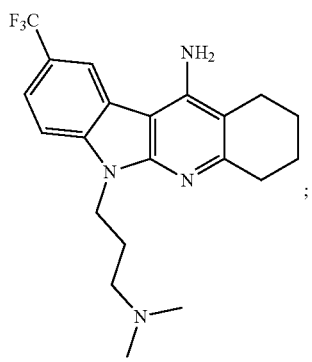
[Formula 1-25]
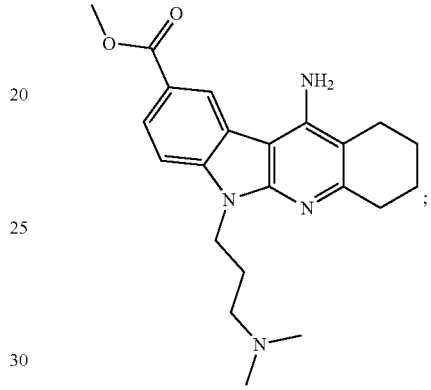
[Formula 1-26]
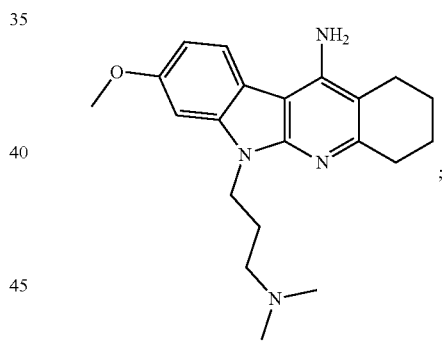
[Formula 1-27]
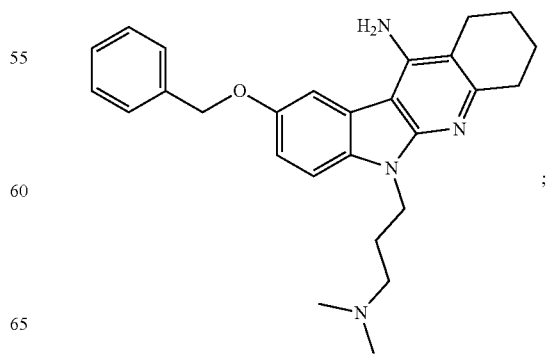

[Formula 1-28]

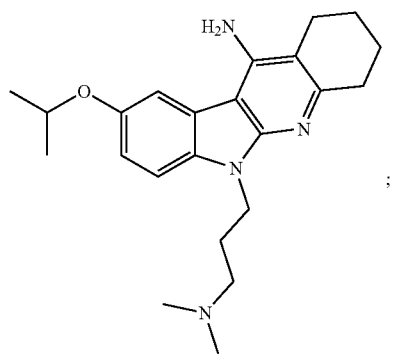

[Formula 1-29]

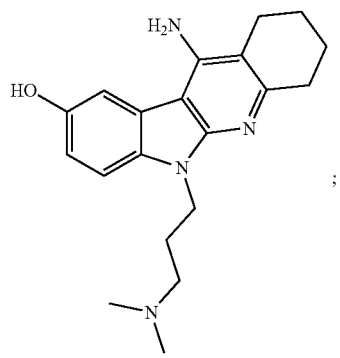

[Formula 1-30]

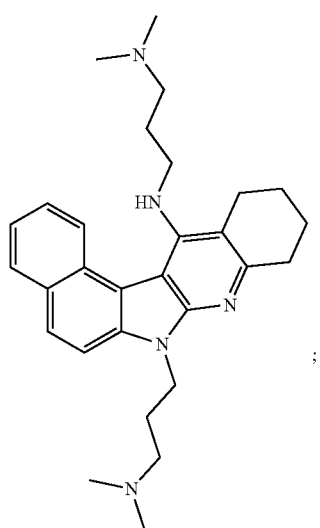

[Formula 1-31]

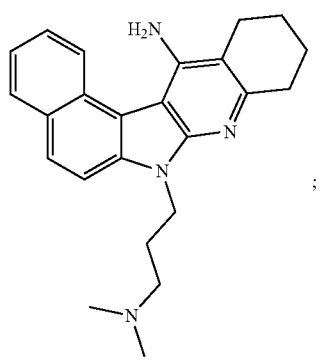

[Formula 1-32]

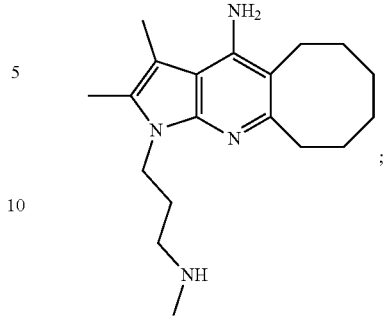

[Formula 1-33]

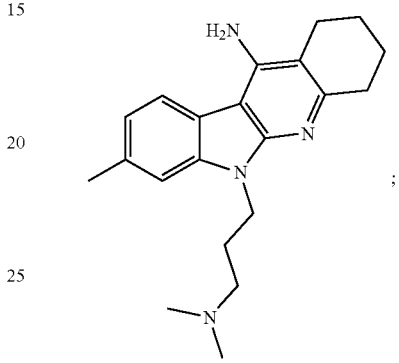

[Formula 1-34]

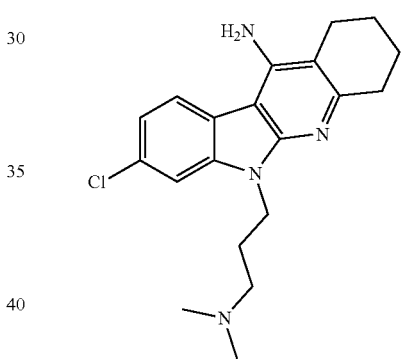

5. The composition according to claim 4, wherein the compound inhibits a signaling pathway of at least one TLR selected from the group consisting of TLR3, TLR7, TLR8, and TLR9.

6. A method for treating an autoimmune disease, an inflammatory disease, or a viral disease in a need thereof, comprising administering the compound or pharmaceutically acceptable salt thereof according to claim 1 to the subject.

7. The method according to claim 6, wherein the autoimmune disease or inflammatory disease is selected from the group consisting of psoriasis, systemic lupus erythematosus (SLE), skin rash, photosensitive skin diseases, rheumatoid arthritis, juvenile rheumatoid arthritis, psoriatic arthritis, discoid lupus erythematosus, malaria, oral ulcer, nephritis, hemocytopenia, vasculitis, serositis, inflammatory bowel disease (IBD), diabetes, multiple sclerosis, skin sclerosis, pemphigus, atopic dermatitis, urethritis, cystitis, arteriosclerosis, allergic diseases, rhinitis, asthma, acute pain, chronic pain, periodontitis, gingivitis, gout, myocardial infarction, congestive heart failure, high blood pressure, angina pectoris, gastric ulcer, cerebral infarction, Down's syndrome, obesity, dementia, depression, schizophrenia, tuberculosis, sleep disorders, sepsis, burns, pancreatitis, Parkinson's disease, and stroke, and the viral disease is selected from the group consisting of cold, flu (influenza), chickenpox, herpes zoster, herpes simplex, infectious mononucleosis, cytomegalovirus infection, measles, mumps, rubella, parvovirus infection, polio, virus hemorrhagic fever, yellow fever, dengue fever, rabies, AIDS and Covid-19.

* * * * *